United States Patent
Diaz Delgado et al.

(10) Patent No.: US 11,750,888 B2
(45) Date of Patent: Sep. 5, 2023

(54) USER INTERFACES INCLUDING SELECTABLE REPRESENTATIONS OF CONTENT ITEMS

(71) Applicant: Apple Inc., Cupertino, CA (US)

(72) Inventors: Juliana Diaz Delgado, San Jose, CA (US); Sean M. Harold, San Jose, CA (US); William D. Carpenter, San Mateo, CA (US); Jose J. Aroche Martinez, San Jose, CA (US); Benjamin T. Christie, Santa Barbara, CA (US); Anton M. Davydov, Gilroy, CA (US); David M. Moretti, Orinda, CA (US); Oscar H. Walden, Los Angeles, CA (US); Justin Gaussoin, Corona Del Mar, CA (US); Policarpo Bonilla Wood, San Jose, CA (US); Florian Maxime Ponson, San Jose, CA (US)

(73) Assignee: Apple Inc., Cupertino, CA (US)

( * ) Notice: Subject to any disclaimer, the term of this patent is extended or adjusted under 35 U.S.C. 154(b) by 113 days.

(21) Appl. No.: 17/367,227

(22) Filed: Jul. 2, 2021

(65) Prior Publication Data

US 2021/0337280 A1 Oct. 28, 2021

Related U.S. Application Data

(63) Continuation of application No. 16/827,942, filed on Mar. 24, 2020, now Pat. No. 11,057,682.
(Continued)

(51) Int. Cl.
*G06F 3/0482* (2013.01)
*H04N 21/482* (2011.01)
(Continued)

(52) U.S. Cl.
CPC ....... *H04N 21/4825* (2013.01); *G06F 3/0482* (2013.01); *G06F 3/0485* (2013.01);
(Continued)

(58) Field of Classification Search
CPC .... G06F 3/0482; G06F 3/0485; G06F 16/743; G06F 9/451; H04N 21/482; H04N 21/47217; H04N 21/4825
See application file for complete search history.

(56) References Cited

U.S. PATENT DOCUMENTS

| 4,672,677 A | 6/1987 | Yamakawa |
| 5,029,223 A | 7/1991 | Fujisaki |

(Continued)

FOREIGN PATENT DOCUMENTS

| AU | 2009255409 B2 | 7/2012 |
| AU | 2016100476 A4 | 5/2016 |

(Continued)

OTHER PUBLICATIONS

Corrected Notice of Allowance received for U.S. Appl. No. 15/876,715, dated Oct. 20, 2021, 2 pages.
(Continued)

*Primary Examiner* — Justin S Lee
(74) *Attorney, Agent, or Firm* — Kubota & Basol LLP

(57) ABSTRACT

In some embodiments, an electronic device presents representations of items of content available for playback on the electronic device. The representations are optionally presented in a horizontally-scrollable row. In response to a user input to horizontally scroll the row of representations, in some embodiments, the electronic device presents an animation of moving a cropping frame/border between respective representations to scroll the presented representations. In some embodiments, an electronic device presents representations of auxiliary content related to an item of content (Continued)

in a product page user interface of the item of content. In some embodiments, an electronic device presents representations of items of content in accordance with content consumption history of the user account. In some embodiments, an electronic device presents representations of bonus content items associated with a series of episodic content.

48 Claims, 134 Drawing Sheets

Related U.S. Application Data

(60) Provisional application No. 62/967,437, filed on Jan. 29, 2020, provisional application No. 62/855,871, filed on May 31, 2019, provisional application No. 62/822,942, filed on Mar. 24, 2019.

(51) Int. Cl.
  *G06F 9/451* (2018.01)
  *G06F 16/74* (2019.01)
  *G06F 3/0485* (2022.01)
  *H04N 21/472* (2011.01)

(52) U.S. Cl.
  CPC ............ *G06F 9/451* (2018.02); *G06F 16/743* (2019.01); *H04N 21/47217* (2013.01); *H04N 21/482* (2013.01)

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,596,373 A | 1/1997 | White et al. |
| 5,621,456 A | 4/1997 | Florin et al. |
| 5,825,352 A | 10/1998 | Bisset et al. |
| 5,835,079 A | 11/1998 | Shieh |
| 5,880,411 A | 3/1999 | Gillespie et al. |
| 5,886,690 A | 3/1999 | Pond et al. |
| 5,926,230 A | 7/1999 | Niijima et al. |
| 6,021,320 A | 2/2000 | Bickford et al. |
| 6,028,600 A | 2/2000 | Rosin et al. |
| 6,188,391 B1 | 2/2001 | Seely et al. |
| 6,310,610 B1 | 10/2001 | Beaton et al. |
| 6,323,846 B1 | 11/2001 | Westerman et al. |
| 6,405,371 B1 | 6/2002 | Oosterhout et al. |
| 6,487,722 B1 | 11/2002 | Okura et al. |
| 6,570,557 B1 | 5/2003 | Westerman et al. |
| 6,628,304 B2 | 9/2003 | Mitchell et al. |
| 6,677,932 B1 | 1/2004 | Westerman |
| 6,690,387 B2 | 2/2004 | Zimmerman et al. |
| 6,745,391 B1 | 6/2004 | Macrae et al. |
| 6,909,837 B1 | 6/2005 | Unger |
| 7,015,894 B2 | 3/2006 | Morohoshi |
| 7,039,879 B2 | 5/2006 | Bergsten et al. |
| 7,103,906 B1 | 9/2006 | Katz et al. |
| 7,134,089 B2 | 11/2006 | Celik et al. |
| 7,184,064 B2 | 2/2007 | Zimmerman et al. |
| 7,213,255 B2 | 5/2007 | Markel et al. |
| 7,293,275 B1 | 11/2007 | Krieger et al. |
| 7,330,192 B2 | 2/2008 | Brunner et al. |
| 7,596,761 B2 | 9/2009 | Lemay et al. |
| 7,614,008 B2 | 11/2009 | Ording |
| 7,631,278 B2 | 12/2009 | Miksovsky et al. |
| 7,633,076 B2 | 12/2009 | Huppi et al. |
| 7,636,897 B2 | 12/2009 | Koralski et al. |
| 7,649,526 B2 | 1/2010 | Ording et al. |
| 7,650,569 B1 | 1/2010 | Allen et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,694,231 B2 | 4/2010 | Kocienda et al. |
| 7,712,051 B2 | 5/2010 | Chadzelek et al. |
| 7,783,892 B2 | 8/2010 | Russell et al. |
| 7,810,043 B2 | 10/2010 | Ostojic et al. |
| 7,814,023 B1 | 10/2010 | Rao et al. |
| 7,827,483 B2 | 11/2010 | Unbedacht et al. |
| 7,836,475 B2 | 11/2010 | Angiolillo et al. |
| 7,844,914 B2 | 11/2010 | Andre et al. |
| 7,849,487 B1 | 12/2010 | Vosseller |
| 7,856,605 B2 | 12/2010 | Ording et al. |
| 7,956,846 B2 | 6/2011 | Ording et al. |
| 7,957,762 B2 | 6/2011 | Herz et al. |
| 7,970,379 B2 | 6/2011 | White et al. |
| 8,006,002 B2 | 8/2011 | Kalayjian et al. |
| 8,026,805 B1 | 9/2011 | Rowe |
| 8,082,523 B2 | 12/2011 | Forstall et al. |
| 8,094,132 B1 | 1/2012 | Frischling et al. |
| 8,115,731 B2 | 2/2012 | Varanda |
| 8,145,617 B1 | 3/2012 | Verstak et al. |
| 8,170,931 B2 | 5/2012 | Ross et al. |
| 8,205,240 B2 | 6/2012 | Ansari et al. |
| 8,239,784 B2 | 8/2012 | Hotelling et al. |
| 8,279,180 B2 | 10/2012 | Hotelling et al. |
| 8,291,452 B1 | 10/2012 | Yong et al. |
| 8,299,889 B2 | 10/2012 | Kumar et al. |
| 8,301,484 B1 | 10/2012 | Kumar |
| 8,312,484 B1 | 11/2012 | Mccarty et al. |
| 8,312,486 B1 | 11/2012 | Briggs et al. |
| 8,325,160 B2 | 12/2012 | St. Pierre et al. |
| 8,346,798 B2 | 1/2013 | Spiegelman et al. |
| 8,370,874 B1 | 2/2013 | Chang et al. |
| 8,381,135 B2 | 2/2013 | Hotelling et al. |
| 8,386,588 B1 | 2/2013 | Cooley |
| 8,407,737 B1 | 3/2013 | Ellis |
| 8,416,217 B1 | 4/2013 | Eriksson et al. |
| 8,418,202 B2 | 4/2013 | Ahmad-taylor |
| 8,424,048 B1 | 4/2013 | Lyren et al. |
| 8,479,122 B2 | 7/2013 | Hotelling et al. |
| 8,495,499 B1 | 7/2013 | Denise |
| 8,516,525 B1 | 8/2013 | Jerding et al. |
| 8,560,398 B1 | 10/2013 | Few et al. |
| 8,584,165 B1 | 11/2013 | Kane et al. |
| 8,607,163 B2 | 12/2013 | Plummer |
| 8,613,015 B2 | 12/2013 | Gordon et al. |
| 8,613,023 B2 | 12/2013 | Narahara et al. |
| 8,674,958 B1 | 3/2014 | Vets et al. |
| 8,683,362 B2 | 3/2014 | Shiplacoff et al. |
| 8,683,517 B2 | 3/2014 | Carpenter et al. |
| 8,730,190 B2 | 5/2014 | Moloney |
| 8,742,885 B2 | 6/2014 | Brodersen et al. |
| 8,754,862 B2 | 6/2014 | Zaliva |
| 8,762,852 B2 | 6/2014 | Davis et al. |
| 8,769,408 B2 | 7/2014 | Madden et al. |
| 8,850,471 B2 | 9/2014 | Kilar et al. |
| 8,850,490 B1 | 9/2014 | Thomas et al. |
| 8,869,207 B1 | 10/2014 | Earle |
| 8,887,202 B2 | 11/2014 | Hunter et al. |
| 8,930,839 B2 | 1/2015 | He et al. |
| 8,952,987 B2 | 2/2015 | Momeyer et al. |
| 8,963,847 B2 | 2/2015 | Hunt |
| 8,983,950 B2 | 3/2015 | Askey et al. |
| 8,988,356 B2 | 3/2015 | Tseng |
| 8,990,857 B2 | 3/2015 | Yong et al. |
| 9,007,322 B1 | 4/2015 | Young |
| 9,066,146 B2 | 6/2015 | Suh et al. |
| 9,081,421 B1 | 7/2015 | Lai et al. |
| 9,092,057 B2 | 7/2015 | Varela et al. |
| 9,116,569 B2 | 8/2015 | Stacy et al. |
| 9,118,967 B2 | 8/2015 | Sirpal et al. |
| 9,141,200 B2 | 9/2015 | Bernstein et al. |
| 9,196,309 B2 | 11/2015 | Schultz et al. |
| 9,214,290 B2 | 12/2015 | Xie et al. |
| 9,219,634 B1 | 12/2015 | Morse et al. |
| 9,235,317 B2 | 1/2016 | Matas et al. |
| 9,241,121 B2 | 1/2016 | Rudolph |
| 9,244,600 B2 | 1/2016 | Mcintosh et al. |
| 9,247,014 B1 | 1/2016 | Rao |
| 9,247,174 B2 | 1/2016 | Sirpal et al. |
| 9,285,977 B1 | 3/2016 | Greenberg et al. |

(56) References Cited

U.S. PATENT DOCUMENTS

| | | |
|---|---|---|
| 9,348,458 B2 | 5/2016 | Hotelling et al. |
| 9,357,250 B1 | 5/2016 | Newman et al. |
| 9,380,343 B2 | 6/2016 | Webster et al. |
| 9,414,108 B2 | 8/2016 | Sirpal et al. |
| 9,454,288 B2 | 9/2016 | Raffle et al. |
| 9,532,111 B1 | 12/2016 | Christie et al. |
| 9,538,310 B2 | 1/2017 | Fjeldsoe-nielsen et al. |
| 9,542,060 B1 | 1/2017 | Brenner et al. |
| 9,560,399 B2 | 1/2017 | Kaya et al. |
| 9,575,944 B2 | 2/2017 | Neil et al. |
| 9,591,339 B1 | 3/2017 | Christie et al. |
| 9,600,159 B2 * | 3/2017 | Lawson ............. G06F 3/04883 |
| 9,602,566 B1 | 3/2017 | Lewis et al. |
| 9,639,241 B2 | 5/2017 | Penha et al. |
| 9,652,448 B2 | 5/2017 | Pasquero et al. |
| 9,658,740 B2 | 5/2017 | Chaudhri |
| 9,774,917 B1 | 9/2017 | Christie et al. |
| 9,792,018 B2 | 10/2017 | Van Os et al. |
| 9,807,462 B2 | 10/2017 | Wood |
| 9,864,508 B2 | 1/2018 | Dixon et al. |
| 9,864,509 B2 | 1/2018 | Howard et al. |
| 9,871,905 B1 | 1/2018 | Habiger et al. |
| 9,913,142 B2 | 3/2018 | Folse et al. |
| 9,933,937 B2 | 4/2018 | Lemay et al. |
| 9,973,800 B2 | 5/2018 | Yellin et al. |
| 10,019,142 B2 | 7/2018 | Van Os et al. |
| 10,025,499 B2 | 7/2018 | Howard et al. |
| 10,079,872 B1 | 9/2018 | Thomas et al. |
| 10,091,558 B2 | 10/2018 | Christie et al. |
| 10,116,996 B1 | 10/2018 | Christie et al. |
| 10,126,904 B2 | 11/2018 | Agnetta et al. |
| 10,168,871 B2 | 1/2019 | Wallters et al. |
| 10,200,761 B1 | 2/2019 | Christie et al. |
| 10,205,985 B2 | 2/2019 | Lue-sang et al. |
| 10,209,866 B2 | 2/2019 | Johnston et al. |
| 10,237,599 B1 | 3/2019 | Gravino et al. |
| 10,275,148 B2 | 4/2019 | Matas et al. |
| 10,282,088 B2 | 5/2019 | Kim et al. |
| 10,303,422 B1 | 5/2019 | Woo et al. |
| 10,521,188 B1 | 12/2019 | Christie et al. |
| 10,551,995 B1 * | 2/2020 | Ho ........................ G06F 3/0486 |
| 10,552,470 B2 | 2/2020 | Todd et al. |
| 10,564,823 B1 | 2/2020 | Dennis et al. |
| 10,601,808 B1 | 3/2020 | Nijim et al. |
| 10,606,539 B2 | 3/2020 | Bernstein et al. |
| 10,631,042 B2 | 4/2020 | Zerr et al. |
| 10,795,490 B2 | 10/2020 | Chaudhri et al. |
| 10,827,007 B2 | 11/2020 | Kode et al. |
| 2002/0015024 A1 | 2/2002 | Westerman et al. |
| 2002/0026637 A1 | 2/2002 | Markel et al. |
| 2002/0042920 A1 | 4/2002 | Thomas et al. |
| 2002/0060750 A1 | 5/2002 | Istvan et al. |
| 2002/0085045 A1 | 7/2002 | Vong et al. |
| 2002/0112239 A1 | 8/2002 | Goldman |
| 2002/0113816 A1 | 8/2002 | Mitchell et al. |
| 2002/0144269 A1 | 10/2002 | Connelly |
| 2002/0171686 A1 | 11/2002 | Kamen et al. |
| 2003/0001907 A1 | 1/2003 | Bergsten et al. |
| 2003/0005445 A1 | 1/2003 | Schein et al. |
| 2003/0009757 A1 | 1/2003 | Kikinis |
| 2003/0011641 A1 | 1/2003 | Totman et al. |
| 2003/0013483 A1 | 1/2003 | Ausems et al. |
| 2003/0088872 A1 | 5/2003 | Maissel et al. |
| 2003/0093790 A1 | 5/2003 | Logan et al. |
| 2003/0126600 A1 | 7/2003 | Heuvelman |
| 2003/0167471 A1 | 9/2003 | Roth et al. |
| 2003/0177075 A1 | 9/2003 | Burke |
| 2003/0177498 A1 | 9/2003 | Ellis et al. |
| 2003/0221191 A1 | 11/2003 | Khusheim |
| 2003/0234804 A1 | 12/2003 | Parker et al. |
| 2004/0070573 A1 | 4/2004 | Graham |
| 2004/0090463 A1 | 5/2004 | Celik et al. |
| 2004/0139401 A1 | 7/2004 | Unbedacht et al. |
| 2004/0161151 A1 | 8/2004 | Iwayama et al. |
| 2004/0168184 A1 | 8/2004 | Steenkamp et al. |
| 2004/0193421 A1 | 9/2004 | Blass |
| 2004/0252120 A1 | 12/2004 | Hunleth et al. |
| 2004/0254958 A1 | 12/2004 | Volk |
| 2005/0012599 A1 | 1/2005 | Dematteo |
| 2005/0071761 A1 | 3/2005 | Kontio |
| 2005/0071785 A1 | 3/2005 | Chadzelek et al. |
| 2005/0091254 A1 | 4/2005 | Stabb et al. |
| 2005/0091597 A1 | 4/2005 | Ackley |
| 2005/0162398 A1 | 7/2005 | Eliasson et al. |
| 2005/0162402 A1 | 7/2005 | Watanachote |
| 2005/0186988 A1 | 8/2005 | Lim et al. |
| 2005/0190059 A1 | 9/2005 | Wehrenberg |
| 2005/0223335 A1 | 10/2005 | Ichikawa |
| 2005/0235316 A1 | 10/2005 | Ahmad-taylor |
| 2005/0257166 A1 | 11/2005 | Tu |
| 2005/0283358 A1 | 12/2005 | Stephanick et al. |
| 2006/0017692 A1 | 1/2006 | Wehrenberg et al. |
| 2006/0020904 A1 | 1/2006 | Aaltonen et al. |
| 2006/0026521 A1 | 2/2006 | Hotelling et al. |
| 2006/0029374 A1 | 2/2006 | Park |
| 2006/0031872 A1 | 2/2006 | Hsiao et al. |
| 2006/0033724 A1 | 2/2006 | Chaudhri et al. |
| 2006/0053449 A1 | 3/2006 | Gutta |
| 2006/0071905 A1 | 4/2006 | Varanda |
| 2006/0080352 A1 | 4/2006 | Boubez et al. |
| 2006/0097991 A1 | 5/2006 | Hotelling et al. |
| 2006/0107304 A1 | 5/2006 | Cleron et al. |
| 2006/0112346 A1 | 5/2006 | Miksovsky et al. |
| 2006/0112352 A1 | 5/2006 | Tseng et al. |
| 2006/0117267 A1 | 6/2006 | Koralski et al. |
| 2006/0195479 A1 | 8/2006 | Spiegelman et al. |
| 2006/0195512 A1 | 8/2006 | Rogers et al. |
| 2006/0197753 A1 | 9/2006 | Hotelling |
| 2006/0224987 A1 | 10/2006 | Caffarelli |
| 2006/0271968 A1 | 11/2006 | Zellner |
| 2006/0282856 A1 | 12/2006 | Errico et al. |
| 2006/0294545 A1 | 12/2006 | Morris et al. |
| 2007/0005569 A1 | 1/2007 | Hurst-hiller et al. |
| 2007/0009229 A1 | 1/2007 | Liu |
| 2007/0028267 A1 | 2/2007 | Ostojic et al. |
| 2007/0038957 A1 | 2/2007 | White |
| 2007/0092204 A1 | 4/2007 | Wagner et al. |
| 2007/0150802 A1 | 6/2007 | Wan et al. |
| 2007/0154163 A1 | 7/2007 | Cordray |
| 2007/0157220 A1 | 7/2007 | Cordray et al. |
| 2007/0157249 A1 | 7/2007 | Cordray et al. |
| 2007/0186254 A1 | 8/2007 | Tsutsui et al. |
| 2007/0199035 A1 | 8/2007 | Schwartz et al. |
| 2007/0204057 A1 | 8/2007 | Shaver et al. |
| 2007/0229465 A1 | 10/2007 | Sakai et al. |
| 2007/0233880 A1 | 10/2007 | Nieh et al. |
| 2007/0244902 A1 | 10/2007 | Seide et al. |
| 2008/0046928 A1 | 2/2008 | Poling et al. |
| 2008/0059884 A1 | 3/2008 | Ellis et al. |
| 2008/0065989 A1 | 3/2008 | Conroy et al. |
| 2008/0066010 A1 | 3/2008 | Brodersen et al. |
| 2008/0077562 A1 | 3/2008 | Schleppe |
| 2008/0092168 A1 | 4/2008 | Logan et al. |
| 2008/0092173 A1 | 4/2008 | Shannon et al. |
| 2008/0111822 A1 | 5/2008 | Horowitz et al. |
| 2008/0120668 A1 | 5/2008 | Yau |
| 2008/0155475 A1 | 6/2008 | Duhig |
| 2008/0189740 A1 | 8/2008 | Carpenter et al. |
| 2008/0189742 A1 | 8/2008 | Ellis et al. |
| 2008/0216020 A1 | 9/2008 | Plummer |
| 2008/0222677 A1 | 9/2008 | Woo et al. |
| 2008/0235588 A1 | 9/2008 | Gonze et al. |
| 2008/0243817 A1 | 10/2008 | Chan et al. |
| 2008/0250312 A1 | 10/2008 | Curtis |
| 2008/0260252 A1 | 10/2008 | Borgaonkar et al. |
| 2008/0270886 A1 | 10/2008 | Gossweiler et al. |
| 2008/0276279 A1 | 11/2008 | Gossweiler et al. |
| 2008/0301579 A1 | 12/2008 | Jonasson et al. |
| 2008/0301734 A1 | 12/2008 | Goldeen et al. |
| 2008/0307343 A1 | 12/2008 | Robert et al. |
| 2008/0307458 A1 | 12/2008 | Kim et al. |
| 2008/0307459 A1 | 12/2008 | Migos |
| 2008/0320391 A1 | 12/2008 | Lemay et al. |
| 2008/0320532 A1 | 12/2008 | Lee |

(56) References Cited

U.S. PATENT DOCUMENTS

| | | |
|---|---|---|
| 2009/0055385 A1 | 2/2009 | Jeon et al. |
| 2009/0063975 A1 | 3/2009 | Rottler et al. |
| 2009/0089837 A1 | 4/2009 | Momosaki |
| 2009/0094662 A1 | 4/2009 | Chang et al. |
| 2009/0119754 A1 | 5/2009 | Schubert |
| 2009/0158325 A1 | 6/2009 | Johnson |
| 2009/0158326 A1 | 6/2009 | Hunt et al. |
| 2009/0161868 A1 | 6/2009 | Chaudhry |
| 2009/0165054 A1 | 6/2009 | Rudolph |
| 2009/0174679 A1 | 7/2009 | Westerman |
| 2009/0177989 A1 | 7/2009 | Ma et al. |
| 2009/0178083 A1 | 7/2009 | Carr et al. |
| 2009/0228491 A1 | 9/2009 | Malik |
| 2009/0239587 A1 | 9/2009 | Negron et al. |
| 2009/0256807 A1 | 10/2009 | Nurmi |
| 2009/0259957 A1 | 10/2009 | Slocum et al. |
| 2009/0278916 A1* | 11/2009 | Ito .................. G06F 3/0489 348/51 |
| 2009/0288079 A1 | 11/2009 | Zuber et al. |
| 2009/0313100 A1 | 12/2009 | Ingleshwar |
| 2009/0322962 A1 | 12/2009 | Weeks |
| 2009/0327952 A1 | 12/2009 | Karas et al. |
| 2010/0009629 A1 | 1/2010 | Jung et al. |
| 2010/0031162 A1 | 2/2010 | Wiser et al. |
| 2010/0053220 A1 | 3/2010 | Ozawa et al. |
| 2010/0053432 A1 | 3/2010 | Cheng et al. |
| 2010/0057696 A1 | 3/2010 | Miyazawa et al. |
| 2010/0064313 A1 | 3/2010 | Beyabani |
| 2010/0080163 A1 | 4/2010 | Krishnamoorthi et al. |
| 2010/0083181 A1* | 4/2010 | Matsushima ......... G06F 3/0484 715/835 |
| 2010/0095240 A1 | 4/2010 | Shiplacoff et al. |
| 2010/0100899 A1 | 4/2010 | Bradbury et al. |
| 2010/0104269 A1 | 4/2010 | Prestenback et al. |
| 2010/0115592 A1 | 5/2010 | Belz et al. |
| 2010/0121714 A1 | 5/2010 | Bryant et al. |
| 2010/0146442 A1 | 6/2010 | Nagasaka et al. |
| 2010/0153999 A1 | 6/2010 | Yates |
| 2010/0159898 A1 | 6/2010 | Krzyzanowski et al. |
| 2010/0162172 A1 | 6/2010 | Aroner |
| 2010/0194998 A1 | 8/2010 | Lee et al. |
| 2010/0198822 A1 | 8/2010 | Glennon et al. |
| 2010/0205628 A1 | 8/2010 | Davis et al. |
| 2010/0211636 A1 | 8/2010 | Starkenburg et al. |
| 2010/0223646 A1 | 9/2010 | Goldeen et al. |
| 2010/0229194 A1 | 9/2010 | Blanchard et al. |
| 2010/0235744 A1 | 9/2010 | Schultz et al. |
| 2010/0251304 A1 | 9/2010 | Donoghue et al. |
| 2010/0269145 A1 | 10/2010 | Ingrassia et al. |
| 2010/0277337 A1 | 11/2010 | Brodersen et al. |
| 2010/0293190 A1 | 11/2010 | Kaiser et al. |
| 2010/0293586 A1 | 11/2010 | Simoes et al. |
| 2010/0312824 A1 | 12/2010 | Smith et al. |
| 2010/0325660 A1 | 12/2010 | Holden |
| 2010/0333142 A1 | 12/2010 | Busse et al. |
| 2010/0333143 A1 | 12/2010 | Civanlar et al. |
| 2011/0004831 A1 | 1/2011 | Steinberg et al. |
| 2011/0047513 A1 | 2/2011 | Onogi et al. |
| 2011/0054649 A1 | 3/2011 | Sarkis et al. |
| 2011/0055870 A1 | 3/2011 | Yum et al. |
| 2011/0071977 A1 | 3/2011 | Nakajima et al. |
| 2011/0078739 A1 | 3/2011 | Grad |
| 2011/0080935 A1 | 4/2011 | Kim et al. |
| 2011/0087992 A1 | 4/2011 | Wang et al. |
| 2011/0090402 A1 | 4/2011 | Huntington et al. |
| 2011/0093415 A1 | 4/2011 | Rhee et al. |
| 2011/0119715 A1 | 5/2011 | Chang et al. |
| 2011/0131607 A1 | 6/2011 | Thomas et al. |
| 2011/0154194 A1 | 6/2011 | Mathai et al. |
| 2011/0154305 A1 | 6/2011 | Leroux et al. |
| 2011/0157029 A1 | 6/2011 | Tseng |
| 2011/0163971 A1 | 7/2011 | Wagner et al. |
| 2011/0175930 A1 | 7/2011 | Hwang et al. |
| 2011/0179388 A1 | 7/2011 | Fleizach et al. |
| 2011/0179453 A1 | 7/2011 | Poniatowski |
| 2011/0209177 A1 | 8/2011 | Sela et al. |
| 2011/0218948 A1 | 9/2011 | De et al. |
| 2011/0231280 A1 | 9/2011 | Farah |
| 2011/0231823 A1 | 9/2011 | Frye et al. |
| 2011/0231872 A1 | 9/2011 | Gharachorloo et al. |
| 2011/0231878 A1 | 9/2011 | Hunter et al. |
| 2011/0283304 A1 | 11/2011 | Roberts et al. |
| 2011/0283333 A1 | 11/2011 | Ukkadam |
| 2011/0289064 A1 | 11/2011 | Lebeau et al. |
| 2011/0289317 A1 | 11/2011 | Darapu et al. |
| 2011/0289419 A1 | 11/2011 | Yu et al. |
| 2011/0289421 A1 | 11/2011 | Jordan et al. |
| 2011/0289452 A1 | 11/2011 | Jordan et al. |
| 2011/0289531 A1 | 11/2011 | Moonka et al. |
| 2011/0289534 A1 | 11/2011 | Jordan et al. |
| 2011/0296351 A1 | 12/2011 | Ewing et al. |
| 2011/0302532 A1 | 12/2011 | Missig |
| 2011/0312278 A1 | 12/2011 | Matsushita et al. |
| 2011/0321072 A1 | 12/2011 | Patterson et al. |
| 2012/0019674 A1 | 1/2012 | Ohnishi et al. |
| 2012/0036552 A1 | 2/2012 | Dare et al. |
| 2012/0042245 A1 | 2/2012 | Askey et al. |
| 2012/0042343 A1 | 2/2012 | Laligand et al. |
| 2012/0053887 A1 | 3/2012 | Nurmi |
| 2012/0054178 A1 | 3/2012 | Tran et al. |
| 2012/0054642 A1 | 3/2012 | Balsiger et al. |
| 2012/0054797 A1 | 3/2012 | Skog et al. |
| 2012/0059910 A1 | 3/2012 | Cassidy |
| 2012/0060092 A1 | 3/2012 | Hill et al. |
| 2012/0064204 A1 | 3/2012 | Davila et al. |
| 2012/0084136 A1 | 4/2012 | Seth et al. |
| 2012/0102573 A1 | 4/2012 | Spooner et al. |
| 2012/0105367 A1 | 5/2012 | Son et al. |
| 2012/0110616 A1 | 5/2012 | Kilar et al. |
| 2012/0110621 A1 | 5/2012 | Gossweiler, III |
| 2012/0114303 A1 | 5/2012 | Chung et al. |
| 2012/0117584 A1 | 5/2012 | Gordon |
| 2012/0139938 A1 | 6/2012 | Khedouri et al. |
| 2012/0144003 A1 | 6/2012 | Rosenbaum et al. |
| 2012/0158524 A1 | 6/2012 | Hintz et al. |
| 2012/0173991 A1 | 7/2012 | Roberts et al. |
| 2012/0174157 A1 | 7/2012 | Stinson et al. |
| 2012/0198020 A1 | 8/2012 | Parker et al. |
| 2012/0198336 A1 | 8/2012 | Novotny et al. |
| 2012/0210366 A1 | 8/2012 | Wong et al. |
| 2012/0216113 A1 | 8/2012 | Li |
| 2012/0216117 A1 | 8/2012 | Arriola et al. |
| 2012/0216296 A1 | 8/2012 | Kidron |
| 2012/0221498 A1 | 8/2012 | Kaszynski et al. |
| 2012/0233640 A1 | 9/2012 | Odryna et al. |
| 2012/0242704 A1* | 9/2012 | Bamford ............. G06F 3/04817 345/660 |
| 2012/0260291 A1 | 10/2012 | Wood |
| 2012/0260293 A1 | 10/2012 | Young et al. |
| 2012/0262371 A1 | 10/2012 | Lee et al. |
| 2012/0266069 A1 | 10/2012 | Moshiri et al. |
| 2012/0272261 A1 | 10/2012 | Reynolds et al. |
| 2012/0284753 A1 | 11/2012 | Roberts et al. |
| 2012/0290933 A1 | 11/2012 | Rajaraman et al. |
| 2012/0291079 A1 | 11/2012 | Gordon et al. |
| 2012/0308143 A1 | 12/2012 | Bellegarda et al. |
| 2012/0311443 A1 | 12/2012 | Chaudhri et al. |
| 2012/0311638 A1 | 12/2012 | Reyna et al. |
| 2012/0317482 A1 | 12/2012 | Barraclough et al. |
| 2012/0324504 A1 | 12/2012 | Archer et al. |
| 2012/0327125 A1 | 12/2012 | Kutliroff et al. |
| 2013/0014150 A1 | 1/2013 | Seo et al. |
| 2013/0014159 A1 | 1/2013 | Wiser et al. |
| 2013/0021288 A1 | 1/2013 | Kaerkkaeinen et al. |
| 2013/0024895 A1 | 1/2013 | Yong et al. |
| 2013/0031585 A1 | 1/2013 | Itagaki et al. |
| 2013/0033643 A1 | 2/2013 | Kim et al. |
| 2013/0042271 A1 | 2/2013 | Yellin et al. |
| 2013/0061234 A1 | 3/2013 | Piira et al. |
| 2013/0067366 A1 | 3/2013 | Almosnino |
| 2013/0073403 A1 | 3/2013 | Tuchman et al. |
| 2013/0083076 A1 | 4/2013 | Liu et al. |
| 2013/0097009 A1 | 4/2013 | Akadiri |
| 2013/0124998 A1 | 5/2013 | Pendergast et al. |

(56) References Cited

U.S. PATENT DOCUMENTS

| | | | |
|---|---|---|---|
| 2013/0132874 A1 | 5/2013 | He et al. |
| 2013/0132966 A1 | 5/2013 | Chanda et al. |
| 2013/0151300 A1 | 6/2013 | Le et al. |
| 2013/0174193 A1 | 7/2013 | Yu et al. |
| 2013/0179812 A1 | 7/2013 | Bianrosa et al. |
| 2013/0179995 A1 | 7/2013 | Basile et al. |
| 2013/0198686 A1* | 8/2013 | Kawai | G06F 3/0482 715/804 |
| 2013/0205312 A1 | 8/2013 | Huang |
| 2013/0212531 A1* | 8/2013 | Yoshida | G06F 3/0482 715/829 |
| 2013/0247105 A1 | 9/2013 | Jovanovski et al. |
| 2013/0262431 A1 | 10/2013 | Garner et al. |
| 2013/0262558 A1 | 10/2013 | Wood et al. |
| 2013/0262619 A1 | 10/2013 | Goodwin et al. |
| 2013/0262633 A1 | 10/2013 | Goodwin et al. |
| 2013/0263189 A1 | 10/2013 | Garner |
| 2013/0283154 A1 | 10/2013 | Sasakura |
| 2013/0283317 A1 | 10/2013 | Guntupalli et al. |
| 2013/0283318 A1 | 10/2013 | Wannamaker |
| 2013/0285937 A1 | 10/2013 | Billings et al. |
| 2013/0290233 A1 | 10/2013 | Ferren et al. |
| 2013/0290848 A1 | 10/2013 | Billings et al. |
| 2013/0291018 A1 | 10/2013 | Billings et al. |
| 2013/0291037 A1 | 10/2013 | Im et al. |
| 2013/0294755 A1 | 11/2013 | Arme et al. |
| 2013/0312044 A1 | 11/2013 | Itagaki |
| 2013/0326499 A1 | 12/2013 | Mowatt et al. |
| 2013/0326554 A1 | 12/2013 | Shkedi |
| 2013/0326561 A1 | 12/2013 | Pandey |
| 2013/0332838 A1 | 12/2013 | Naggar et al. |
| 2013/0332960 A1 | 12/2013 | Young et al. |
| 2013/0340006 A1 | 12/2013 | Kwan |
| 2013/0347044 A1 | 12/2013 | Lee et al. |
| 2014/0006635 A1 | 1/2014 | Braness et al. |
| 2014/0006951 A1 | 1/2014 | Hunter |
| 2014/0012859 A1 | 1/2014 | Heilprin et al. |
| 2014/0013283 A1 | 1/2014 | Matas et al. |
| 2014/0024341 A1 | 1/2014 | Johan |
| 2014/0033245 A1 | 1/2014 | Barton et al. |
| 2014/0049692 A1 | 2/2014 | Sirpal et al. |
| 2014/0052683 A1 | 2/2014 | Kirkham et al. |
| 2014/0053116 A1 | 2/2014 | Smith et al. |
| 2014/0053195 A1 | 2/2014 | Sirpal et al. |
| 2014/0059605 A1 | 2/2014 | Sirpal et al. |
| 2014/0059615 A1 | 2/2014 | Sirpal et al. |
| 2014/0059635 A1 | 2/2014 | Sirpal et al. |
| 2014/0071068 A1 | 3/2014 | Shih et al. |
| 2014/0075313 A1 | 3/2014 | Bachman et al. |
| 2014/0075316 A1 | 3/2014 | Li |
| 2014/0075394 A1 | 3/2014 | Nawle et al. |
| 2014/0075574 A1 | 3/2014 | Zheng et al. |
| 2014/0082497 A1 | 3/2014 | Chalouhi et al. |
| 2014/0088952 A1 | 3/2014 | Fife et al. |
| 2014/0089816 A1 | 3/2014 | Dipersia et al. |
| 2014/0098102 A1 | 4/2014 | Raffle et al. |
| 2014/0104646 A1 | 4/2014 | Nishiyama |
| 2014/0109204 A1 | 4/2014 | Papillon et al. |
| 2014/0111416 A1 | 4/2014 | Sugiura |
| 2014/0115636 A1 | 4/2014 | Stuckman |
| 2014/0123006 A1 | 5/2014 | Chen et al. |
| 2014/0129232 A1 | 5/2014 | Jones et al. |
| 2014/0130097 A1 | 5/2014 | Londero |
| 2014/0136946 A1 | 5/2014 | Matas |
| 2014/0137029 A1* | 5/2014 | Stephenson | G06F 3/0486 715/784 |
| 2014/0137030 A1 | 5/2014 | Matas |
| 2014/0143683 A1 | 5/2014 | Underwood et al. |
| 2014/0156792 A1 | 6/2014 | Roberts et al. |
| 2014/0157204 A1 | 6/2014 | Roberts et al. |
| 2014/0164966 A1 | 6/2014 | Kim et al. |
| 2014/0168071 A1 | 6/2014 | Ahmed et al. |
| 2014/0171153 A1 | 6/2014 | Kienzle et al. |
| 2014/0173660 A1 | 6/2014 | Correa et al. |
| 2014/0184471 A1 | 7/2014 | Martynov et al. |
| 2014/0189523 A1 | 7/2014 | Shuttleworth et al. |
| 2014/0189574 A1 | 7/2014 | Stallings et al. |
| 2014/0189606 A1 | 7/2014 | Shuttleworth et al. |
| 2014/0196064 A1 | 7/2014 | Kennedy et al. |
| 2014/0208268 A1 | 7/2014 | Jimenez |
| 2014/0208360 A1 | 7/2014 | Kardatzke |
| 2014/0219637 A1 | 8/2014 | Mcintosh et al. |
| 2014/0224867 A1 | 8/2014 | Werner et al. |
| 2014/0244751 A1 | 8/2014 | Tseng |
| 2014/0245148 A1 | 8/2014 | Silva et al. |
| 2014/0245186 A1 | 8/2014 | Tseng |
| 2014/0245222 A1 | 8/2014 | Kovacevic et al. |
| 2014/0250465 A1 | 9/2014 | Mulholland et al. |
| 2014/0250479 A1 | 9/2014 | Lee et al. |
| 2014/0253463 A1 | 9/2014 | Hicks |
| 2014/0259074 A1 | 9/2014 | Ansari et al. |
| 2014/0278072 A1 | 9/2014 | Fino et al. |
| 2014/0278940 A1 | 9/2014 | Wade |
| 2014/0282208 A1 | 9/2014 | Chaudhri |
| 2014/0282636 A1 | 9/2014 | Petander et al. |
| 2014/0282677 A1 | 9/2014 | Mantell et al. |
| 2014/0289226 A1 | 9/2014 | English et al. |
| 2014/0289751 A1 | 9/2014 | Hsu et al. |
| 2014/0310742 A1 | 10/2014 | Kim |
| 2014/0333530 A1 | 11/2014 | Agnetta et al. |
| 2014/0337607 A1 | 11/2014 | Peterson et al. |
| 2014/0340358 A1 | 11/2014 | Martinoli |
| 2014/0341109 A1 | 11/2014 | Cartmell et al. |
| 2014/0344291 A9 | 11/2014 | Simonson et al. |
| 2014/0344294 A1 | 11/2014 | Skeen et al. |
| 2014/0351691 A1 | 11/2014 | Neil et al. |
| 2014/0359598 A1 | 12/2014 | Oliver et al. |
| 2014/0365479 A1 | 12/2014 | Lyons et al. |
| 2014/0365481 A1 | 12/2014 | Novosel et al. |
| 2014/0365919 A1 | 12/2014 | Shaw et al. |
| 2014/0366040 A1 | 12/2014 | Parker et al. |
| 2015/0020127 A1 | 1/2015 | Doshi et al. |
| 2015/0039685 A1 | 2/2015 | Lewis et al. |
| 2015/0046866 A1* | 2/2015 | Shimadate | G06F 3/04883 715/776 |
| 2015/0067582 A1 | 3/2015 | Donnelly et al. |
| 2015/0067724 A1 | 3/2015 | Johnson et al. |
| 2015/0074552 A1 | 3/2015 | Chai et al. |
| 2015/0074603 A1 | 3/2015 | Abe et al. |
| 2015/0082187 A1 | 3/2015 | Wallters et al. |
| 2015/0095460 A1 | 4/2015 | Berger et al. |
| 2015/0095845 A1 | 4/2015 | Chun et al. |
| 2015/0113429 A1 | 4/2015 | Edwards et al. |
| 2015/0134653 A1 | 5/2015 | Bayer et al. |
| 2015/0153571 A1 | 6/2015 | Ballard et al. |
| 2015/0169705 A1 | 6/2015 | Korbecki et al. |
| 2015/0169975 A1 | 6/2015 | Kienzle et al. |
| 2015/0186002 A1 | 7/2015 | Suzuki et al. |
| 2015/0189347 A1 | 7/2015 | Oztaskent et al. |
| 2015/0195624 A1 | 7/2015 | Gossweiler, III |
| 2015/0205591 A1 | 7/2015 | Jitkoff et al. |
| 2015/0296072 A1 | 10/2015 | Zhou et al. |
| 2015/0301729 A1 | 10/2015 | Wang et al. |
| 2015/0309670 A1 | 10/2015 | Wheeler et al. |
| 2015/0312603 A1 | 10/2015 | Singh et al. |
| 2015/0317343 A1 | 11/2015 | Cselle et al. |
| 2015/0334464 A1 | 11/2015 | Shin |
| 2015/0346975 A1 | 12/2015 | Lee et al. |
| 2015/0350741 A1 | 12/2015 | Rajaraman et al. |
| 2015/0355816 A1 | 12/2015 | Shim |
| 2015/0363035 A1 | 12/2015 | Hinckley et al. |
| 2015/0365729 A1 | 12/2015 | Kaya et al. |
| 2015/0370435 A1 | 12/2015 | Kirmse et al. |
| 2015/0370455 A1 | 12/2015 | Van Os et al. |
| 2015/0370920 A1 | 12/2015 | Van Os et al. |
| 2015/0382047 A1 | 12/2015 | Van Os et al. |
| 2016/0004425 A1* | 1/2016 | Yoon | G06F 3/04855 715/763 |
| 2016/0004773 A1 | 1/2016 | Jannink et al. |
| 2016/0005013 A1 | 1/2016 | Perry |
| 2016/0014461 A1 | 1/2016 | Leech et al. |
| 2016/0035119 A1 | 2/2016 | Lee et al. |
| 2016/0036897 A1 | 2/2016 | Kim et al. |
| 2016/0041702 A1 | 2/2016 | Wang |

(56) References Cited

U.S. PATENT DOCUMENTS

| | | |
|---|---|---|
| 2016/0043962 A1 | 2/2016 | Kim et al. |
| 2016/0066004 A1 | 3/2016 | Lieu et al. |
| 2016/0066021 A1 | 3/2016 | Thomas et al. |
| 2016/0066040 A1 | 3/2016 | Webster et al. |
| 2016/0066049 A1 | 3/2016 | Mountain |
| 2016/0078526 A1 | 3/2016 | Nations et al. |
| 2016/0080815 A1 | 3/2016 | Ruffini et al. |
| 2016/0092042 A1 | 3/2016 | Yenigalla et al. |
| 2016/0092559 A1 | 3/2016 | Lind et al. |
| 2016/0099991 A1 | 4/2016 | Lonkar et al. |
| 2016/0105540 A1 | 4/2016 | Kwon et al. |
| 2016/0110064 A1 | 4/2016 | Shapira |
| 2016/0127783 A1 | 5/2016 | Garcia Navarro |
| 2016/0127789 A1 | 5/2016 | Roberts et al. |
| 2016/0133230 A1 | 5/2016 | Daniels et al. |
| 2016/0142783 A1 | 5/2016 | Bagga et al. |
| 2016/0165307 A1 | 6/2016 | Lavender et al. |
| 2016/0188902 A1 | 6/2016 | Jin |
| 2016/0191639 A1 | 6/2016 | Dai et al. |
| 2016/0192017 A1 | 6/2016 | Tirpak |
| 2016/0231885 A1 | 8/2016 | Lee et al. |
| 2016/0249105 A1 | 8/2016 | Carney Landow |
| 2016/0255379 A1 | 9/2016 | Langan et al. |
| 2016/0277785 A1 | 9/2016 | Newman et al. |
| 2016/0345070 A1 | 11/2016 | Beeson et al. |
| 2016/0357305 A1* | 12/2016 | Wells ............... G06F 3/04842 |
| 2016/0357352 A1 | 12/2016 | Matas et al. |
| 2016/0357366 A1 | 12/2016 | Migos et al. |
| 2016/0370982 A1 | 12/2016 | Penha et al. |
| 2017/0010846 A1 | 1/2017 | Bernstein et al. |
| 2017/0010847 A1 | 1/2017 | Bernstein et al. |
| 2017/0013295 A1 | 1/2017 | Wertheimer et al. |
| 2017/0046039 A1* | 2/2017 | Karunamuni ....... G06F 3/04855 |
| 2017/0046339 A1 | 2/2017 | Bhat et al. |
| 2017/0068402 A1 | 3/2017 | Lochhead et al. |
| 2017/0068511 A1 | 3/2017 | Brown et al. |
| 2017/0094360 A1 | 3/2017 | Keighran et al. |
| 2017/0097969 A1 | 4/2017 | Stein et al. |
| 2017/0115867 A1 | 4/2017 | Bargmann |
| 2017/0124594 A1 | 5/2017 | Naiga et al. |
| 2017/0132659 A1 | 5/2017 | Dirks et al. |
| 2017/0132829 A1 | 5/2017 | Blas et al. |
| 2017/0134778 A1 | 5/2017 | Christie et al. |
| 2017/0188116 A1 | 6/2017 | Major et al. |
| 2017/0192642 A1 | 7/2017 | Fishman et al. |
| 2017/0195736 A1 | 7/2017 | Chai et al. |
| 2017/0201850 A1 | 7/2017 | Raleigh et al. |
| 2017/0214975 A1 | 7/2017 | Schmidt et al. |
| 2017/0242913 A1 | 8/2017 | Tijssen et al. |
| 2017/0245017 A1 | 8/2017 | Chaudhri et al. |
| 2017/0251257 A1 | 8/2017 | Obrien |
| 2017/0300151 A1 | 10/2017 | Lue-sang et al. |
| 2017/0339443 A1 | 11/2017 | Lue-sang et al. |
| 2017/0344553 A1 | 11/2017 | Evnine et al. |
| 2017/0353603 A1 | 12/2017 | Grunewald et al. |
| 2017/0357387 A1 | 12/2017 | Clarke |
| 2017/0359722 A1 | 12/2017 | Folse et al. |
| 2017/0364246 A1 | 12/2017 | Van Os et al. |
| 2018/0011580 A1 | 1/2018 | Lebowitz et al. |
| 2018/0041814 A1 | 2/2018 | Christie et al. |
| 2018/0063591 A1 | 3/2018 | Newman et al. |
| 2018/0070121 A1 | 3/2018 | Zimmerman et al. |
| 2018/0070138 A1 | 3/2018 | Chai et al. |
| 2018/0107353 A1 | 4/2018 | Lee |
| 2018/0113579 A1 | 4/2018 | Johnston et al. |
| 2018/0130097 A1 | 5/2018 | Tran et al. |
| 2018/0136800 A1 | 5/2018 | Johnston et al. |
| 2018/0146377 A1 | 5/2018 | Folse et al. |
| 2018/0189076 A1 | 7/2018 | Liston et al. |
| 2018/0253900 A1 | 9/2018 | Finding et al. |
| 2018/0275855 A1 | 9/2018 | Van Os et al. |
| 2018/0293771 A1 | 10/2018 | Piemonte et al. |
| 2018/0295403 A1 | 10/2018 | Christie et al. |
| 2018/0302680 A1 | 10/2018 | Cormican |
| 2018/0343497 A1 | 11/2018 | Brown et al. |
| 2018/0367834 A1* | 12/2018 | Carpenter ........ H04N 21/47202 |
| 2019/0012048 A1 | 1/2019 | Johnston et al. |
| 2019/0020925 A1 | 1/2019 | Christie et al. |
| 2019/0028769 A1 | 1/2019 | Jeon et al. |
| 2019/0045271 A1 | 2/2019 | Christie et al. |
| 2019/0052744 A1* | 2/2019 | Jung ................... G06F 3/04817 |
| 2019/0058921 A1 | 2/2019 | Christie et al. |
| 2019/0073104 A1* | 3/2019 | Wang ................. G06F 3/04883 |
| 2019/0129588 A1 | 5/2019 | Johnston et al. |
| 2019/0138163 A1 | 5/2019 | Howland et al. |
| 2019/0141399 A1 | 5/2019 | Auxer et al. |
| 2019/0258373 A1 | 8/2019 | Davydov et al. |
| 2019/0272853 A1 | 9/2019 | Moore |
| 2019/0342616 A1 | 11/2019 | Domm et al. |
| 2019/0354264 A1 | 11/2019 | Van Os et al. |
| 2019/0373320 A1 | 12/2019 | Balsamo |
| 2020/0068274 A1 | 2/2020 | Aher et al. |
| 2020/0084488 A1 | 3/2020 | Christie et al. |
| 2020/0099985 A1 | 3/2020 | Keighran et al. |
| 2020/0133631 A1 | 4/2020 | Christie et al. |
| 2020/0137175 A1 | 4/2020 | Ganci et al. |
| 2020/0257415 A1 | 8/2020 | Clarke |
| 2020/0272666 A1 | 8/2020 | Van Os et al. |
| 2020/0301567 A1 | 9/2020 | Park et al. |
| 2020/0301575 A1 | 9/2020 | Lindholm et al. |
| 2020/0304863 A1 | 9/2020 | Domm et al. |
| 2020/0304876 A1 | 9/2020 | Cielak et al. |
| 2020/0304879 A1 | 9/2020 | Ellingford |
| 2020/0304880 A1 | 9/2020 | Diaz Delgado et al. |
| 2020/0363934 A1 | 11/2020 | Van Os et al. |
| 2020/0380029 A1 | 12/2020 | Chen |
| 2020/0382845 A1 | 12/2020 | Payne |
| 2020/0396507 A1 | 12/2020 | Balsamo |
| 2021/0021903 A1 | 1/2021 | Christie et al. |
| 2021/0168424 A1 | 6/2021 | Sharma |
| 2021/0181901 A1 | 6/2021 | Johnston et al. |
| 2021/0306711 A1 | 9/2021 | Ellingford et al. |
| 2021/0345004 A1 | 11/2021 | Christie et al. |
| 2021/0397306 A1 | 12/2021 | Rajam et al. |
| 2022/0179526 A1 | 6/2022 | Schöberl |
| 2022/0321940 A1 | 10/2022 | Christie et al. |
| 2022/0329891 A1 | 10/2022 | Christie et al. |

FOREIGN PATENT DOCUMENTS

| | | |
|---|---|---|
| AU | 2017101431 A4 | 11/2017 |
| AU | 2018100810 A4 | 7/2018 |
| CN | 1295419 A | 5/2001 |
| CN | 101436110 A | 5/2009 |
| CN | 101465993 A | 6/2009 |
| CN | 101719125 A | 6/2010 |
| CN | 101860447 A | 10/2010 |
| CN | 102098537 A | 6/2011 |
| CN | 102325144 A | 1/2012 |
| CN | 102890615 A | 1/2013 |
| CN | 103037265 A | 4/2013 |
| CN | 103177738 A | 6/2013 |
| CN | 103516933 A | 1/2014 |
| CN | 103546816 A | 1/2014 |
| CN | 103562848 A | 2/2014 |
| CN | 103620541 A | 3/2014 |
| CN | 104508618 A | 4/2015 |
| CN | 104822098 A | 8/2015 |
| CN | 105264479 A | 1/2016 |
| CN | 105812849 A | 7/2016 |
| CN | 105955520 A | 9/2016 |
| CN | 105955607 A | 9/2016 |
| CN | 105989085 A | 10/2016 |
| CN | 105992068 A | 10/2016 |
| DE | 202016003233 U1 | 8/2016 |
| EP | 0608708 A2 | 8/1994 |
| EP | 0624853 A2 | 11/1994 |
| EP | 2386984 A2 | 11/2011 |
| EP | 2453667 A1 | 5/2012 |
| EP | 2535844 A2 | 12/2012 |
| EP | 2642402 A2 | 9/2013 |
| EP | 2672703 A1 | 12/2013 |
| EP | 2704032 A2 | 3/2014 |
| EP | 2725531 A1 | 4/2014 |

(56) References Cited

FOREIGN PATENT DOCUMENTS

| | | |
|---|---|---|
| EP | 2879398 A1 | 6/2015 |
| JP | 2000-112977 A | 4/2000 |
| JP | 2000-163031 A | 6/2000 |
| JP | 2001-197445 A | 7/2001 |
| JP | 2002-27381 A | 1/2002 |
| JP | 2002-342033 A | 11/2002 |
| JP | 2003-99452 A | 4/2003 |
| JP | 2003-534737 A | 11/2003 |
| JP | 2004-62237 A | 2/2004 |
| JP | 2006-31219 A | 2/2006 |
| JP | 2007-512640 A | 5/2007 |
| JP | 2007-140910 A | 6/2007 |
| JP | 2007-294068 A | 11/2007 |
| JP | 2008-71112 A | 3/2008 |
| JP | 2008-135911 A | 6/2008 |
| JP | 2009-60328 A | 3/2009 |
| JP | 2009-260947 A | 11/2009 |
| JP | 2010-28437 A | 2/2010 |
| JP | 2010-56595 A | 3/2010 |
| JP | 2010-509684 A | 3/2010 |
| JP | 2010-114733 A | 5/2010 |
| JP | 2011-512701 A | 4/2011 |
| JP | 2011-154455 A | 8/2011 |
| JP | 2011-205562 A | 10/2011 |
| JP | 2011-257930 A | 12/2011 |
| JP | 2012-95123 A | 5/2012 |
| JP | 2012-123685 A | 6/2012 |
| JP | 2012-208622 A | 10/2012 |
| JP | 2013-8369 A | 1/2013 |
| JP | 2013-223150 A | 10/2013 |
| JP | 2014-81740 A | 5/2014 |
| JP | 2014-102660 A | 6/2014 |
| JP | 2015-50655 A | 3/2015 |
| KR | 2001-0005939 A | 1/2001 |
| KR | 2001-0035356 A | 5/2001 |
| KR | 10-2009-0106104 A | 10/2009 |
| KR | 10-2010-0039194 A | 4/2010 |
| KR | 10-2011-0036408 A | 4/2011 |
| KR | 10-2011-0061811 A | 6/2011 |
| KR | 10-2012-0076682 A | 7/2012 |
| KR | 10-2012-0124445 A | 11/2012 |
| KR | 10-2013-0058034 A | 6/2013 |
| KR | 10-2013-0137969 A | 12/2013 |
| KR | 10-2014-0041939 A | 4/2014 |
| TW | 200622893 A | 7/2006 |
| TW | 200719204 A | 5/2007 |
| TW | 201337717 A | 9/2013 |
| TW | 201349049 A | 12/2013 |
| TW | 201351261 A | 12/2013 |
| WO | 1994/009438 A2 | 4/1994 |
| WO | 1999/040728 A1 | 8/1999 |
| WO | 2005/050652 A1 | 6/2005 |
| WO | 2007/078623 A2 | 7/2007 |
| WO | 2008/005135 A1 | 1/2008 |
| WO | 2008/060486 A2 | 5/2008 |
| WO | 2009/016607 A2 | 2/2009 |
| WO | 2009/148781 A1 | 12/2009 |
| WO | 2011/095693 A1 | 8/2011 |
| WO | 2012/012446 A2 | 1/2012 |
| WO | 2012/061760 A2 | 5/2012 |
| WO | 2013/000741 A1 | 1/2013 |
| WO | 2013/149128 A2 | 10/2013 |
| WO | 2013/169849 A2 | 11/2013 |
| WO | 2013/149128 A3 | 2/2014 |
| WO | 2014/105276 A1 | 7/2014 |
| WO | 2014/144908 A1 | 9/2014 |
| WO | 2014/177929 A2 | 11/2014 |
| WO | 2014/200730 A1 | 12/2014 |
| WO | 2015/200227 A1 | 12/2015 |
| WO | 2015/200228 A1 | 12/2015 |
| WO | 2015/200537 A2 | 12/2015 |
| WO | 2016/048308 A1 | 3/2016 |
| WO | 2016/048310 A1 | 3/2016 |
| WO | 2016/111065 A1 | 7/2016 |
| WO | 2017/008079 A1 | 1/2017 |
| WO | 2017/124116 A1 | 7/2017 |
| WO | 2017/200923 A1 | 11/2017 |
| WO | 2017/218104 A1 | 12/2017 |
| WO | 2018/081157 A1 | 5/2018 |

OTHER PUBLICATIONS

Final Office Action received for U.S. Appl. No. 16/175,565, dated Nov. 12, 2020, 40 pages.
Final Office Action received for U.S. Appl. No. 16/584,790, dated Jun. 15, 2021, 30 pages.
Final Office Action received for U.S. Appl. No. 16/827,918, dated Jul. 8, 2021, 31 pages.
Non-Final Office Action received for U.S. Appl. No. 15/167,801, dated Sep. 3, 2021, 17 pages.
Non-Final Office Action received for U.S. Appl. No. 16/142,635, dated Jun. 11, 2021, 23 pages.
Non-Final Office Action received for U.S. Appl. No. 16/175,565, dated Sep. 20, 2021, 33 pages.
Non-Final Office Action received for U.S. Appl. No. 16/233,990, dated Jul. 9, 2021, 18 pages.
Non-Final Office Action received for U.S. Appl. No. 16/697,090, dated Aug. 3, 2021, 16 pages.
Non-Final Office Action received for U.S. Appl. No. 16/827,910, dated Jun. 17, 2021, 16 pages.
Non-Final Office Action received for U.S. Appl. No. 16/865,172 dated Jun. 29, 2021, 29 pages.
Non-Final Office Action received for U.S. Appl. No. 16/872,274, dated Jul. 9, 2021, 19 pages.
Non-Final Office Action received for U.S. Appl. No. 16/888,453, dated Jun. 4, 2021, 37 pages.
Non-Final Office Action received for U.S. Appl. No. 16/945,724, dated Jul. 19, 2021, 8 pages.
Non-Final Office Action received for U.S. Appl. No. 17/065,387, dated Jun. 1, 2021, 25 pages.
Non-Final Office Action received for U.S. Appl. No. 17/133,550, dated Jun. 8, 2021, 23 pages.
Non-Final Office Action received for U.S. Appl. No. 17/210,352, dated Oct. 18, 2021, 18 pages.
Non-Final Office Action received for U.S. Appl. No. 17/353,527, dated Oct. 5, 2021, 14 pages.
Non-Final Office Action received for U.S. Appl. No. 16/175,565, dated Mar. 4, 2020, 36 pages.
Notice of Allowance received for U.S. Appl. No. 15/876,715, dated Oct. 14, 2021, 7 pages.
Notice of Allowance received for U.S. Appl. No. 16/108,519, dated Sep. 21, 2021, 8 pages.
Notice of Allowance received for U.S. Appl. No. 16/136,005, dated Jun. 9, 2021, 7 pages.
Notice of Allowance received for U.S. Appl. No. 16/682,443, dated Aug. 20, 2021, 7 pages.
Notice of Allowance received for U.S. Appl. No. 16/726,179, dated Jun. 17, 2021, 9 pages.
Notice of Allowance received for U.S. Appl. No. 16/726,179, dated Sep. 30, 2021, 8 pages.
Notice of Allowance received for U.S. Appl. No. 16/827,931, dated Sep. 15, 2021, 11 pages.
Patent Board Decision received for U.S. Appl. No. 15/876,715, dated Aug. 3, 2021, 8 pages.
Cheredar, Tom, "Verizon's Viewdini Lets You Watch Netflix, Comcast, & Hulu Videos from a Single App", venturebeat.com, May 22, 2012, 6 pages.
Kaijser, Martijn, "Mimic Skin for Kodi 15.x: Installation and Showcase", Time 2:23-2:28, Available online at: <https://www.youtube.com/watch?v=RGfpbUWVkgQ&t=143s>, Aug. 3, 2015, 1 page.
Applicant Initiated Interview Summary received for U.S. Appl. No. 17/210,352, dated Feb. 28, 2022, 4 pages.
Corrected Notice of Allowability received for U.S. Appl. No. 16/108,519, dated Dec. 22, 2021, 3 pages.
Corrected Notice of Allowance received for U.S. Appl. No. 15/876,715, dated Apr. 11, 2022, 4 Pages.

(56) References Cited

OTHER PUBLICATIONS

Corrected Notice of Allowance received for U.S. Appl. No. 15/876,715, dated Apr. 19, 2022, 4 Pages.
Corrected Notice of Allowance received for U.S. Appl. No. 16/142,635, dated Mar. 10, 2022, 2 Pages.
Corrected Notice of Allowance received for U.S. Appl. No. 16/233,990, dated Mar. 8, 2022, 4 pages.
Corrected Notice of Allowance received for U.S. Appl. No. 16/827,931, dated Dec. 6, 2021, 4 pages.
Corrected Notice of Allowance received for U.S. Appl. No. 17/065,387, dated Mar. 30, 2022, 2 Pages.
Final Office Action received for U.S. Appl. No. 16/888,453, dated Apr. 8, 2022, 39 pages.
Final Office Action received for U.S. Appl. No. 16/175,565, dated May 27, 2022, 33 pages.
Final Office Action received for U.S. Appl. No. 16/697,090, dated Feb. 23, 2022, 25 pages.
Final Office Action received for U.S. Appl. No. 16/827,910, dated Feb. 28, 2022, 17 pages.
Final Office Action received for U.S. Appl. No. 16/872,274, dated Dec. 23, 2021, 20 pages.
Final Office Action received for U.S. Appl. No. 16/888,478, dated Nov. 15, 2021, 27 pages.
Final Office Action received for U.S. Appl. No. 17/133,550, dated Feb. 11, 2022, 18 pages.
Final Office Action received for U.S. Appl. No. 17/353,527, dated May 11, 2022, 17 Pages.
Non-Final Office Action received for U.S. Appl. No. 15/167,801, dated May 18, 2022, 17 Pages.
Non-Final Office Action received for U.S. Appl. No. 15/719,404, dated Nov. 26, 2021, 19 pages.
Non-Final Office Action received for U.S. Appl. No. 16/584,790, dated Feb. 1, 2022, 33 pages.
Non-Final Office Action received for U.S. Appl. No. 16/827,926, dated Apr. 25, 2022, 27 pages.
Non-Final Office Action received for U.S. Appl. No. 16/888,478, dated May 2, 2022, 29 pages.
Non-Final Office Action received for U.S. Appl. No. 17/000,112, dated Dec. 7, 2021, 15 pages.
Non-Final Office Action received for U.S. Appl. No. 17/379,785, dated Mar. 30, 2022, 18 Pages.
Notice of Allowance received for U.S. Appl. No. 15/876,715, dated Apr. 4, 2022, 7 pages.
Notice of Allowance received for U.S. Appl. No. 16/142,635, dated Nov. 10, 2021, 8 pages.
Notice of Allowance received for U.S. Appl. No. 16/233,990, dated Feb. 22, 2022, 8 pages.
Notice of Allowance received for U.S. Appl. No. 16/233,990, dated May 26, 2022, 5 pages.
Notice of Allowance received for U.S. Appl. No. 16/682,443, dated Nov. 17, 2021, 8 pages.
Notice of Allowance received for U.S. Appl. No. 16/827,918, dated Feb. 7, 2022, 9 pages.
Notice of Allowance received for U.S. Appl. No. 16/827,926, dated Nov. 1, 2021, 35 pages.
Notice of Allowance received for U.S. Appl. No. 16/827,931, dated Apr. 19, 2022, 7 Pages.
Notice of Allowance received for U.S. Appl. No. 16/827,931, dated Jan. 5, 2022, 7 pages.
Notice of Allowance received for U.S. Appl. No. 16/865,172, dated Apr. 13, 2022, 8 pages.
Notice of Allowance received for U.S. Appl. No. 16/865,172, dated Dec. 16, 2021, 10 pages.
Notice of Allowance received for U.S. Appl. No. 16/872,274, dated Apr. 19, 2022, 10 Pages.
Notice of Allowance received for U.S. Appl. No. 16/945,724, dated Apr. 4, 2022, 8 Pages.
Notice of Allowance received for U.S. Appl. No. 16/945,724, dated Dec. 20, 2021, 7 pages.
Notice of Allowance received for U.S. Appl. No. 17/065,387, dated Dec. 1, 2021, 10 pages.
Search Report received for Chinese Patent Application No. 201680050096.X, dated Jan. 10, 2022, 4 pages (2 pages of English Translation and 2 pages of Official Copy).
Search Report received for Chinese Patent Application No. 201910587972.8, dated Jan. 4, 2022, 4 pages (2 pages of English Translation and 2 pages of Official Copy).
Advisory Action received for U.S. Appl. No. 14/208,963, dated Feb. 17, 2017, 3 pages.
Advisory Action received for U.S. Appl. No. 15/167,801, dated Feb. 16, 2018, 4 pages.
Applicant Initiated Interview Summary received for U.S. Appl. No. 15/167,801, dated Apr. 23, 2018, 3 pages.
Applicant Initiated Interview Summary received for U.S. Appl. No. 15/167,801, dated Jul. 29, 2019, 3 pages.
Corrected Notice of Allowance received for U.S. Appl. No. 14/242,575, dated Dec. 15, 2016, 7 pages.
Corrected Notice of Allowance received for U.S. Appl. No. 14/242,575, dated Nov. 16, 2016, 7 pages.
Corrected Notice of Allowance received for U.S. Appl. No. 14/255,664, dated Aug. 29, 2017, 4 pages.
Corrected Notice of Allowance received for U.S. Appl. No. 14/267,671, dated Nov. 29, 2018, 3 pages.
Corrected Notice of Allowance received for U.S. Appl. No. 14/749,288, dated Sep. 21, 2017, 5 pages.
Corrected Notice of Allowance received for U.S. Appl. No. 15/276,633, dated Sep. 10, 2019, 7 pages.
Corrected Notice of Allowance received for U.S. Appl. No. 15/695,880, dated Jun. 11, 2018, 6 pages.
Corrected Notice of Allowance received for U.S. Appl. No. 15/714,904, dated Sep. 7, 2018, 5 pages.
Corrected Notice of Allowance received for U.S. Appl. No. 16/010,280, dated Aug. 6, 2019, 2 pages.
Corrected Notice of Allowance received for U.S. Appl. No. 16/036,810, dated Nov. 19, 2018, 6 pages.
Examiner Initiated Interview Summary received for U.S. Appl. No. 15/390,377, dated Oct. 30, 2017, 2 pages.
Examiner's Answer to Appeal Brief received for U.S. Appl. No. 15/876,715, mailed on Aug. 18, 2020, 16 pages.
Extended European Search Report received for European Patent Application No. 17813728.7, dated Feb. 11, 2019, 8 pages.
Extended European Search Report received for European Patent Application No. 20190698.9, dated Oct. 30, 2020, 6 pages.
Final Office Action received for U.S. Appl. No. 14/208,963, dated Aug. 13, 2015, 16 pages.
Final Office Action received for U.S. Appl. No. 14/208,963, dated Aug. 18, 2016, 17 pages.
Final Office Action received for U.S. Appl. No. 14/255,664, dated Oct. 17, 2016, 16 pages.
Final Office Action received for U.S. Appl. No. 14/267,671, dated May 23, 2018, 17 pages.
Final Office Action received for U.S. Appl. No. 14/267,671, dated Oct. 26, 2016, 21 pages.
Final Office Action received for U.S. Appl. No. 14/271,179, dated Dec. 15, 2016, 10 pages.
Final Office Action received for U.S. Appl. No. 14/271,179, dated Jun. 20, 2019, 15 pages.
Final Office Action received for U.S. Appl. No. 14/271,179, dated Jun. 21, 2018, 14 pages.
Final Office Action received for U.S. Appl. No. 14/746,095, dated Jul. 16, 2018, 33 pages.
Final Office Action received for U.S. Appl. No. 14/746,662, dated Apr. 24, 2017, 8 pages.
Final Office Action received for U.S. Appl. No. 14/746,662, dated Jun. 27, 2017, 9 pages.
Final Office Action received for U.S. Appl. No. 15/167,801, dated Apr. 5, 2019, 18 pages.
Final Office Action received for U.S. Appl. No. 15/167,801, dated May 28, 2020, 17 pages.
Final Office Action received for U.S. Appl. No. 15/167,801, dated Nov. 29, 2017, 12 pages.

(56) References Cited

OTHER PUBLICATIONS

Final Office Action received for U.S. Appl. No. 15/235,000, dated Dec. 19, 2018, 33 pages.
Final Office Action received for U.S. Appl. No. 15/235,000, dated Mar. 13, 2018, 31 pages.
Final Office Action received for U.S. Appl. No. 15/272,393, dated Mar. 25, 2019, 54 pages.
Final Office Action received for U.S. Appl. No. 15/272,397, dated Mar. 7, 2017, 23 pages.
Final Office Action received for U.S. Appl. No. 15/276,633, dated Jul. 26, 2017, 15 pages.
Final Office Action received for U.S. Appl. No. 15/276,633, dated Oct. 29, 2018, 12 pages.
Final Office Action received for U.S. Appl. No. 15/390,377, dated Nov. 9, 2017, 18 pages.
Final Office Action received for U.S. Appl. No. 15/507,229, dated Jul. 15, 2020, 20 pages.
Final Office Action received for U.S. Appl. No. 15/507,229, dated Sep. 18, 2019, 15 pages.
Final Office Action received for U.S. Appl. No. 15/719,404, dated Aug. 8, 2019, 19 pages.
Final Office Action received for U.S. Appl. No. 15/719,404, dated Mar. 30, 2021, 19 pages.
Final Office Action received for U.S. Appl. No. 15/876,715, dated Nov. 5, 2018, 15 pages.
Final Office Action received for U.S. Appl. No. 15/943,316, dated Apr. 27, 2020, 19 pages.
Final Office Action received for U.S. Appl. No. 15/943,316, dated Mar. 6, 2019, 8 pages.
Final Office Action received for U.S. Appl. No. 16/108,519, dated Dec. 12, 2019, 10 pages.
Final Office Action received for U.S. Appl. No. 16/108,519, dated Nov. 25, 2020, 12 pages.
Final Office Action received for U.S. Appl. No. 16/126,962, dated Apr. 8, 2020, 20 pages.
Final Office Action received for U.S. Appl. No. 16/136,005, dated Mar. 9, 2020, 9 pages.
Final Office Action received for U.S. Appl. No. 16/142,635, dated Feb. 3, 2021, 23 pages.
Final Office Action received for U.S. Appl. No. 16/144,077, dated Jul. 12, 2019, 22 pages.
Final Office Action received for U.S. Appl. No. 16/233,990, dated Jan. 11, 2021, 17 pages.
Final Office Action received for U.S. Appl. No. 16/584,790, dated May 27, 2020, 27 pages.
Final Office Action received for U.S. Appl. No. 16/682,443, dated Mar. 9, 2021, 9 pages.
Final Office Action received for U.S. Appl. No. 16/697,090, dated Jan. 27, 2021, 18 pages.
Final Office Action received for U.S. Appl. No. 16/827,926, dated Mar. 17, 2021, 44 pages.
Final Office Action received for U.S. Appl. No. 16/865,172, dated Feb. 12, 2021, 29 pages.
International Search Report received for PCT Patent Application No. PCT/US2014/057272, dated May 28, 2015, 4 pages.
International Search Report received for PCT Patent Application No. PCT/US2014/057280, dated May 27, 2015, 4 pages.
International Search Report received for PCT Patent Application No. PCT/US2015/037027, dated Sep. 28, 2015, 3 pages.
International Search Report received for PCT Patent Application No. PCT/US2015/037030, dated Dec. 10, 2015, 7 pages.
International Search Report received for PCT Patent Application No. PCT/US2015/037520, dated Mar. 7, 2016, 6 pages.
International Search Report received for PCT Patent Application No. PCT/US2017/029448, dated Jul. 13, 2017, 3 pages.
International Search Report received for PCT Patent Application No. PCT/US2017/031764, dated Aug. 7, 2017, 2 pages.
International Search Report received for PCT Patent Application No. PCT/US2017/058132, dated Mar. 27, 2018, 6 pages.
International Search Report received for PCT Patent Application No. PCT/US2019/034921, dated Nov. 19, 2019, 5 pages.
International Search Report received for PCT Patent Application No. PCT/US2020/024452, dated Aug. 6, 2020, 6 pages.
International Search Report received for PCT Patent Application No. PCT/US2020/024485, dated Aug. 3, 2020, 6 pages.
International Search Report received for PCT Patent Application No. PCT/US2020/024486, dated Aug. 11, 2020, 6 pages.
International Search Report received for PCT Patent Application No. PCT/US2020/024492, dated Aug. 10, 2020, 6 pages.
International Search Report received for PCT Patent Application No. PCT/US2020/035423, dated Oct. 13, 2020, 4 pages.
Invitation to Pay Additional Fees received for PCT Patent Application No. PCT/US2019/034921, dated Sep. 24, 2019, 12 pages.
Invitation to Pay Additional Fees received for PCT Patent Application No. PCT/US2020/024452, dated Jun. 15, 2020, 13 pages.
Invitation to Pay Additional Fees received for PCT Patent Application No. PCT/US2020/024485, dated Jun. 8, 2020, 11 pages.
Invitation to Pay Additional Fees received for PCT Patent Application No. PCT/US2020/024486, dated Jun. 3, 2020, 11 pages.
Invitation to Pay Additional Fees received for PCT Patent Application No. PCT/US2020/024492, dated Jun. 8, 2020, 10 pages.
Non-Final Office Action received for U.S. Appl. No. 14/208,099, dated Jun. 25, 2015, 12 pages.
Non-Final Office Action received for U.S. Appl. No. 14/208,963 dated Nov. 3, 2014, 17 pages.
Non-Final Office Action received for U.S. Appl. No. 14/208,963, dated Apr. 21, 2017, 19 pages.
Non-Final Office Action received for U.S. Appl. No. 14/208,963, dated Jan. 29, 2016, 17 pages.
Non-Final Office Action received for U.S. Appl. No. 14/208,963, dated Jun. 30, 2020, 20 pages.
Non-Final Office Action received for U.S. Appl. No. 14/242,575, dated Mar. 21, 2016, 12 pages.
Non-Final Office Action received for U.S. Appl. No. 14/255,664, dated Apr. 1, 2016, 15 pages.
Non-Final Office Action received for U.S. Appl. No. 14/262,435, dated Feb. 22, 2016, 22 pages.
Non-Final Office Action received for U.S. Appl. No. 14/267,671, dated Apr. 1, 2016, 16 pages.
Non-Final Office Action received for U.S. Appl. No. 14/267,671, dated Dec. 1, 2017, 18 pages.
Non-Final Office Action received for U.S. Appl. No. 14/267,671, dated May 26, 2017, 18 pages.
Non-Final Office Action received for U.S. Appl. No. 14/271,179, dated May 29, 2015, 25 pages.
Non-Final Office Action received for U.S. Appl. No. 14/271,179, dated Oct. 5, 2018, 15 pages.
Non-Final Office Action received for U.S. Appl. No. 14/271,179, dated Sep. 21, 2017, 12 pages.
Non-Final Office Action received for U.S. Appl. No. 14/746,095, dated Dec. 1, 2017, 34 pages.
Non-Final Office Action received for U.S. Appl. No. 14/746,095, dated Jul. 25, 2019, 33 pages.
Non-Final Office Action received for U.S. Appl. No. 14/746,620, dated Jan. 11, 2017, 16 pages.
Non-Final Office Action received for U.S. Appl. No. 14/746,662, dated Aug. 9, 2016, 8 pages.
Non-Final Office Action received for U.S. Appl. No. 14/749,288, dated Oct. 12, 2016, 11 pages.
Non-Final Office Action received for U.S. Appl. No. 15/167,801 dated Mar. 24, 2017, 12 Pages.
Non-Final Office Action received for U.S. Appl. No. 15/167,801, dated Aug. 30, 2018, 15 pages.
Non-Final Office Action received for U.S. Appl. No. 15/167,801, dated Dec. 11, 2020, 18 pages.
Non-Final Office Action received for U.S. Appl. No. 15/167,801, dated Sep. 26, 2019, 18 pages.
Non-Final Office Action received for U.S. Appl. No. 15/224,370, dated Oct. 3, 2017, 14 pages.
Non-Final Office Action received for U.S. Appl. No. 15/235,000, dated Jul. 14, 2017, 31 pages.

(56) References Cited

OTHER PUBLICATIONS

Non-Final Office Action received for U.S. Appl. No. 15/235,000, dated Jul. 25, 2018, 31 pages.
Non-Final Office Action received for U.S. Appl. No. 15/235,000, dated Jun. 26, 2019, 31 pages.
Non-Final Office Action received for U.S. Appl. No. 15/272,393, dated Oct. 2, 2018, 52 pages.
Non-Final Office Action received for U.S. Appl. No. 15/272,397, dated Nov. 22, 2016, 20 pages.
Non-Final Office Action received for U.S. Appl. No. 15/276,633, dated Feb. 23, 2018, 12 pages.
Non-Final Office Action received for U.S. Appl. No. 15/276,633, dated Mar. 5, 2019, 16 pages.
Non-Final Office Action received for U.S. Appl. No. 15/276,633, dated Nov. 17, 2016, 12 pages.
Non-Final Office Action received for U.S. Appl. No. 15/390,377, dated Apr. 5, 2017, 17 pages.
Non-Final Office Action received for U.S. Appl. No. 15/414,493, dated Oct. 6, 2017, 15 pages.
Non-Final Office Action received for U.S. Appl. No. 15/507,229, dated Feb. 27, 2020, 16 pages.
Non-Final Office Action received for U.S. Appl. No. 15/507,229, dated Jun. 3, 2019, 14 pages.
Non-Final Office Action received for U.S. Appl. No. 15/674,992, dated May 11, 2018, 8 pages.
Non-Final Office Action received for U.S. Appl. No. 15/719,404, dated Dec. 14, 2018, 14 pages.
Non-Final Office Action received for U.S. Appl. No. 15/719,404, dated Oct. 16, 2020, 18 pages.
Non-Final Office Action received for U.S. Appl. No. 15/798,092, dated Dec. 20, 2017, 20 pages.
Non-Final Office Action received for U.S. Appl. No. 15/876,715, dated Jun. 4, 2018, 12 pages.
Non-Final Office Action received for U.S. Appl. No. 15/876,715, dated Sep. 10, 2019, 13 pages.
Non-Final Office Action received for U.S. Appl. No. 15/943,316, dated Aug. 20, 2019, 11 pages.
Non-Final Office Action received for U.S. Appl. No. 15/943,316, dated Jul. 23, 2018, 9 pages.
Non-Final Office Action received for U.S. Appl. No. 15/990,327, dated Jul. 31, 2018, 8 pages.
Non-Final Office Action received for U.S. Appl. No. 16/010,280, dated Mar. 7, 2019, 5 pages.
Non-Final Office Action received for U.S. Appl. No. 16/108,519, dated Apr. 5, 2021, 13 pages.
Non-Final Office Action received for U.S. Appl. No. 16/108,519, dated Aug. 2, 2019, 10 pages.
Non-Final Office Action received for U.S. Appl. No. 16/108,519, dated May 8, 2020, 11 pages.
Non-Final Office Action received for U.S. Appl. No. 16/126,962, dated Aug. 25, 2020, 22 pages.
Non-Final Office Action received for U.S. Appl. No. 16/126,962, dated Sep. 3, 2019, 16 pages.
Non-Final Office Action received for U.S. Appl. No. 16/136,005, dated Sep. 9, 2020, 10 pages.
Non-Final Office Action received for U.S. Appl. No. 16/136,005, dated Sep. 18, 2019, 9 pages.
Non-Final Office Action received for U.S. Appl. No. 16/142,635, dated Jun. 8, 2020, 19 pages.
Non-Final Office Action received for U.S. Appl. No. 16/144,077, dated Feb. 19, 2019, 24 pages.
Non-Final Office Action received for U.S. Appl. No. 16/144,077, dated Nov. 27, 2019, 40 pages.
Non-Final Office Action received for U.S. Appl. No. 16/233,990, dated Jun. 18, 2020, 17 pages.
Non-Final Office Action received for U.S. Appl. No. 16/392,467, dated Sep. 27, 2019, 5 pages.
Non-Final Office Action received for U.S. Appl. No. 16/584,790, dated Dec. 23, 2020, 30 pages.
Non-Final Office Action received for U.S. Appl. No. 16/584,790, dated Dec. 26, 2019, 24 pages.
Non-Final Office Action received for U.S. Appl. No. 16/682,443, dated Sep. 23, 2020, 10 pages.
Non-Final Office Action received for U.S. Appl. No. 16/697,090, dated Jul. 6, 2020, 14 pages.
Non-Final Office Action received for U.S. Appl. No. 16/827,918, dated Dec. 10, 2020, 28 pages.
Non-Final Office Action received for U.S. Appl. No. 16/827,926, dated Oct. 29, 2020, 45 pages.
Non-Final Office Action received for U.S. Appl. No. 16/827,931, dated Mar. 3, 2021, 24 pages.
Non-Final Office Action received for U.S. Appl. No. 16/865,172, dated Aug. 20, 2020, 19 pages.
Non-Final Office Action received for U.S. Appl. No. 16/888,478, dated Feb. 8, 2021, 24 pages.
Non-Final Office Action received for U.S. Appl. No. 17/065,387, dated Jan. 28, 2021, 28 pages.
Notice of Allowance received for U.S. Appl. No. 14/208,099, dated Feb. 3, 2016, 10 pages.
Notice of Allowance received for U.S. Appl. No. 14/242,575, dated Oct. 27, 2016, 11 pages.
Notice of Allowance received for U.S. Appl. No. 14/255,664, dated May 5, 2017, 7 pages.
Notice of Allowance received for U.S. Appl. No. 14/262,435, dated Aug. 16, 2016, 6 pages.
Notice of Allowance received for U.S. Appl. No. 14/267,671, dated Sep. 19, 2018, 8 pages.
Notice of Allowance received for U.S. Appl. No. 14/746,095, dated Dec. 31, 2019, 8 pages.
Notice of Allowance received for U.S. Appl. No. 14/746,620, dated Sep. 25, 2017, 8 pages.
Notice of Allowance received for U.S. Appl. No. 14/746,662, dated Sep. 25, 2017, 7 pages.
Notice of Allowance received for U.S. Appl. No. 14/749,288, dated May 25, 2017, 8 pages.
Notice of Allowance received for U.S. Appl. No. 15/272,393, dated Jan. 15, 2020, 7 pages.
Notice of Allowance received for U.S. Appl. No. 15/272,393, dated Sep. 18, 2019, 10 pages.
Notice of Allowance received for U.S. Appl. No. 15/272,397, dated Oct. 18, 2017, 8 pages.
Notice of Allowance received for U.S. Appl. No. 15/276,633, dated Aug. 26, 2019, 8 pages.
Notice of Allowance received for U.S. Appl. No. 15/390,377, dated Jul. 2, 2018, 9 pages.
Notice of Allowance received for U.S. Appl. No. 15/414,493, dated Mar. 14, 2018, 7 pages.
Notice of Allowance received for U.S. Appl. No. 15/674,992, dated Oct. 1, 2018, 7 pages.
Notice of Allowance received for U.S. Appl. No. 15/695,880, dated Feb. 28, 2018, 10 pages.
Notice of Allowance received for U.S. Appl. No. 15/695,880, dated Oct. 18, 2017, 9 pages.
Notice of Allowance received for U.S. Appl. No. 15/714,904, dated May 22, 2018, 8 pages.
Notice of Allowance received for U.S. Appl. No. 15/798,092, dated Jun. 7, 2018, 9 pages.
Notice of Allowance received for U.S. Appl. No. 15/798,092, dated Oct. 9, 2018, 5 pages.
Notice of Allowance received for U.S. Appl. No. 15/833,618, dated Mar. 14, 2018, 9 pages.
Notice of Allowance received for U.S. Appl. No. 15/990,327, dated Jan. 11, 2019, 7 pages.
Notice of Allowance received for U.S. Appl. No. 16/010,280, dated Jul. 29, 2019, 7 pages.
Notice of Allowance received for U.S. Appl. No. 16/036,810, dated Oct. 31, 2018, 9 pages.
Notice of Allowance received for U.S. Appl. No. 16/136,005, dated Feb. 24, 2021, 8 pages.
Notice of Allowance received for U.S. Appl. No. 16/144,077, dated May 8, 2020, 15 pages.

(56) References Cited

OTHER PUBLICATIONS

Notice of Allowance received for U.S. Appl. No. 16/392,467, dated Mar. 23, 2020, 9 pages.
Notice of Allowance received for U.S. Appl. No. 16/827,942, dated Apr. 28, 2021, 5 pages.
Notice of Allowance received for U.S. Appl. No. 16/827,942, dated Jan. 22, 2021, 5 pages.
Notice of Allowance received for U.S. Appl. No. 16/827,942, dated Oct. 5, 2020, 10 pages.
Restriction Requirement received for U.S. Appl. No. 14/208,099, dated Feb. 24, 2015, 5 pages.
Search Report received for Chinese Patent Application No. 201580028382.1, dated Oct. 12, 2018, 5 pages (2 pages of English Translation & 3 pages of Official copy).
Search Report received for Chinese Patent Application No. 201780033590.X, dated Mar. 24, 2021, 4 pages (2 page of English Translation and 2 pages of Official Copy).
Search Report received for Chinese Patent Application No. 201910469185.3, dated Feb. 23, 2021, 6 pages (3 page of English Translation and 3 page of Official Copy).
Search Report received for Danish Patent Application No. PA 201670581, dated Apr. 4, 2017, 2 pages.
Search Report received for Danish Patent Application No. PA 201670581, dated Feb. 5, 2018, 1 page.
Search Report received for Danish Patent Application No. PA 201670581, dated Nov. 3, 2016, 1 page.
Search Report received for Danish Patent Application No. PA 201870354, dated Sep. 26, 2018, 4 pages.
Search Report received for Danish Patent Application No. PA201670582, dated Feb. 9, 2017, 1 pages.
Search Report received for Danish Patent Application No. PA201670582, dated Mar. 6, 2018, 2 pages.
Search Report received for Danish Patent Application No. PA201670582, dated Oct. 28, 2016, 4 pages.
Search Report received for Danish Patent Application No. PA201770200, Completed on Jul. 12, 2017, 4 pages.
Search Report received for Taiwanese Patent Application No. 104120369, dated Aug. 8, 2016, 2 Pages (1 page of official copy & 1 page of English translation).
Search Report received for Taiwanese Patent Application No. 104120385, dated Nov. 25, 2016, 2 Pages (1 page of official copy & 1 page of English translation).
Supplemental Notice of Allowability received for U.S. Appl. No. 16/827,942, dated Nov. 4, 2020, 3 pages.
Supplemental Notice of Allowance received for U.S. Appl. No. 15/798,092, dated Jan. 9, 2019, 2 pages.
Akhtar Iyaz, "Movies Anywhere: Everything You Need To Know", Available online at: <https://www.cnet.com/how-to/movies-anywhere-ultraviolet-movies-locker-streaming-redeem-faq/>, 2017, 8 pages.
Alvarez Edgar, "Sling TV Redesign Makes It Easy To Find Your Favorite Content", Engadget, Available online at: <https://www.engadget.com/2016/01/05/sling-tv-major-redesign/>, May 1, 2016, pp. 1-12.
Bishop Bryan, "Netflix Introduces One Unified TV Interface to Rule them All", The Verge, Available online at: <https://www.theverge.com/2013/11/13/5098224/netflix-introduces-one-unified-tv-interface-to-rule-them-all>, Nov. 13, 2013, 3 pages.
Bohn Dieter, "Rebooting WebOS: How LG Rethought The Smart TV", The Verge, Available online at: <http://www.theverge.com/2014/1/6/5279220/rebooting-webos-how-lg-rethought-the-smart-tv>, Jan. 6, 2014, 5 pages.
episodecalendar.com, "Keep track of your favorite TV shows!—TV Episode Calendar", Available Online At: <https://web.archive.org/web/20140517060612/https://episodecalendar.com/>, May 17, 2014, 6 pages.
Fingas Roger, "Walmart's Vudu to get Native Apple TV", AppleInsider, 2017, pp. 1-4.

Grey Melissa, "Comcast's New X2 Platform Moves your DVR Recordings from the Box to the Cloud", Engadget, Available online at: <http://www.engadget.com/2013/06/11/comcast-x2-platform/>, Jun. 11, 2013, 15 pages.
International Standard—ISO, "Ergonomic Requirements for Office Work with Visual Display Terminals (VDTs)", Part 13: User Guidance, Zurich, CH, vol. 9241-13, XP001525163, Section 10, Jul. 15, 1998, 40 pages.
Lee et al., "A Multi-Touch Three Dimensional Touch-Sensitive Tablet", CHI'85 Proceedings, Apr. 1985, pp. 21-25.
Li Xiaoshan, "CNTV, HULU, BBC iPlayer Comparative Study on User Interface of Three Network TV Stations", Modern Communication (Journal of Communication University of China), Issue 11, Nov. 5, 2010, pp. 156-158.
Ng Gary, "New Netflix User Interface Coming This Month, First Redesign in Four Years", iPhone in Canada, Available online at: <https://www.iphoneincanada.ca/news/new-netflix-user-interface/>, Jun. 1, 2015, 3 pages.
Panzarino Matthew, "Apple Announces Voice Activated Siri Assistant Feature For iOS 5, Integrates Wolfram Alpha And Wikipedia", Available online at: <www.thenextweb.com>, Oct. 4, 2011, pp. 1-6.
Pierce David, "Got Hulu and Netflix? You Need an App to Search It All", Wired, Available online at: <https://www.wired.com/2016/03/got-hulu-netflix-need-app-search/>, Mar. 10, 2016, pp. 1-4.
Rubine Dean, "Combining Gestures and Direct Manipulation", CHI'92, May 3-7, 1992, pp. 659-660.
Rubine Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Westerman Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.
Corrected Notice of Allowance received for U.S. Appl. No. 16/945,724, dated Aug. 31, 2022, 2 pages.
Non-Final Office Action received for U.S. Appl. No. 16/827,910, dated Sep. 14, 2022, 18 pages.
Non-Final Office Action received for U.S. Appl. No. 17/133,550, dated Sep. 9, 2022, 23 pages.
Non-Final Office Action received for U.S. Appl. No. 17/457,901, dated Apr. 28, 2022, 24 Pages.
Notice of Allowance received for U.S. Appl. No. 16/233,990, dated Oct. 5, 2022, 5 pages.
Notice of Allowance received for U.S. Appl. No. 16/865,172, dated Aug. 25, 2022, 8 Pages.
Notice of Allowance received for U.S. Appl. No. 17/000,112, dated Oct. 18, 2022, 10 pages.
Corrected Notice of Allowance received for U.S. Appl. No. 16/872,274, dated Aug. 12, 2022, 5 pages.
Corrected Notice of Allowance received for U.S. Appl. No. 17/000,112, dated Jun. 17, 2022, 2 pages.
Extended European Search Report received for European Patent Application No. 22167405.4, dated Jul. 4, 2022, 11 Pages.
Final Office Action received for U.S. Appl. No. 16/584,790, dated Jun. 14, 2022, 37 pages.
Final Office Action received for U.S. Appl. No. 17/210,352, dated Jun. 3, 2022, 21 pages.
Non-Final Office Action received for U.S. Appl. No. 16/697,090, dated Jul. 7, 2022, 25 pages.
Notice of Allowance received for U.S. Appl. No. 15/719,404, dated Jul. 13, 2022, 8 Pages.
Notice of Allowance received for U.S. Appl. No. 15/876,715, dated Aug. 3, 2022, 7 Pages.
Notice of Allowance received for U.S. Appl. No. 16/827,918, dated Jun. 8, 2022, 9 Pages.
Notice of Allowance received for U.S. Appl. No. 16/945,724, dated Jul. 20, 2022, 8 pages.
Notice of Allowance received for U.S. Appl. No. 17/000,112, dated Jun. 3, 2022, 14 pages.

* cited by examiner

700

702 — Display, on the display, a content item representation section that includes a primary position, a first secondary position, and a second secondary position, wherein a first representation associated with a first content item is located in the primary positon, a second representation associated with a second content item is located in the first secondary position, the first representation is partially overlaid on the second representation, and the first and second representations are selectable to initiate respective actions corresponding to the respective content items

704 — While displaying the content item representation section, receive, via the one or more input devices, an input corresponding to a request to move the first representation to the second secondary position in the content item representation section

706 — In response to receiving the input:

708 — Move the first representation from the primary position to the second secondary position a first distance in a first direction

710 — Move the second representation from the first secondary position to the primary position the first distance in the first direction

712 — Moving the first representation from the primary position to the second secondary position, and the second representation from the first secondary position to the primary position comprises moving a cropping boundary between first representation and the second representation by a second distance, greater than the first distance, in the first direction, revealing the second representation from underneath the first representation

714 — After moving the first representation from the primary position to the second secondary position, and the second representation from the first secondary position to the primary position, the second representation is partially overlaid on the first representation

FIG. 7A  (A)

USER INTERFACES INCLUDING SELECTABLE REPRESENTATIONS OF CONTENT ITEMS

CROSS-REFERENCE TO RELATED APPLICATIONS

This application is a continuation of U.S. application Ser. No. 16/827,942, filed Mar. 24, 2020, which claims the benefit of U.S. Provisional Application No. 62/822,942 filed Mar. 24, 2019, U.S. Provisional Application No. 62/855,871, filed May 31, 2019, and U.S. Provisional Application No. 62/967,437, filed Jan. 29, 2020, the contents of which are hereby incorporated by reference in their entireties for all purposes.

FIELD OF THE DISCLOSURE

This relates generally to user interfaces that present information and selectable options related to items of content on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device presents items of content. In some circumstances, the electronic device presents selectable representations of the items of content. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to presenting representations of items of content available for playback on the electronic device. Some embodiments described in this disclosure are directed to presenting representations of auxiliary content in a product page user interface of an item of content related to the auxiliary content. Some embodiments described in this disclosure are directed to presenting representations of content in a manner based on the content consumption history of the user. Some embodiments described in this disclosure are directed to presenting representations of bonus content items in a user interface for a respective series of episodic content. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIGS. 7A-7G are flow diagrams illustrating a method of presenting representations of items of content available for playback on the electronic device in accordance with some embodiments of the disclosure.

DETAILED DESCRIPTION

Figure 1A:
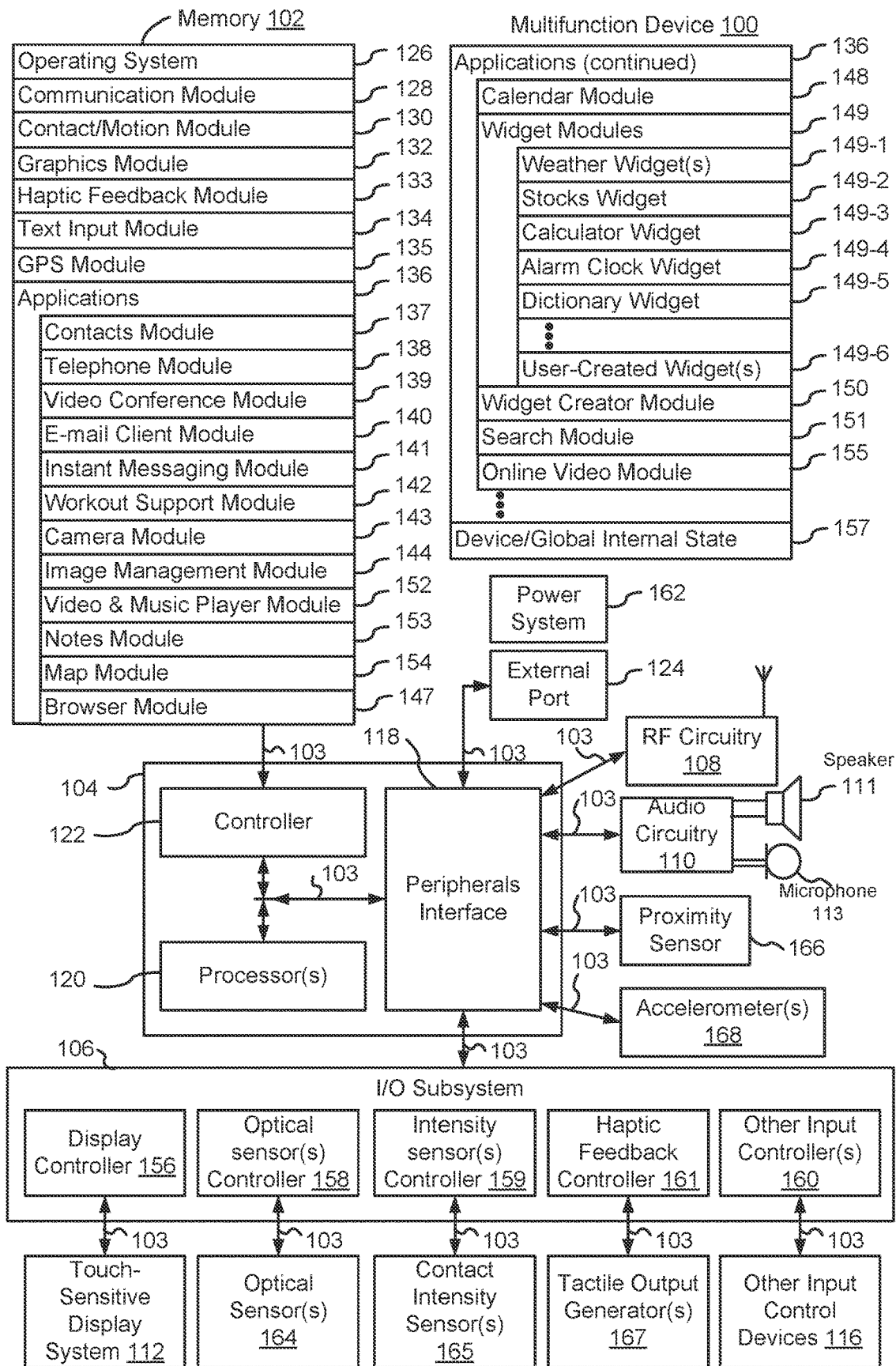
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Exemplary Devices

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, Calif.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touch-screen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
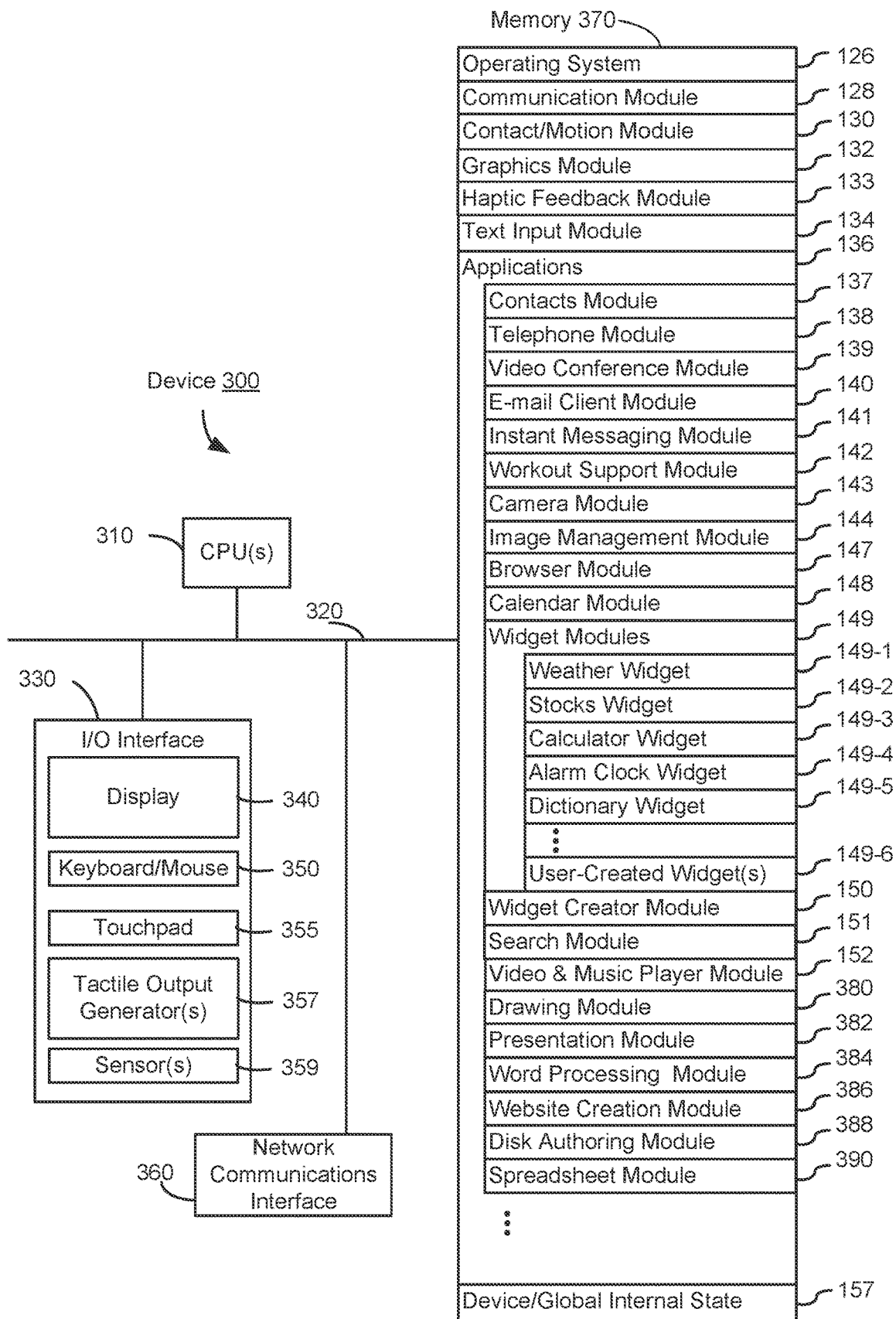
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
- contacts module 137 (sometimes called an address book or contact list);
- telephone module 138;
- video conferencing module 139;
- e-mail client module 140;
- instant messaging (IM) module 141;
- workout support module 142;
- camera module 143 for still and/or video images;
- image management module 144;
- video player module;
- music player module;
- browser module 147;
- calendar module 148;
- widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- widget creator module 150 for making user-created widgets 149-6;
- search module 151;
- video and music player module 152, which merges video player module and music player module;
- notes module 153;
- map module 154; and/or
- online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
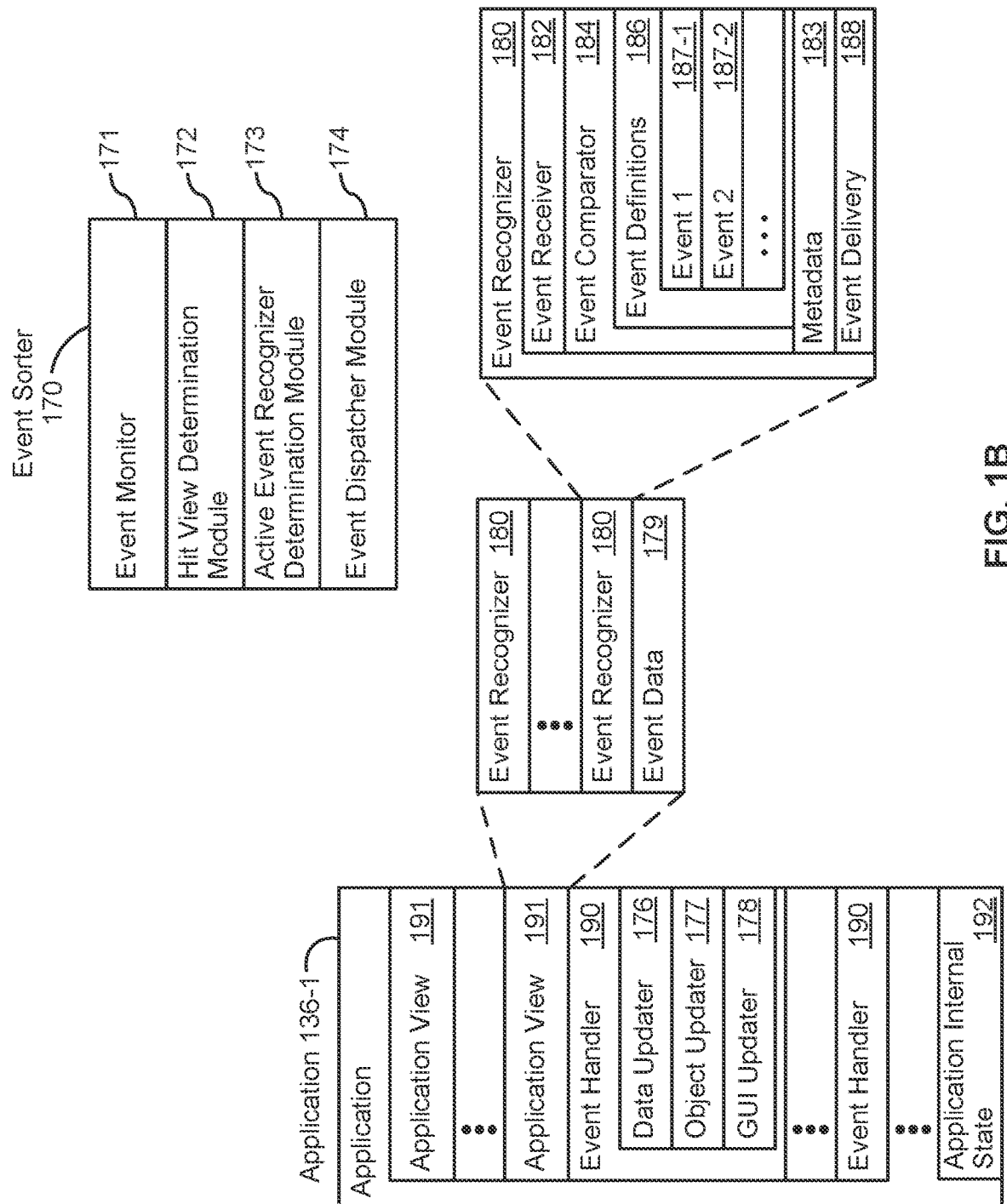
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
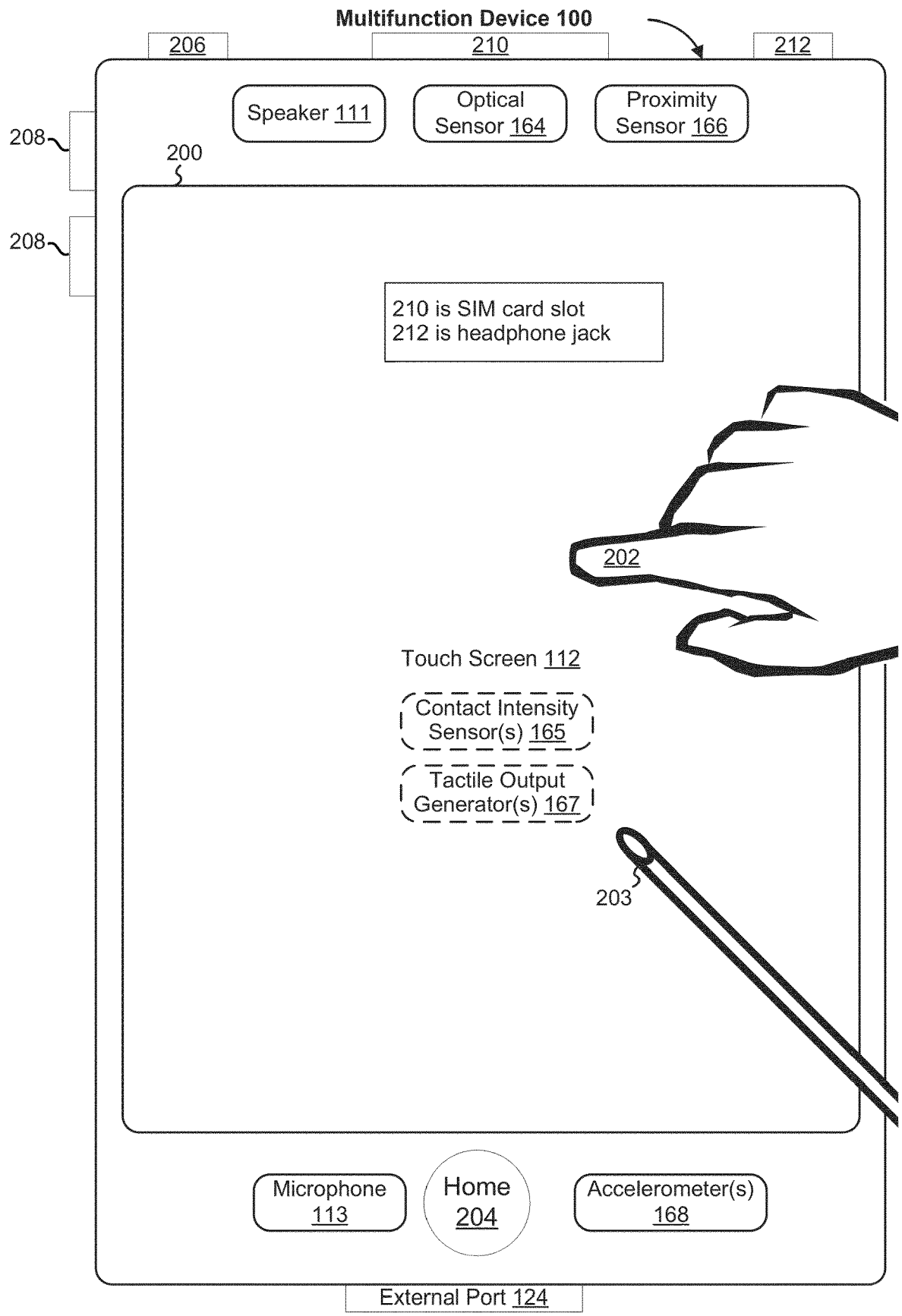
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

Figure 4:
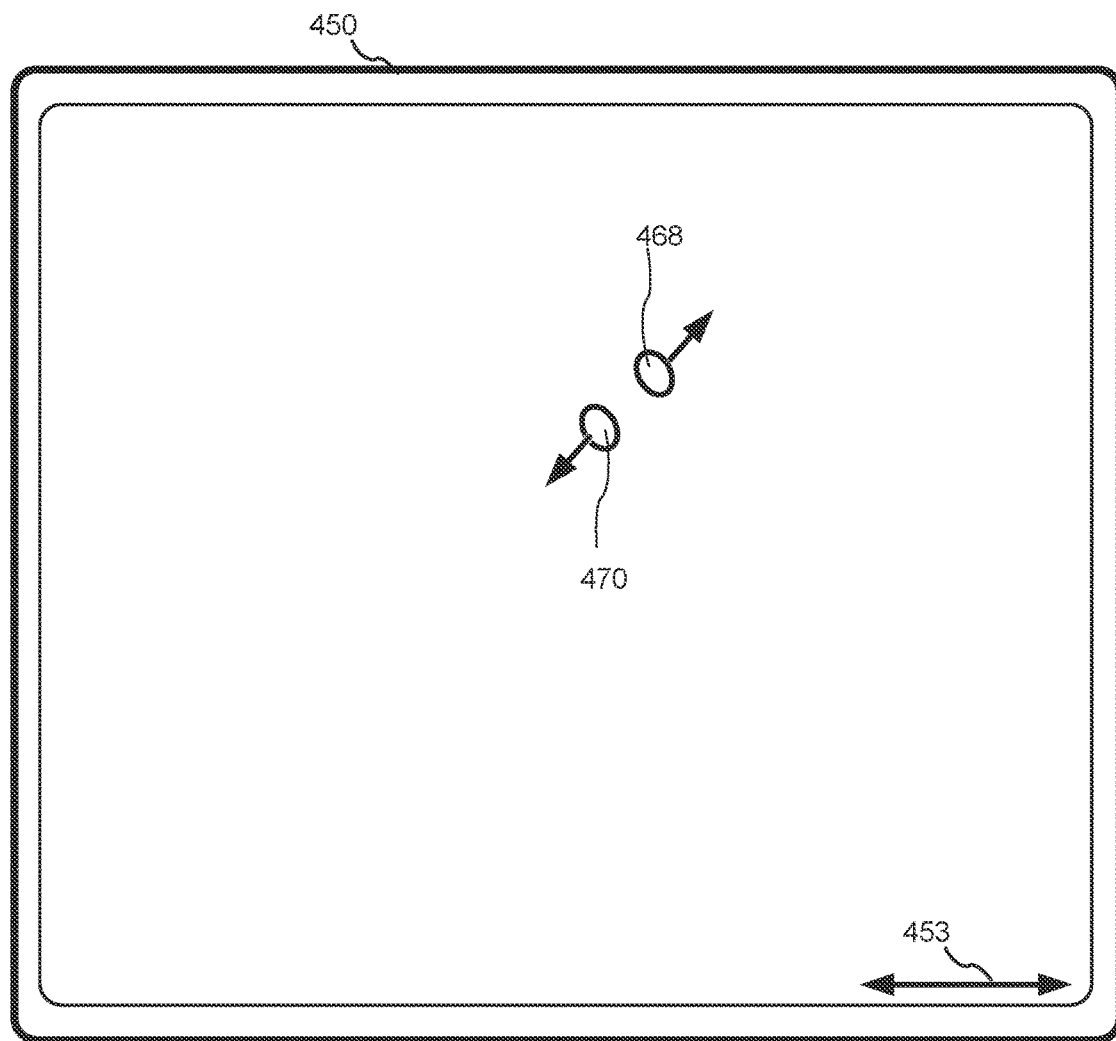
FIG. 4 illustrates an exemplary user interface for a multifunction device with a touch-sensitive surface that is separate from the display in accordance with some embodiments of the disclosure.
Figure 4:
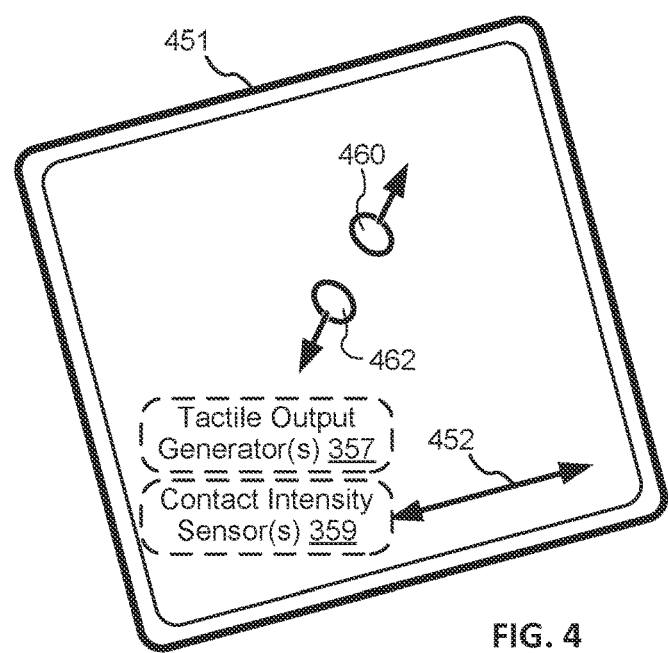

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
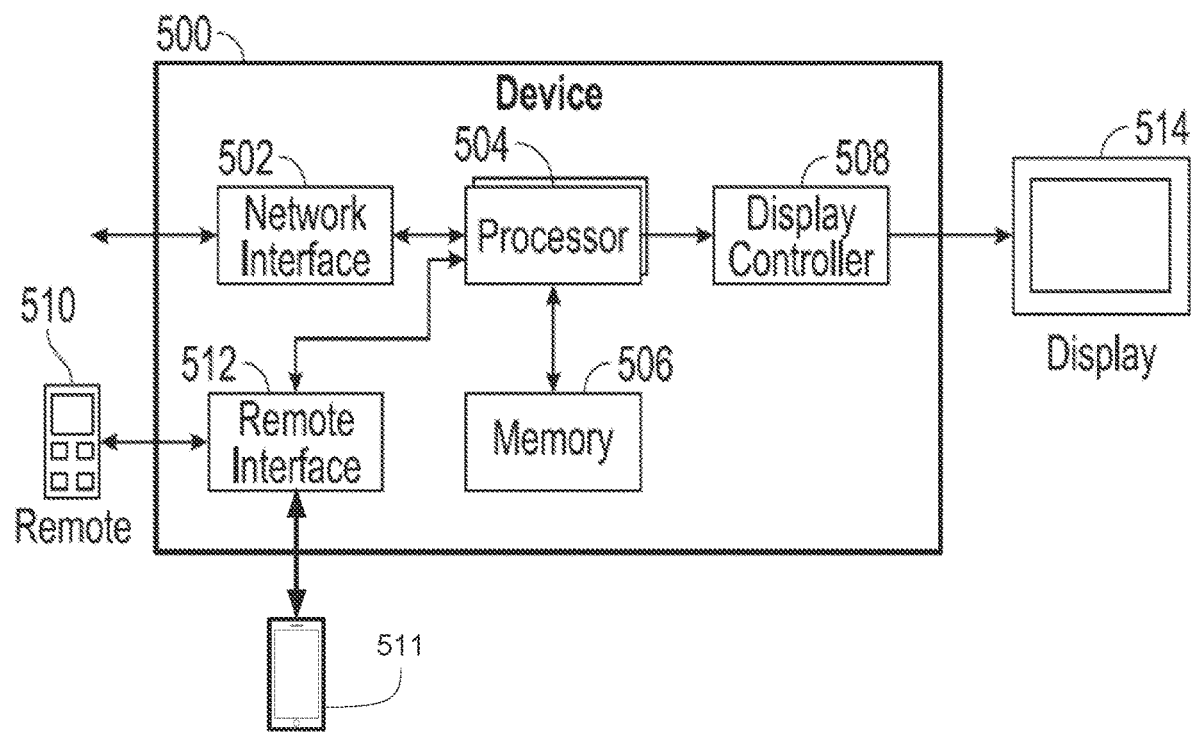
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., methods 700, 900, 1100, and 1300).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
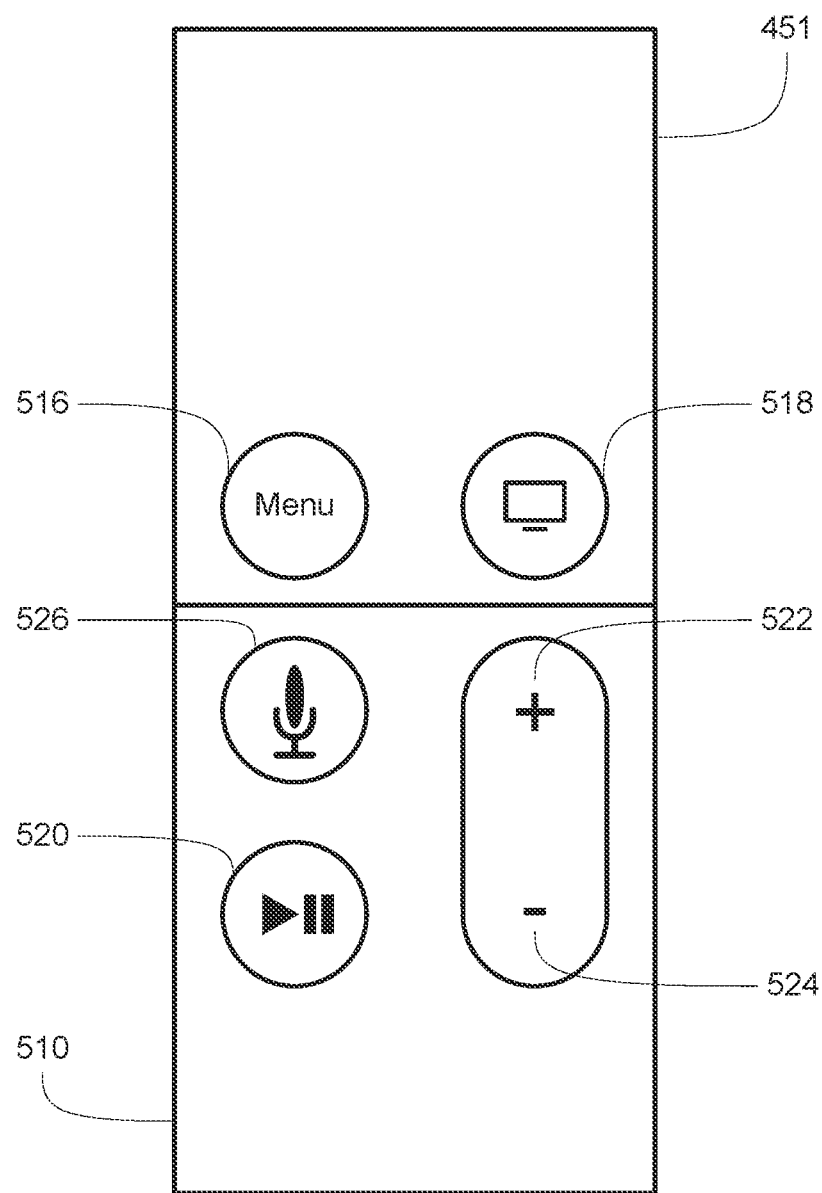

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
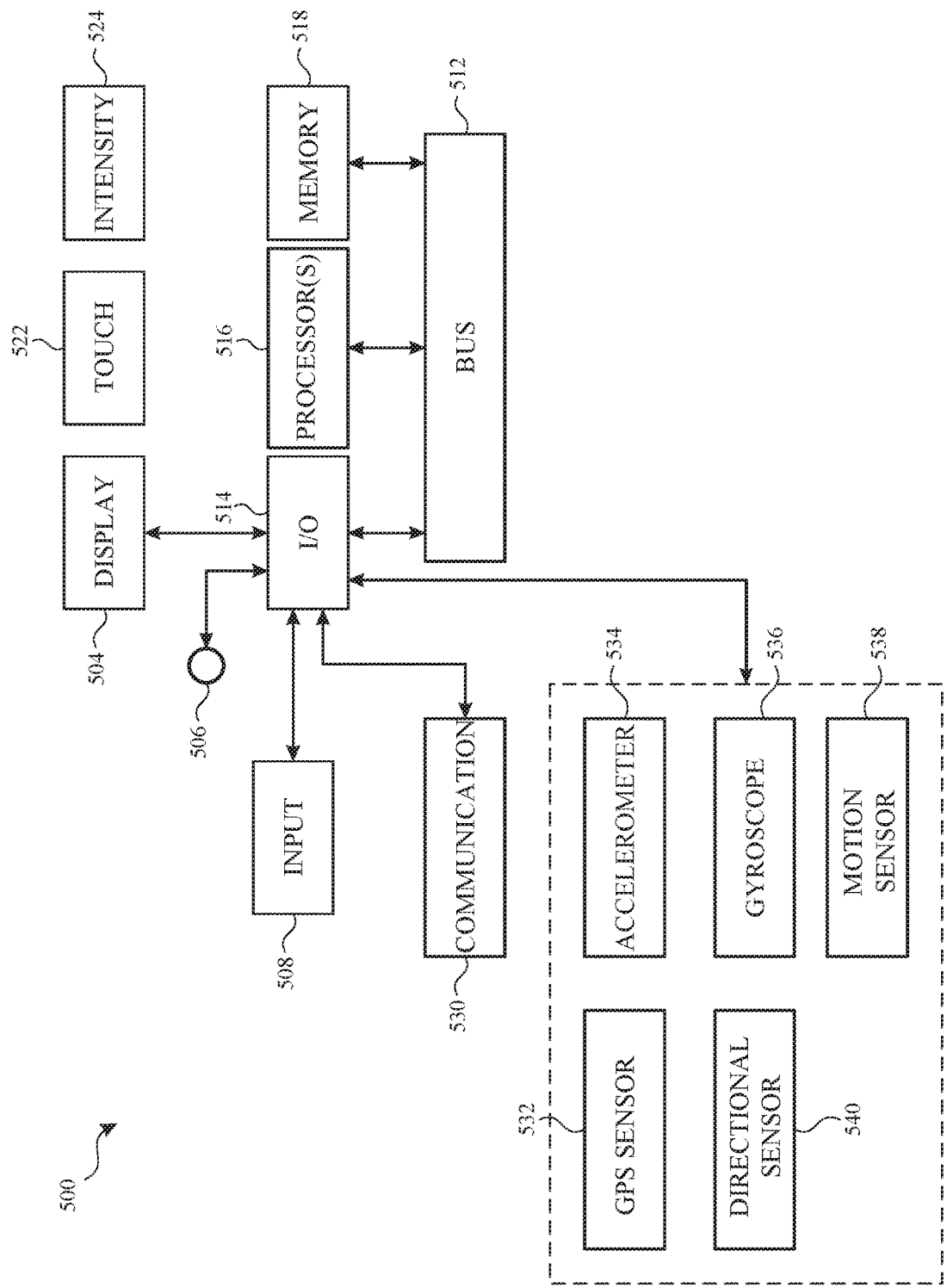

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-11. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" (U.S. Patent Application No. 62/822,952, filed Mar. 24, 2019), "User Interfaces For a Media Browsing Application" (U.S. Patent Application No. 62/822,948, filed Mar. 24, 2019), and "User Interface Specific to Respective Content Items" (U.S. Patent Application No. 62/822,966), filed Mar. 24, 2019), each of which is hereby incorporated by reference.

Attention is now directed towards embodiments of user interfaces ("UI") and associated processes that are implemented on an electronic device, such as portable multifunction device 100, device 300, or device 500.

User Interfaces and Associated Processes

Selectable Representations of Content Items

Users interact with electronic devices in many different manners, including using an electronic device to browse items of content available for playback on the electronic device. In some embodiments, an electronic device is able to present representations of items of content that are available for playback on the electronic device. The embodiments described below provide ways in which an electronic device presents representations of items of content and enables browsing of the representations of items of content. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

FIGS. 6A-6FF illustrate exemplary ways in which an electronic device 500 presents representations of items of content available for playback on the electronic device 500 in accordance with some embodiments of the disclosure. The embodiments in these figures are used to illustrate the processes described below, including the processes described with reference to FIGS. 7A-7G.

Figure 6A:
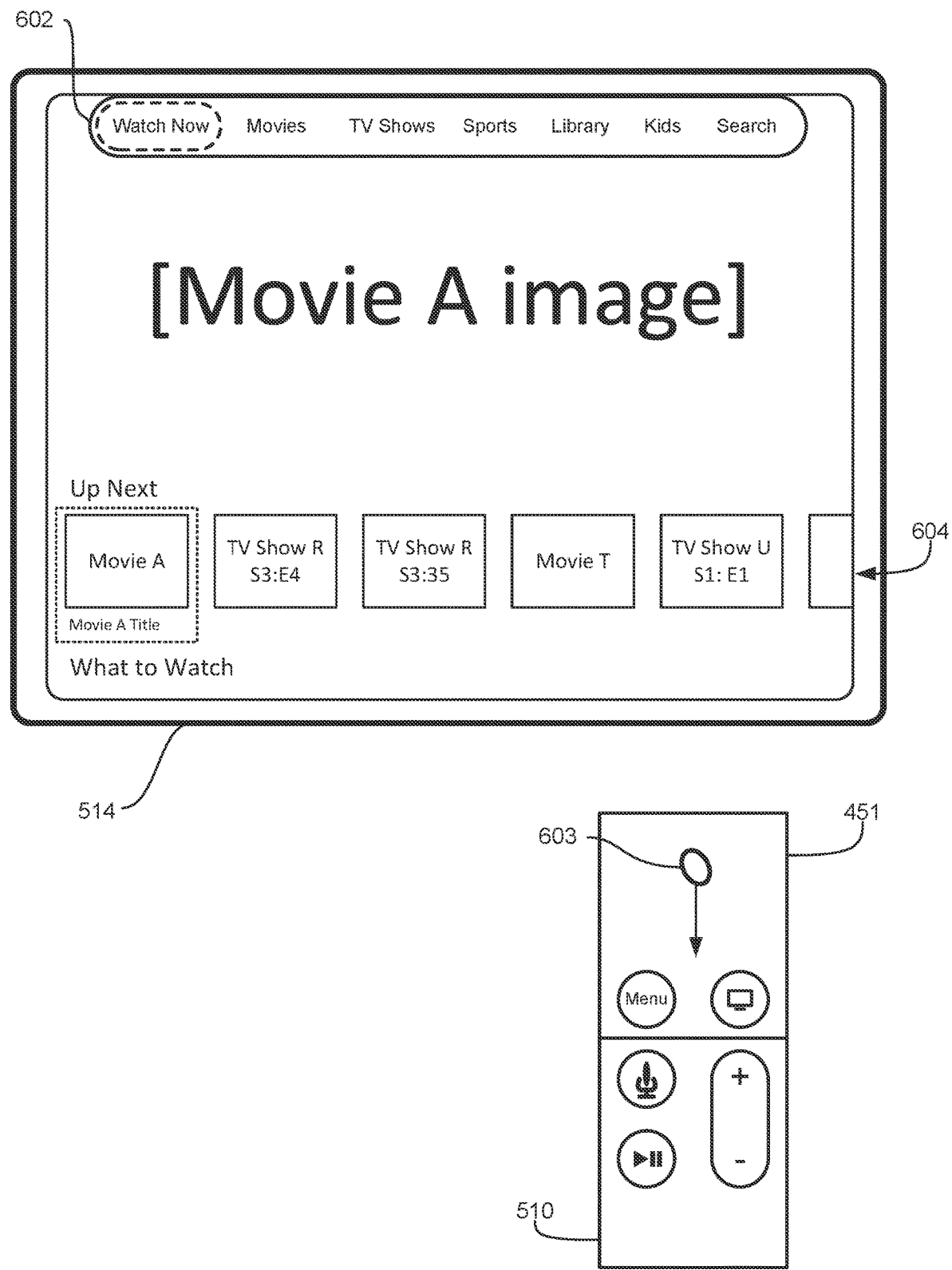
FIGS. 6A-6FF illustrate exemplary ways in which an electronic device presents representations of items of content available for playback on the electronic device in accordance with some embodiments of the disclosure.

FIG. 6A illustrates a media browsing application user interface. The user interface includes a navigation bar 602 and a plurality of selectable options 604 that, when selected, cause the electronic device 500 to initiate playback of a respective content item represented by the selected selectable option. As shown in FIG. 6A, while presenting the media browsing application user interface, the electronic device 500 detects a movement of a contact 603 on an input device 510 in communication with the electronic device 500. In response to the user input, the electronic device 500 scrolls the user interface down and moves the current focus in accordance with movement of contact 603, as shown in FIG. 6B.

Figure 6B:
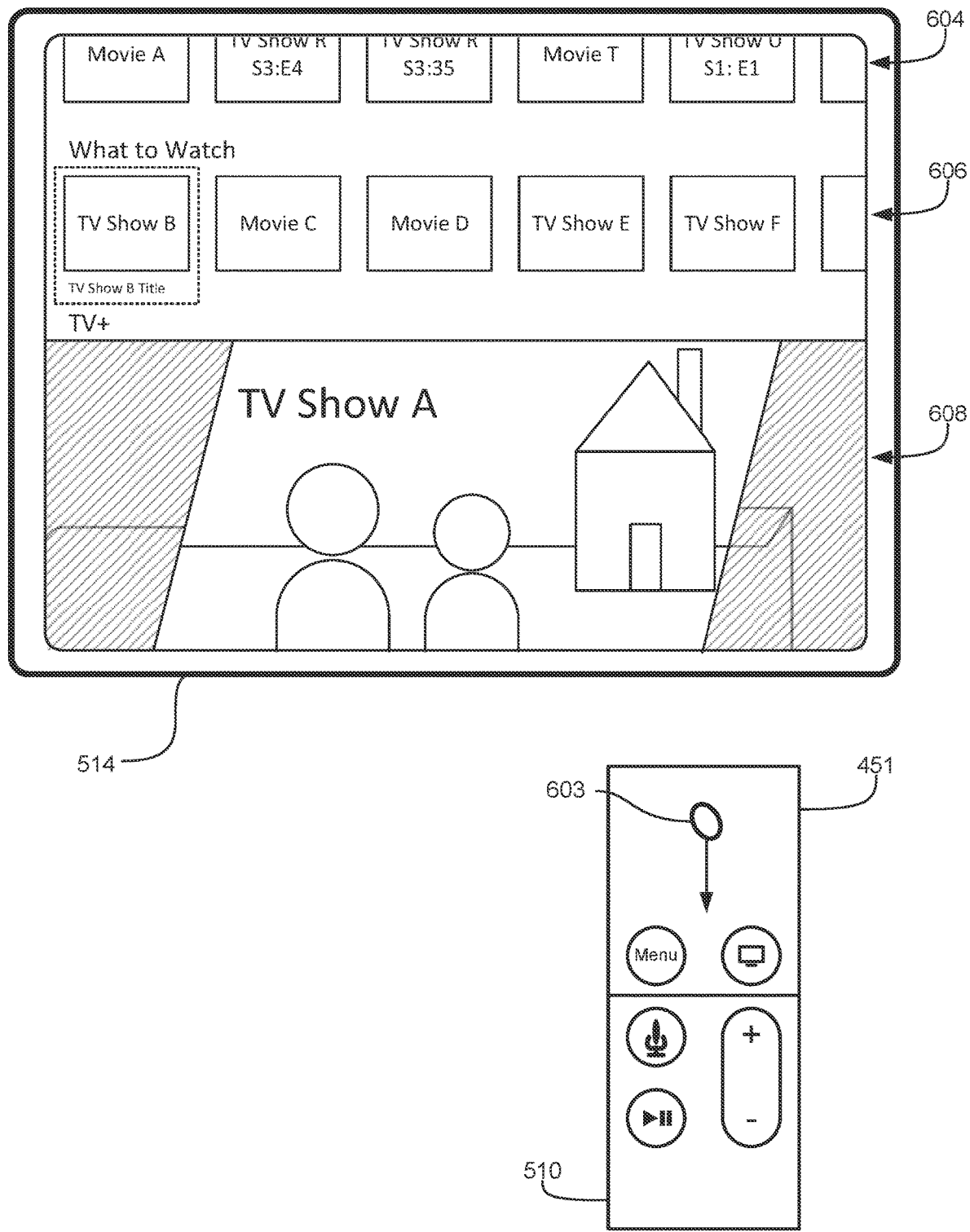

As shown in FIG. 6B, in response to the input illustrated in FIG. 6A, the electronic device 500 presents additional representations 606 and 608 of items of content that are selectable to display user interfaces specific to the selected item of content. As shown in FIG. 6B, while presenting the media browsing application user interface, the electronic device 500 detects a movement of a contact 603 on an input device 510 in communication with the electronic device 500. In response to the user input, the electronic device 500 scrolls the user interface down and moves the current focus in accordance with movement of contact 603, as shown in FIG. 6C.

Figure 6C:
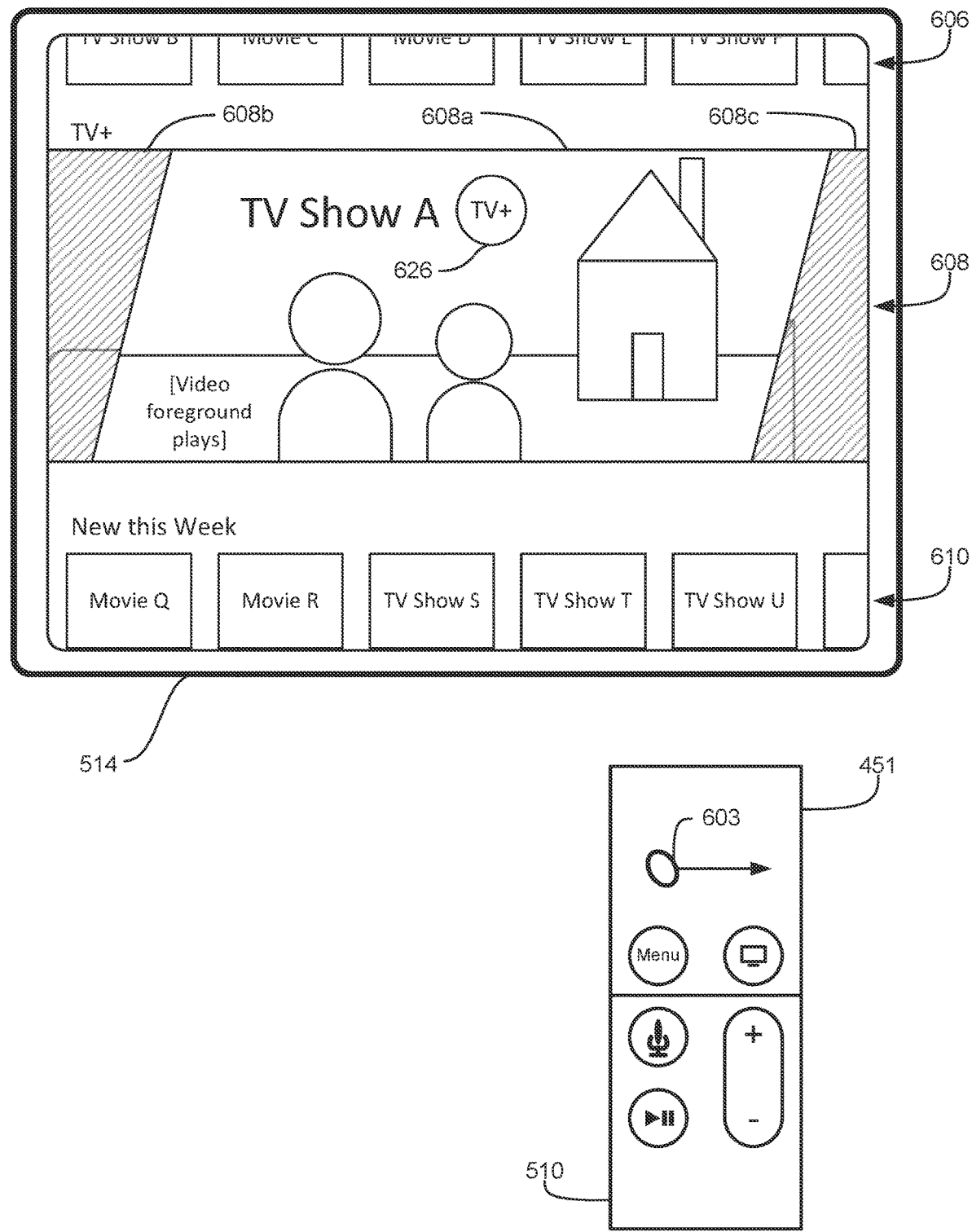

In FIG. 6C, the electronic device 500 presents the entirety of representations 608a-c that are presented in a horizontally scrollable row. In some embodiments, the content items presented in row 608 and in the manner of the representations in row 608 are provided by the same subscription service, channel, or provider and content items provided by other subscription services, channels, or providers are not presented in row 608 or in the manner of row 608. In some embodiments, row 608 includes representations of content provided by a variety of channels, subscription services, or providers or the user interface includes additional rows presented in the manner of 608 that include content from other subscription services, channels, or providers.

While presenting the user interface shown in FIG. 6C, the current focus of the electronic device 500 is on representation 608a. As shown in FIG. 6C, once representation 608a has the current focus of the electronic device 500, the representation 608a is displayed with a width that is wider than the width of the representation when the current focus is elsewhere in the user interface, such as in FIG. 6B (e.g., the representation expands laterally when it receives the current focus).

Returning to FIG. 6C, the user swipes (e.g., with contact 603) horizontally. In response to the input, the electronic device 500 presents an animation illustrated in FIGS. 6D-6E of representation 608a moving to reveal representation 608b. In other words, a cropping frame/border between representation 608a and representation 608b moves a greater distance than a distance moved by the representations 608a and 608b, rather than moving representations 608a and 608b a distance around the width of the representations. In some embodiments, the animation produces a visual effect that representation 608a is moving to reveal representation 608b from underneath representation 608a. After the animation is complete, representation 608b is presented overlaid on representation 608a and representation 608a is to the right of representation 608b and right-aligned with the edge of the visible area of row 608. Animating the transition in this way reduces the number of pixels that need to move to present the animation and therefore conserves computing resources and reduces an undesired dizzying effect on the user when viewing large, repetitive animations, such as when browsing the content items in row 608.

Figure 6D:
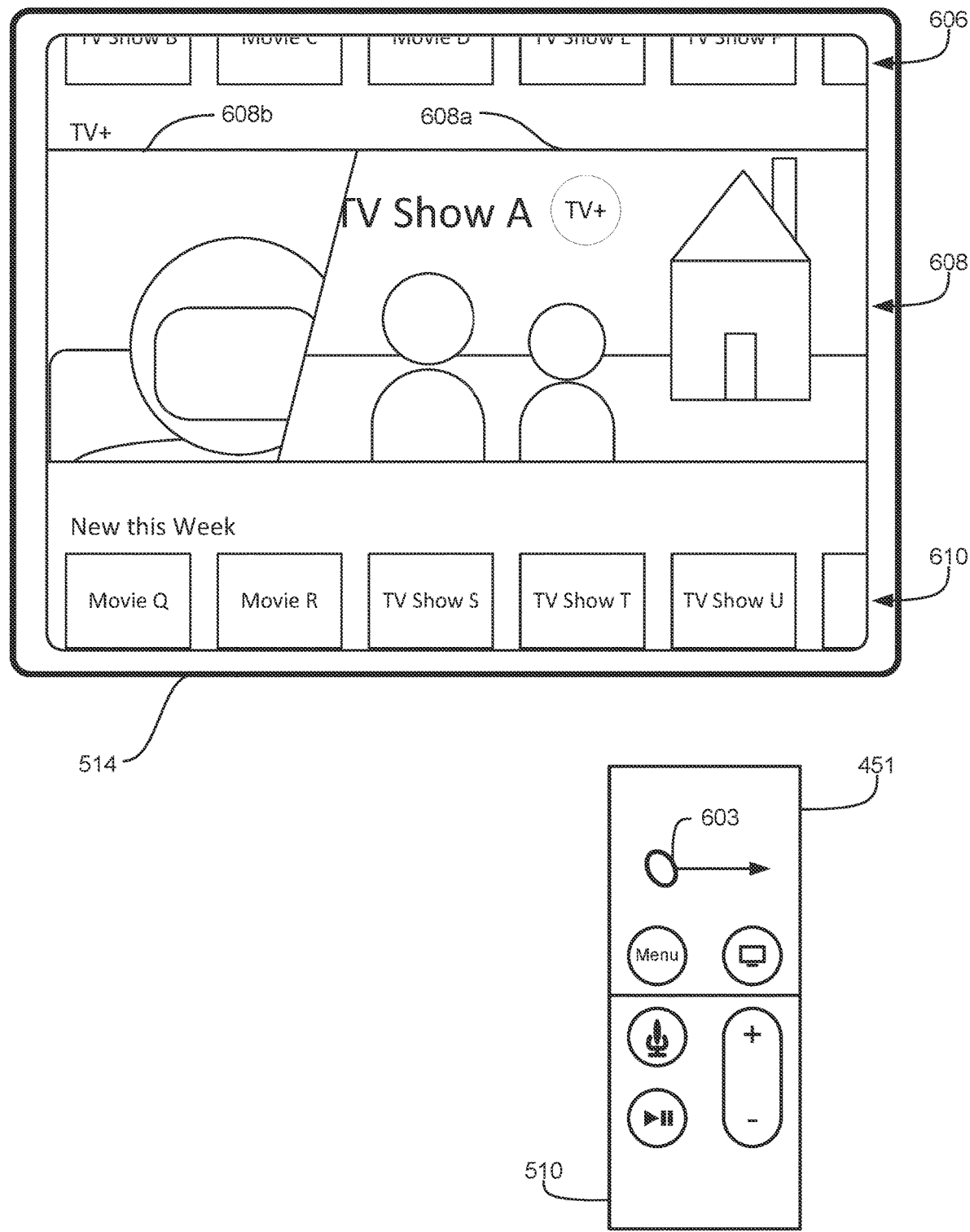
Figure 6E:
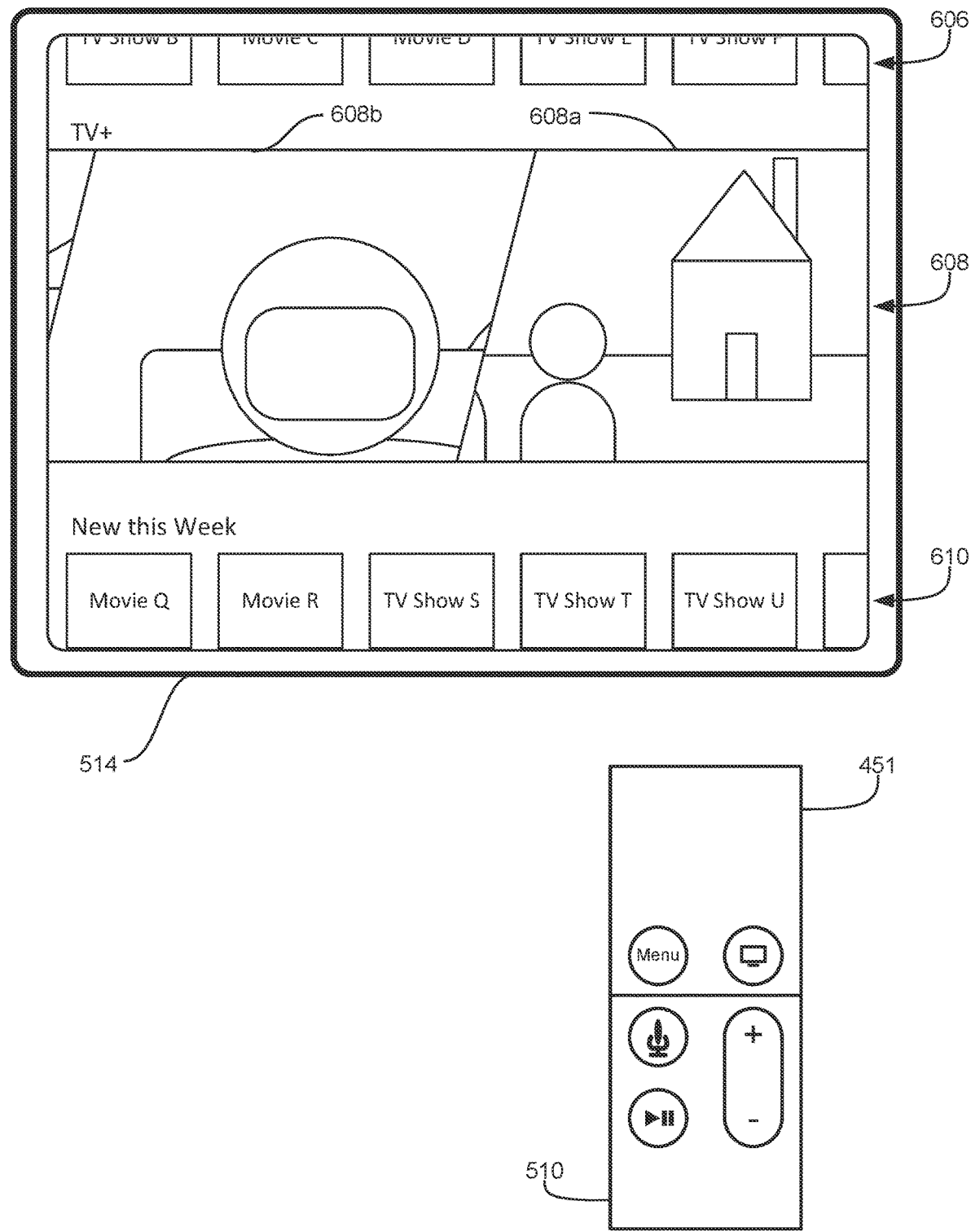
Figure 6F:
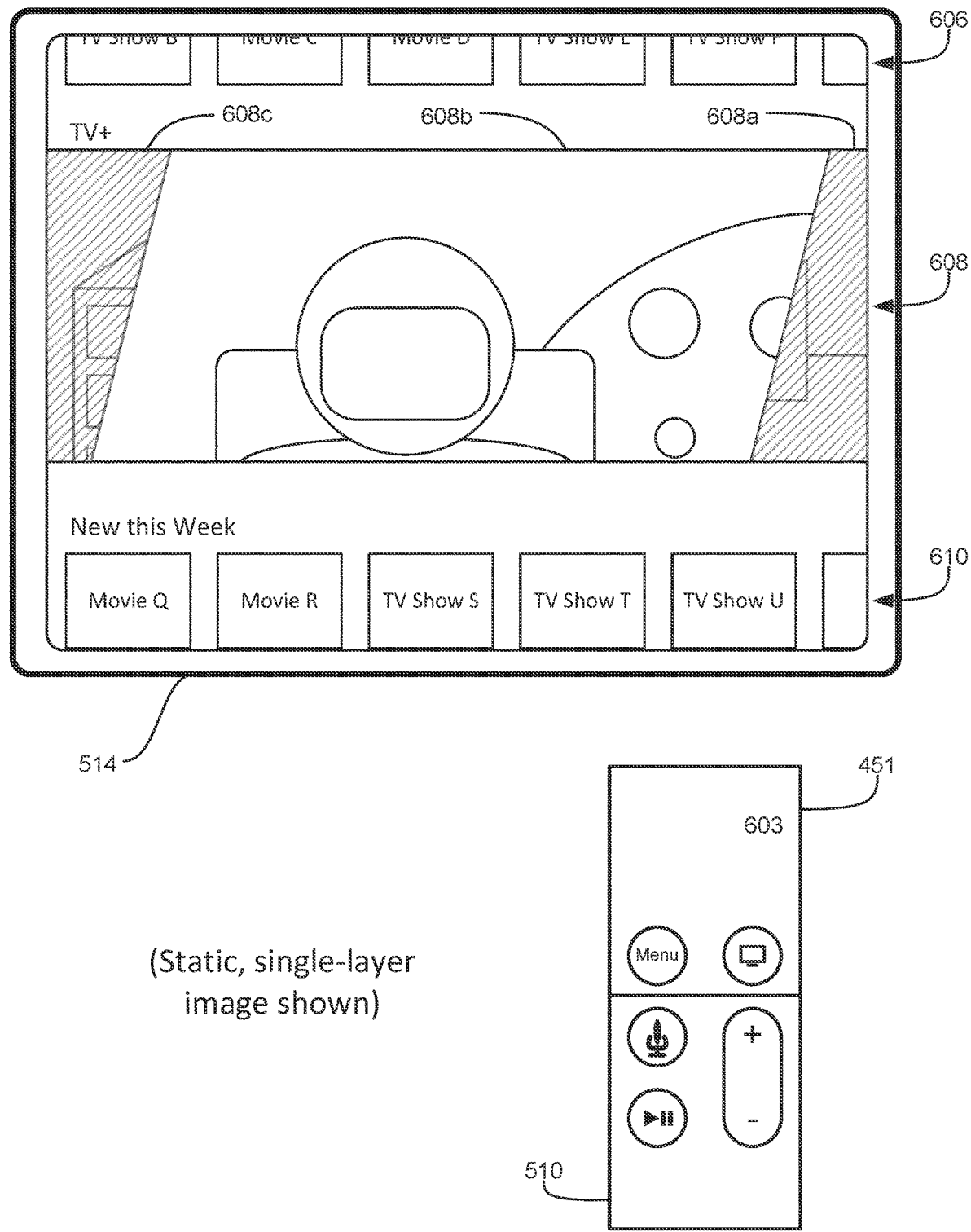

As shown in FIG. 6F, after presenting the animation illustrated in FIGS. 6D-6E, the electronic device 500 presents the representation 608b in the middle of row 608. Initially, as shown in FIG. 6F, the electronic device 500 presents representation 608b as a static, single-layer image (e.g., an image that does not include multiple layers or video content).

Figure 6G:
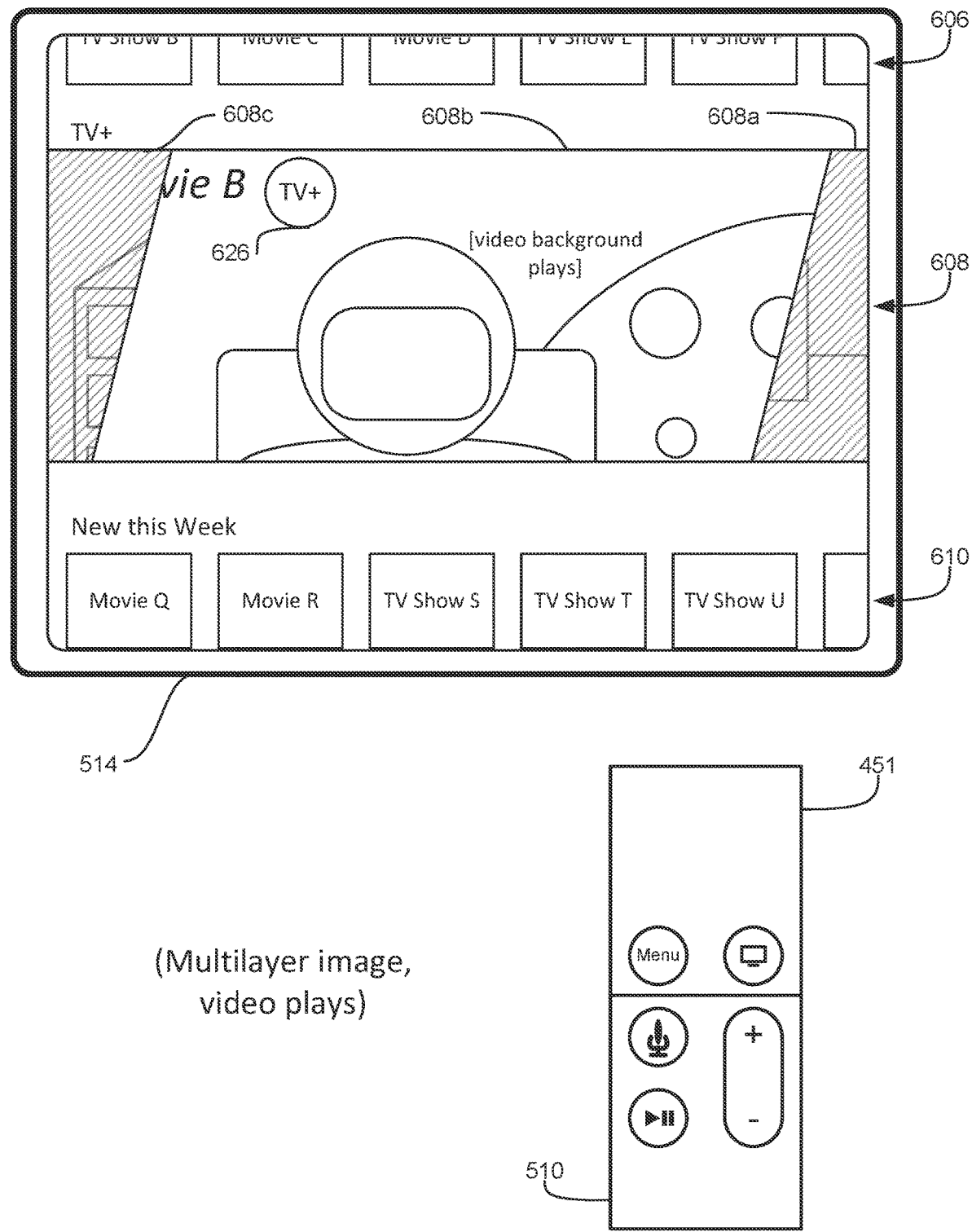
Figure 6H:
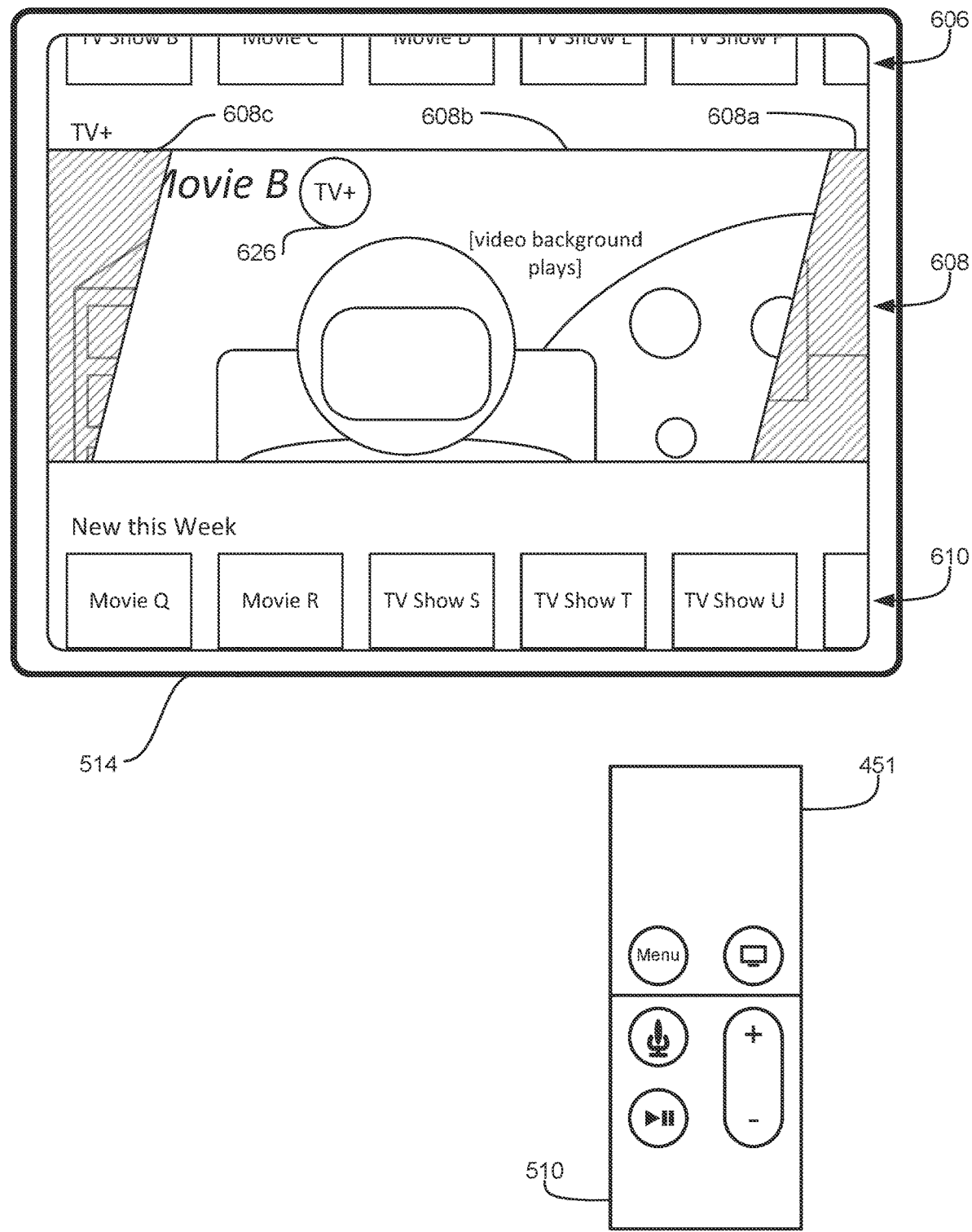
Figure 6I:
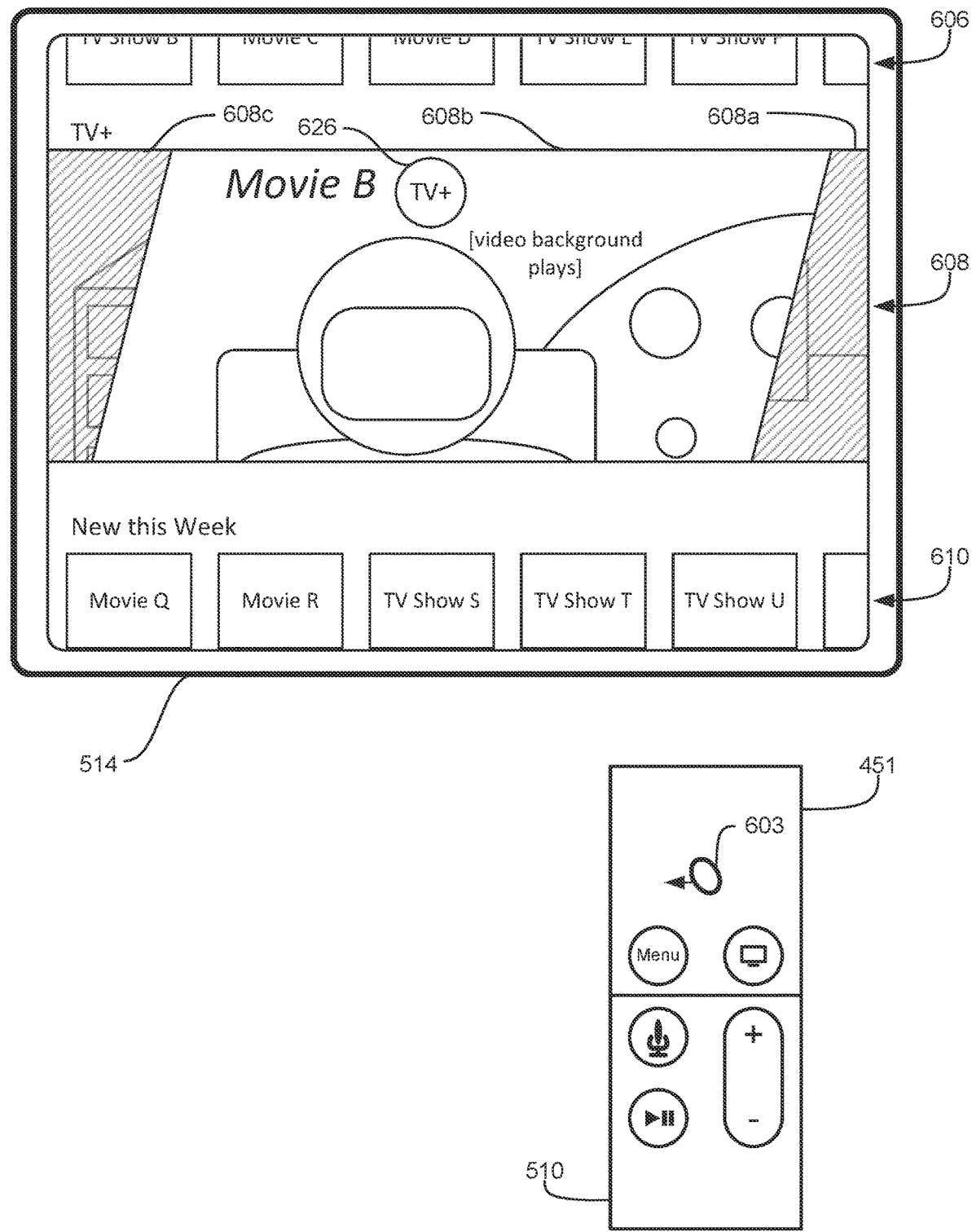

As shown in FIG. 6G, once the multi-layer, multi-media representation 608b loads in the user interface (e.g., once the representation has fully moved into the primary center position in the horizontal row), the electronic device 500 presents the representation 608b with a video background (e.g., one or more video or animation layers in the representation, whether in the background layer or otherwise, begin to play or animate). Additionally, the representation 608b includes a plurality of overlaid image layers (e.g., the representation includes one or more static image layers). As shown in FIG. 6G-6I, the electronic device 500 presents an animation of a title of the content and a badge 626 representing the provider of the content moving in to the representation 608b once the representation has fully moved in the primary center position in the horizontal row. In some embodiments, the title and badge 626 appear in the static image representation 608b illustrated in FIG. 6F and do not animate in.

Figure 6J:
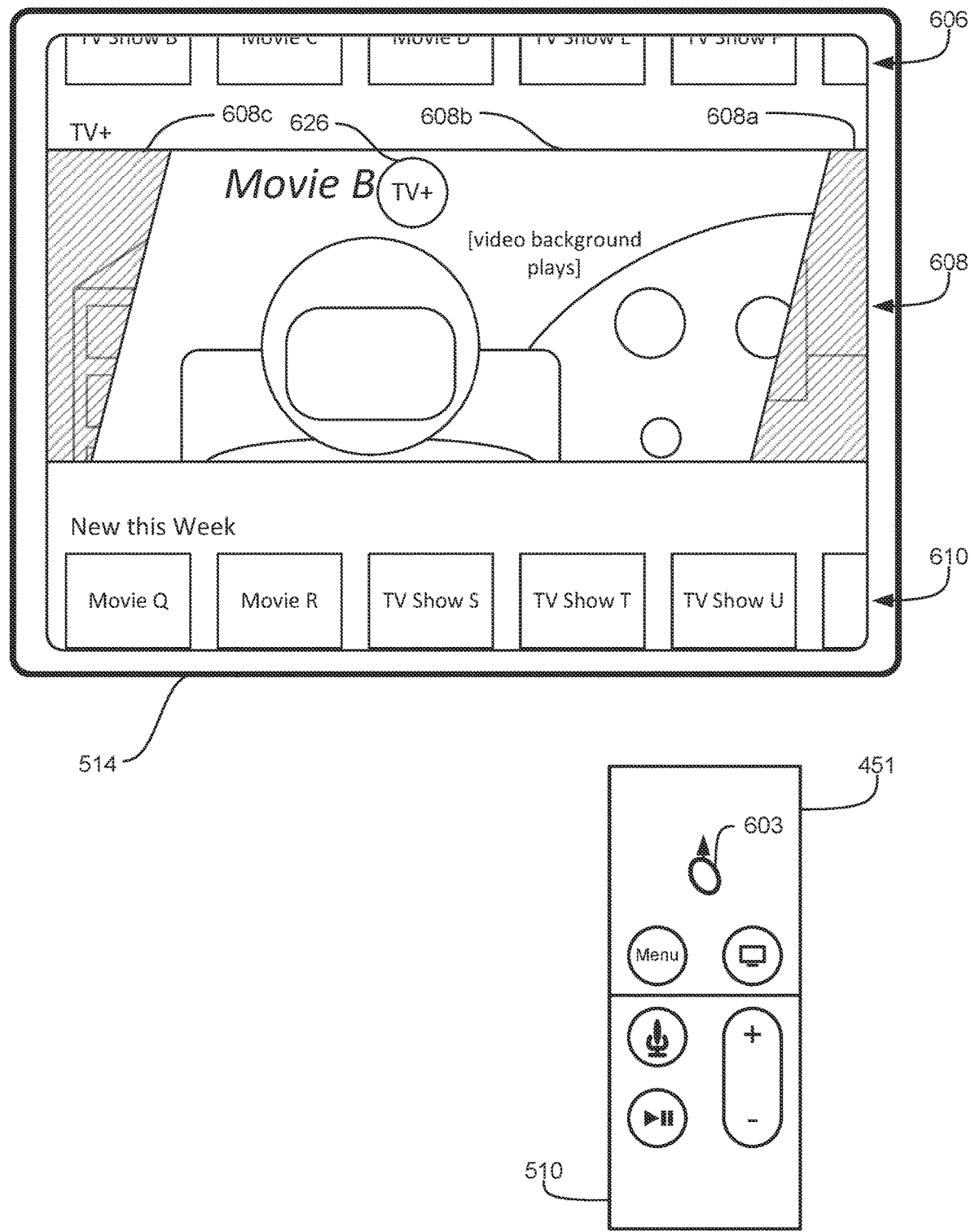

As shown in FIG. 6I, the electronic device 500 detects movement of contact 603 that is below a movement threshold for changing the input focus of the electronic device 500 (e.g., for changing the current focus from one representation in the horizontal row to another representation in the horizontal row). In response to the detected movement, the electronic device 500 shifts the image and/or video/animation layers of representation 608b, including badge 626 (although, in some embodiments, the badge does not move), in accordance with the movement, as shown in FIG. 6J. In some embodiments, the layers in the image move different amounts in response to the user input. For example, layers in the front of the image move less than layers in the back of the image or vice-versa. In some embodiments, the still image layers move in response to the user input. In some embodiments, the video layers move in response to the user input. In some embodiments, the video layers remain stationary but continue to play when user input that moves the stationary layers is received. The layers move in accordance with the direction of the movement of contact 603 (e.g., rightward movement causes the image layers to move to the right, etc).

Figure 6K:
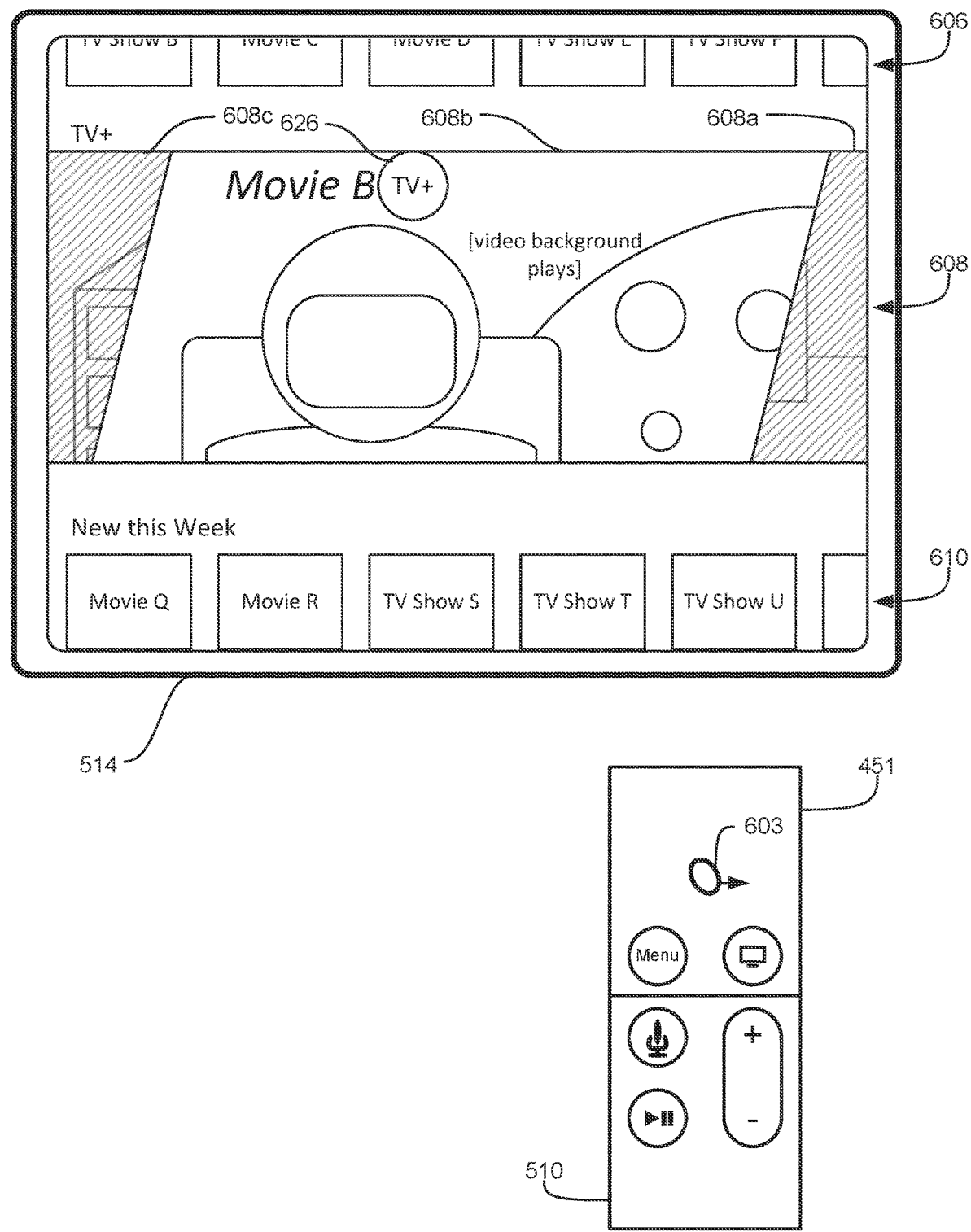
Figure 6L:
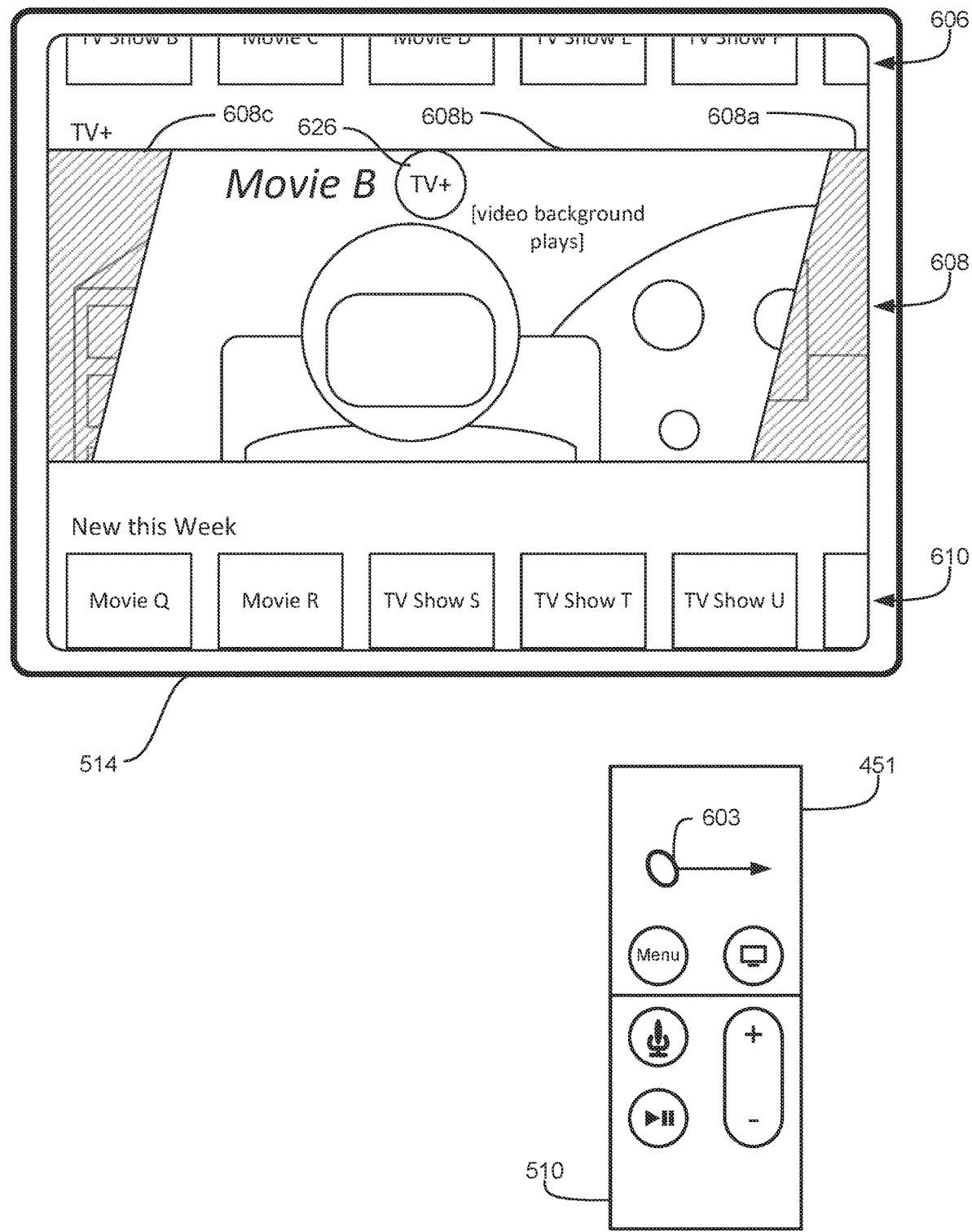
Figure 6M:
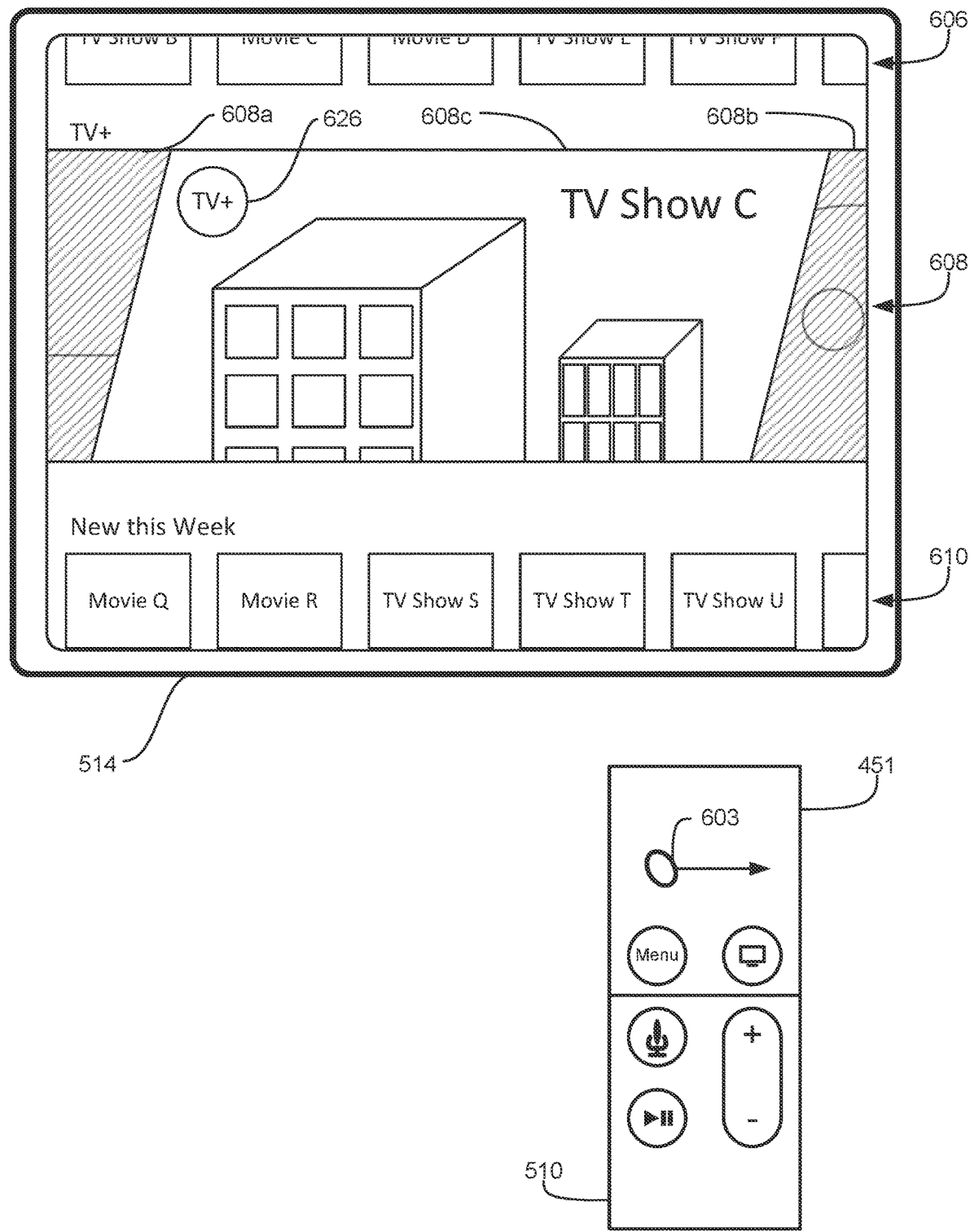

FIGS. 6J-6L illustrate further movement of the representation 608b in response to detecting movement of contact 603 below a movement threshold for changing the input focus of the electronic device. Representations 608a and 608c do not move in response to the input and instead remain stationary while representation 608b moves. Likewise, borders around representation 608b remain stationary while the image layers move. As shown in FIG. 6L, the electronic device 500 detects movement of contact 603 that is above the movement threshold for changing the input focus of the electronic device 500. In response to the input, the electronic device 500 scrolls the row 608 of representations 606a-c to present representation 608c in the middle of row 608 with the current focus of the electronic device, as shown in FIG. 6M.

Although not illustrated in the figures, it should be understood that in response to the input illustrated in FIG. 6L, the electronic device 500 presents an animation similar to the animation illustrated in FIGS. 6D-6E.

Returning to FIG. 6M, the electronic device 500 detects another swipe input for scrolling row 608 of representations 608a-c. Although not illustrated in the figures, it should be understood that in response to the input illustrated in FIG. 6M, the electronic device 500 presents an animation similar to the animation illustrated in FIGS. 6D-6E. In response to the input, the electronic device 500 presents representation 608a in the middle of row 608 with the current focus of the electronic device 500, as shown in FIG. 6N.

Figure 6N:
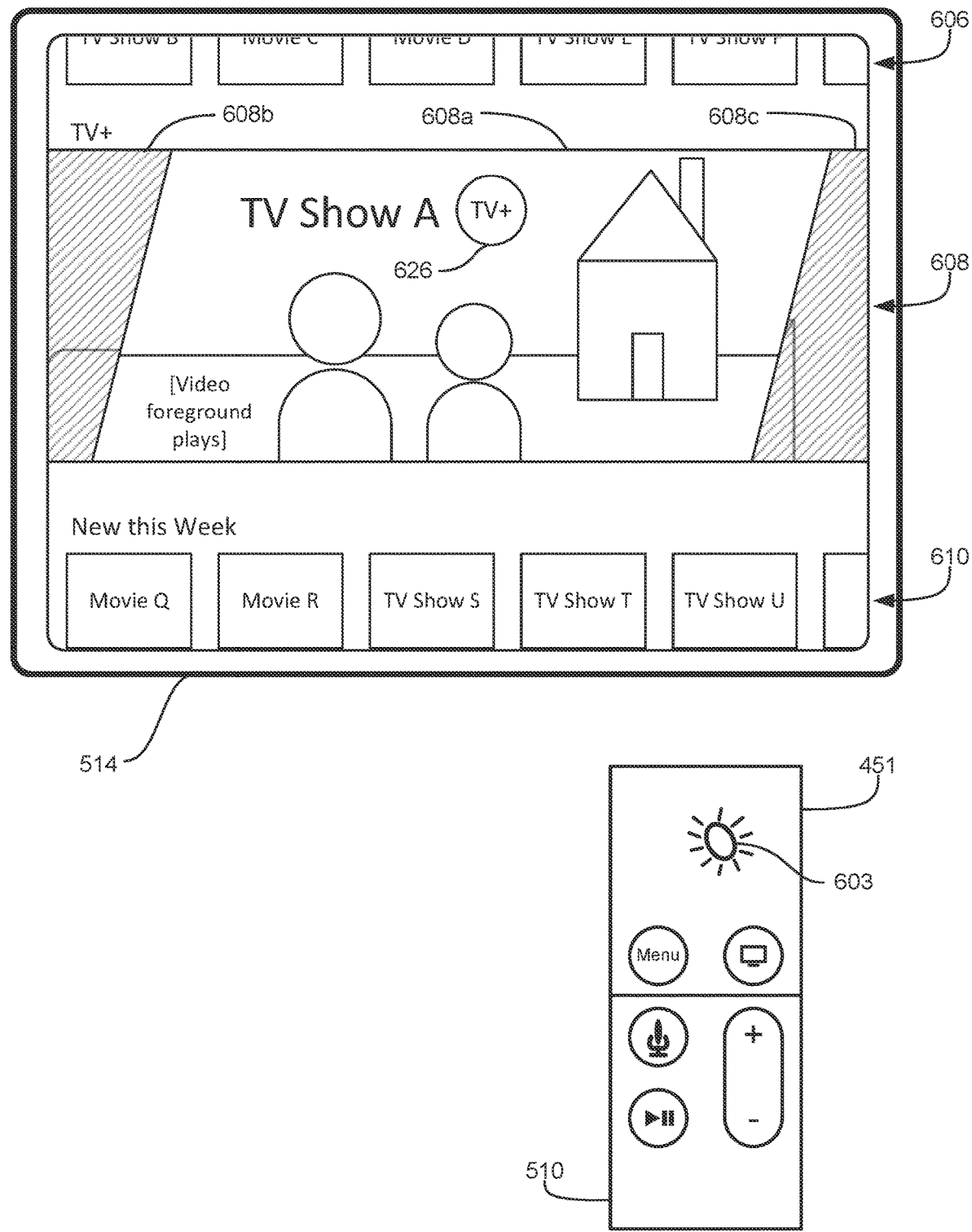
Figure 6O:
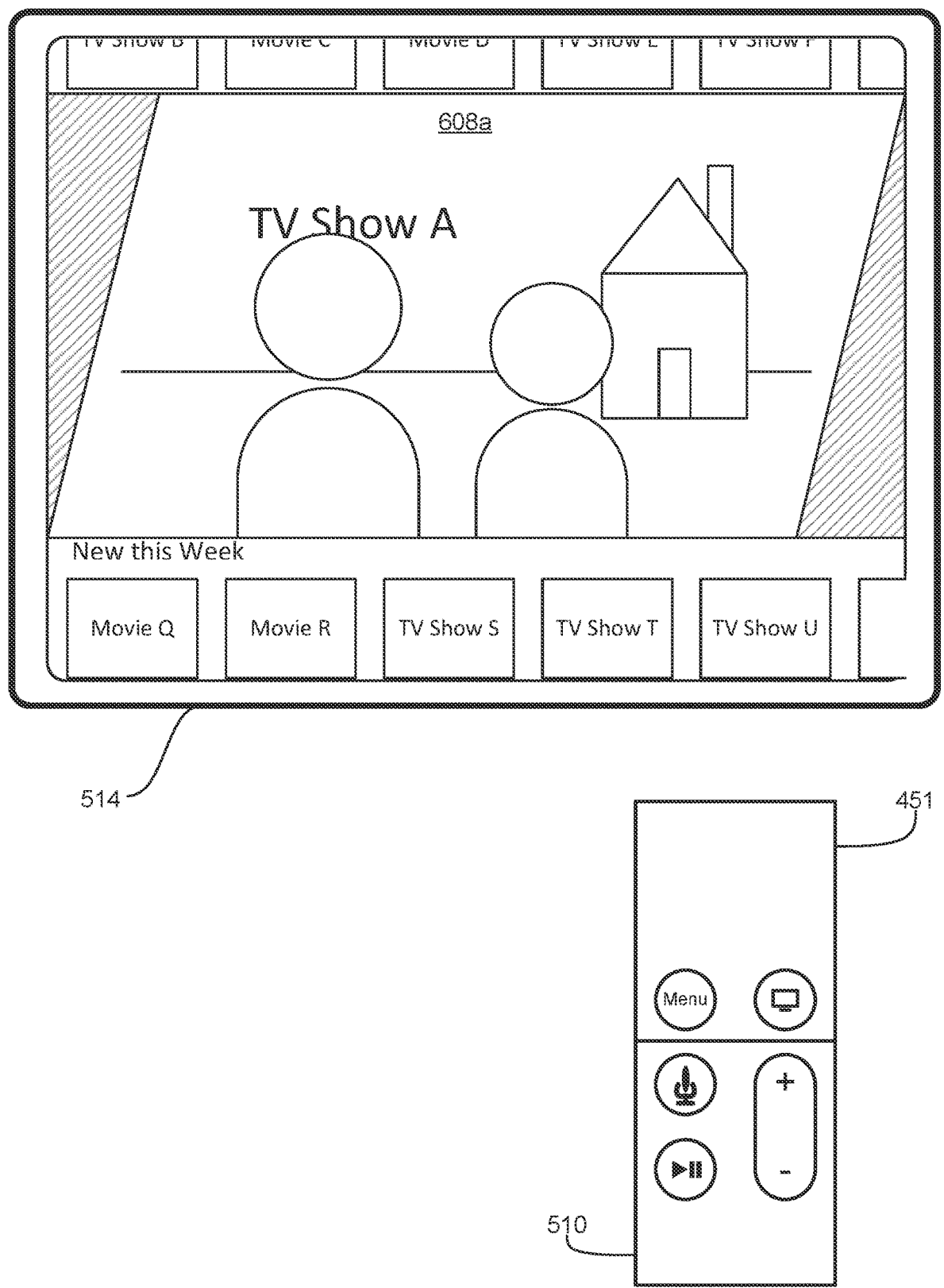
Figure 6P:
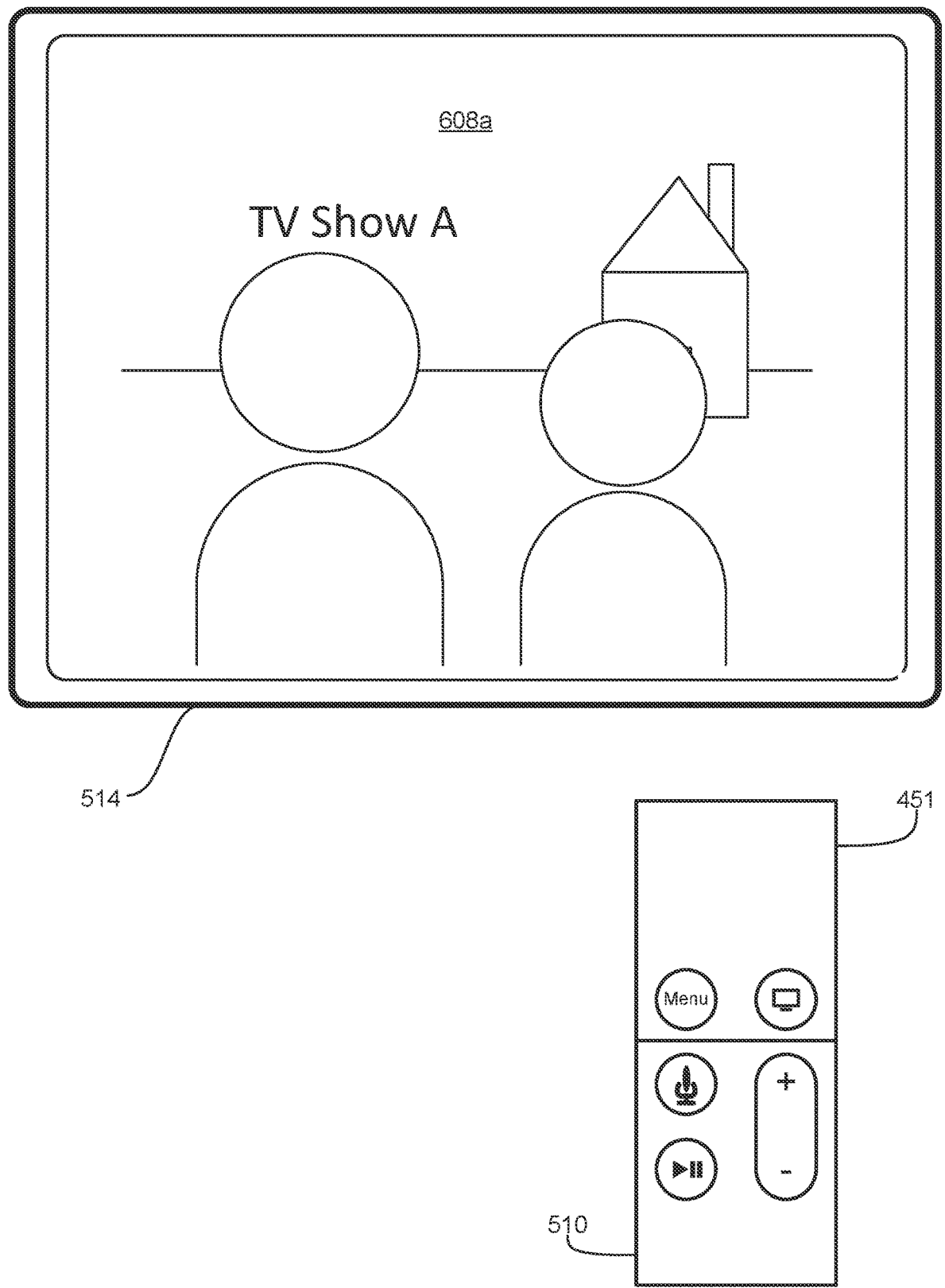
Figure 6Q:
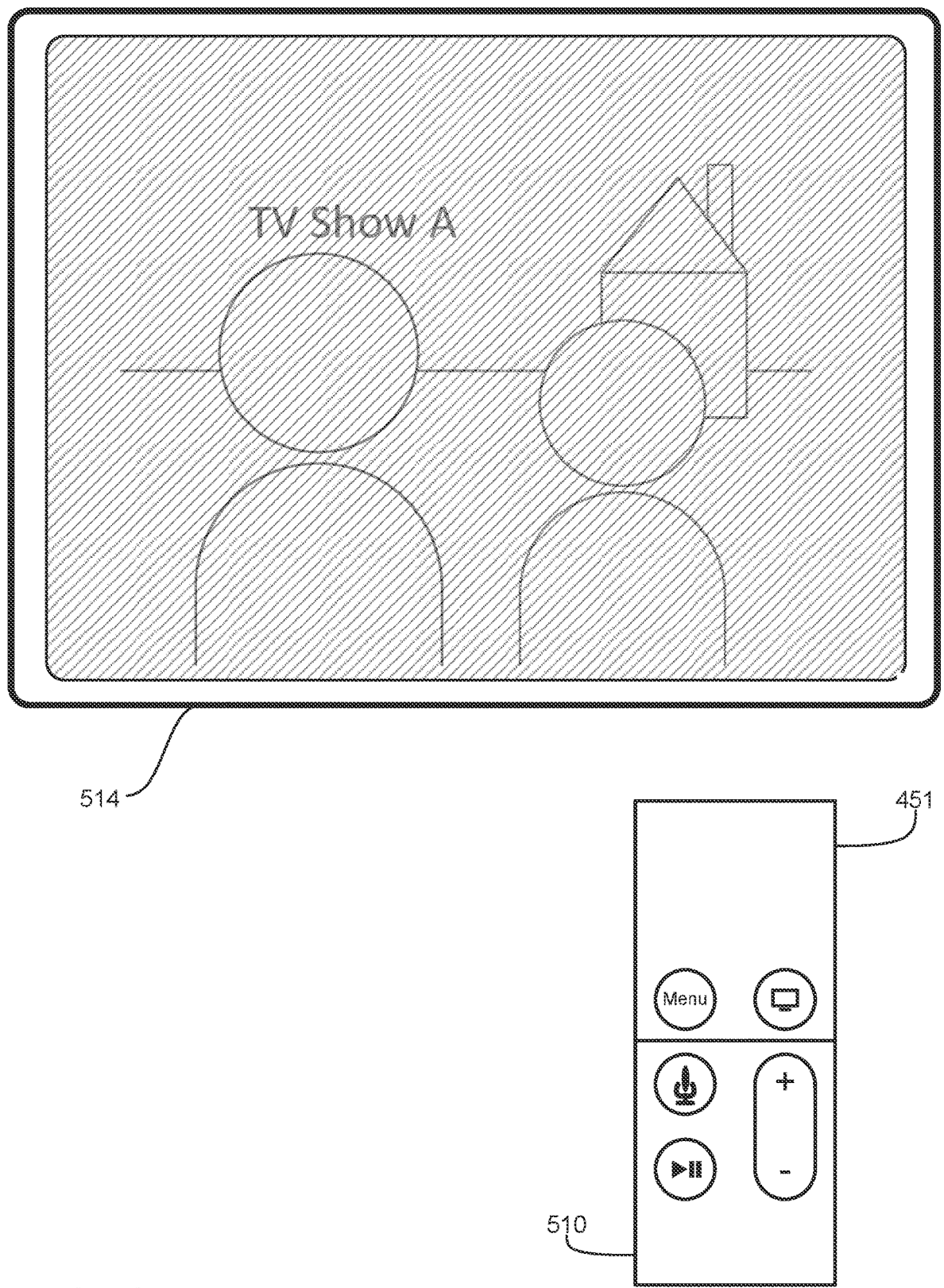
Figure 6R:
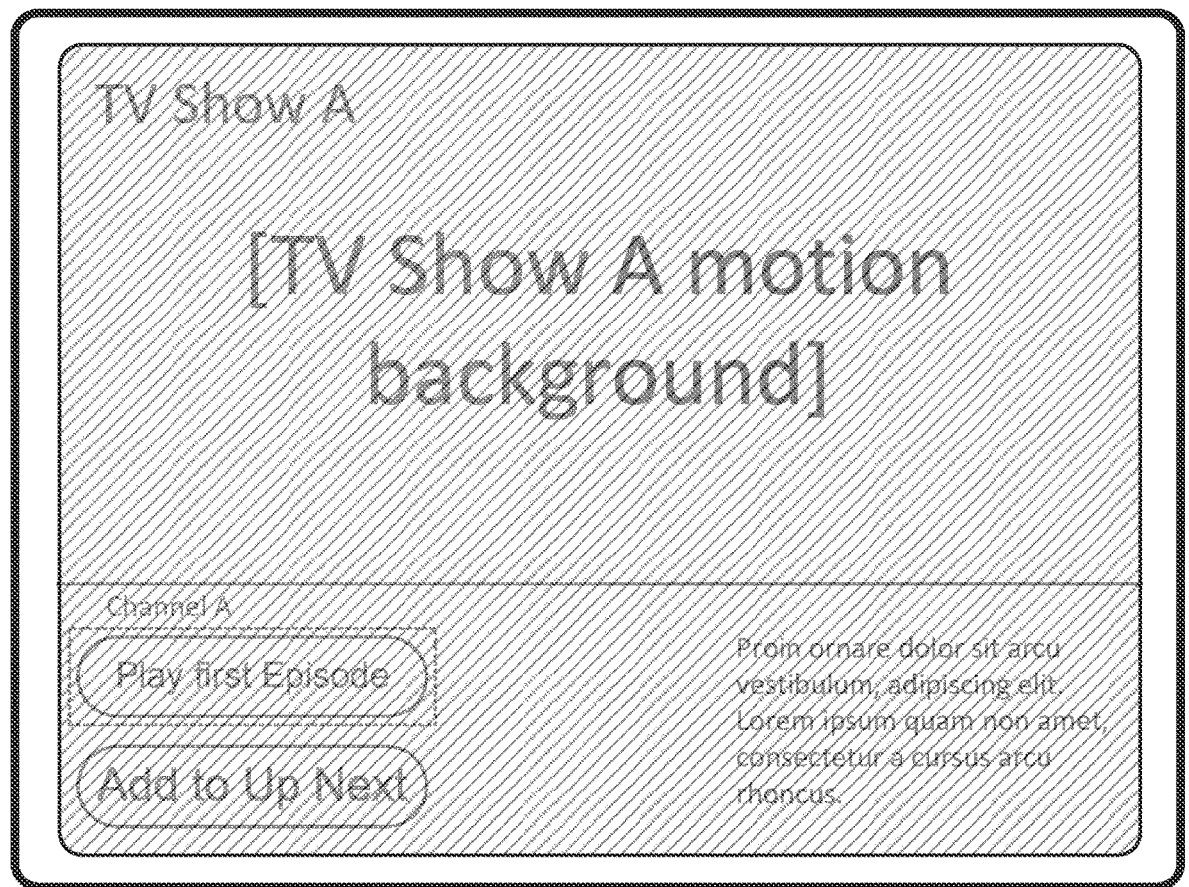
Figure 6R:
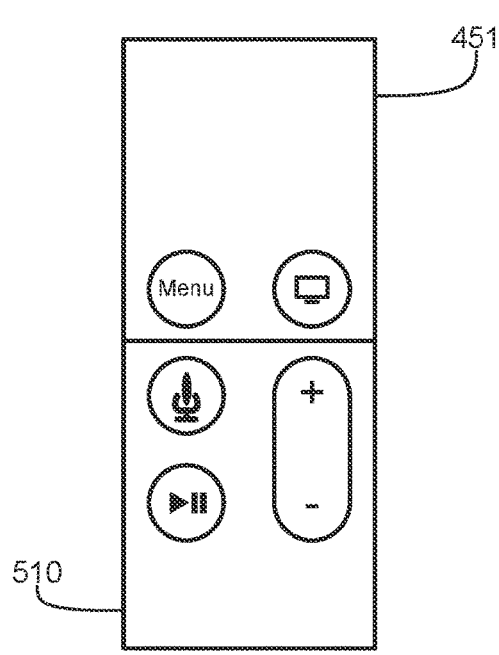

As shown in FIG. 6N, the user selects (e.g., with click of contact 608) the representation 608a. In response to the user's selection, the electronic device 500 presents an animation illustrated in FIGS. 6O-6R of representation 608a expanding and moving towards the user before fading out, followed by an animation of a user interface 614a fading in to the display 514, resulting in the user interface 614a illustrated in FIG. 6S. More specifically, the layers of the representation 608a expand, with the layers in the foreground (e.g., the top layers) expanding sooner and/or more than layers in the background of the image, followed by representation 608a fading out and user interface 614a fading in.

Figure 6S:
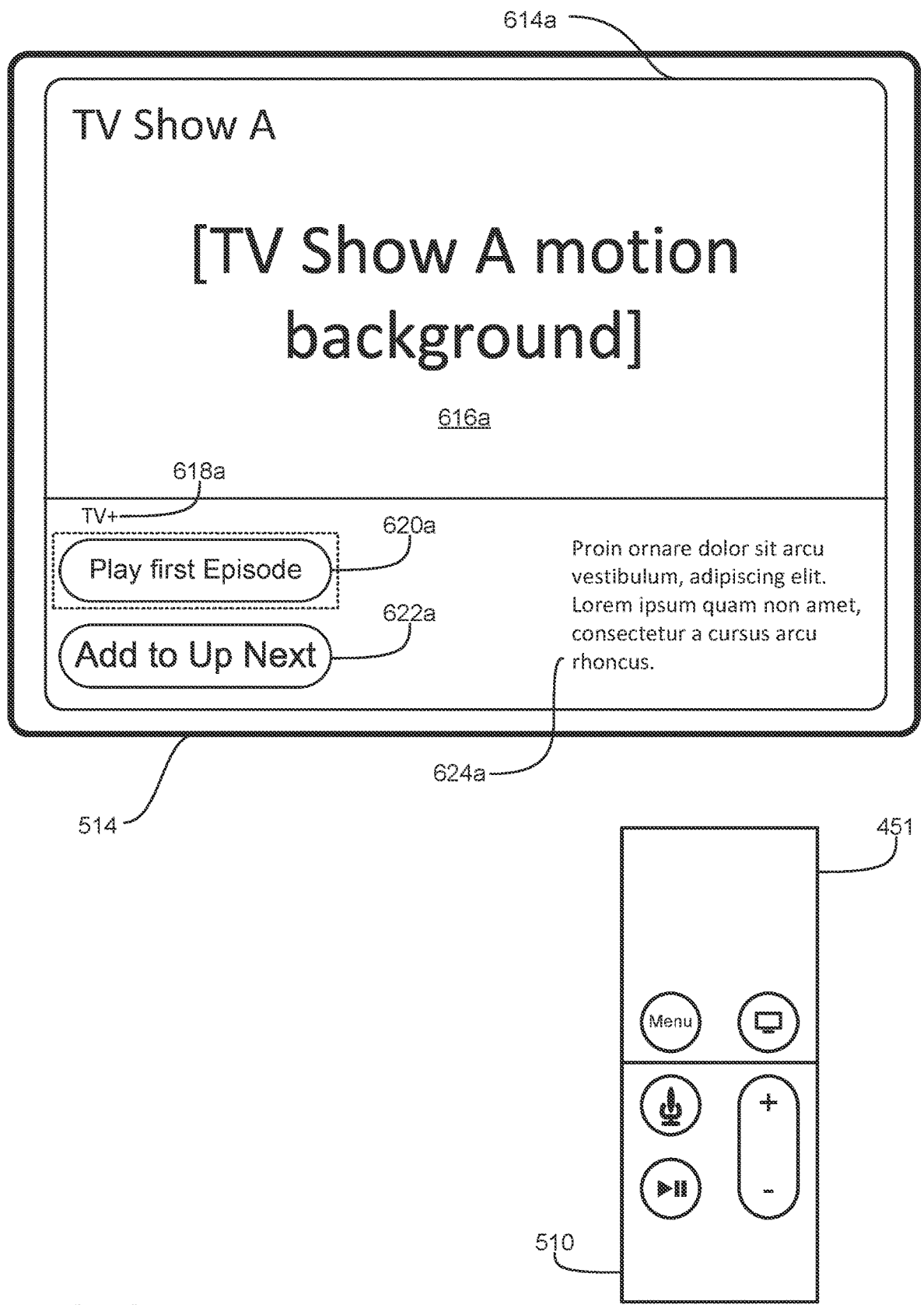

FIG. 6S illustrates a user interface 614a including information about the item of content represented by representation 608a. The user has not previously interacted with the item of content. The user interface 614a includes a motion background 616a (e.g., an animation or video) representing the series of the item of content, which is a collection of episodic content. The user interface 614a further includes an indication 618a of the provider of the content, a selectable option 620a to play the content, a selectable option 622a to add the content to a playback queue, and a description 624a of the content. The description 624a of the content includes a first column including information such as the first (or, if the user has watched one or more episodes in the series already, the next) episode title, runtime, format, languages, and accessibility information and a second column including information about the cast and crew of the content.

Figure 6T:
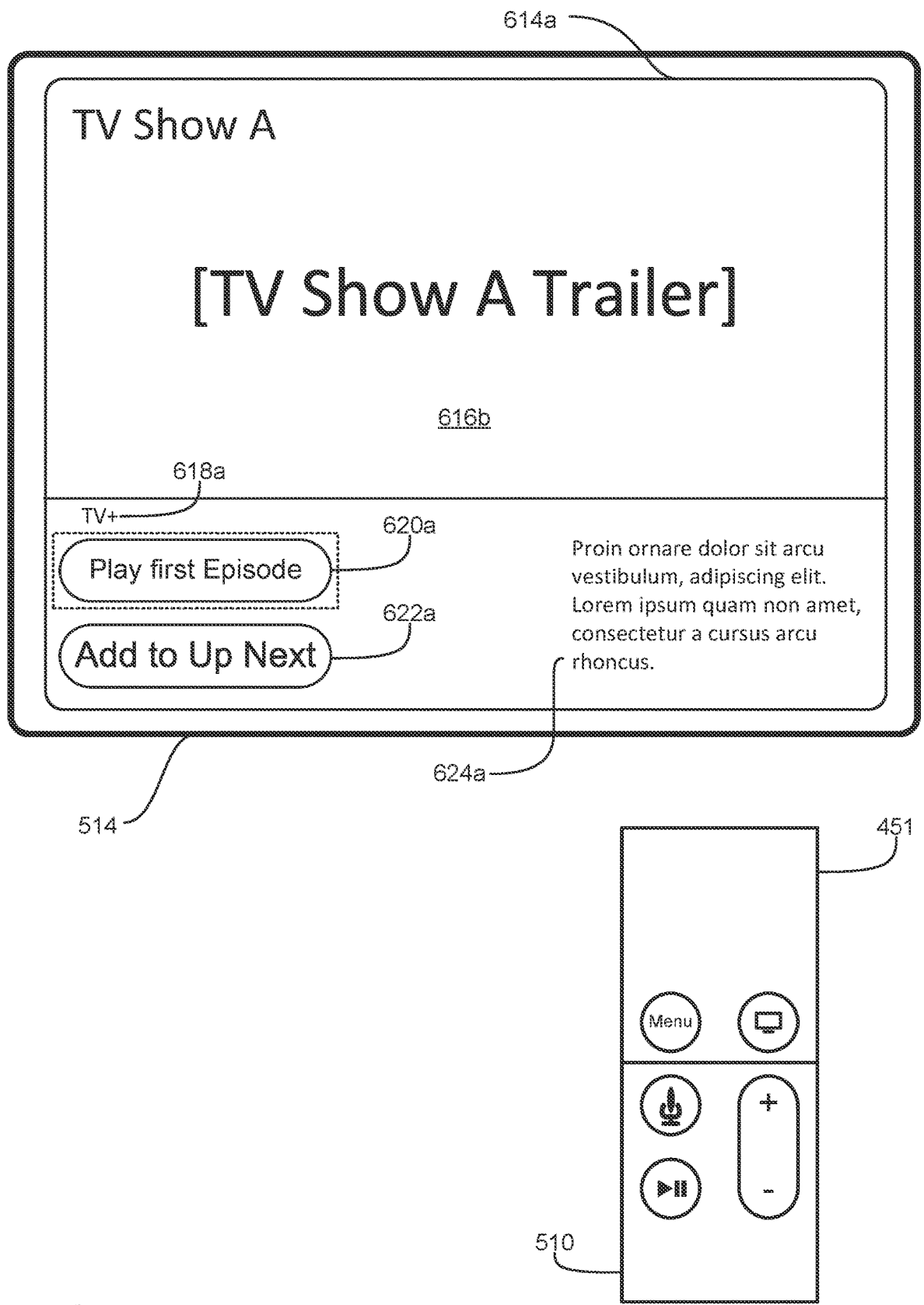

As shown in FIG. 6T, after a predetermined amount of time (e.g., 3, 5, 10 seconds) has passed since the electronic device 500 began presenting the user interface 614a, the electronic device presents a video trailer 616b of the content. If the user has viewed the content or the video trailer previously, the trailer is not presented. In some embodiments, if the content item is not yet available for playback via the content provider (e.g., the content item is "coming soon"), the electronic device 500 presents the trailer every time the user views the product page, even if the user has viewed the trailer before.

Figure 6U:
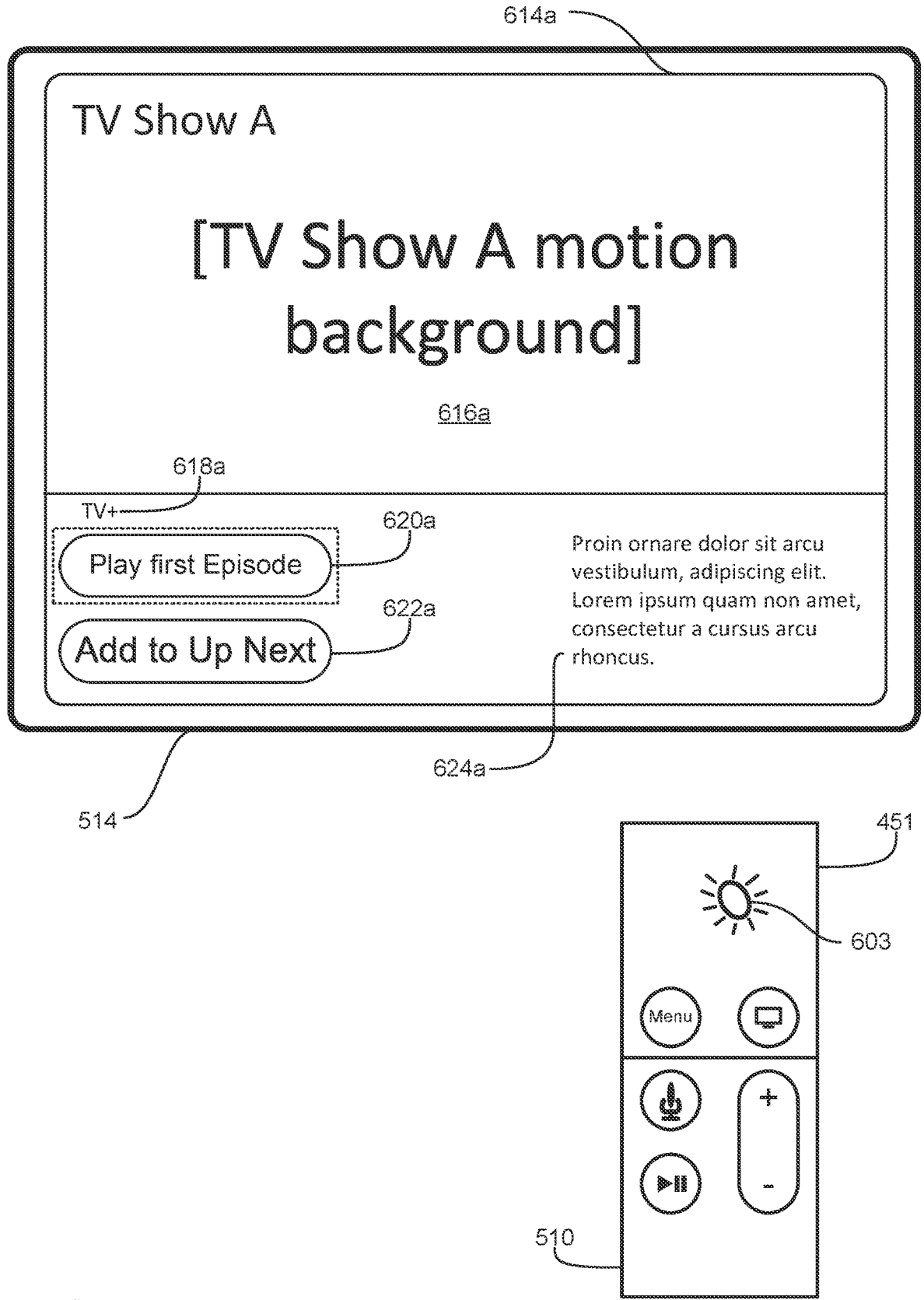
Figure 6V:
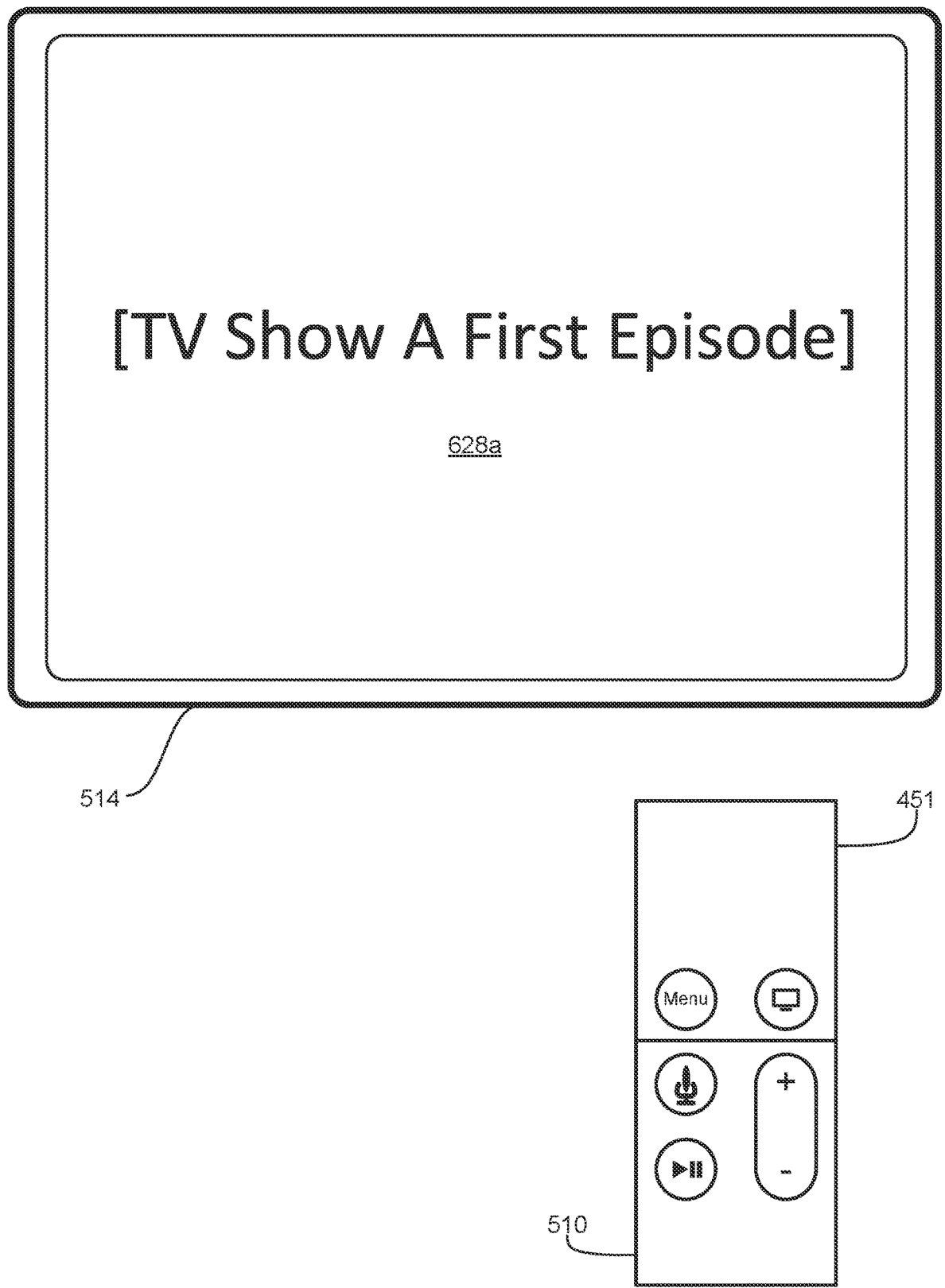

In FIG. 6U, the trailer has finished playing and the electronic device resumes presenting the motion background 616a related to the content series. In some embodiments, rather than presenting a motion background in FIG. 6S and/or 6U, the electronic device 500 instead presents a still image representing the content series. As shown in FIG. 6U, the user selects (e.g., with contact 603) the selectable option 620a to play the first episode in the series of content, as shown in FIG. 6V.

Figure 6W:
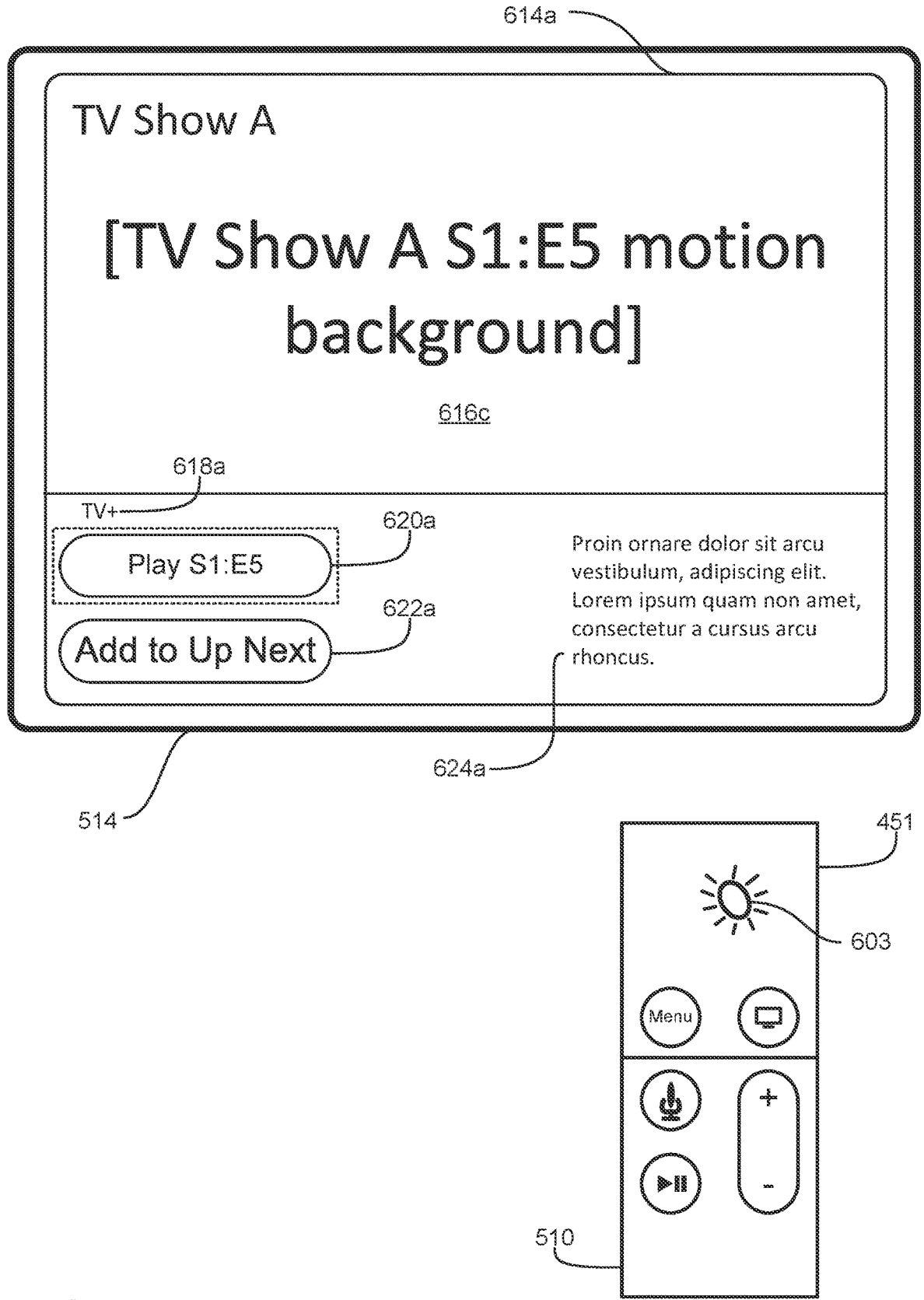

FIG. 6W illustrates the user interface 614a representing the content after the user has previously viewed a plurality of the episodes in the content. The user interface 614a includes a motion background (or still image) representing the next episode in the content (e.g., as opposed to presenting a background that represents or corresponds to the content series as a whole, such as in FIGS. 6S and 6U).

Figure 6X:
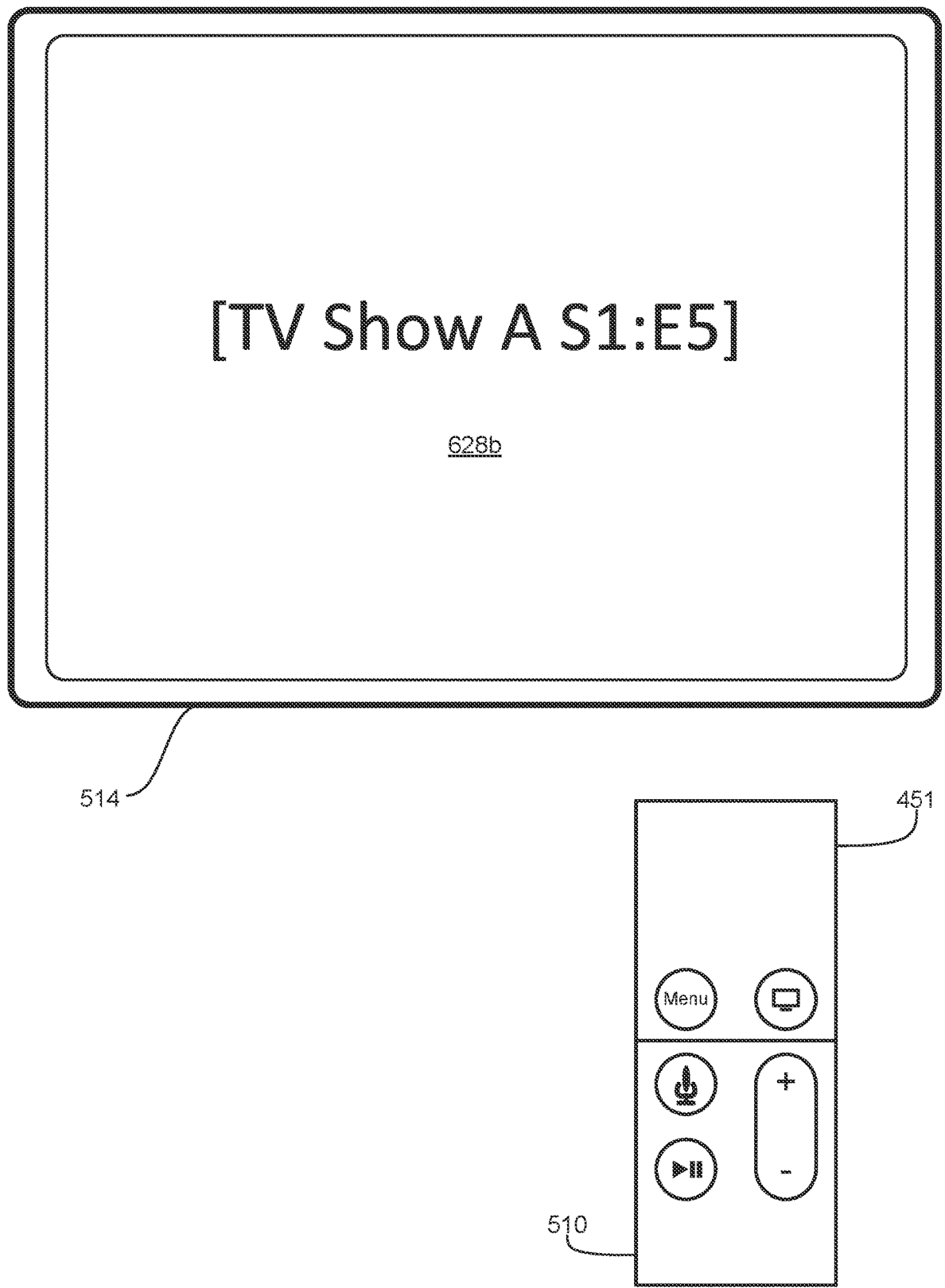

Because the user has viewed the content already, the electronic device 500 will not present the trailer as the background of representation 614a automatically. In some embodiments, however, the electronic device 500 presents a trailer of the next episode instead of the trailer for the content collection if the user has not viewed the trailer of the next episode before. Although selectable option 620a is illustrated as having text that includes the specific number of the next episode (e.g., "S1: E5"), in some embodiments, the selectable option 620a includes text along the lines of "Play Next Episode" and optionally includes a play icon in lieu of the written word "Play." As shown in FIG. 6W, the user selects (e.g., with contact 603) the representation 620a. In response to the user's selection, the electronic device 500 presents the next episode 628a of the content series, as shown in FIG. 6X.

Figure 6Y:
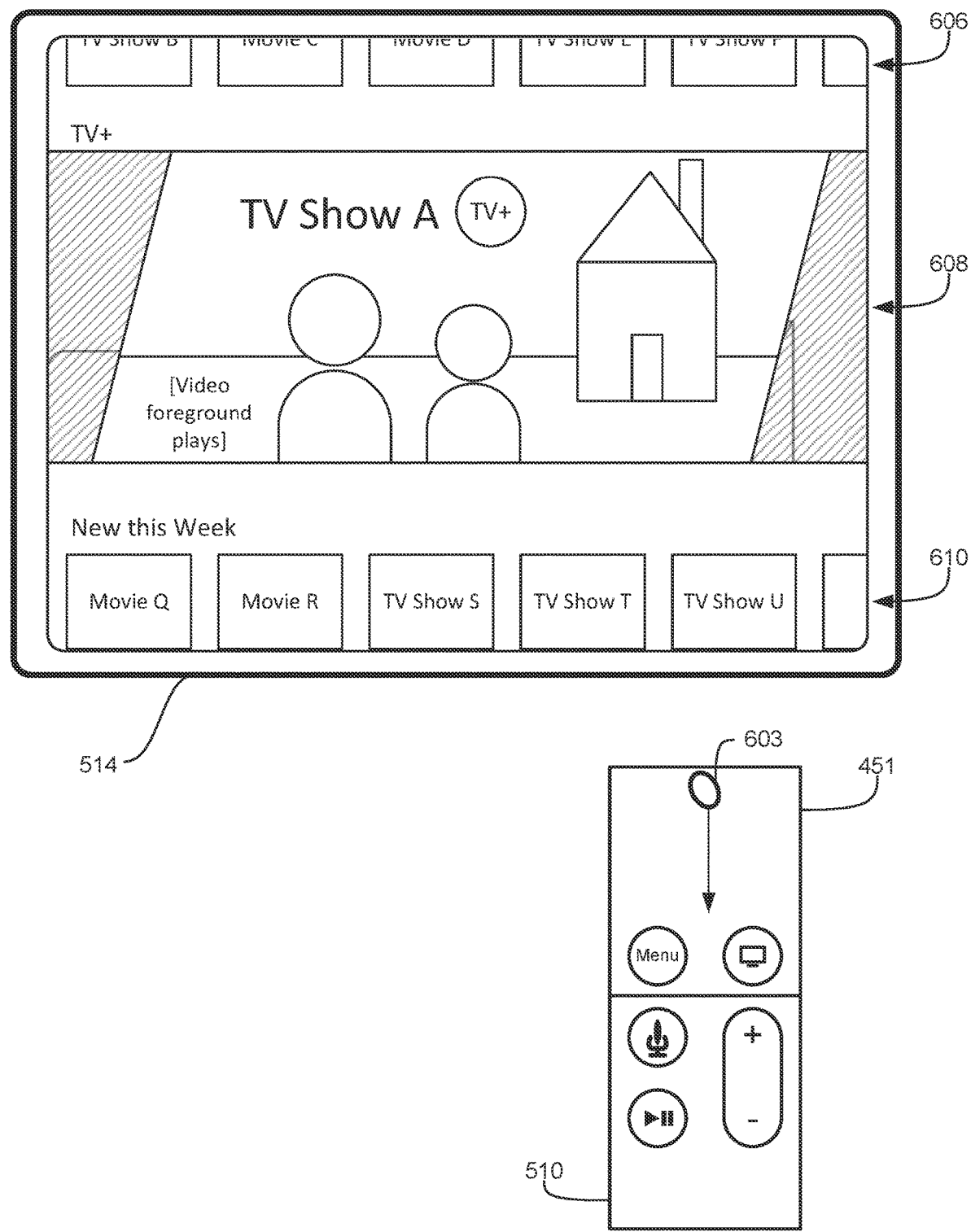

FIG. 6Y illustrates the user interface of the media browsing application that includes a plurality of rows 606-610 of representations of content. As shown in FIG. 6Y, the user scrolls down (e.g., with contact 603). In response to the user's scrolling, the electronic device 500 moves the current focus, reduces the width of representation 608a, and scrolls the user interface, as shown in FIG. 6Z.

Figure 6Z:
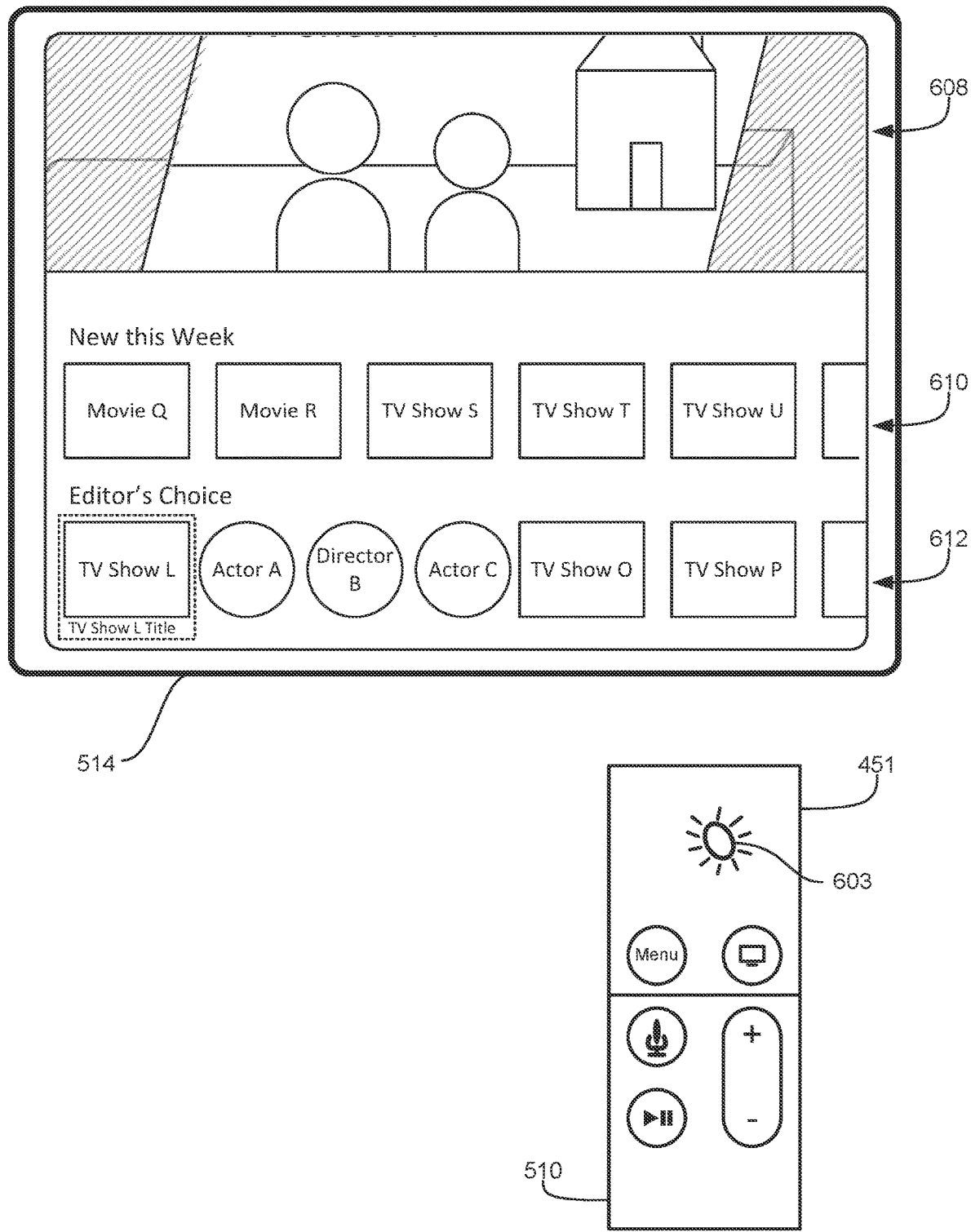
Figure 6A:
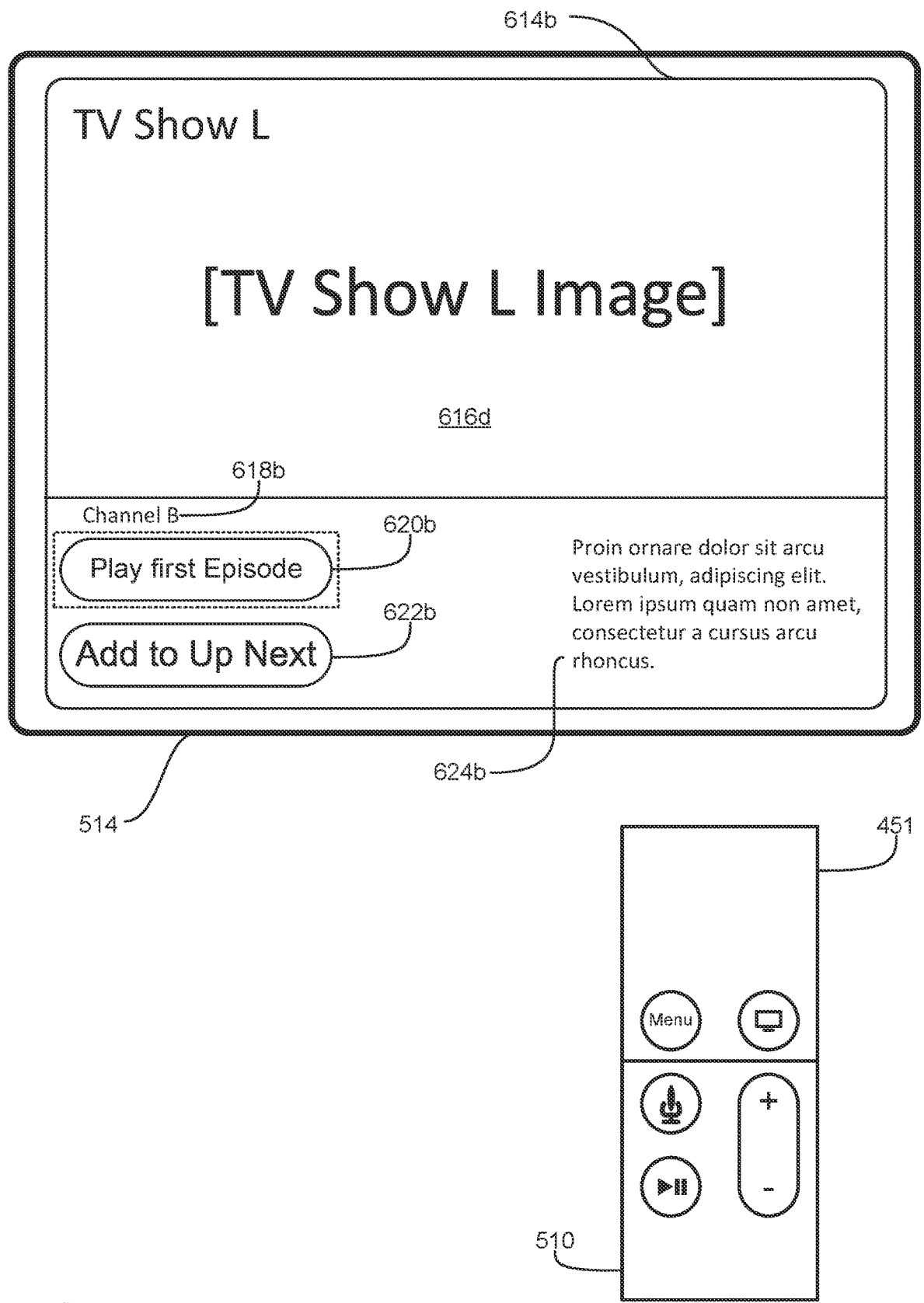
Figure 6B:
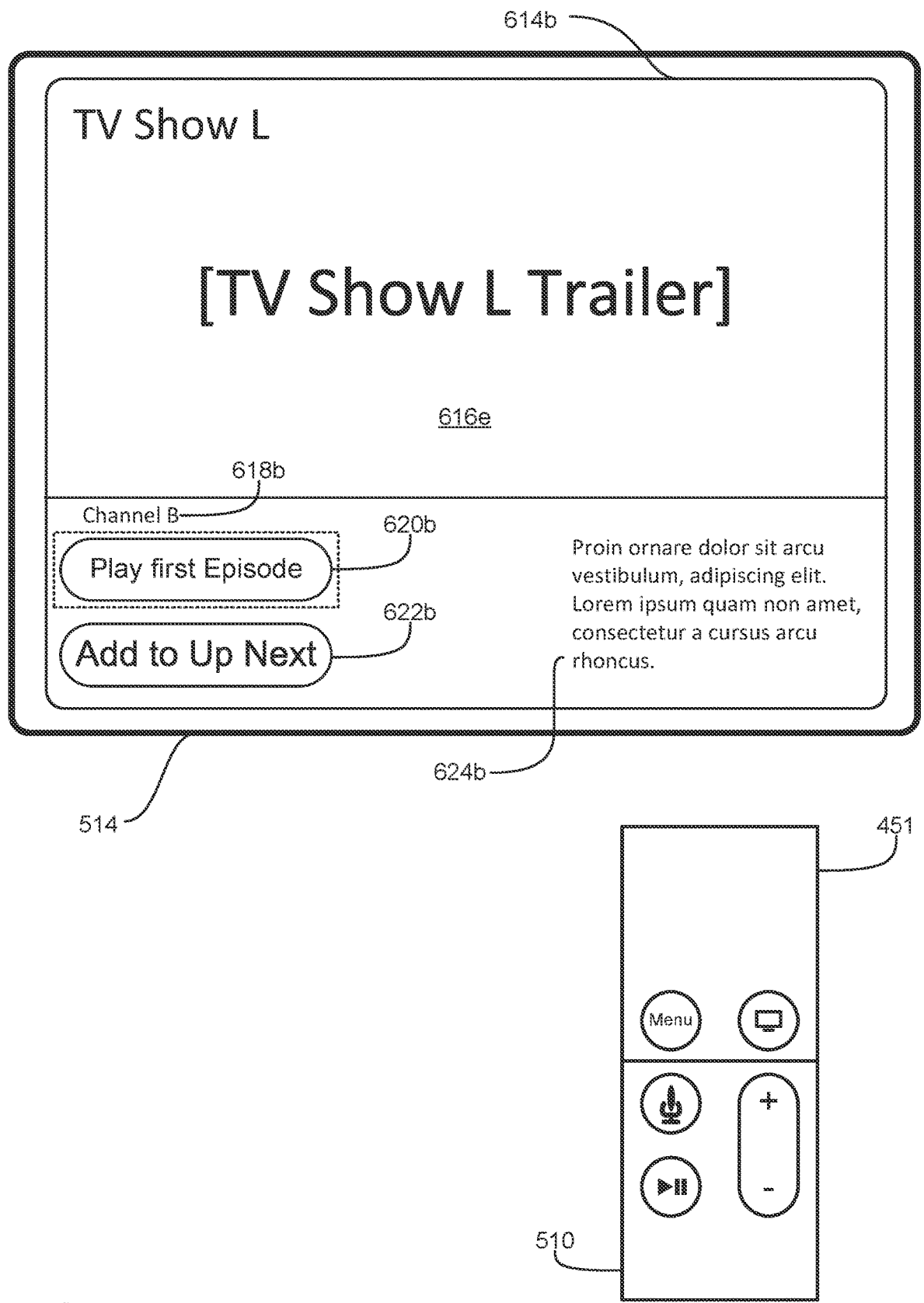
Figure 6C:
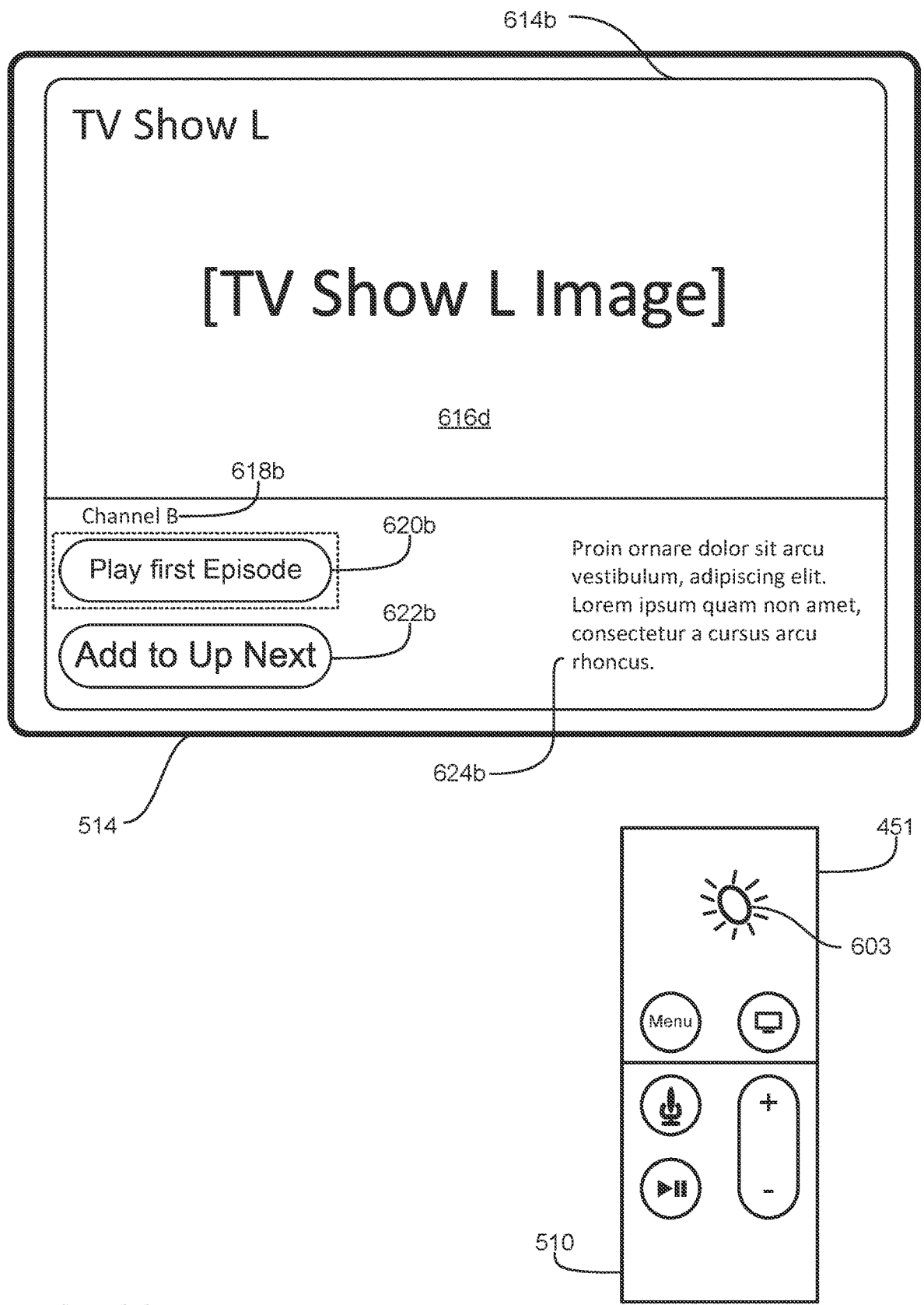
Figure 6D:
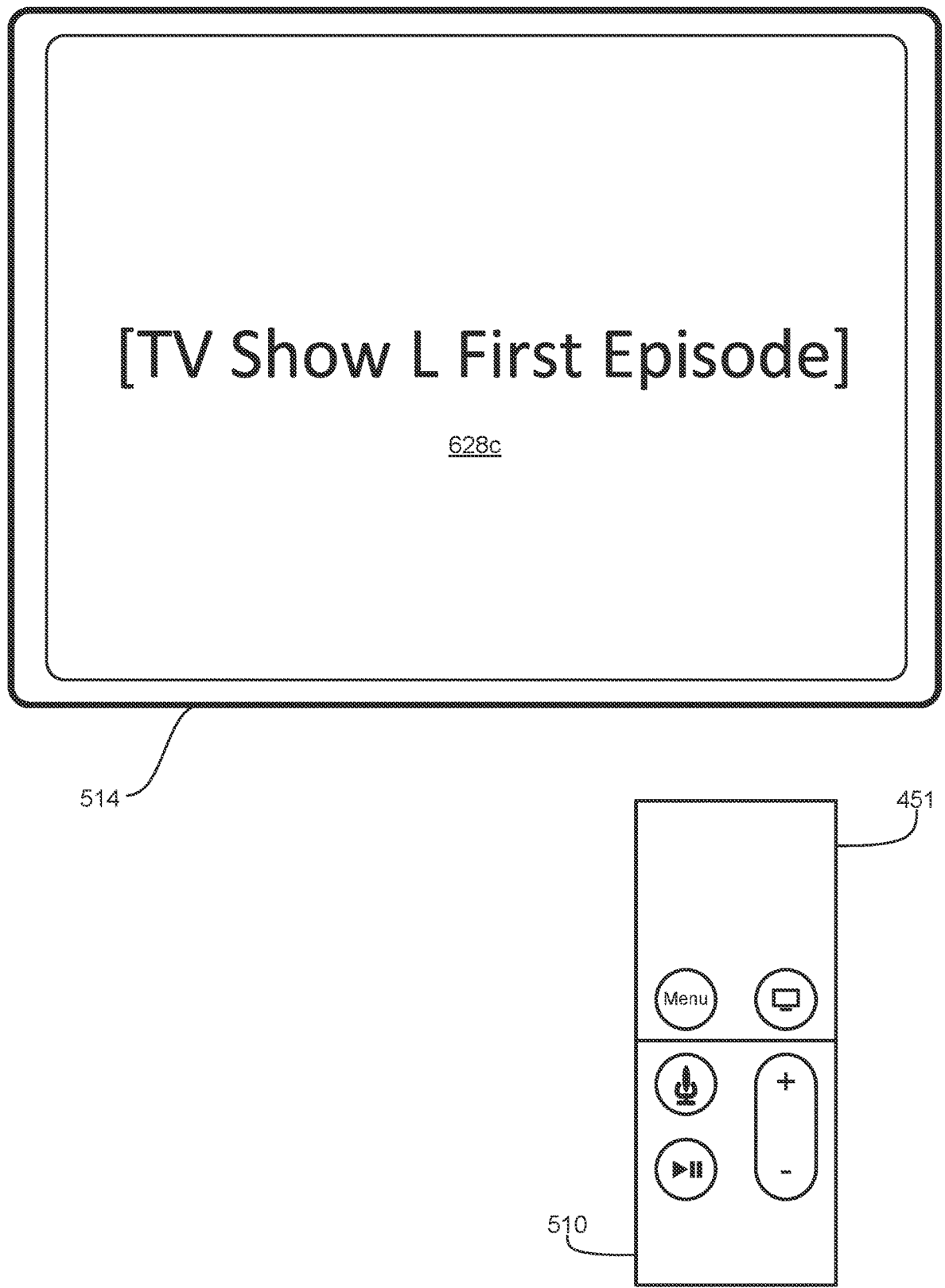
Figure 6E:
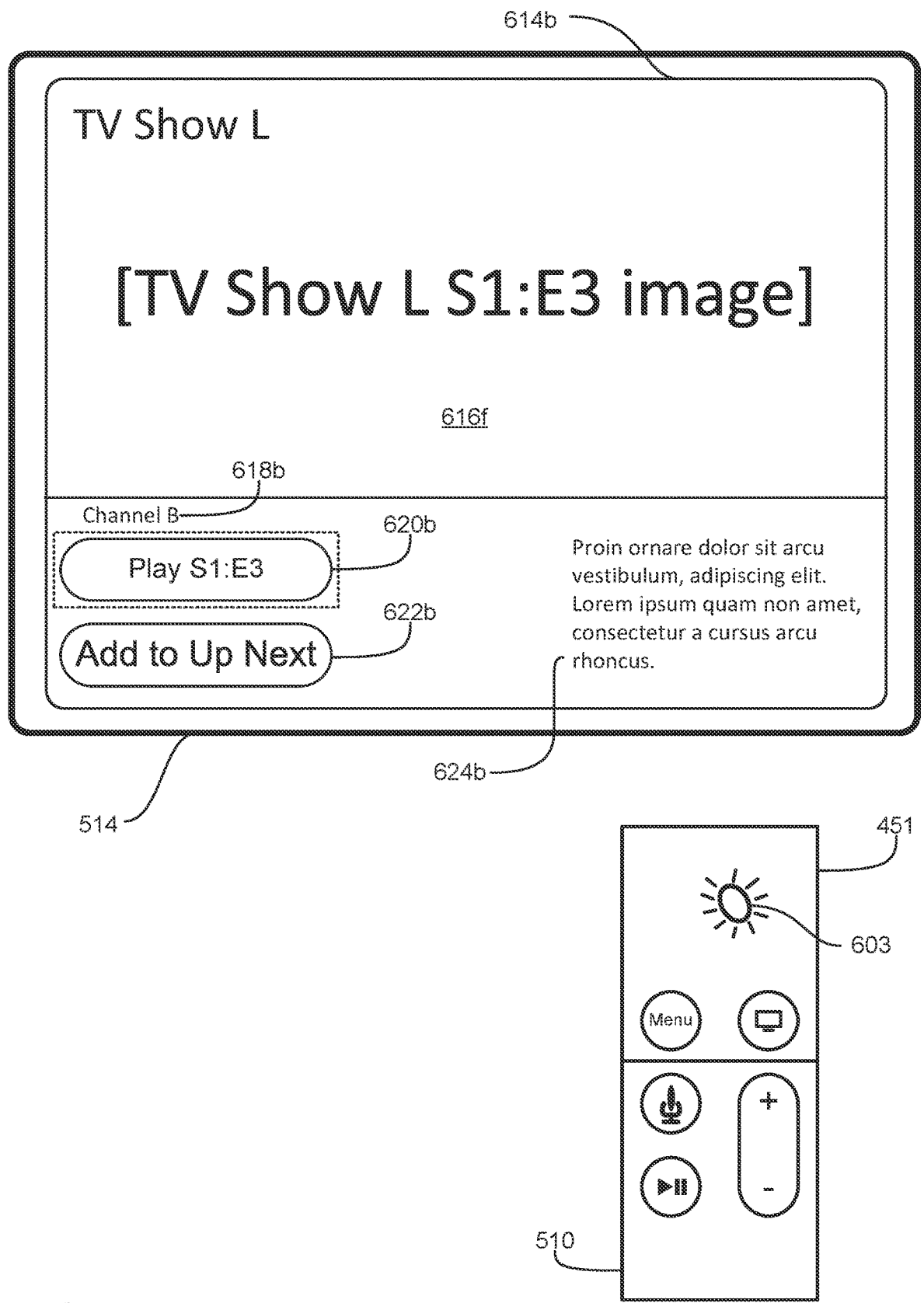
Figure 6F:
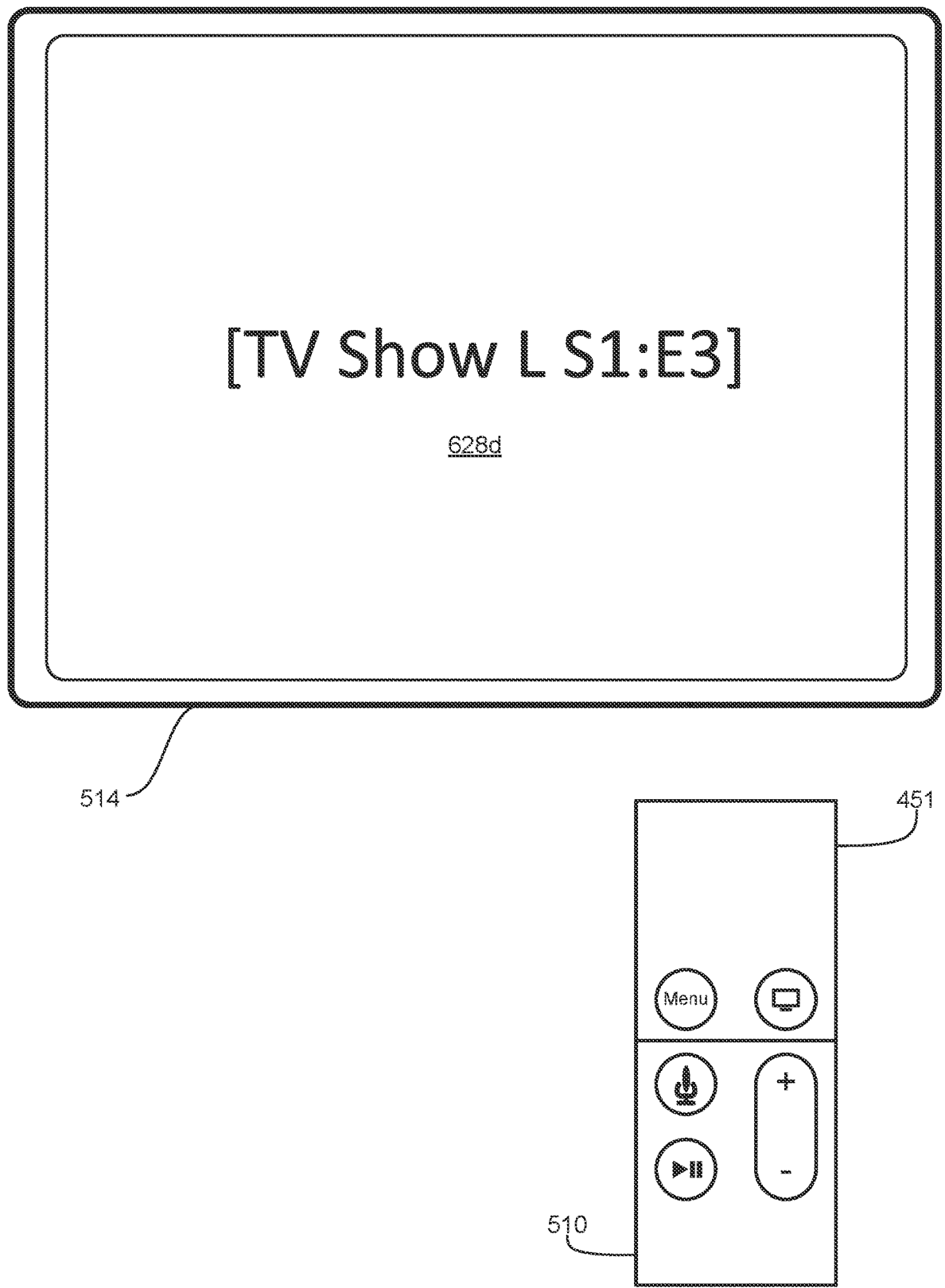
Figure 7B:
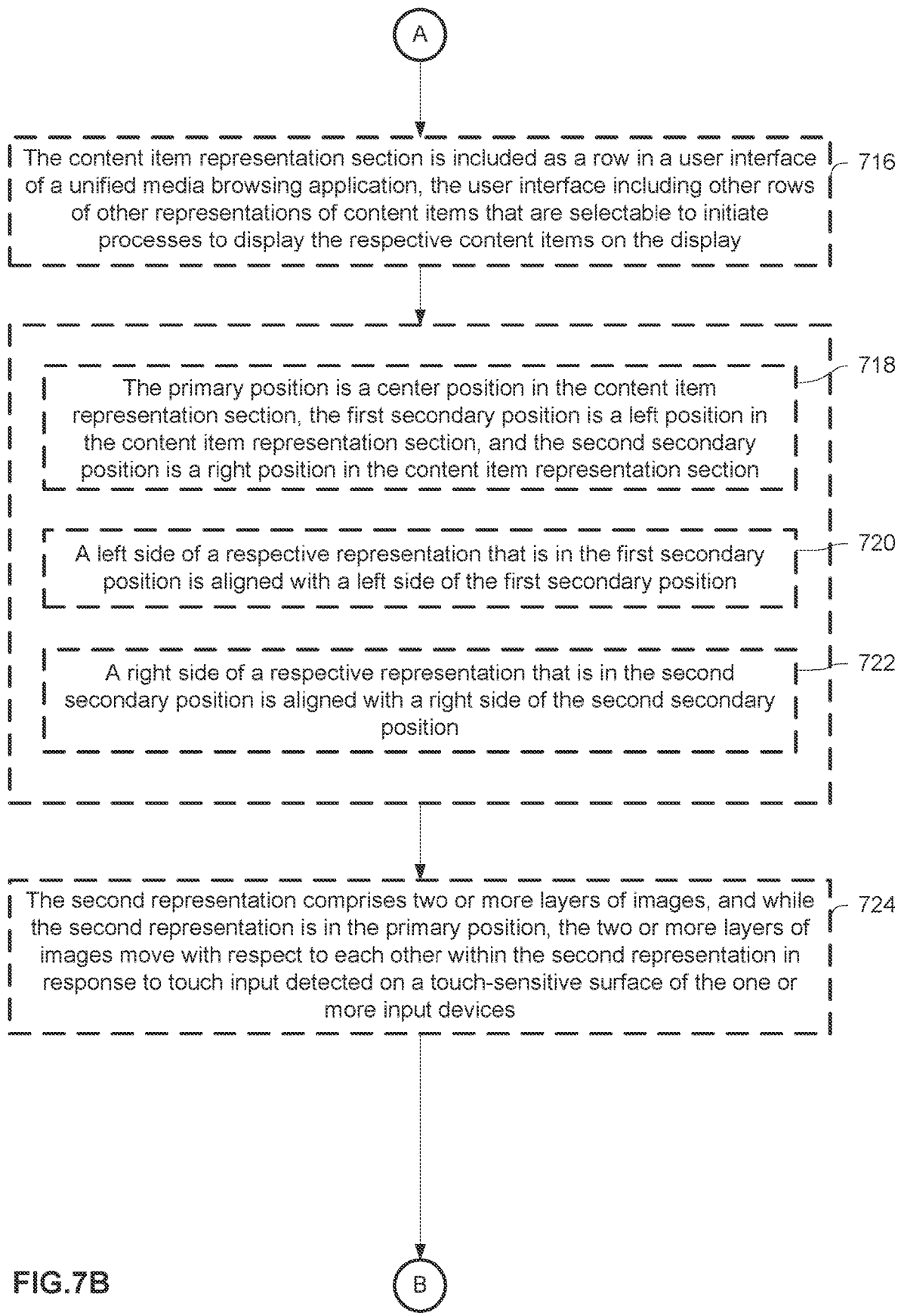
Figure 7C:
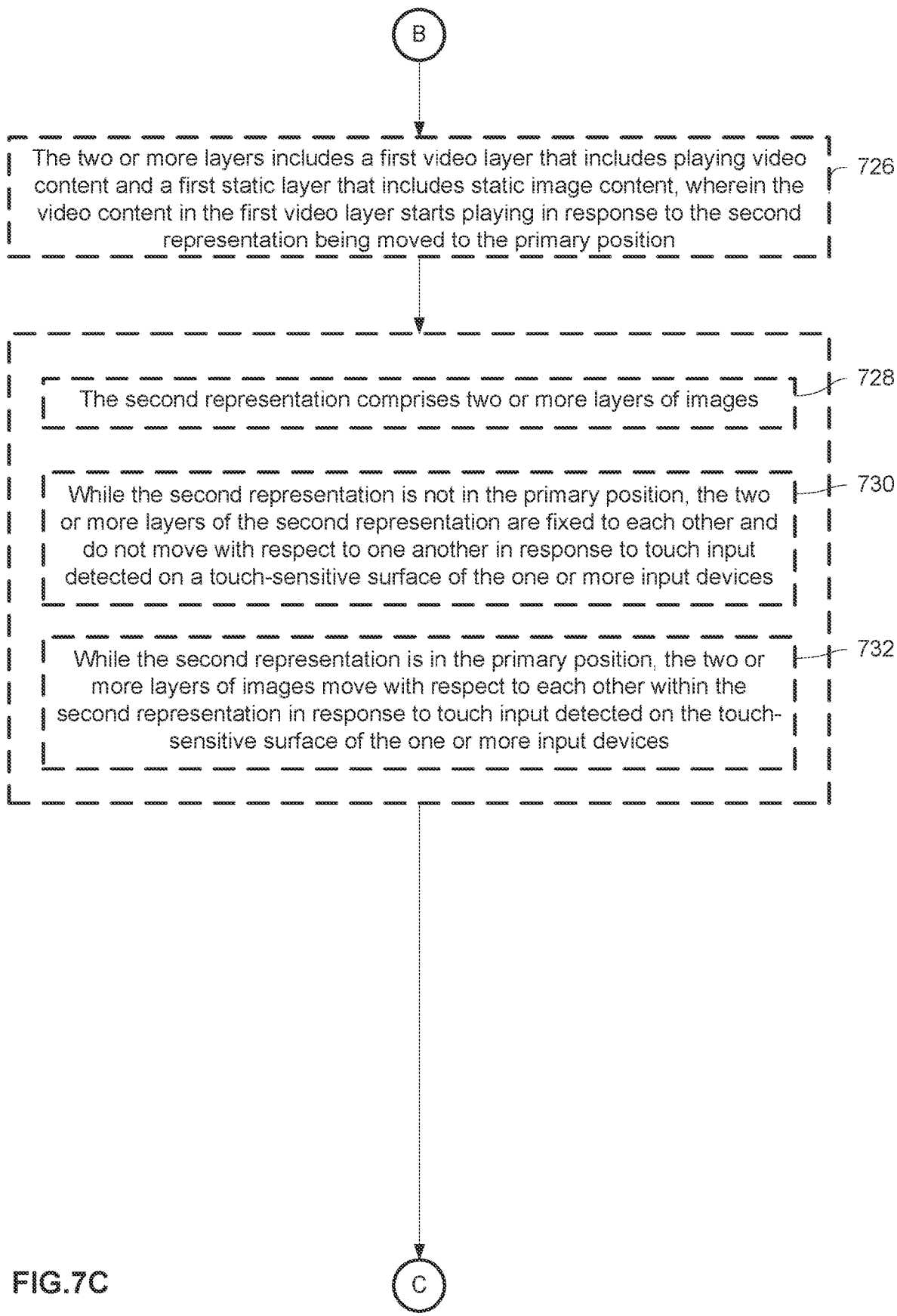
Figure 7D:
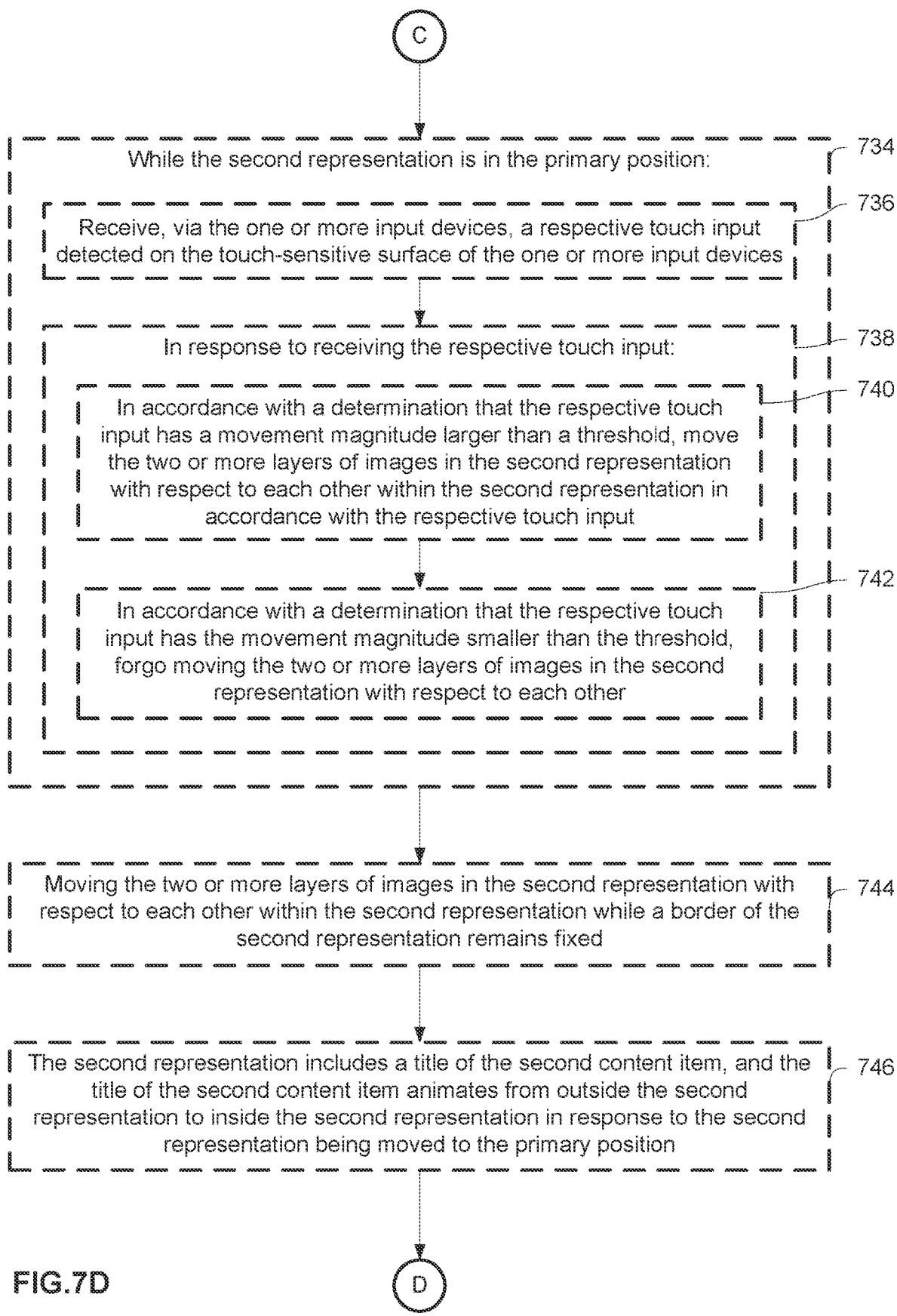
Figure 7E:
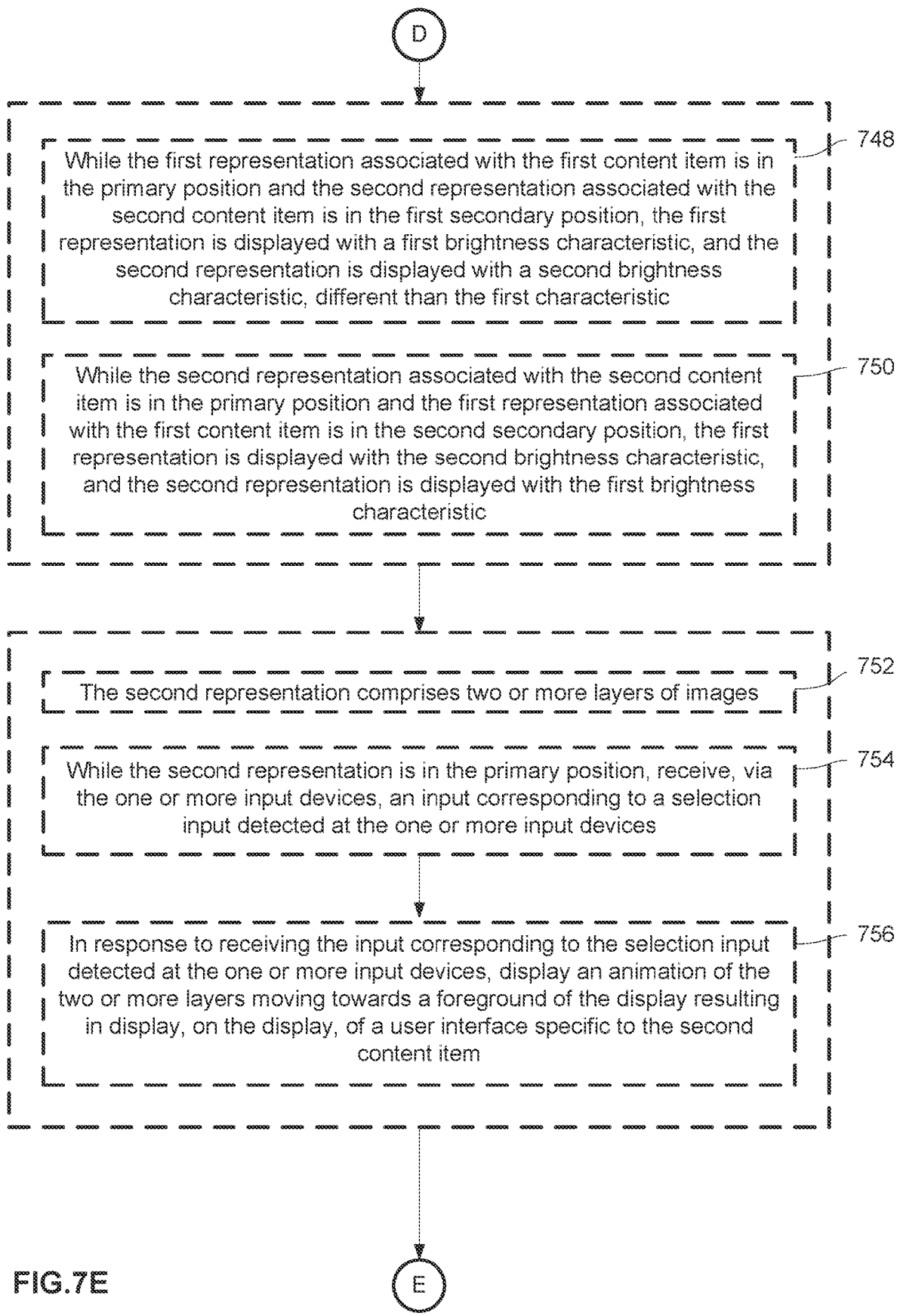
Figure 7F:
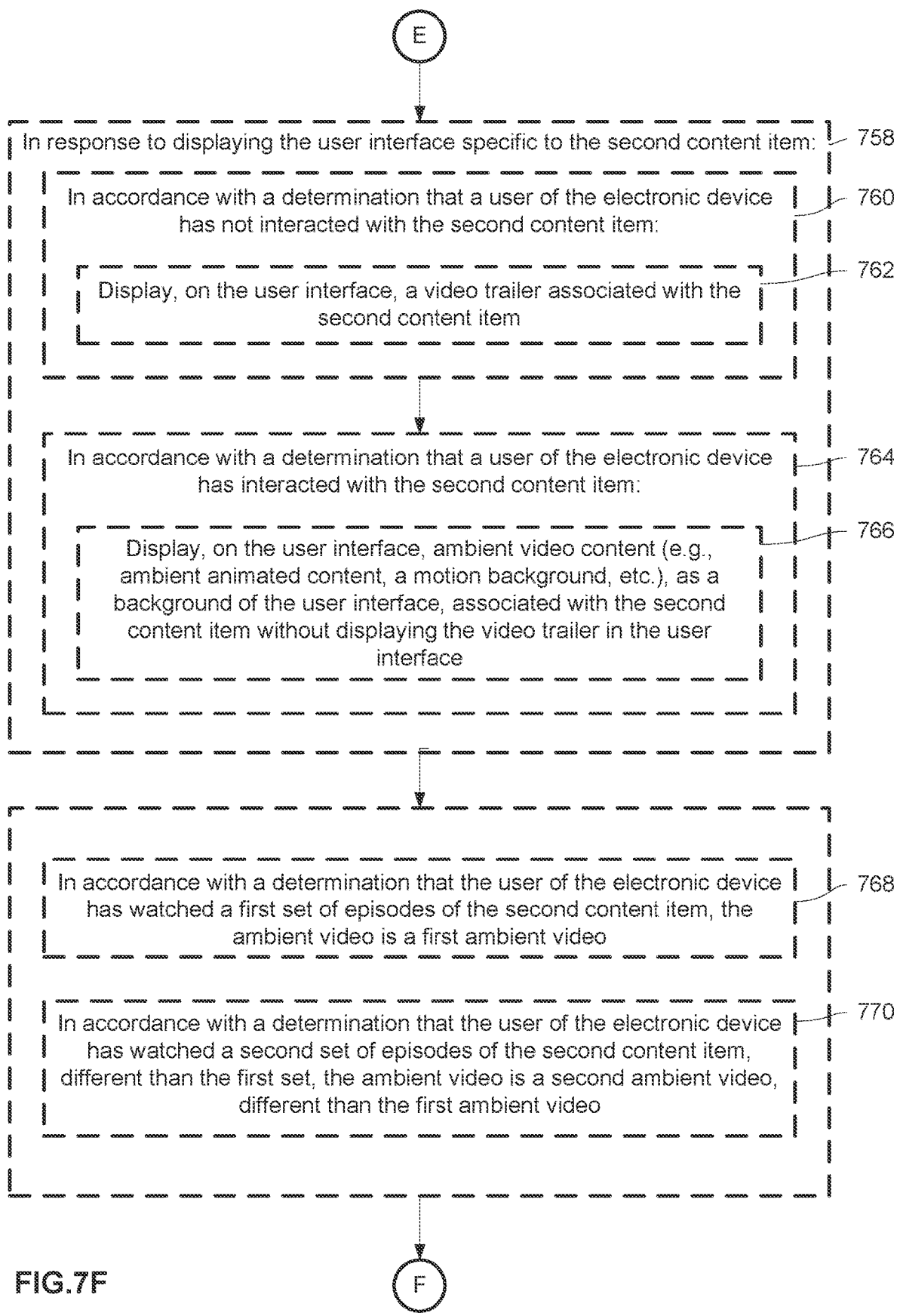
Figure 7G:
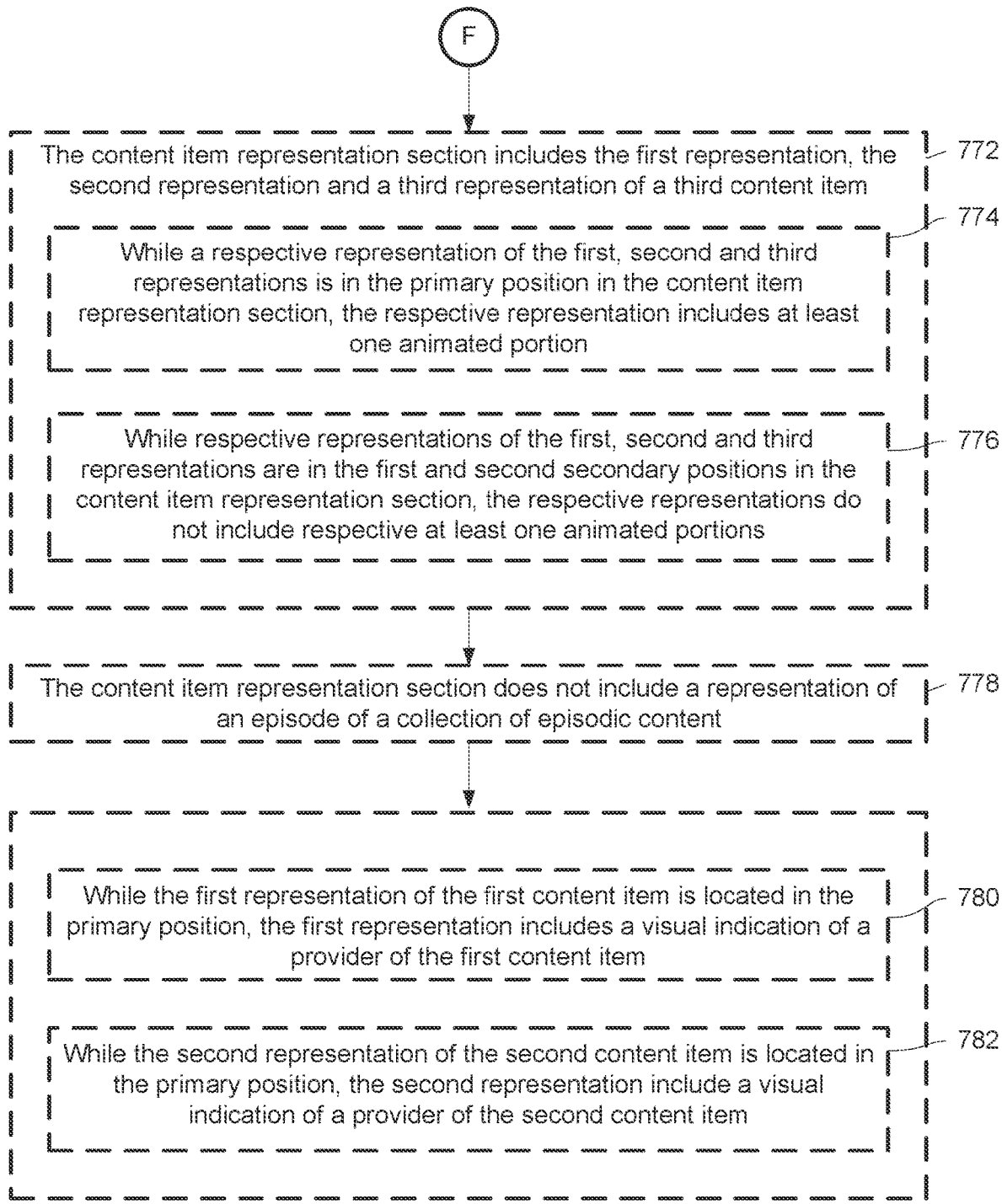

As shown in FIG. 6Z, the user selects (e.g., with contact 603) a representation of a content item presented in row 612. In response to the user's selection, the electronic device 500 presents a user interface 614b specific to the item of content, which is a series of episodic content. Because the content is provided by a different provider than the provider of the content represented by representation 608a, the representation is presented in row 612 instead of row 608. Additionally, as will be described in more detail with respect to FIG. 6AA, because the content is provided by a different provider than the provider of the content represented by representation 608a, the user interface 614b is presented with a still image 616d representing the series of content as the background instead of a motion background.

Turning now to FIG. 6AA, the user interface 614b includes similar components to the components of user interface 614a illustrated in FIG. 6S, except user interface 614b is presented with a still image 616d as a background instead of a motion background, because the content is provided by a different provider than the provider of the content represented by representation 608a.

As shown in FIG. 6BB, after a predetermined amount of time (e.g., 3, 5, 10 seconds) passes from initially displaying user interface 614b, the electronic device 500 presents a video trailer 616e of the content in the background of user interface 614b. If the user has already viewed the content or the video trailer of the content, the video trailer is not presented in the background of user interface 614b. As shown in FIG. 6CC, after the trailer finished playing, the electronic device 500 presents the image 616d representing the content series. As shown in FIG. 6CC, the user selects (e.g., with contact 603) the option 620b to play the content. In response to the user's selection, the electronic device 500 presents the first episode 628c of the content on the display 514.

FIG. 6EE illustrates the presentation of user interface 614b after the user has watched a plurality of episodes of the content series. As shown in FIG. 6EE, the user interface 614b includes a still image 616f representing the next item of content in the series as the background of the user interface (as opposed to a background image that represents or corresponds to the content series as a whole). The user selects (e.g., with contact 603) the option 620b to play the next episode in the content series. As shown in FIG. 6FF, in response to the user's selection, the electronic device 500 presents the next episode 628*d* of the content on the display 514.

FIGS. 7A-7G are flow diagrams illustrating a method of presenting representations of items of content available for playback on the electronic device 500 in accordance with some embodiments of the disclosure. The method 700 is optionally performed at an electronic device such as device 100, device 300, device 500, device 501, device 510, and device 511 as described above with reference to FIGS. 1A-1B, 2-3, 4A-4B and 5A-5C. Some operations in method 700 are, optionally combined and/or order of some operations is, optionally, changed.

As described below, the method 700 provides ways to present representations of items of content available for playback on the electronic device 500. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 6C, an electronic device (e.g., electronic device 500, a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) in communication with a display 514 and one or more input devices 510 displays (702), on the display 514, a content item representation section 608 that includes a primary position (e.g., a position in the center of a row of content representations), a first secondary position (e.g., a position to the left of the primary position), and a second secondary position (e.g., a position to the right of the primary position), wherein a first representation 608*a* associated with a first content item (e.g., text and/or an image indicative of the first content item) is located in the primary positon, a second representation 608*b* associated with a second content item (e.g., text and/or an image associated with the second content item) is located in the first secondary position, the first representation 608*a* is partially overlaid on the second representation 608*b*, and the first and second representations 608*a* and 608*b* are selectable to initiate respective actions corresponding to the respective content items. In some embodiments, the first representation is presented in its entirety and a portion of the second representation is visible to the side of the first representation to create a visual effect that the first representation is on top of the second representation. In some embodiments, in response to detecting selection of a respective representation associated with a respective content item, the electronic device presents a user interface specific to the respective content item. In some embodiments, the user interface specific to the respective content item includes information about the respective content item, such as a summary, information about how to access the respective content item, a selectable option to play the respective content item, and the like. The first content item is optionally one of a movie or TV series.

In some embodiments, such as in FIG. 6C, while displaying the content item representation section 608, the electronic device 500 receives (704), via the one or more input devices 510, an input corresponding to a request to move the first representation 608*a* to the second secondary position in the content item representation section (e.g., a directional input (e.g., a swipe or tap on a touch-sensitive surface, selection of an arrow key, a voice input, etc.) requesting to move the first representation to the right). In some embodiments, this input is a horizontal swipe detected on a touch-sensitive surface of the remote control device. In some embodiments, such as in FIG. 6F, in response to receiving the input (706), the electronic device 500 moves (708) the first representation 608*a* from the primary position to the second secondary position a first distance in a first direction. In some embodiments, the electronic device presents an animation of the first representation moving to the right of the primary position. In some embodiments, such as in FIG. 6F, the electronic device 500 moves (710) the second representation 608*b* from the first secondary position to the primary position the first distance in the first direction. In some embodiments, the electronic device presents an animation of the second representation from the left of the primary position to the primary position. In some embodiments, the first representation and the second representation move the same distance that is less than the width of the primary position.

In some embodiments, FIGS. 6D-6E, moving the first representation 608*a* from the primary position to the second secondary position, and the second representation 608*b* from the first secondary position to the primary position comprises moving a cropping boundary between first representation 608*a* and the second representation 608*b* by a second distance, greater than the first distance, in the first direction, revealing the second representation 608*b* from underneath the first representation 608*a* (712) (e.g., as more of the second representation is revealed, move of the first representation is obscured). In some embodiments, the cropping boundary moves at the same time as the first and second representations and in the same direction that the first and second representations move. For example, while the first and second representations move a distance to the right that is equal to the distance between the right edge of the primary position and the right edge of the second secondary position, the cropping boundary moves a distance to the right that is equal to the width of the primary position. In some embodiments, the cropping boundary demarcates the location/area/boundary on the display where the display of the first representation changes to the display of the second representation.

In some embodiments, such as in FIG. 6F, after moving the first representation 608*a* from the primary position to the second secondary position, and the second representation 608*b* from the first secondary position to the primary position, the second representation 608*b* is partially overlaid on the first representation 608*a* (714). In some embodiments, the second representation is presented in the primary position next to a portion of the first representation to give the appearance that the second representation is overlaid on the second representation. The electronic device optionally presents another representation of another content item in the first secondary position such that the second representation also appears to be partially overlaid on the other representation. In some embodiments, a representation that had been presented in the second secondary position before the input is received is presented in the first secondary position in response to the input.

The above-described manner of transitioning from displaying the first representation in the primary position to displaying the second representation in the primary position by moving a cropping boundary a distance greater than the distance the first and second representations move allows the electronic device to animate the transition between the first representation and the second representation to confirm to the user that the request to move the first representation to the second secondary position was received in a manner that reduces the number of display pixels that need to move to animate the transition (e.g., moving the cropping boundary further than the distance that the representations move involves moving fewer pixels of the representations than moving both the first and second representations the distance that the cropping frame boundary), which reduces power usage and improves battery life of the electronic device by simplifying the animation presented on the display.

In some embodiments, such as in FIG. 6F, the content item representation section 608 is included as a row in a user interface of a unified media browsing application, the user interface including other rows 606 and 610 of other representations of content items that are selectable to initiate processes to display the respective content items on the display (716). In some embodiments, the representations of content items are selectable to play the respective content items or present a product page user interface specific to the respective content item that includes information about the respective content item and a selectable option to play the respective content item. In some embodiments, each row of representations of content items is horizontally scrollable to reveal additional representations of content items and the user interface is vertically scrollable to reveal additional rows of representations.

The above-described manner of presenting the content item representation section as a row in a user interface of the unified media browsing application allows the electronic device to present the content item representation section among representations of other content items, which simplifies the interaction between the user and the electronic device and enhances the operability of the electronic device and makes the user-device interface more efficient (e.g., by reducing the number of inputs needed to navigate between a user interface that includes the content item representation and the other rows of other representations of content), which additionally reduces power usage and improves battery life of the electronic device by enabling the user to use the electronic device more quickly and efficiency.

In some embodiments, such as in FIG. 6F, the primary position (e.g., the location of representation 608b in FIG. 6F) is a center position in the content item representation section, the first secondary position (e.g., the location of representation 608c in FIG. 6F) is a left position in the content item representation section, and the second secondary position (e.g., the location of representation 608a in FIG. 6F) is a right position in the content item representation section (718). The content item representation in the primary position is optionally presented in full and the content item representations in the first secondary position and the second secondary position are optionally presented in part on either side of the content item representation in the primary position. In some embodiments, such as in FIG. 6F, a left side of a respective representation 608c that is in the first secondary position is aligned with a left side of the first secondary position (720). In some embodiments, the left side of the respective representation that is in the first secondary position is visible to the left of the respective representation that is in the primary position. In some embodiments, such as in FIG. 6F, a right side of a respective representation 608a that is in the second secondary position is aligned with a right side of the second secondary position (722). In some embodiments, the left side of the respective representation that is in the first secondary position is visible to the left of the respective representation that is in the primary position. For example, left-aligning the representation on the left and right-aligning the representation on the right enable the electronic device to scroll the content item representation section by moving the cropping frame between the representation that is moving out of the primary position and the representation that is moving into the primary position.

The above-described manner of left-aligning the representation on the left and right-aligning the representation on the right allows the electronic device to scroll the representations by moving a cropping frame between respective representations of content items, which makes the electronic device more efficient (e.g., by reducing the number of pixels that move during the animation of the transition), which additionally reduces power usage and improves battery life of the electronic device.

In some embodiments, such as in FIG. 6G, the second representation 608b comprises two or more layers of images, and while the second representation 608b is in the primary position, the two or more layers of images move with respect to each other (e.g., move differently than one another) within the second representation 608b in response to touch input detected on a touch-sensitive surface of the one or more input devices 510, as shown in FIGS. 6I-6J (724). In some embodiments, the image layers move to create a parallax effect. For example, one or more image layers towards the front of the image stackup move a greater distance in response to the movement of the contact on the touch-sensitive surface than the distance that one or more image layers towards the back of the stackup move in response to the input. The electronic device optionally compares the detected movement of the contact to one or more sets of movement criteria to determine whether the input satisfies a navigational input that moves the current focus within the content item representation section or to another section of the user interface or if the movement satisfies image-movement criteria that moves the two or more layers of images with respect to each other without moving the current focus of the electronic device.

The above-described manner of moving the two or more layers of images with respect to one another in response to touch input allows the electronic device to indicate to the user that the touch input is being detected while presenting the representations of content items, which simplifies the interaction between the user and the electronic device and enhances the operability of the electronic device and makes the user-device interface more efficient (e.g., by confirming that the input device is responsive without requiring the user to enter a navigational input), which additionally reduces power usage and improves battery life of the electronic device by enabling the user to use the electronic device more quickly and efficiency.

In some embodiments, such as in FIG. 6G, the two or more layers includes a first video layer that includes playing video content (e.g., an animated layer that included animated content) and a first static layer that includes static image content, wherein the video content in the first video layer starts playing in response to the second representation 608b being moved to the primary position (726). In some embodiments, until the second representation is moved to the primary position, the representation is presented as a single-layer image that optionally includes a paused frame of the video content. After moving the second representation into the primary position, the electronic device optionally presents the second representation as a multi-layer image that includes the video content in one of the layers of the image.

The above-described manner of not playing the video layer until the second representation is moved to the primary position allows the electronic device to conserve computing resources until the second representation is moved to the primary position, which reduces power usage and improves battery life of the electronic device.

In some embodiments, such as in FIG. 6G, the second representation 608b comprises two or more layers of images (728). In some embodiments, such as in FIG. 6C, while the second representation 608b, is not in the primary position, the two or more layers of the second representation are fixed to each other and do not move with respect to one another in response to touch input detected on a touch-sensitive surface of the one or more input devices (730). In some embodiments, the second representation is presented as a single-layer image until it moves to the primary position. In some embodiments, such as in FIG. 6J, while the second representation 608b is in the primary position, the two or more layers of images move with respect to each other (e.g., move differently than one another) within the second representation 608b in response to touch input 603 detected on the touch-sensitive surface of the one or more input devices 510 (732). In some embodiments, the image layers move to create a parallax effect. For example, one or more image layers towards the front of the image stackup move a greater distance in response to the movement of the contact on the touch-sensitive surface than the distance that one or more image layers towards the back of the stackup move in response to the input. The electronic device optionally compares the detected movement of the contact to one or more sets of movement criteria to determine whether the input satisfies a navigational input that moves the current focus within the content item representation section or to another section of the user interface or if the movement satisfies image-movement criteria that moves the two or more layers of images with respect to each other without moving the current focus of the electronic device.

The above-described manner of presenting the second representation as a fixed image until the second representation is in the primary position allows the electronic device to conserve computing resources while the second representation is in a secondary position which reduces power usage and improves battery life of the electronic device by enabling the user to use the electronic device more quickly and efficiency.

In some embodiments, such as in FIGS. 6J-6K, while the second representation 608b is in the primary position (734), the electronic device 500 receives (736), via the one or more input devices, a respective touch input 603 detected on the touch-sensitive surface of the one or more input devices 510 (e.g., presence or movement of a touch on the touch-sensitive surface). In some embodiments, such as in FIGS. 6J-6K, in response to receiving the respective touch input 603 (738), in accordance with a determination that the respective touch input 603 has a movement magnitude larger than a threshold, the electronic device 500 moves (740) the two or more layers of images in the second representation 608b with respect to each other (e.g., move differently than one another) within the second representation 608b in accordance with the respective touch input 603. The electronic device optionally compares the detected movement of the contact to one or more sets of movement criteria to determine whether the input satisfies a navigational input that moves the current focus within the content item representation section or to another section of the user interface or if the movement satisfies image-movement criteria that moves the two or more layers of images with respect to each other without moving the current focus of the electronic device. In some embodiments, in accordance with a determination that the respective touch input has the movement magnitude smaller than the threshold, the electronic device forgoes (742) moving the two or more layers of images in the second representation with respect to each other, such as presenting the user interface illustrated in FIG. 6I in response to a touch input that does not include movement of the contact 603 or includes movement of a contact 603 that is a smaller movement than a threshold amount of movement. For example, when the touch input is stationary or substantially stationary, the two or more layers of images do not move in accordance with the touch input.

The above-described manner of moving the two or more layers of images in response to movement larger than a threshold and forgoing moving the two or more layers of images in response to movement smaller than the threshold allows the electronic device to move the images in response to intentional user input which indicates to the user that touch input is being detected, which simplifies the interaction between the user and the electronic device and enhances the operability of the electronic device and makes the user-device interface more efficient (e.g., by confirming to the user that the electronic device is responsive to touch input without requiring the user to enter a navigational input), which additionally reduces power usage and improves battery life of the electronic device by enabling the user to use the electronic device more quickly and efficiency.

In some embodiments, such as in FIGS. 6J-6K, moving the two or more layers of images in the second representation 608b with respect to each other (e.g., move differently than one another) within the second representation 608b comprises moving the two or more layers of images in the second representation 608b with respect to each other (e.g., move differently than one another) within the second representation 608b while a border of the second representation 608b remains fixed (744). In some embodiments, the second representation occupies the same footprint in the user interface even when the two or more image layers move. For example, the border region acts as a cropping window around the two or more image layers.

The above-described manner of presenting the second representation with a fixed border region allows the electronic device to conserve display area for other content and information, which simplifies the interaction between the user and the electronic device and enhances the operability of the electronic device and makes the user-device interface more efficient (e.g., by presenting the user with more information that is visible without scrolling the user interface), which additionally reduces power usage and improves battery life of the electronic device by enabling the user to use the electronic device more quickly and efficiency.

In some embodiments, such as in FIGS. 6G-6I the second representation 608b includes a title of the second content item, and the title of the second content item animates from outside the second representation 608b to inside the second representation 608b in response to the second representation 608b being moved to the primary position (746). For example, while the second representation is in the primary position, the electronic device presents an animation of the title of the content moving from outside of the representation to inside the representation. In some embodiments, the title is only visible within the boundary of the second representation as the title animates to the second representation.

The above-described manner of animating movement of the title into the second representation when the second representation is presented in the primary position allows the electronic device to forgo presenting the title in the second representation while the second representation is in one of the secondary positions in the content representation area of the display, which simplifies the interaction between the user and the electronic device and enhances the operability of the electronic device and makes the user-device interface more efficient (e.g., by not presenting the title until there is enough space within the second representation to present the title in full, which enables the title to be clearly read by the user), which additionally reduces power usage and improves battery life of the electronic device by enabling the user to use the electronic device more quickly and efficiency.

In some embodiments, such as in FIG. 6C, while the first representation 608a associated with the first content item is in the primary position and the second representation 608b associated with the second content item is in the first secondary position, the first representation 608a is displayed with a first brightness characteristic, and the second representation 608b is displayed with a second brightness characteristic, different than the first characteristic (748). In some embodiments, the first representation is presented in full color. In some embodiments, the second representation is presented with a greyed out or darkened appearance. The third representation is optionally also presented with the second brightness characteristic while the third representation is presented in the second secondary position. In some embodiments, such as in FIG. 6F, while the second representation 608b associated with the second content item is in the primary position and the first representation 608a associated with the first content item is in the second secondary position, the first representation 608a is displayed with the second brightness characteristic, and the second representation 608b is displayed with the first brightness characteristic (750). In some embodiments, whichever representation is in the primary position is presented with the first brightness characteristic (e.g., full color) and the representations in the first and second secondary positions are presented with the second brightness characteristic (e.g., darkened, greyed out, etc).

The above-described manner of presenting the representation in the primary position with the first brightness characteristic and the representations in the secondary positions with the second brightness characteristic allows the electronic device to improve the readability and visibility of the representation that has the current focus, which simplifies the interaction between the user and the electronic device and enhances the operability of the electronic device and makes the user-device interface more efficient (e.g., by reducing the amount of time it takes the user to comprehend the representation in the primary position), which additionally reduces power usage and improves battery life of the electronic device by enabling the user to use the electronic device more quickly and efficiency.

In some embodiments, such as in FIG. 6N, the second representation 608a comprises two or more layers of images (752). In some embodiments, such as in FIG. 6N, while the second representation 608a is in the primary position, the electronic device 500 receives (754), via the one or more input devices 510, an input corresponding to a selection input detected at the one or more input devices (e.g., an input selecting the second representation). In some embodiments, such as in FIGS. 6O-6S, in response to receiving the input corresponding to the selection input detected at the one or more input devices 510, the electronic device 500 displays (756) an animation of the two or more layers moving towards a foreground of the display resulting in display, on the display, of a user interface 614a specific to the second content item. In some embodiments, the image layers of the second representation get larger to appear to be moving towards the user. In some embodiments, as the layers of the second representation increase in size, the electronic device fades or greys out the appearance of the second representation and the user interface specific to the second content item fades in. The user interface specific to the second content item is optionally a product page use interface that includes information about the item of content and a selectable option to play the content.

The above-described manner of displaying an animation of the two or more layers moving towards the foreground of the display resulting in the display of the user interface specific to the second content item allows the electronic device to visually confirm that the input selecting the second representation, which simplifies the interaction between the user and the electronic device and enhances the operability of the electronic device and makes the user-device interface more efficient (e.g., by providing confirmation to the user without requiring further input from the user), which additionally reduces power usage and improves battery life of the electronic device by enabling the user to use the electronic device more quickly and efficiency.

In some embodiments, such as in FIG. 6T, in response to displaying the user interface 614a specific to the second content item (758), in accordance with a determination that a user of the electronic device 500 has not interacted with the second content item (760) (e.g., played the second content item, viewed a video trailer of the second content item, etc.), the electronic device 500 displays (762), on the user interface 614a, a video trailer 616b associated with the second content item. In some embodiments, when the user interface is first displayed, the user interface is presented with a still or motion background (e.g., ambient video) that represents the item of content and, after a predetermined duration of time (e.g., 3, 5, or 10 seconds), the electronic device ceases displaying the motion background and presents the video trailer. After the video trailer is complete, the electronic device optionally presents the still image or motion background (e.g., ambient video) in the user interface. In some embodiments, such as in FIG. 6W, in accordance with a determination that a user of the electronic device 500 has interacted with the second content item (764) (e.g., watched the content or the video trailer of the content), the electronic device 500 displays (766), on the user interface 614a, ambient video content 616c (e.g., ambient animated content, a motion background, etc.), as a background of the user interface 614a, associated with the second content item without displaying the video trailer in the user interface (e.g., information and/or the selectable option to play the content is overlaid on the ambient video content).

The above-described manner of presenting the trailer if the user has not interacted with the content and forgoing presenting the trailer if the user has interacted with the content allows the electronic device to conserve resources when the user has already interacted with the content, which reduces power usage and improves battery life of the electronic device by enabling the user to use the electronic device more quickly and efficiency.

In some embodiments, such as in FIG. 6S, in accordance with a determination that the user of the electronic device 500 has watched a first set of episodes of the second content item, the ambient video is a first ambient video 616a (768). In some embodiments, the second content item is a series of episodic content, such as a television show. In some embodiments, the ambient video is an ambient video associated with the next episode after the first set of episodes of the second content item. In some embodiments, such as in FIG. 6W, in accordance with a determination that the user of the electronic device 500 has watched a second set of episodes of the second content item, different than the first set, the ambient video is a second ambient video 616c, different than the first ambient video 616a (770). In some embodiments, the ambient video is an ambient video associated with the next episode after the second set of episodes.

The above-described manner of presenting ambient video based on which set of episodes of the second content time the user has watched allows the electronic device to indicate to the user that the next episode will play in response to selection of a selectable option for playing the content, which simplifies the interaction between the user and the electronic device and enhances the operability of the electronic device and makes the user-device interface more efficient (e.g., by reducing the number of inputs needed to verify that the content will play from the next episode in the series), which additionally reduces power usage and improves battery life of the electronic device by enabling the user to use the electronic device more quickly and efficiency.

In some embodiments, such as in FIG. 6C, the content item representation section 608 includes the first representation 608a, the second representation 608b and a third representation 608c of a third content item (772). In some embodiments, such as in FIG. 6C, while a respective representation 608a of the first, second and third representations is in the primary position in the content item representation section 608, the respective representation 608a includes at least one animated portion (774). In some embodiments, the image stackup of the respective representation includes one or more video layers that continuously plays while the respective representation is presented in the primary position. In some embodiments, such as in FIG. 6C, while respective representations 608b and 608c of the first, second and third representations are in the first and second secondary positions in the content item representation section, the respective representations 608b and 608c do not include respective at least one animated portions (776). In some embodiments, the video layers of the representations in the second and third secondary positions are not presented or are paused while the representations are in the second and third secondary positions.

The above-described manner of forgoing presenting the animated portions of the representations in the second and third secondary positions allows the electronic device to conserve computing resources, which reduces power usage and improves battery life of the electronic device by enabling the user to use the electronic device more quickly and efficiency.

In some embodiments, such as in FIG. 6C the content item representation section 608 does not include a representation of an episode of a collection of episodic content (778). In some embodiments, the content item representations that represent episodic content are representative of the series of episodic content, rather than individual episodes. In some embodiments, the content item representation section further includes representations of movies.

The above-described manner of excluding representations of individual episodes from the content item representation section allows the electronic device to reduce the number of user inputs needed to browse representations of different content series, which simplifies the interaction between the user and the electronic device and enhances the operability of the electronic device and makes the user-device interface more efficient (e.g., by reducing the number of inputs needed to view representations of different series), which additionally reduces power usage and improves battery life of the electronic device by enabling the user to use the electronic device more quickly and efficiency.

In some embodiments, such as in FIG. 6C, while the first representation 608a of the first content item is located in the primary position, the first representation 608a includes a visual indication 626 of a provider of the first content item (780) (e.g., text or an image (e.g., an icon or logo) indicating the provider of the first content item). In some embodiments, such as in FIG. 6I, while the second representation 608b of the second content item is located in the primary position, the second representation 608b includes a visual indication of a provider of the second content item (782) (e.g., text or an image (e.g., an icon or logo) indicating the provider of the first content item). The electronic device optionally presents the visual indication of the provider as animating in to the primary position when the respective representation is presented in the primary position. In some embodiments, the indication of the provider does not move in response to a user input that causes other layers in the image stackup to move. In some embodiments, the indication of the provider moves in response to the user input that causes the other image layers in the image stackup to move. The indication of the provider is optionally overlaid on the other image layers in the image stackup. As used herein, the provider of the content is optionally a channel, streaming service, subscription service, or other entity that authorizes the electronic device to access the content. In some embodiments, the indication of the provider is presented when the respective representation is in the primary position, but not when the respective representation is in one of the secondary positions.

The above-described manner of presenting the indication of the provider of the content allows the electronic device to indicate to the user the way in which the electronic device has access to the content, which simplifies the interaction between the user and the electronic device and enhances the operability of the electronic device and makes the user-device interface more efficient (e.g., by reducing the number of inputs needed to view the content item representation section and information about the provider of a respective item of content presented in the content item representation section), which additionally reduces power usage and improves battery life of the electronic device by enabling the user to use the electronic device more quickly and efficiency.

It should be understood that the particular order in which the operations in FIGS. 7A-7G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 900, 1100, and 1300) are also applicable in an analogous manner to method 700 described above with respect to FIGS. 7A-7G. For example, the ways of presenting representations of items of content described above with reference to method 700 optionally have one or more of the characteristics of the ways of presenting representations of auxiliary content, presenting representations of content based on the content consumption history of the user account, presenting representations of bonus content items, etc., described herein with reference to other methods described herein (e.g., methods 900, 1100, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C or application specific chips. Further, the operations described above with reference to FIGS. 7A-7G are, optionally, implemented by components depicted in FIGS. 1A-1B. For example, displaying operations 702, 704, 716, 748, 750, 756,758, 762, and 766 receiving operations 704, 706, 736, 738, 754, and 756 and initiating operations 702, and 716 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Representations of Auxiliary Content

Users interact with electronic devices in many different manners, including using an electronic device to view auxiliary content related to an item of content of interest to the user. In some embodiments, an electronic device is able to display representations of the auxiliary content to facilitate browsing of the available auxiliary content. The embodiments described below provide ways in which an electronic device presents representations of auxiliary content related to an item of content in the product page user interface of the item of content and in auxiliary content user interfaces. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 8A:
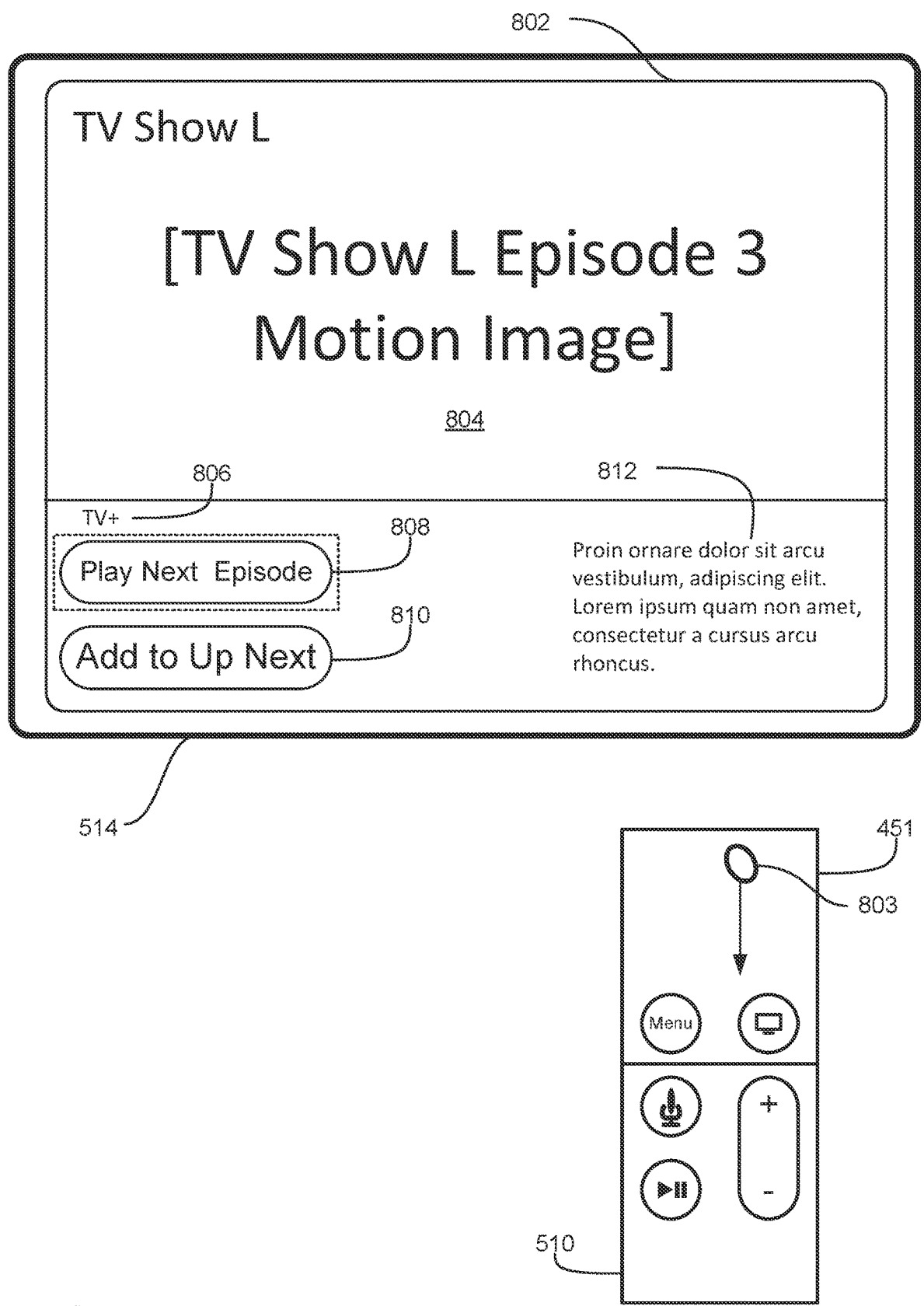
FIGS. 8A-8W illustrate exemplary ways in which an electronic device presents representations of auxiliary content related to an item of content in accordance with some embodiments of the disclosure.
Figure 8B:
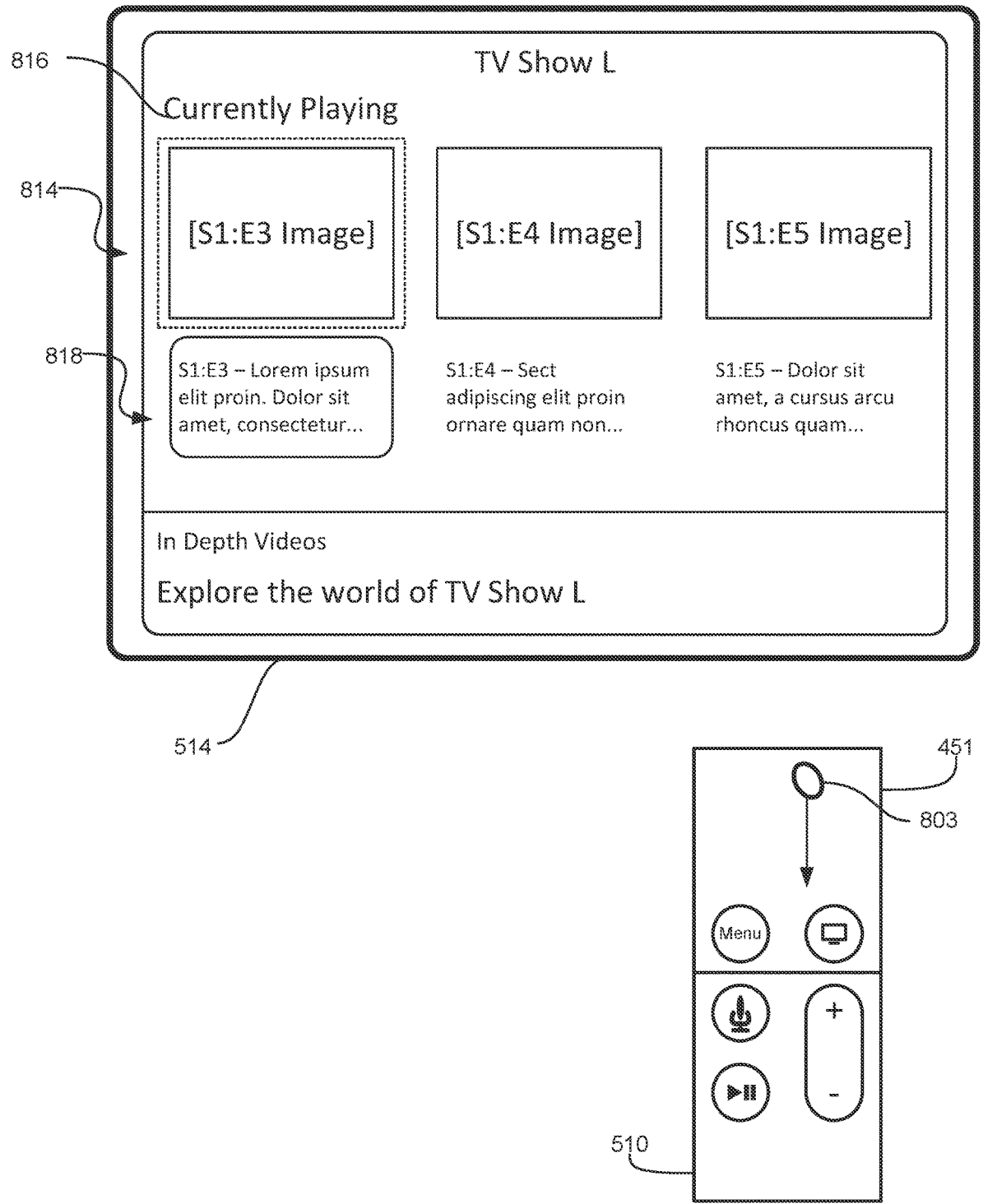
Figure 8C:
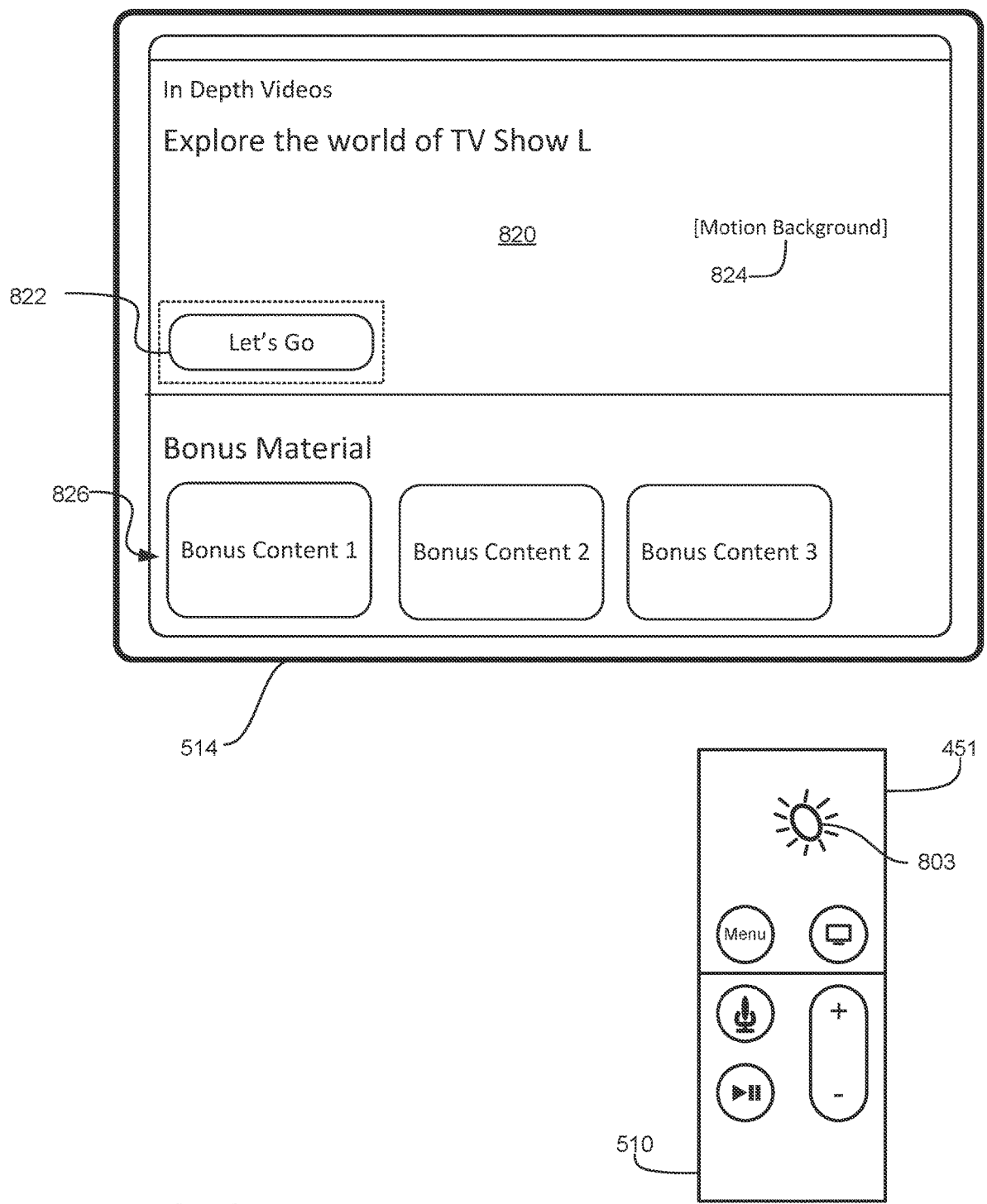
Figure 8D:
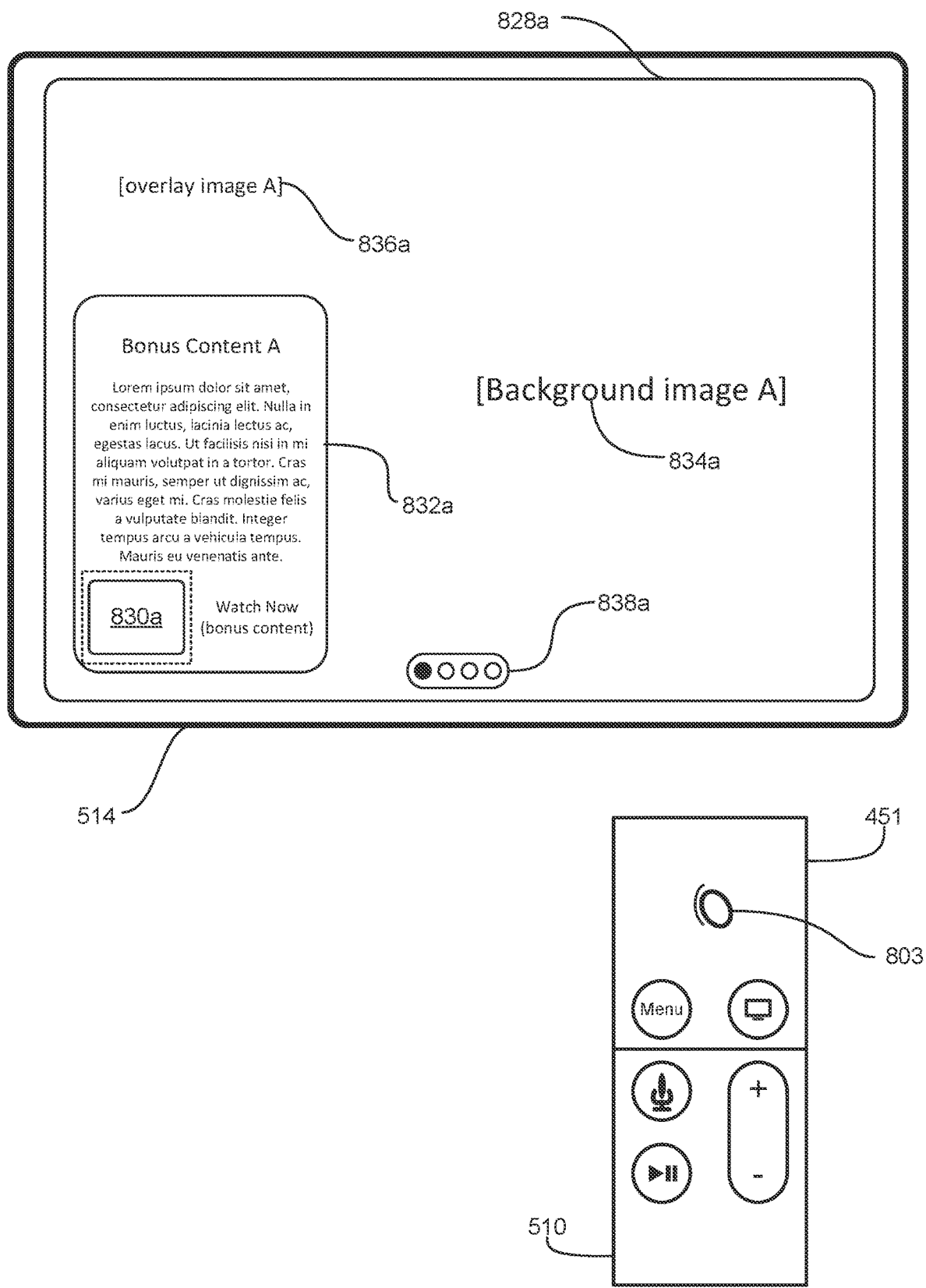
Figure 8E:
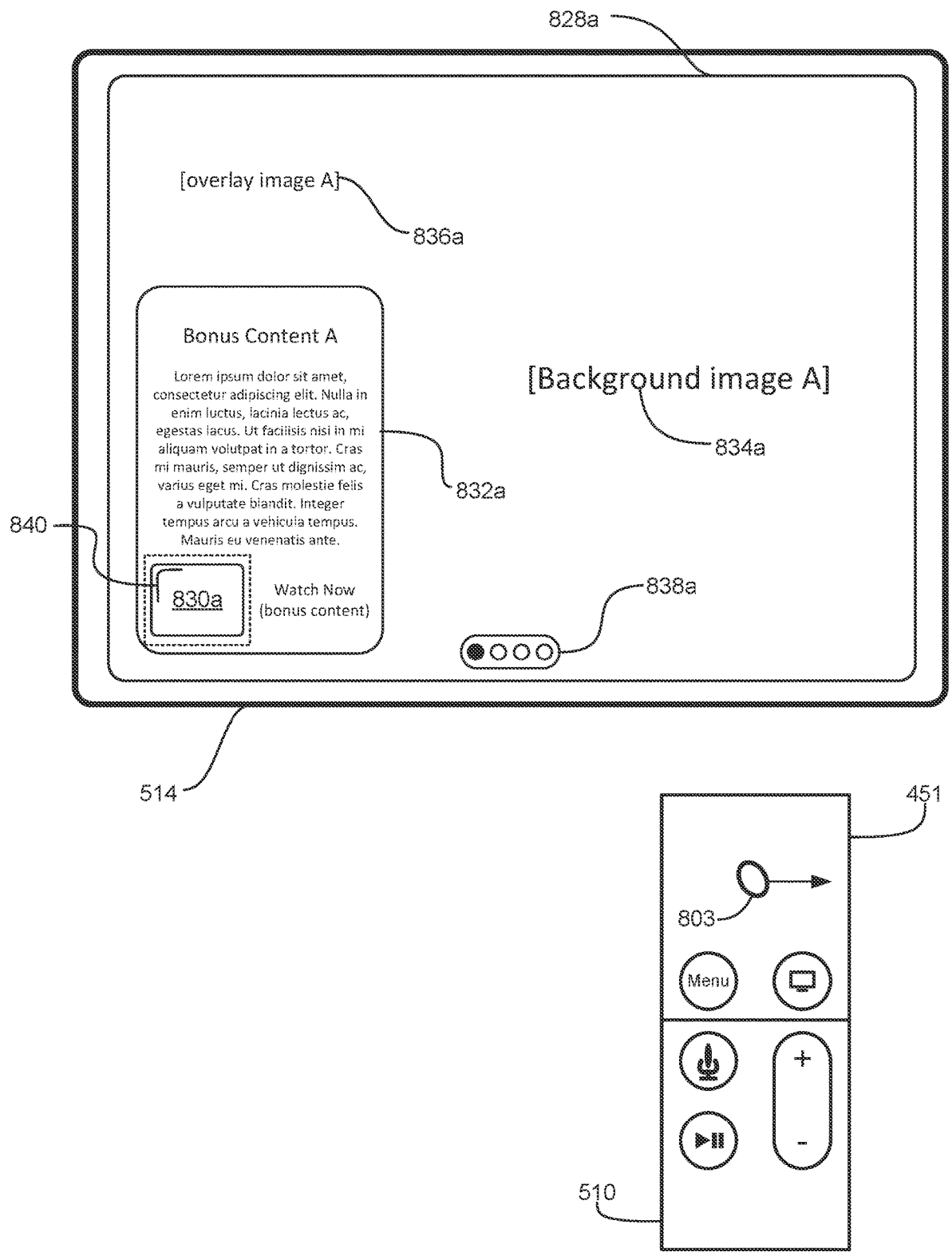
Figure 8F:
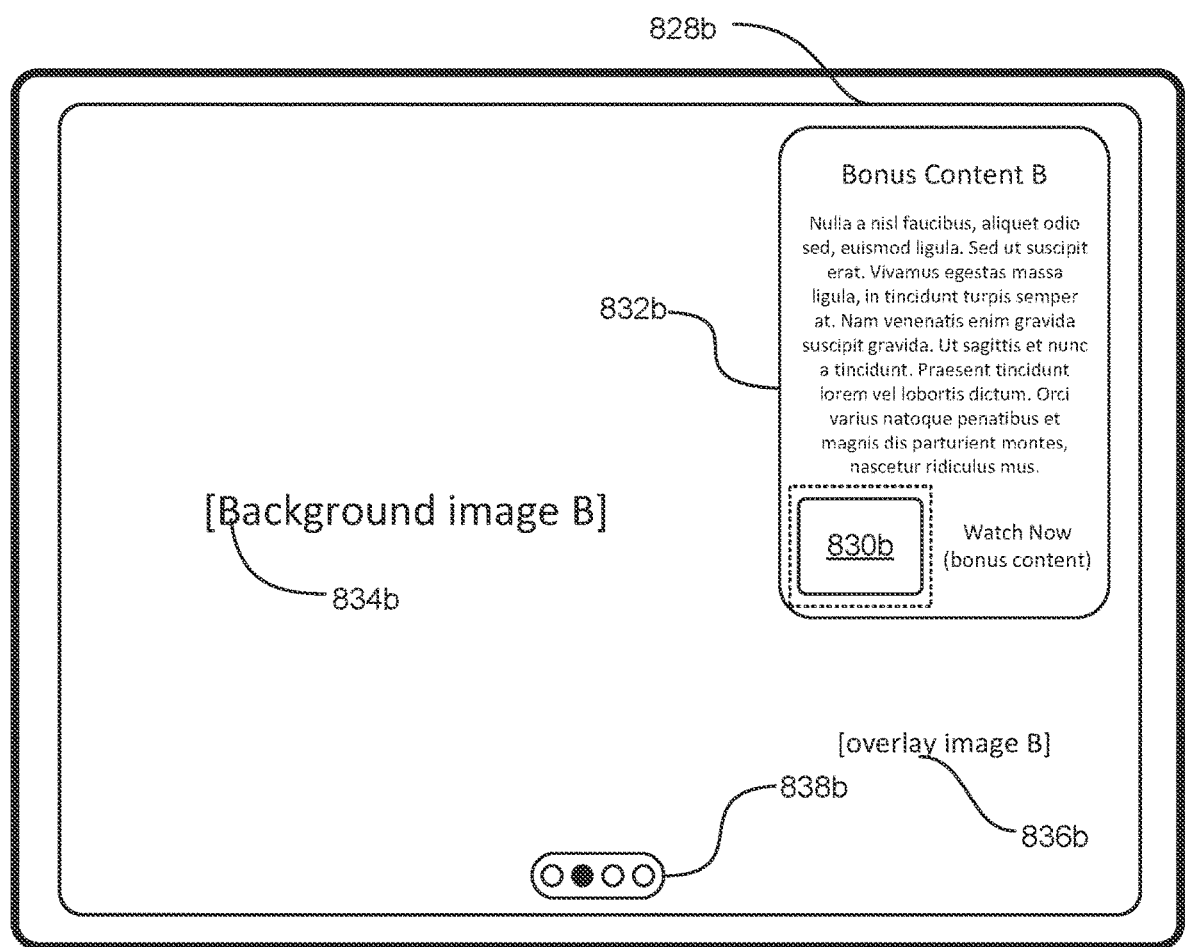
Figure 8F:
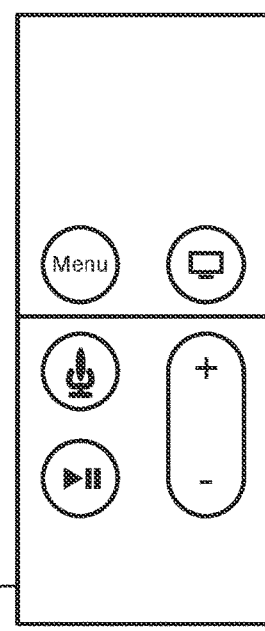
Figure 8G:
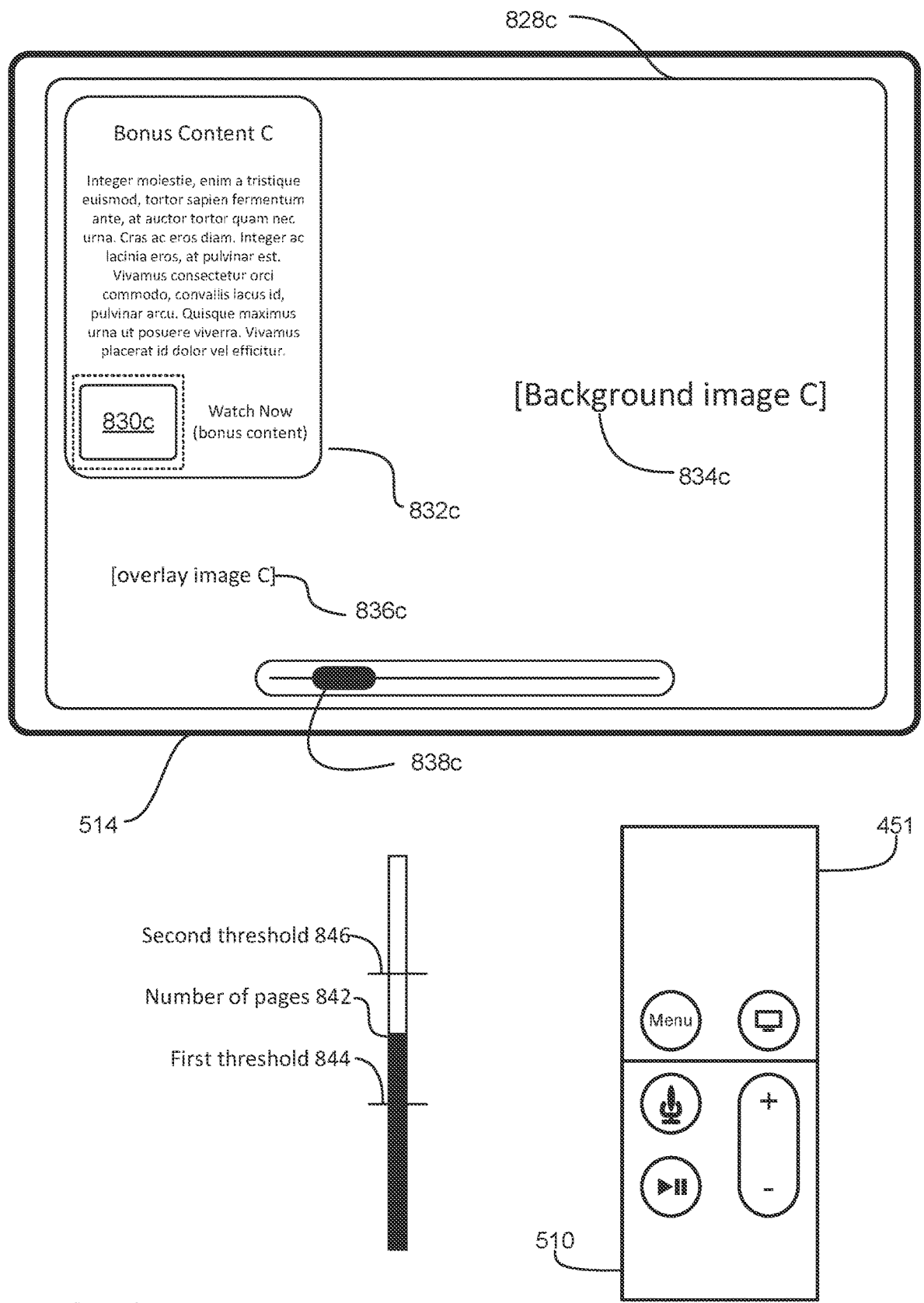
Figure 8H:
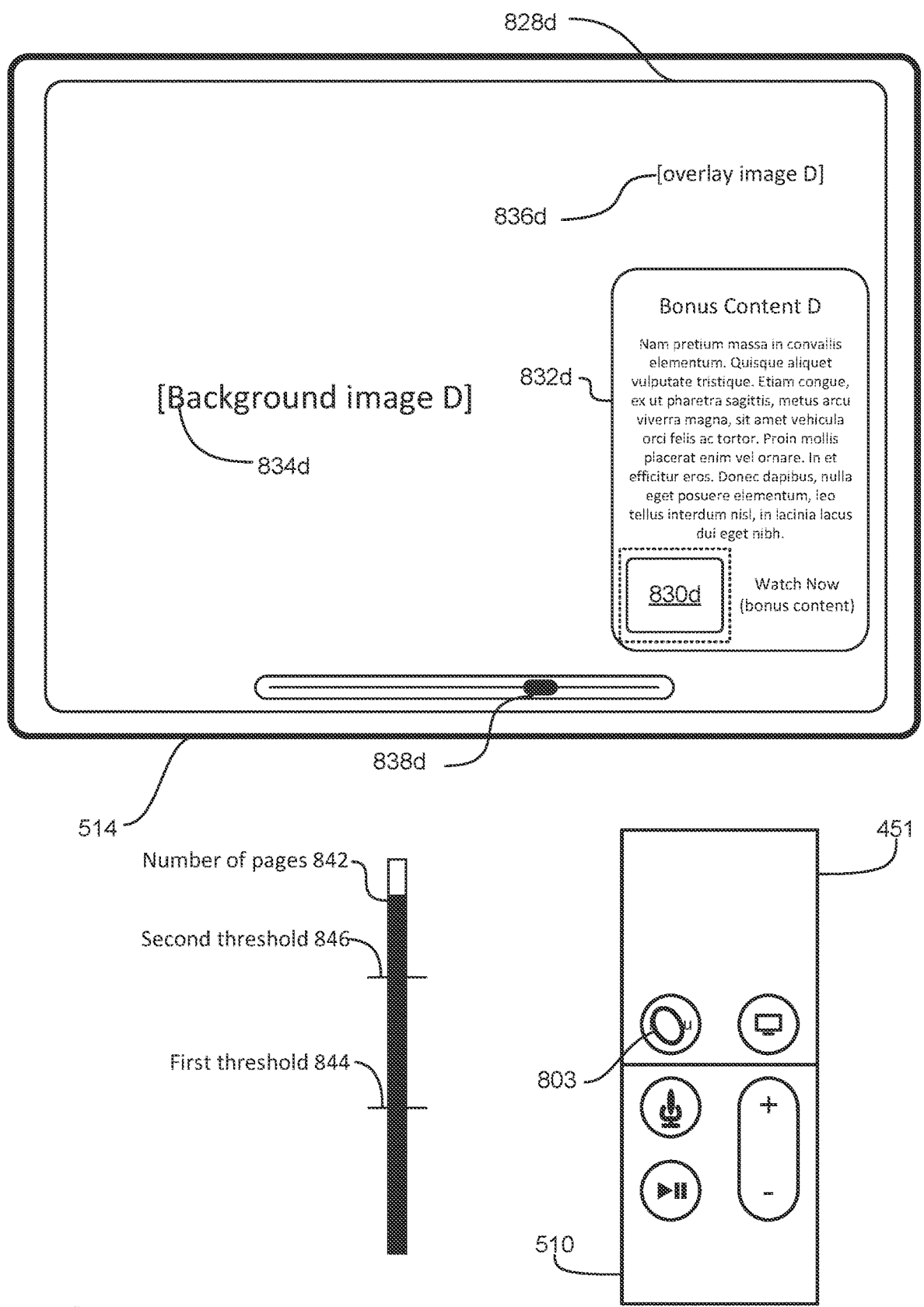
Figure 8I:
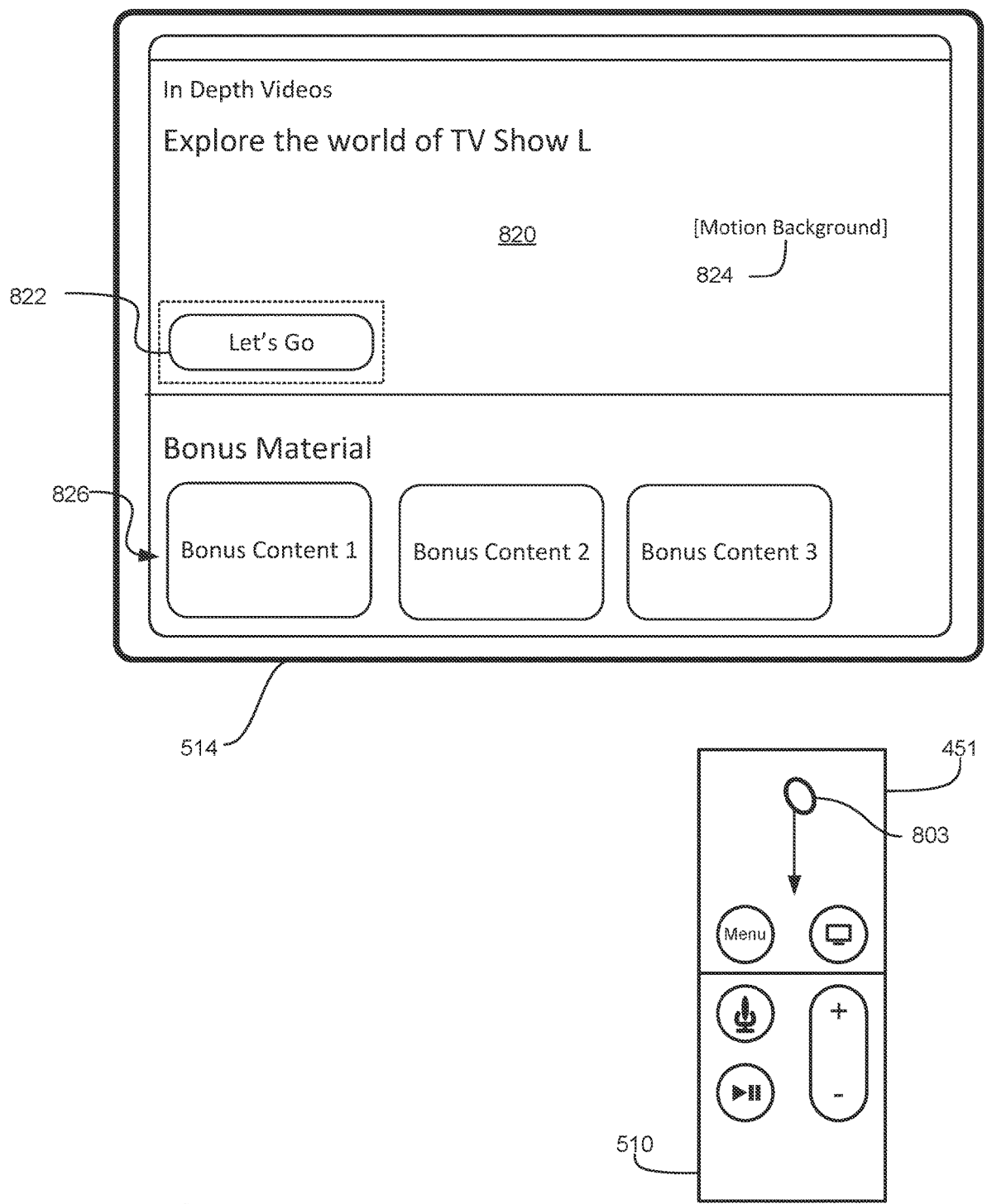
Figure 8J:
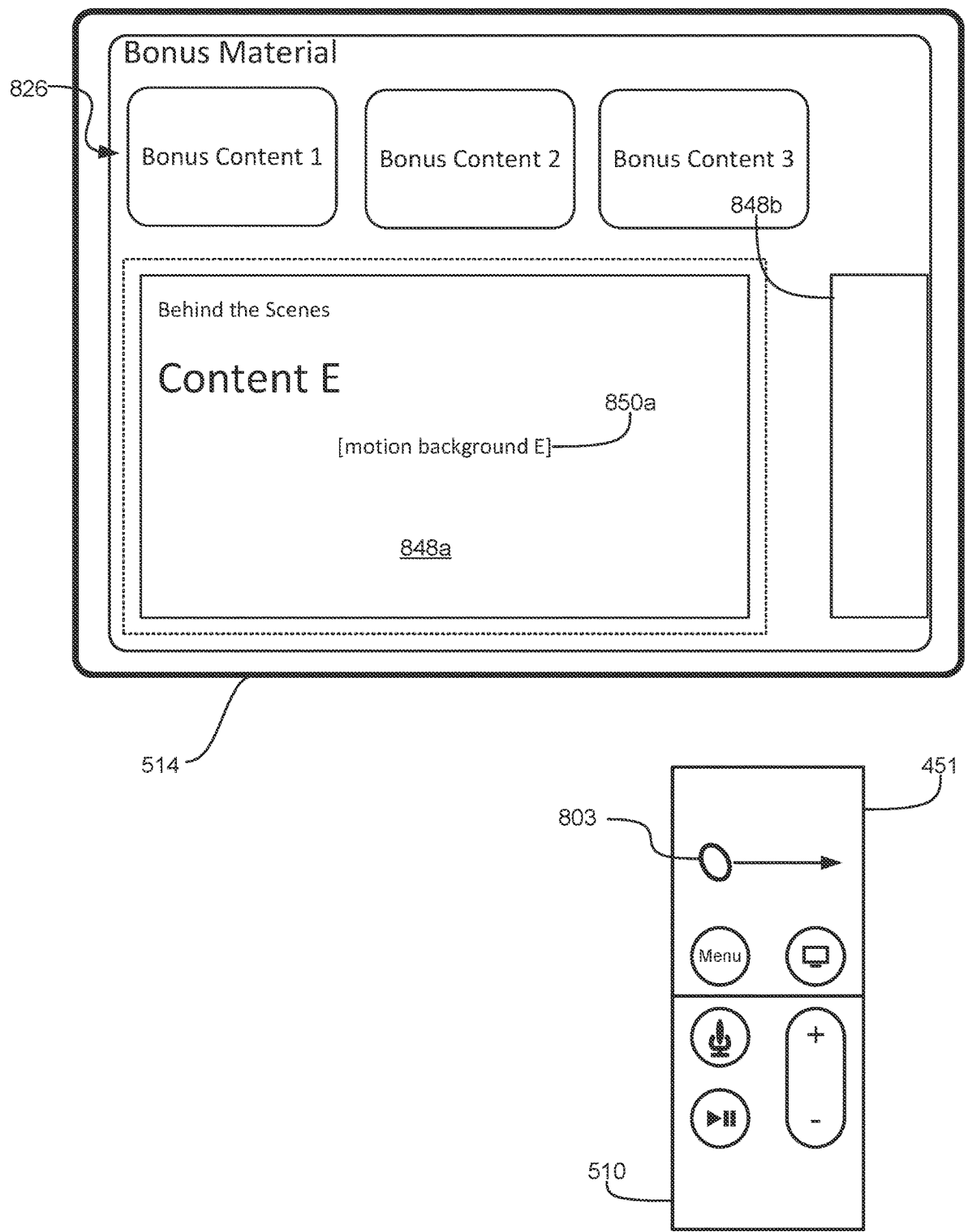
Figure 8K:
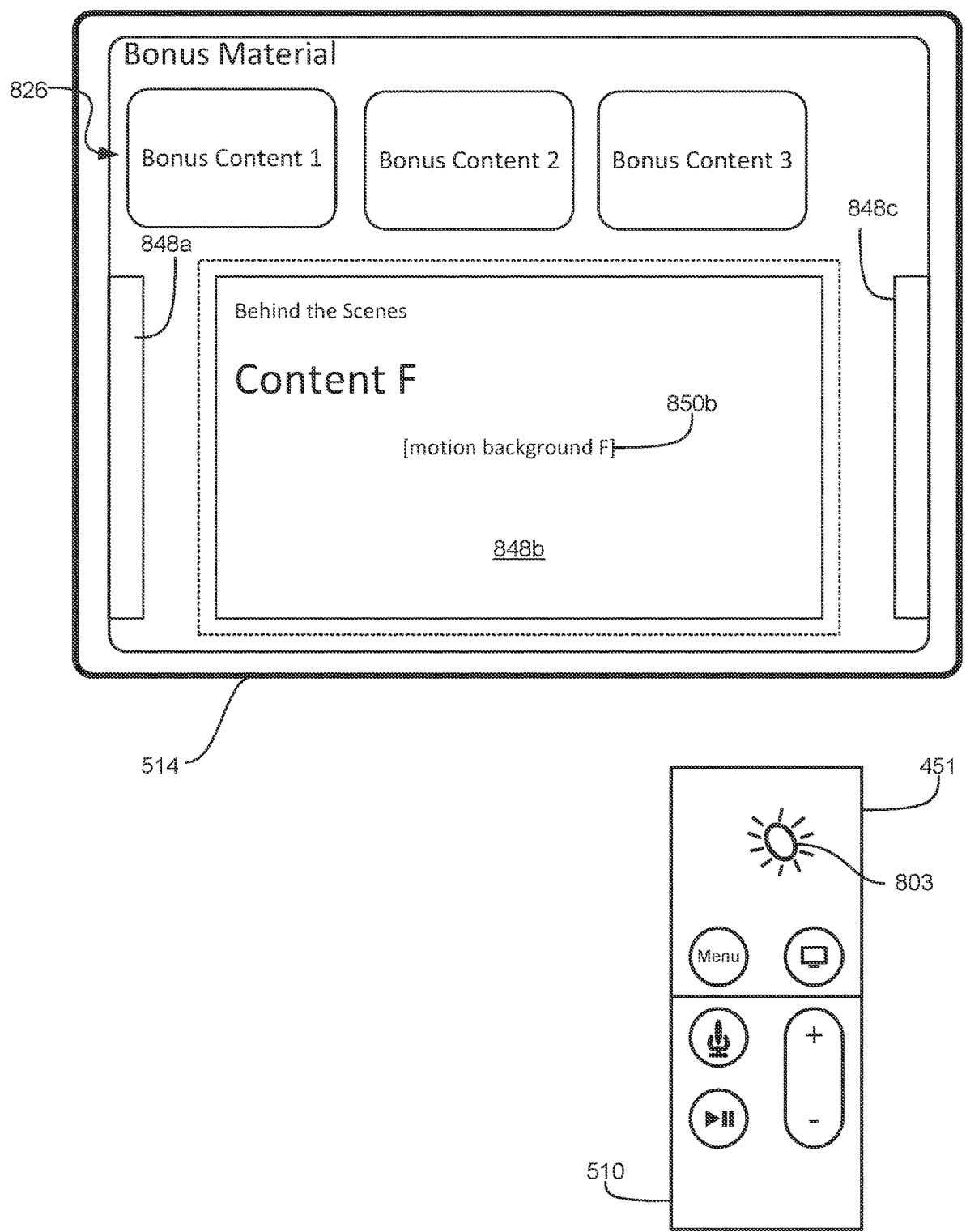
Figure 8L:
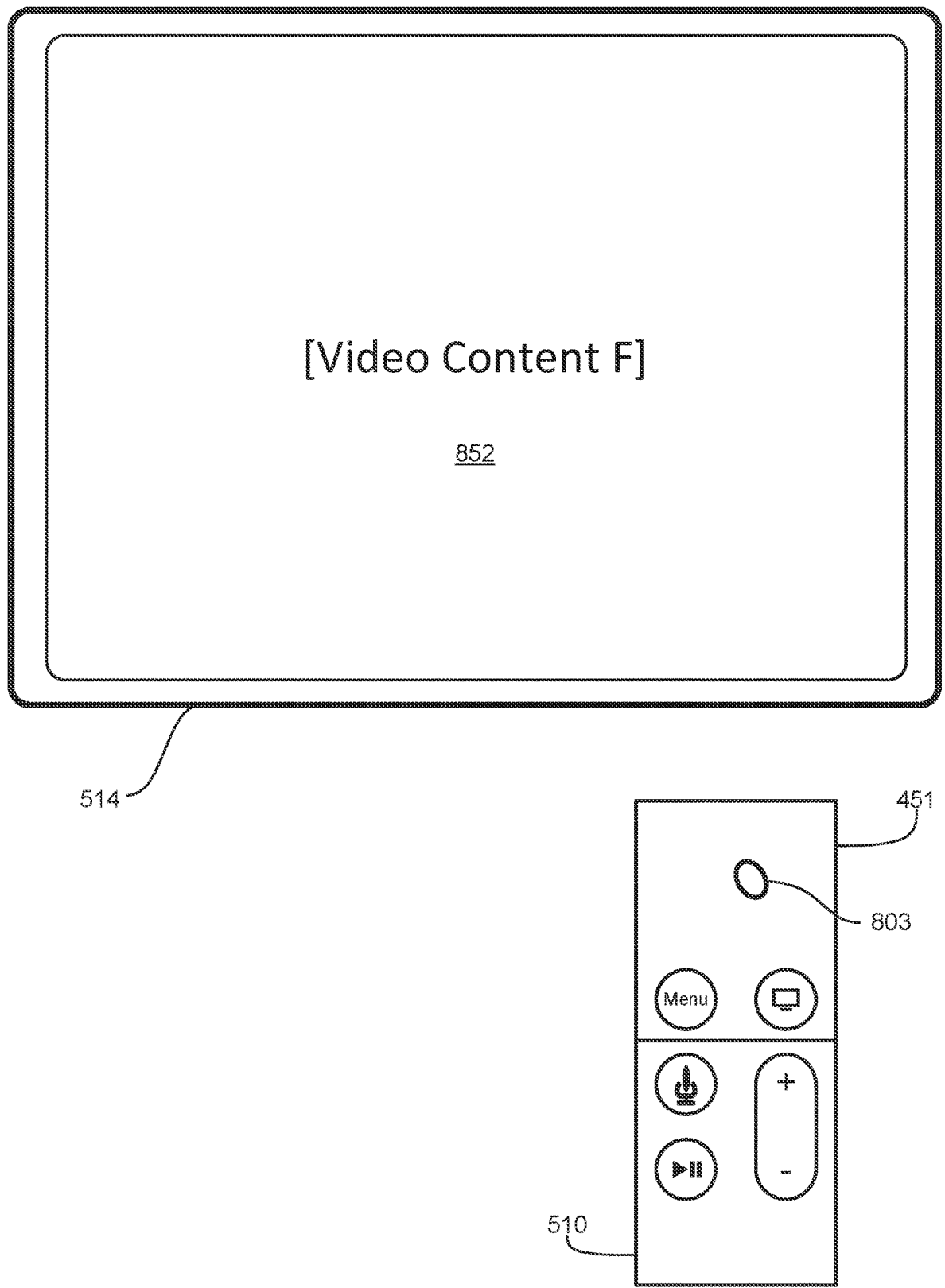
Figure 8M:
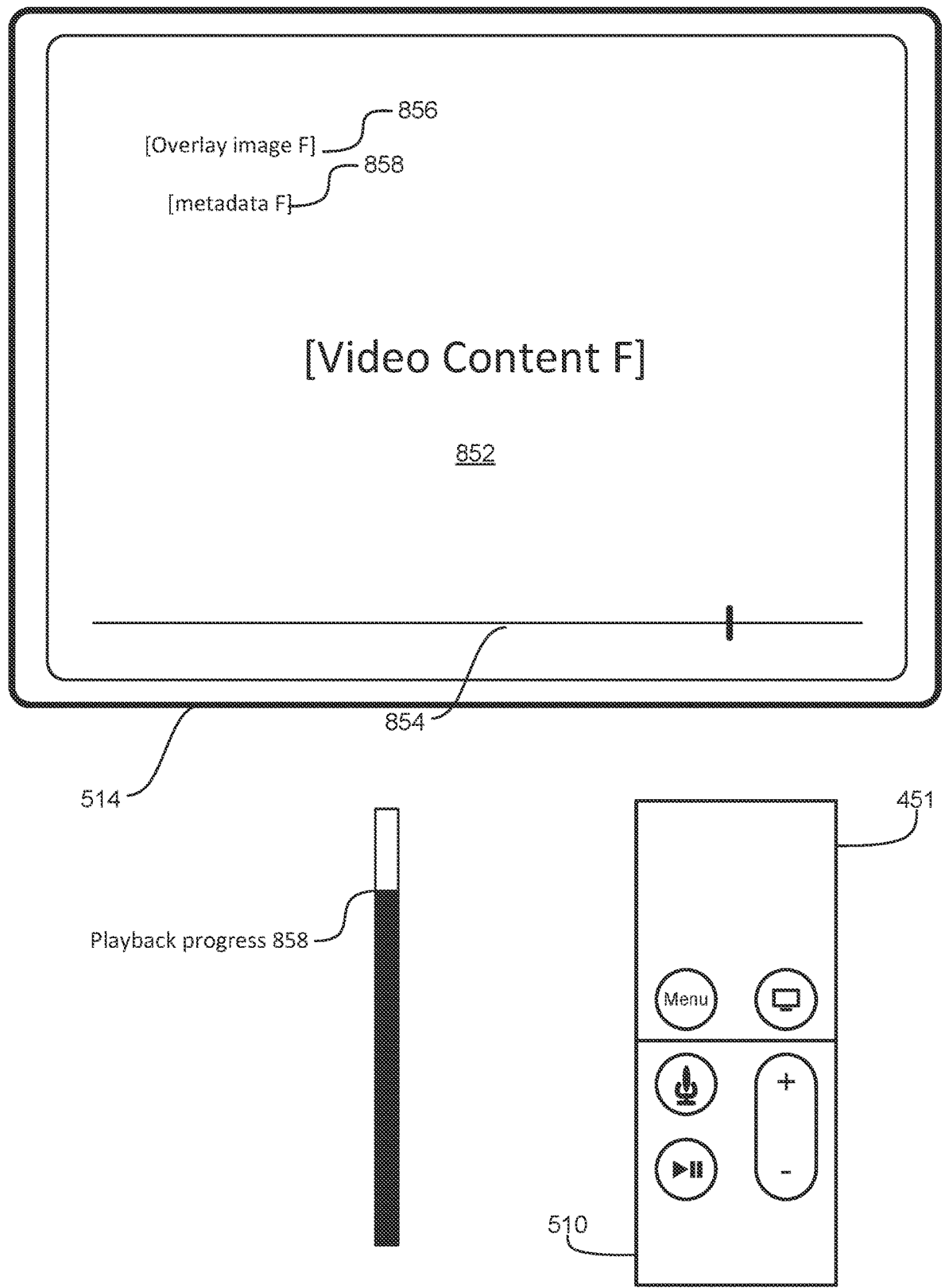
Figure 8N:
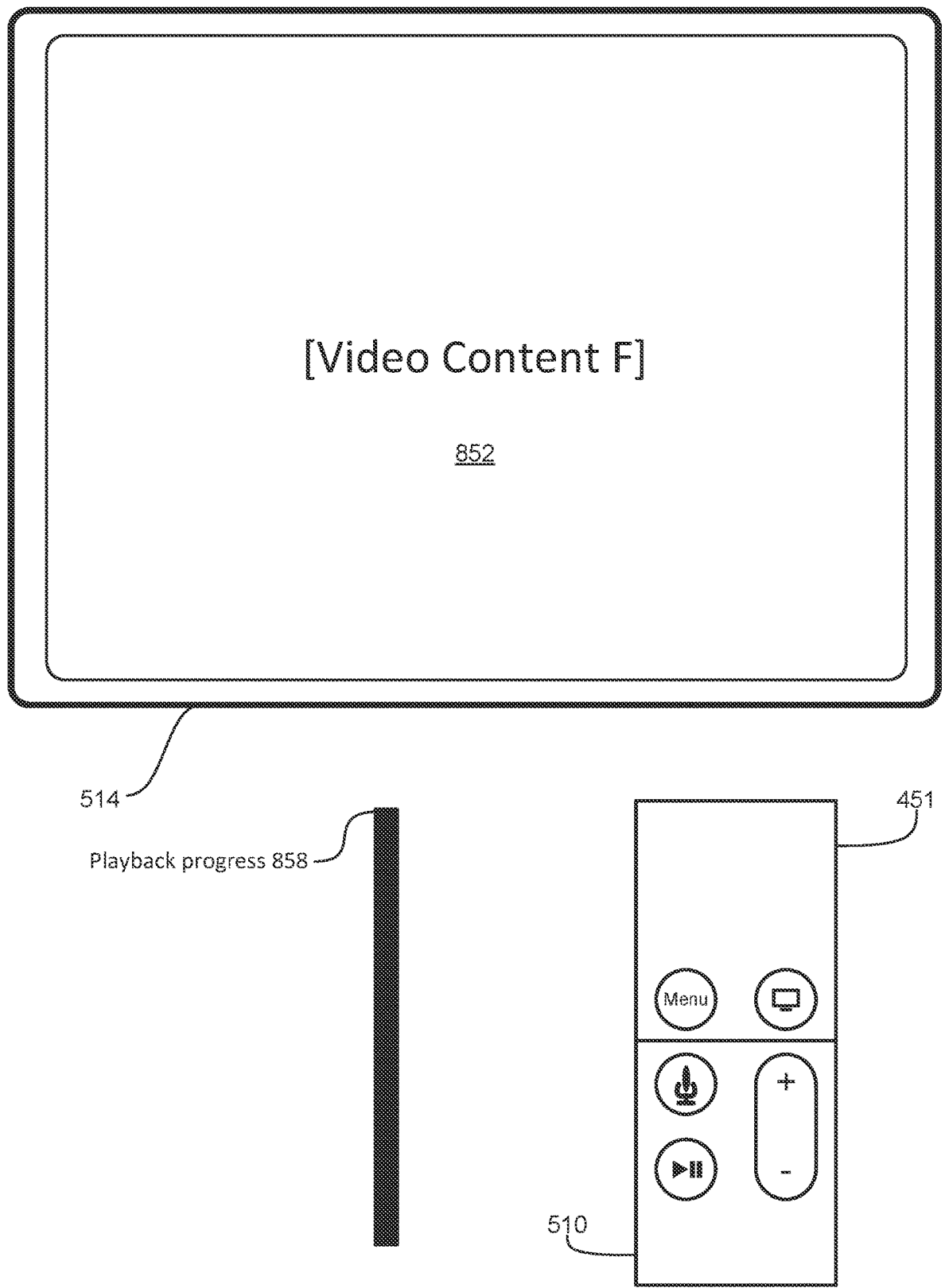
Figure 8O:
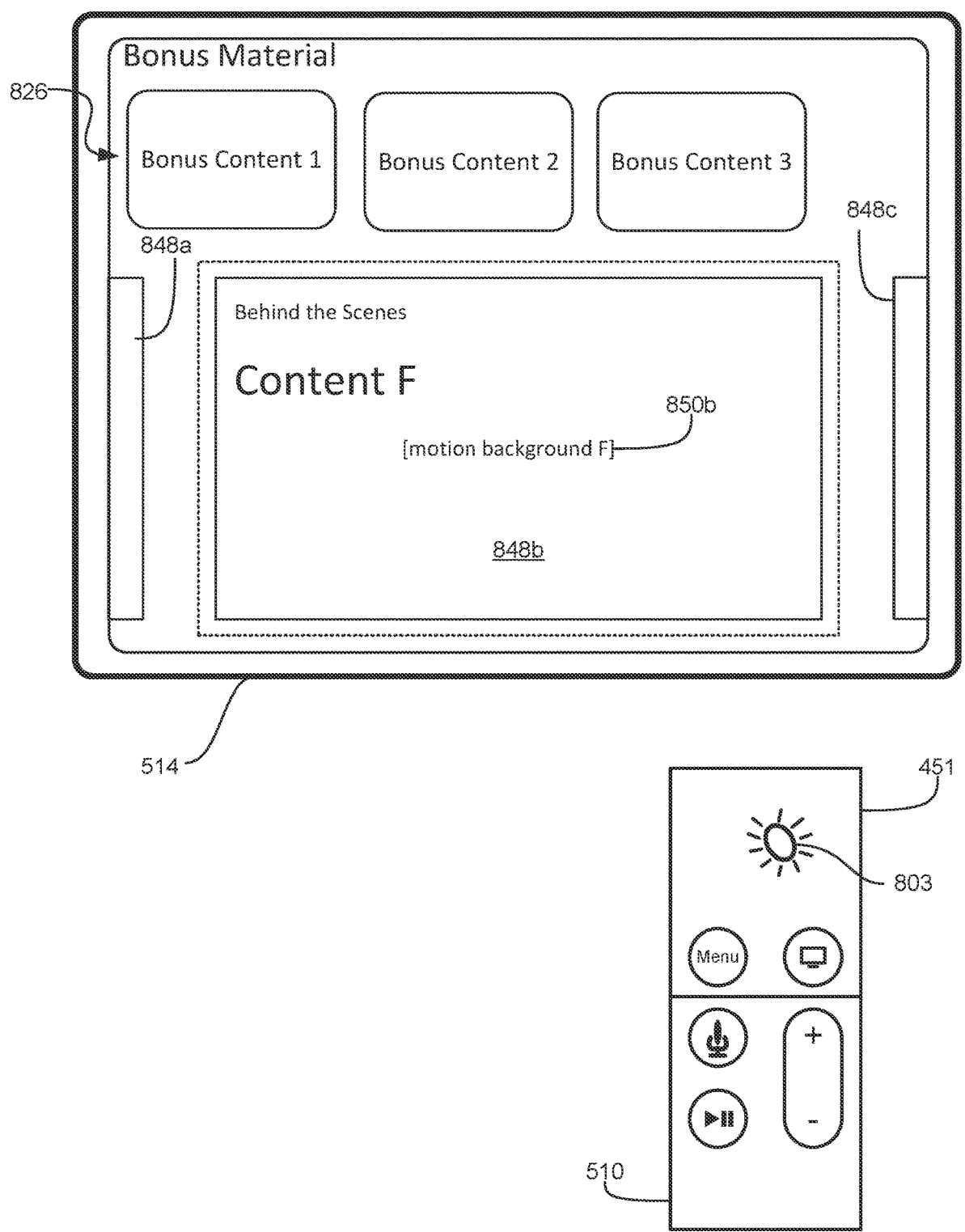
Figure 8P:
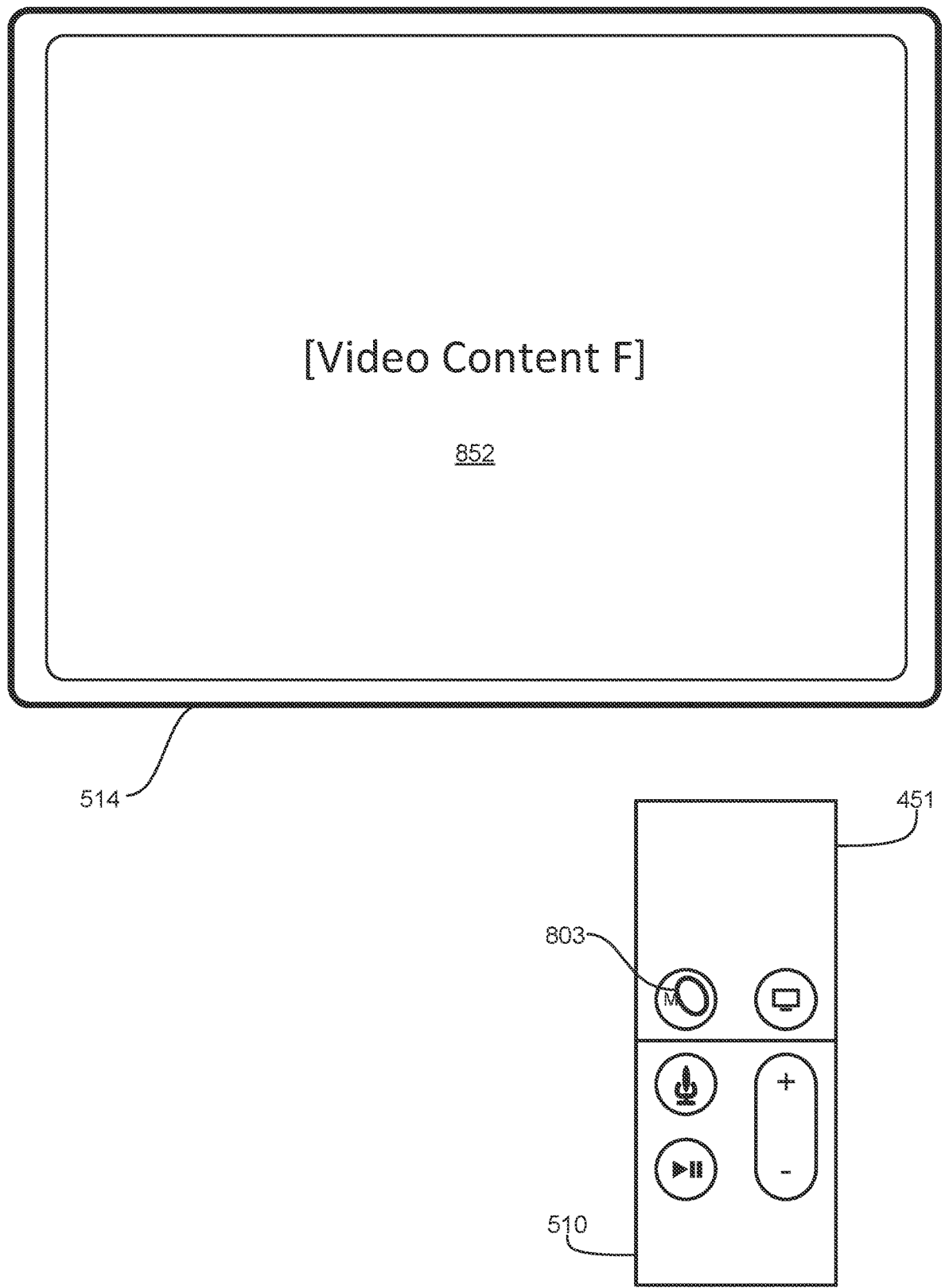
Figure 8Q:
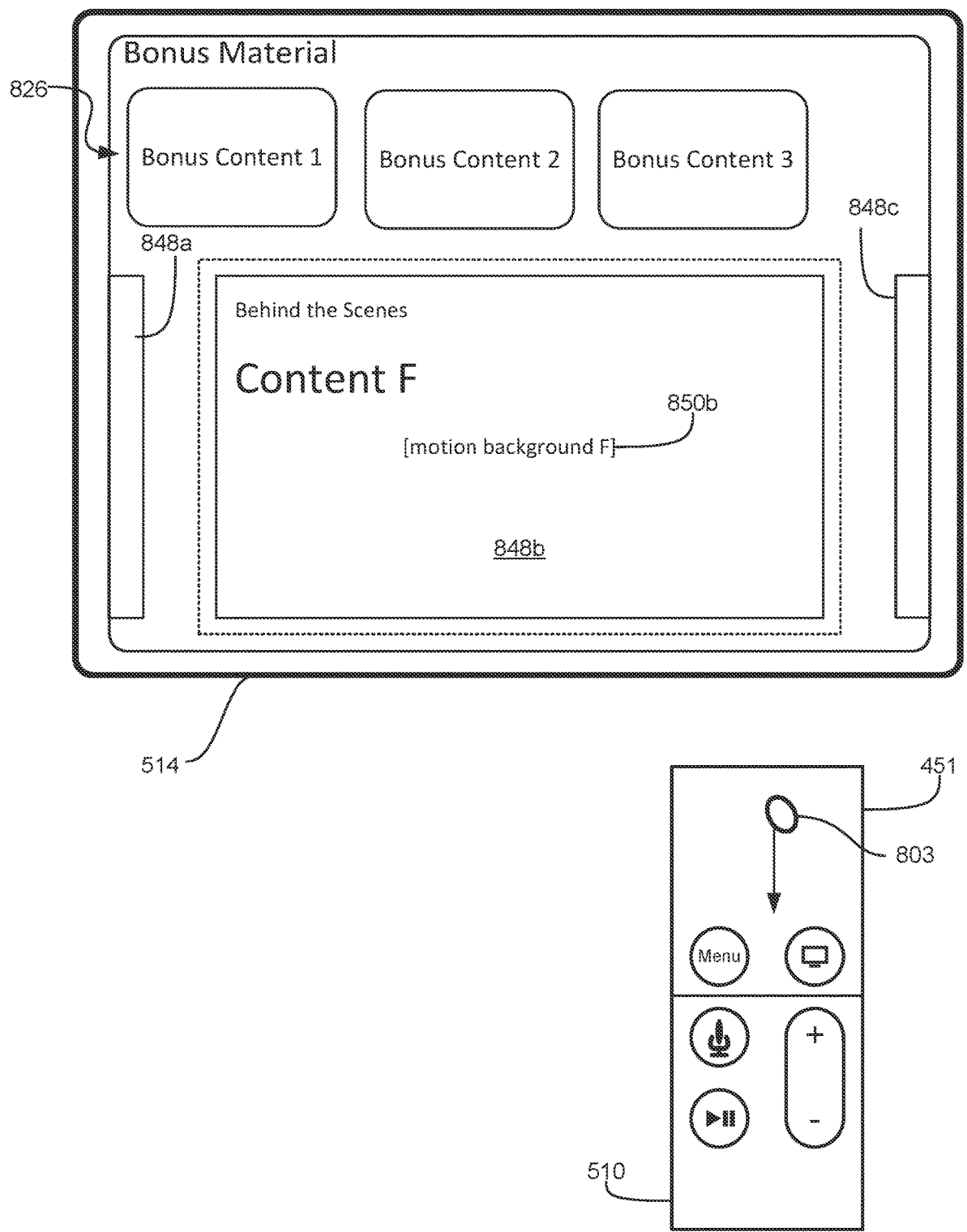
Figure 8R:
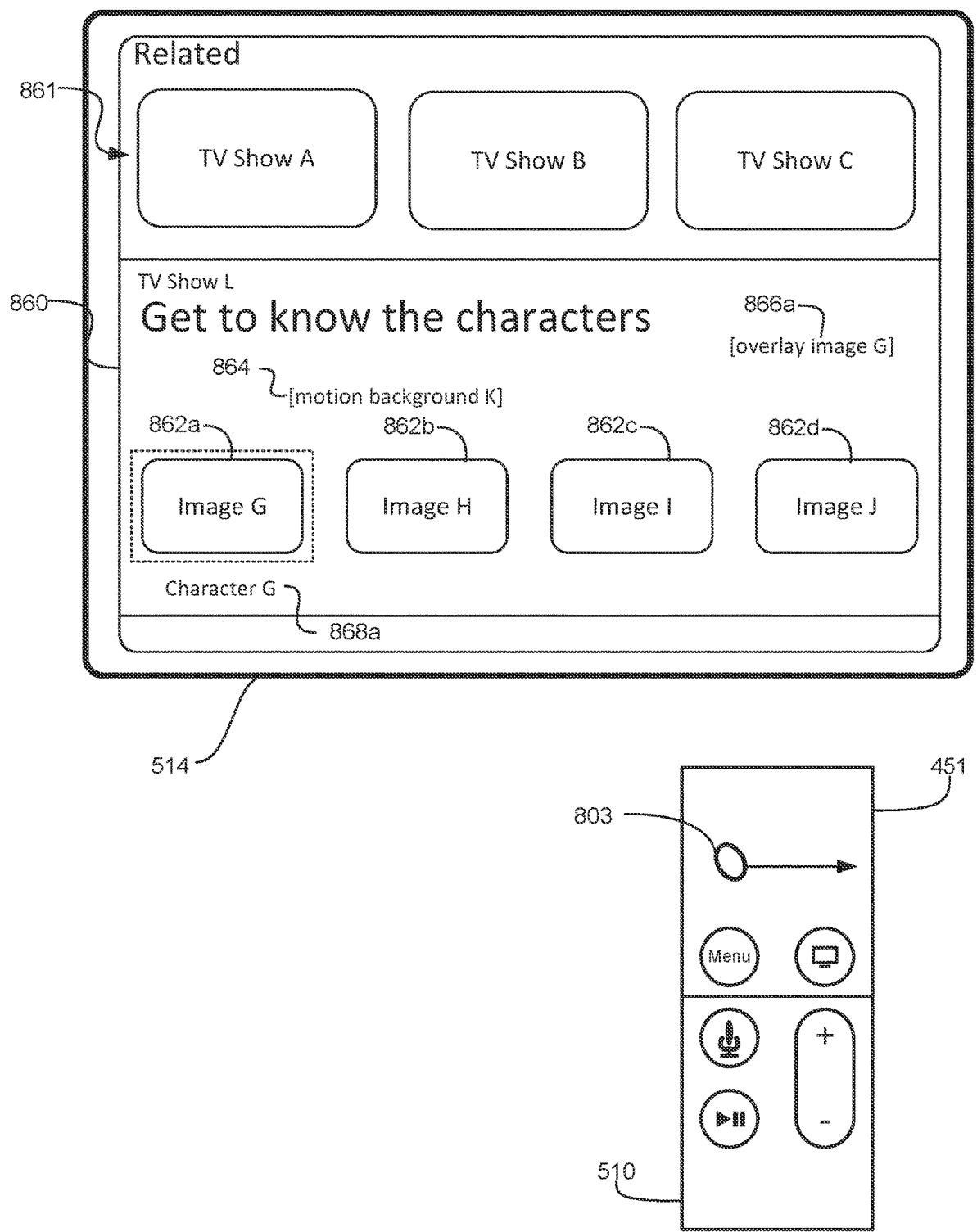
Figure 8S:
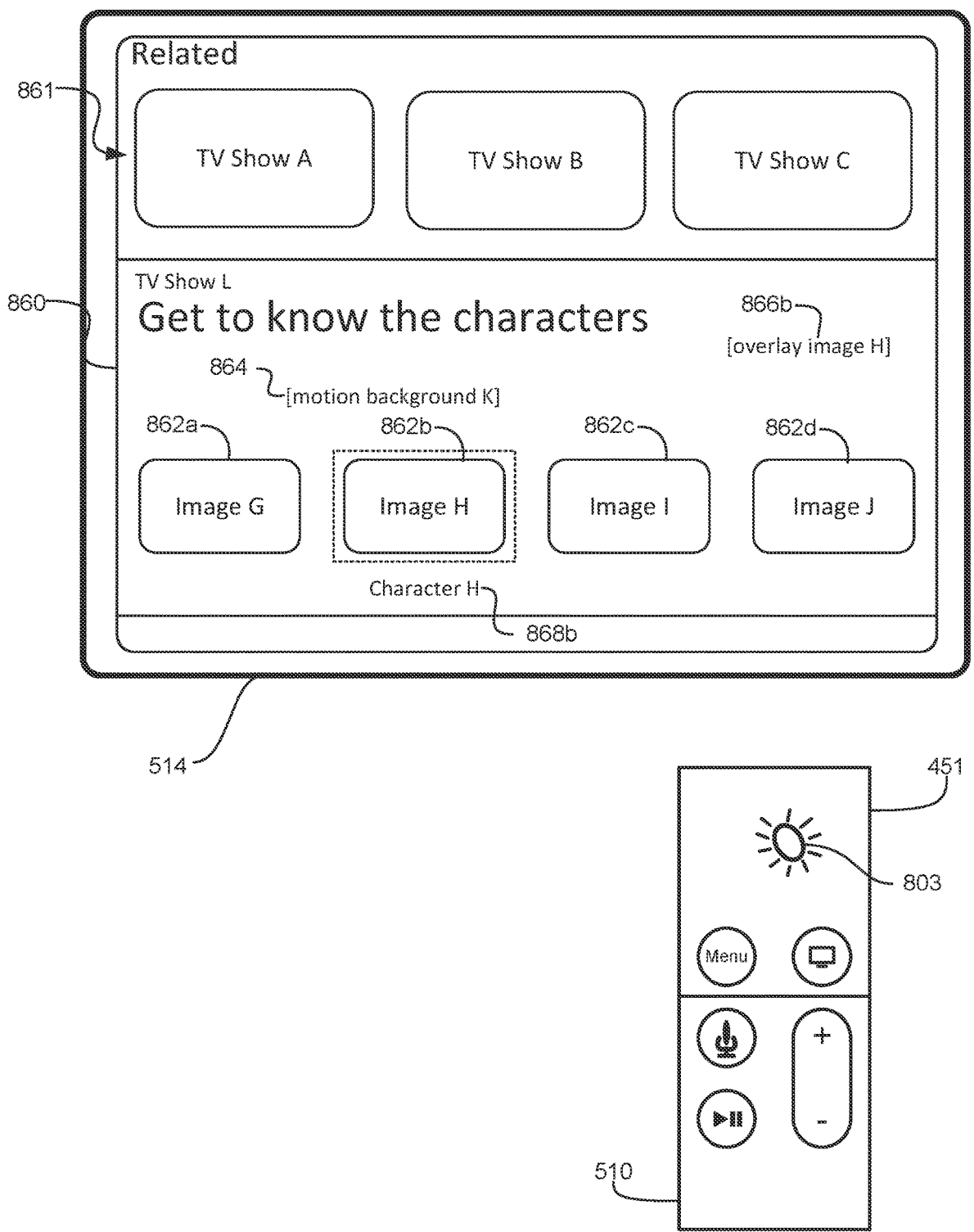
Figure 8T:
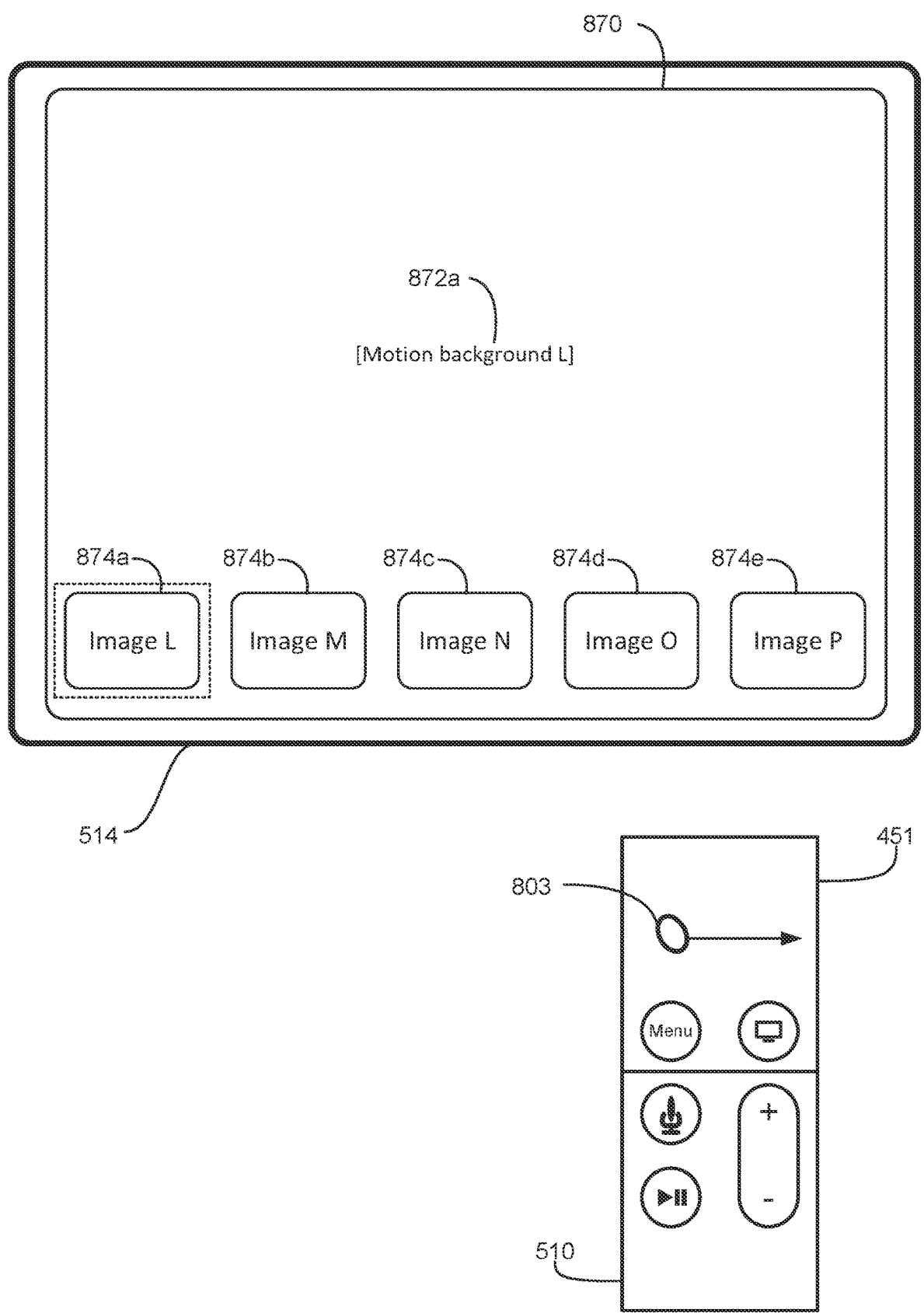
Figure 8U:
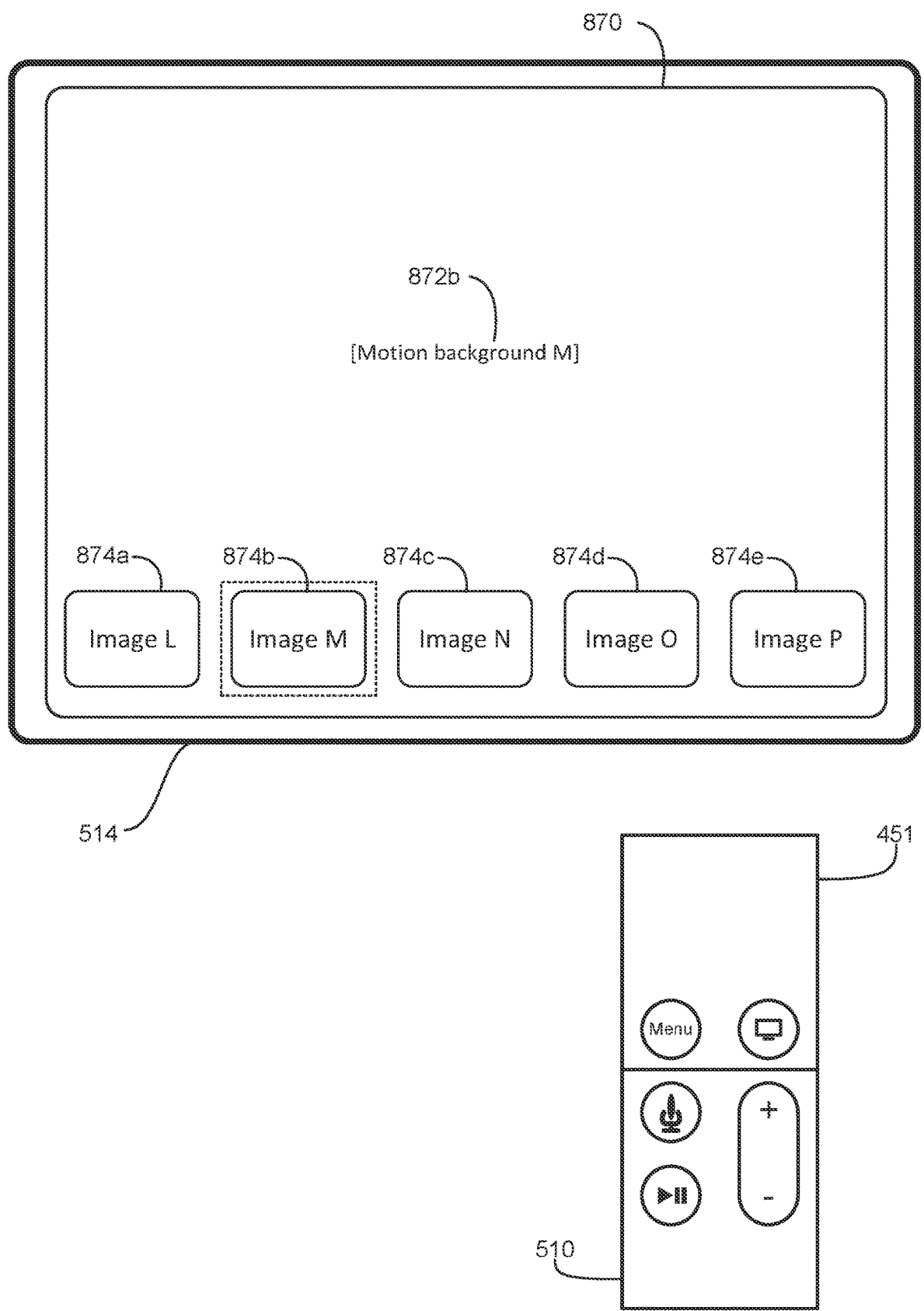
Figure 8V:
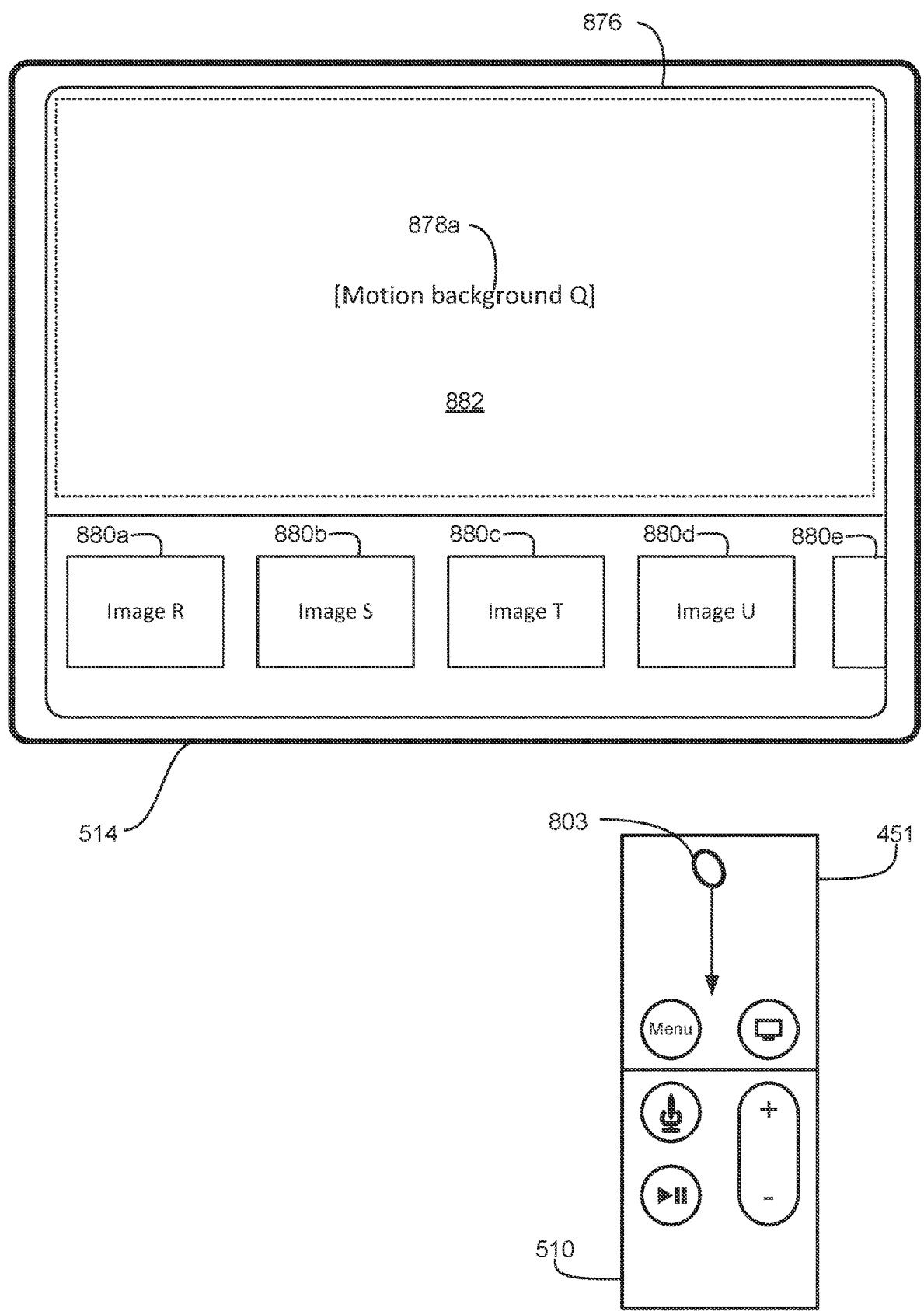
Figure 8W:
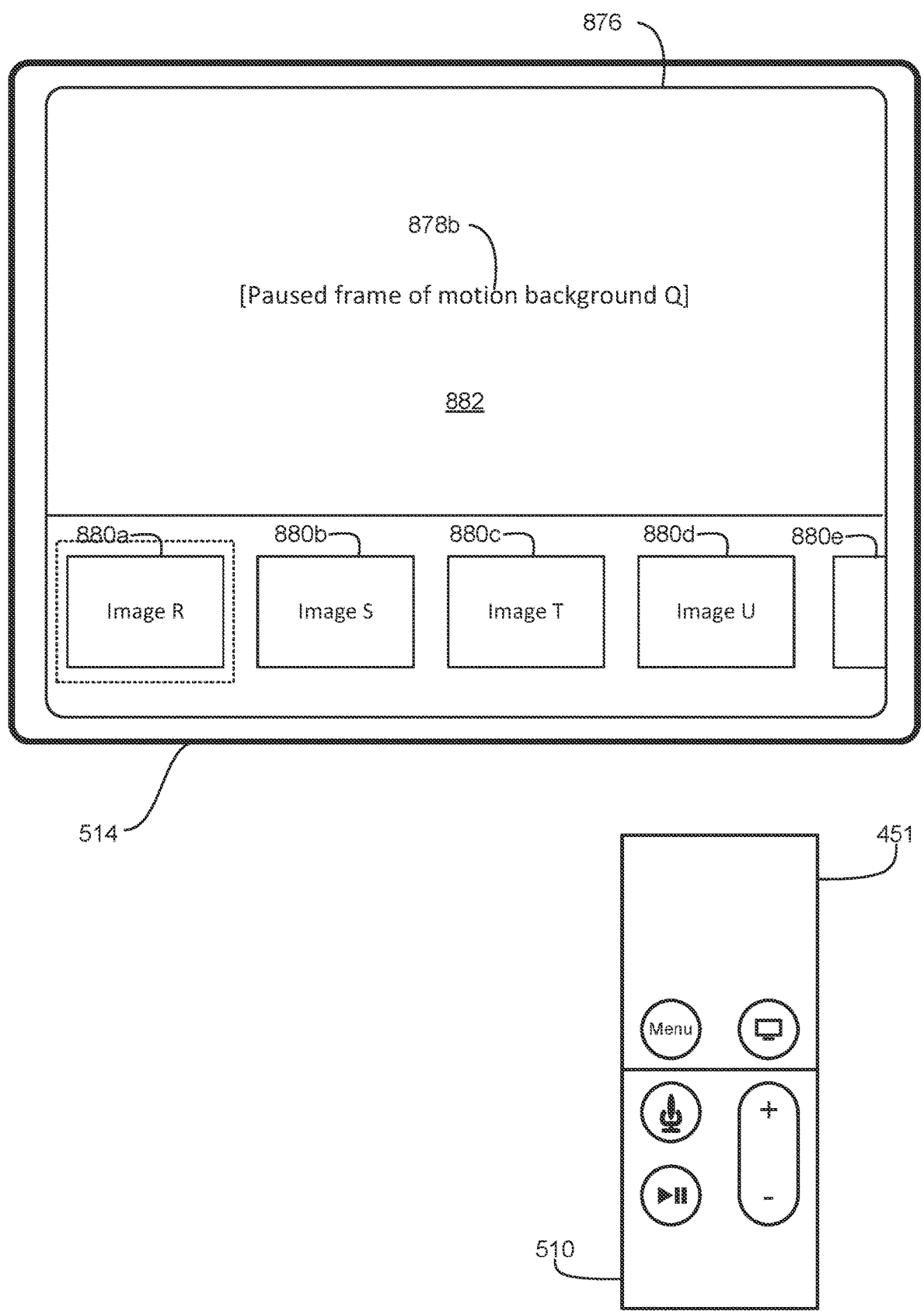
Figure 9A:
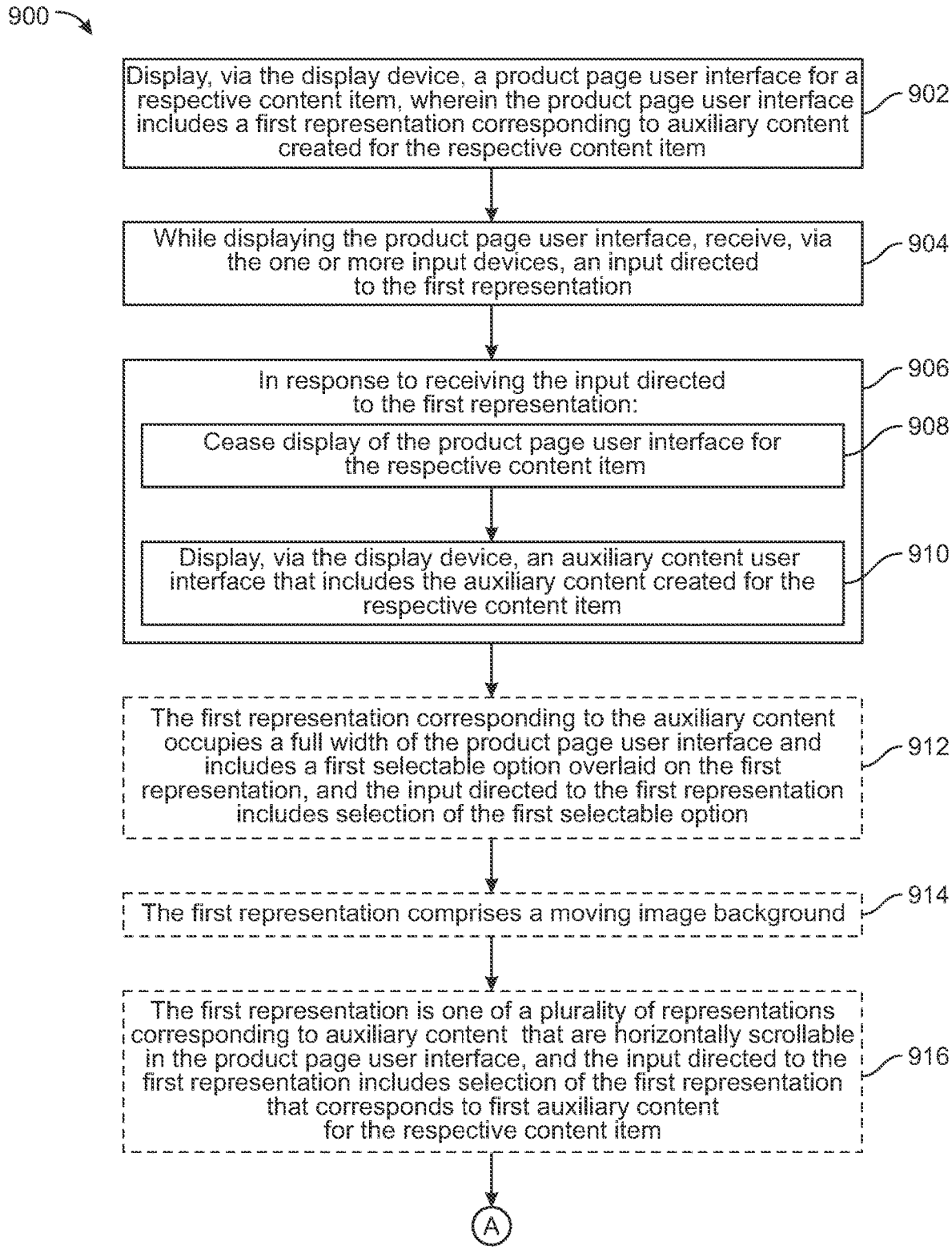
FIGS. 9A-9H are flow diagrams illustrating a method of presenting representations of auxiliary content related to an item of content in accordance with some embodiments of the disclosure.
Figure 9B:
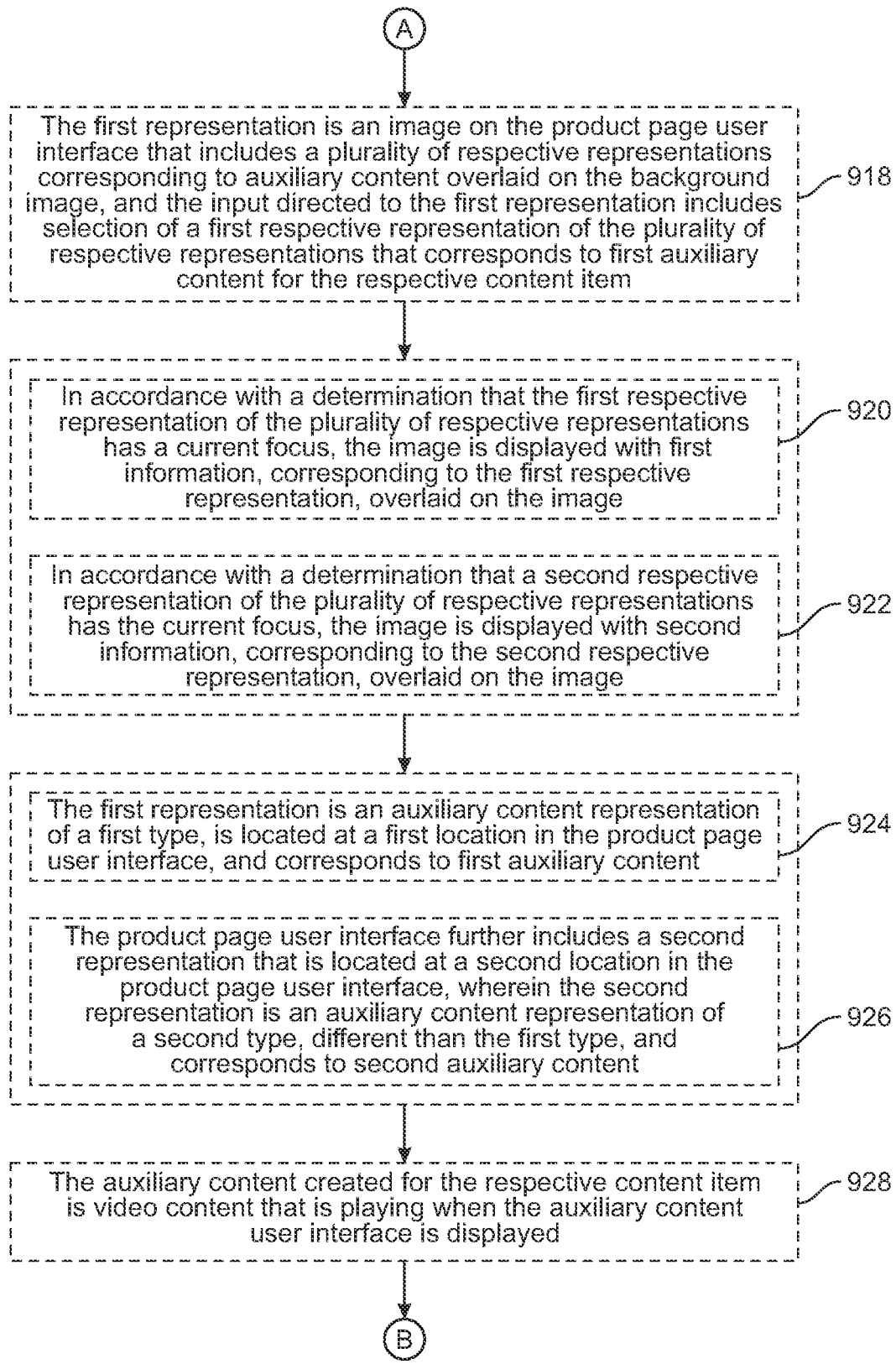
Figure 9C:
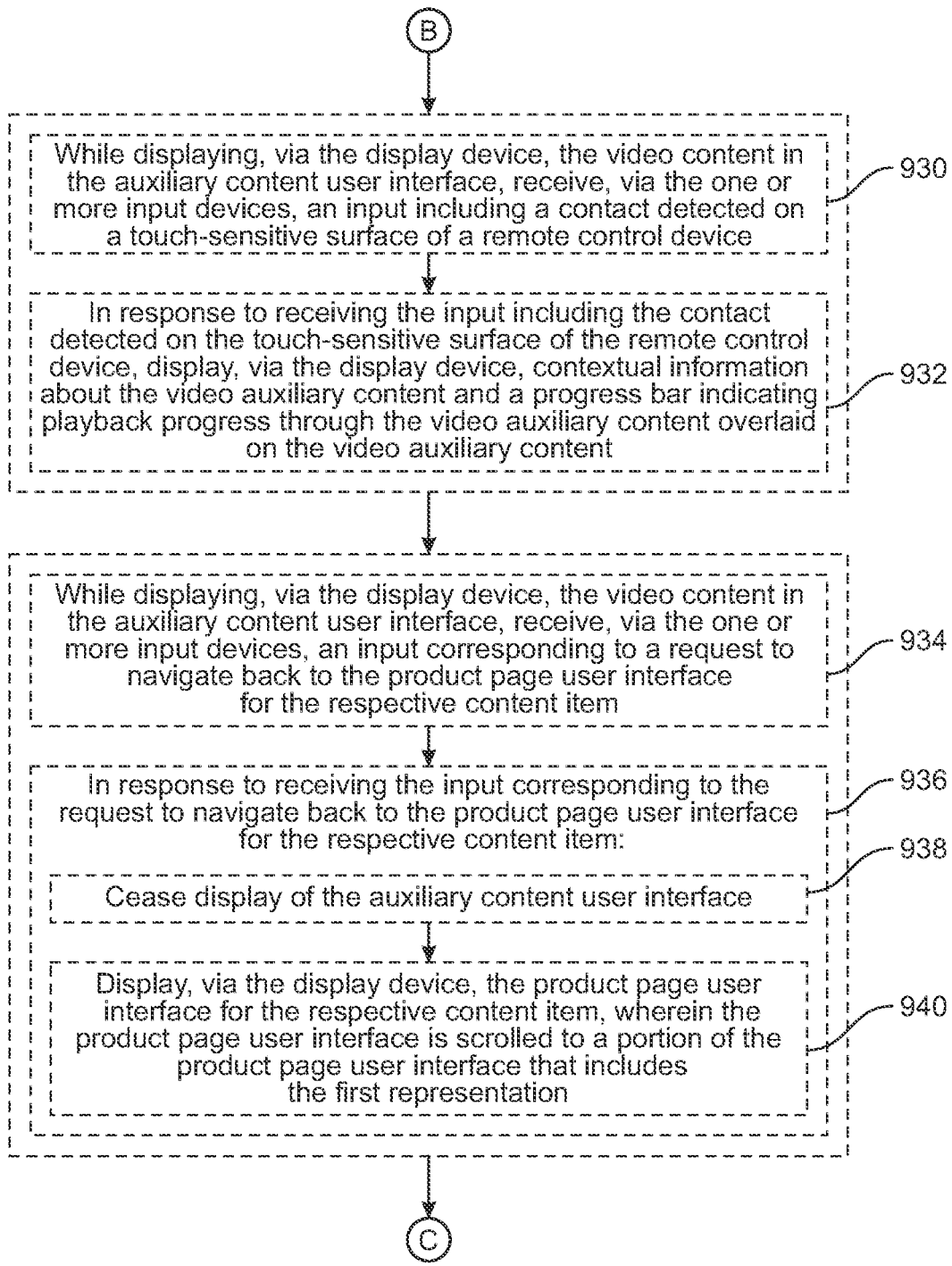
Figure 9D:
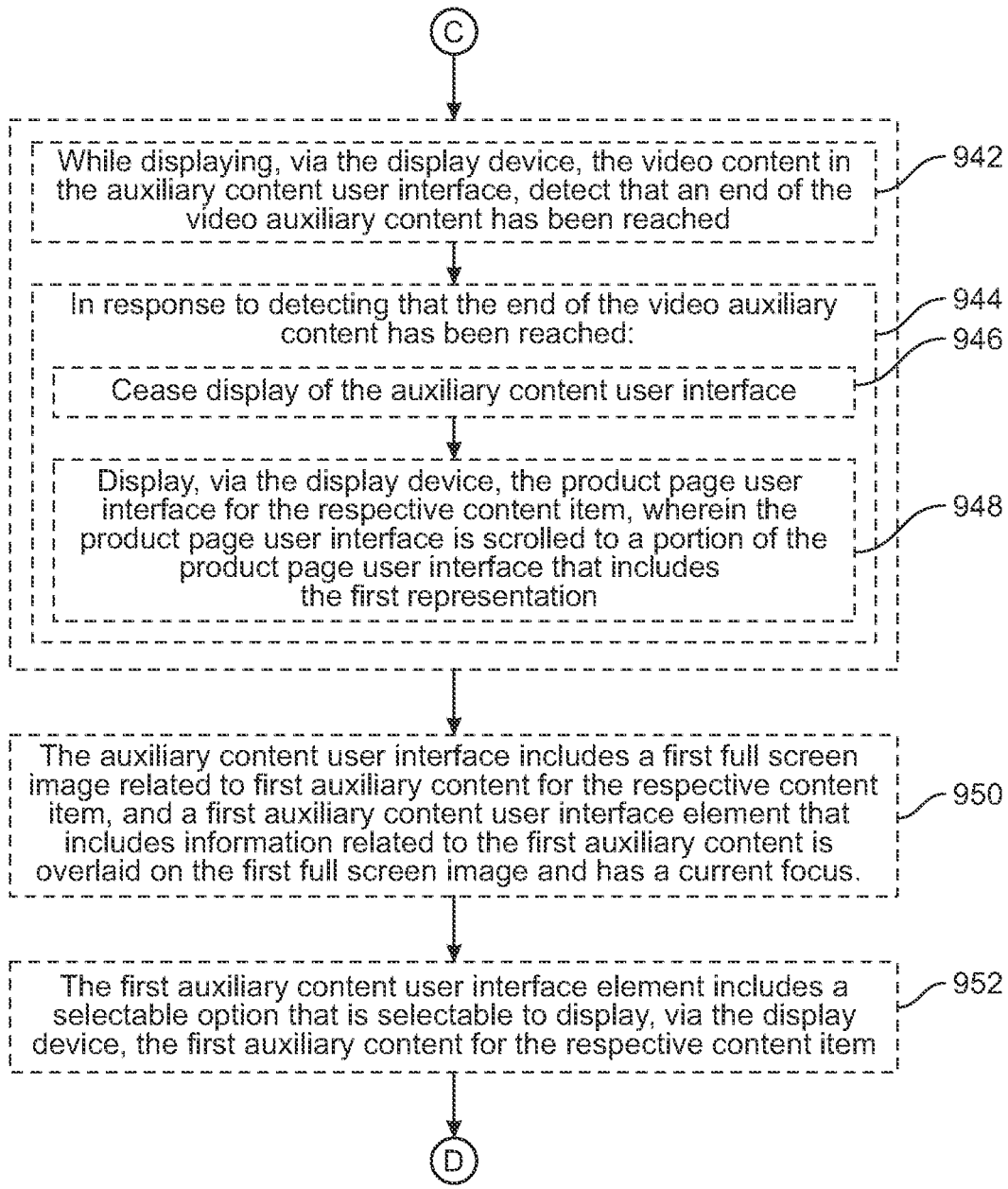
Figure 9E:
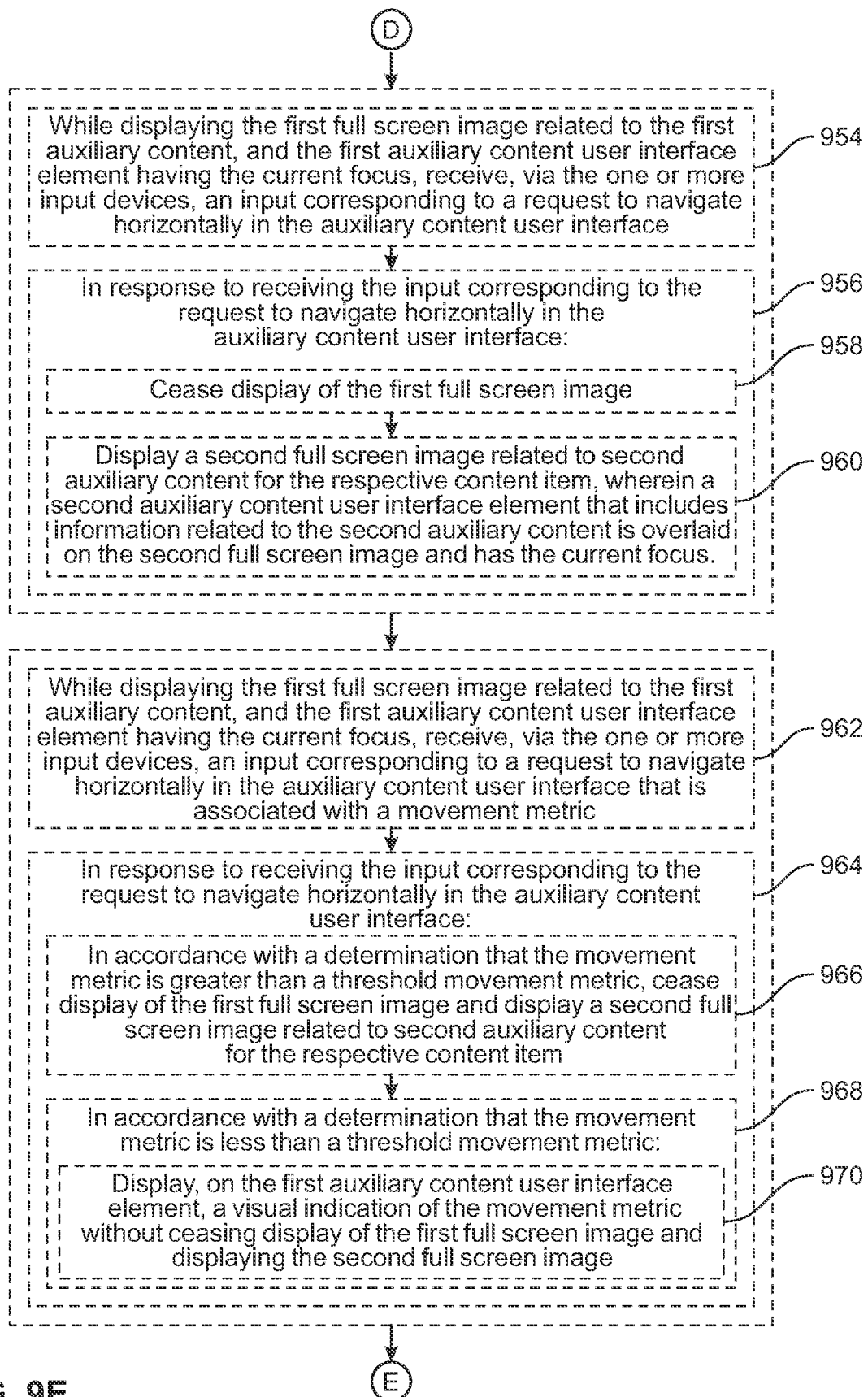
Figure 9F:
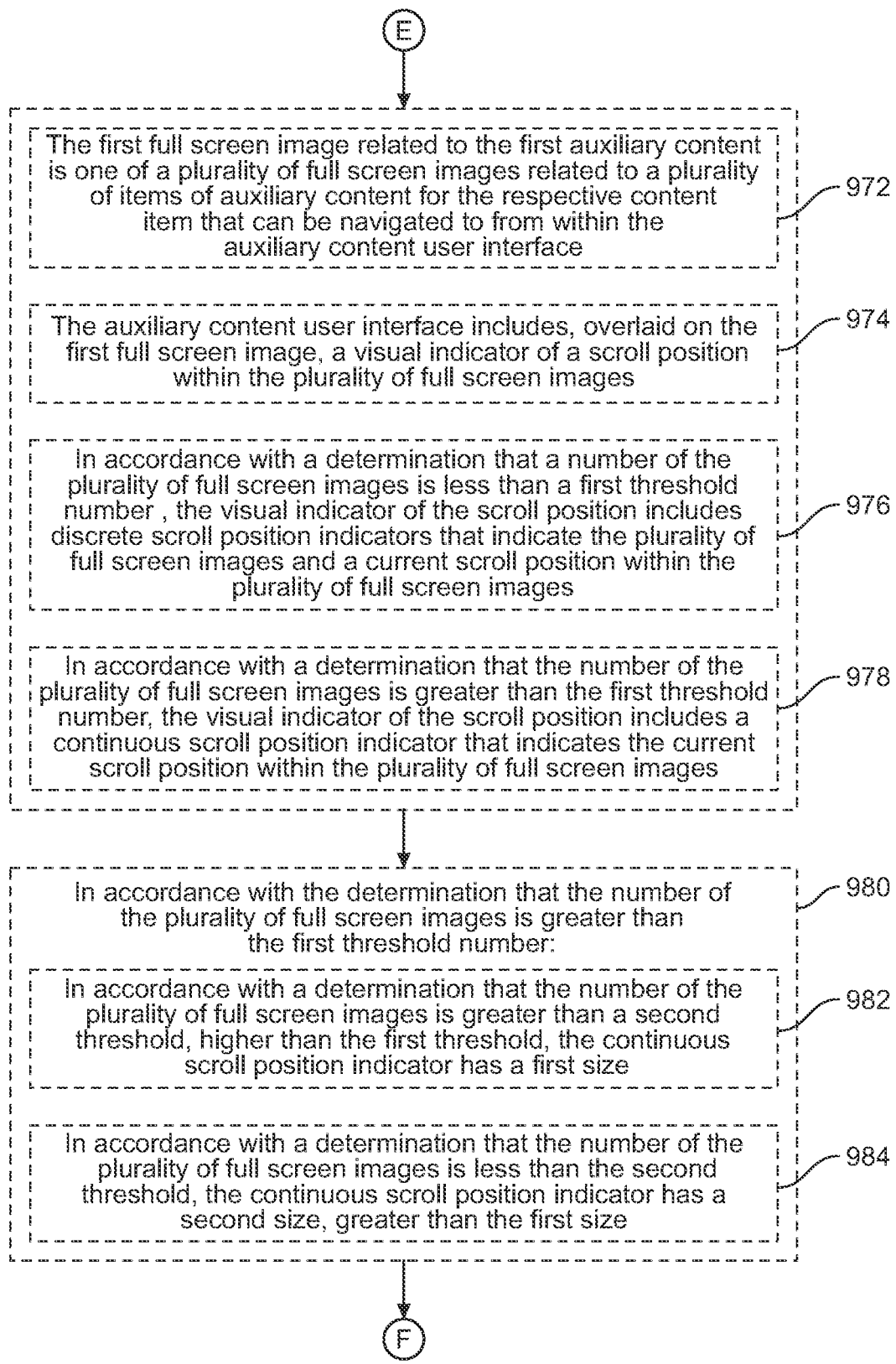
Figure 9G:
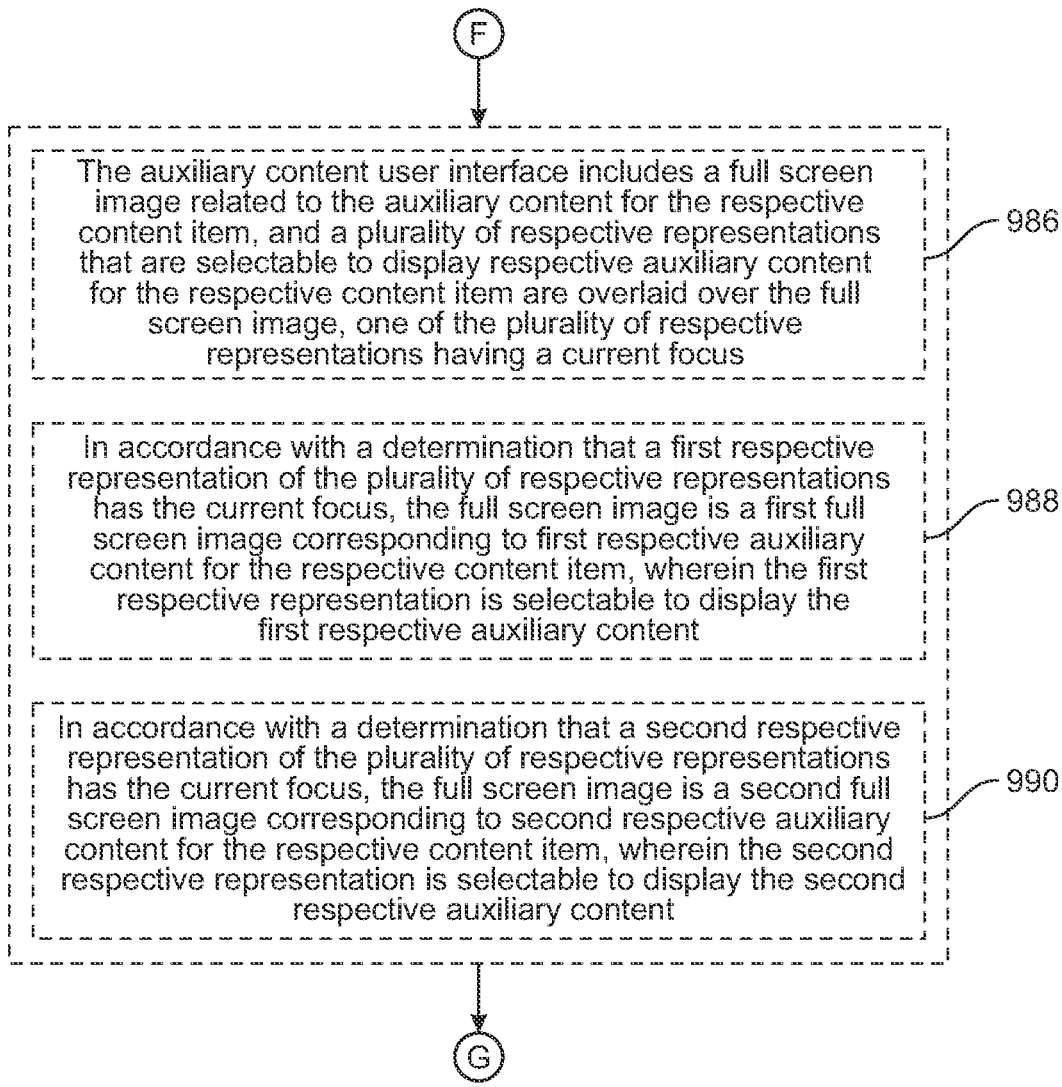
Figure 9H:
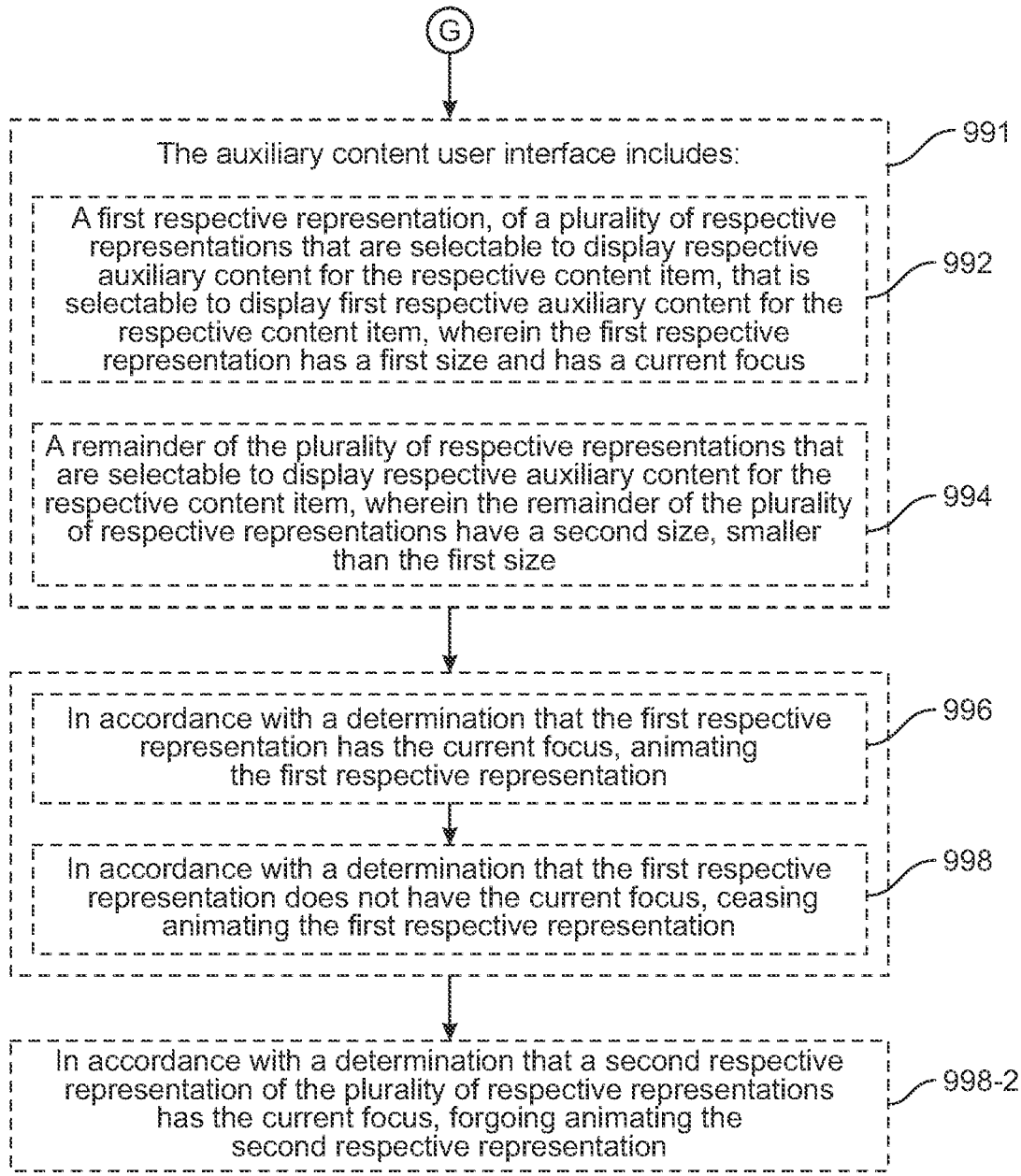

FIGS. 8A-8W illustrate exemplary ways in which an electronic device 500 presents representations of auxiliary content related to an item of content in accordance with some embodiments of the disclosure. The embodiments in these figures are used to illustrate the processes described below, including the processes described with reference to FIGS. 9A-9H.

FIG. 8A illustrates a product page user interface 802 of a content application. The product page user interface 802 includes information about a series of episodic content available for playback with the content application, as described above with reference to FIGS. 6S-6X and 6AA-6FF. The product page user interface 802 includes a motion image 804 corresponding to the next episode in the series of episodes based on the user's watching progress, an indication 806 of the provider that provides access to the content series in the content application, a selectable option 808 that, when selected, causes the electronic device 500 to play the next episode, a selectable option 810 that, when selected, causes the electronic device 500 to add the series to an up next queue of the content application, and information 812 about the series. As shown in FIG. 8A, the user scrolls (e.g., with contact 803) down in the user interface.

In response to the user's scrolling in FIG. 8A, the electronic device 500 scrolls the product page user interface. As shown in FIG. 8B, the electronic device 500 presents a row 814 of representations of episodes in the content series and a row 818 of descriptions of the episodes. Additionally, the electronic device 500 presents an indication 816 of which episode is the current episode based on the user's watching progress. The user scrolls (e.g., with contact 803) down in the user interface.

In FIG. 8C, the electronic device 500 presents the next part of the product page user interface that includes a representation 820 of auxiliary content related to the series of content. The representation 820 includes an animated background image 824 related to the auxiliary content and a selectable option 822 that, when selected, causes the electronic device 500 to present the auxiliary content related to the content series. The electronic device 500 also displays a row 826 of representations of bonus material related to the content series. The user selects (e.g., with contact 803) the option 822 to display the auxiliary content user interface.

FIG. 8D illustrates the auxiliary content user interface 828a that is displayed by the electronic device 500 in response to the user's selection in FIG. 8C. The auxiliary content user interface 828a includes a selectable option 830a that, when selected, causes the electronic device 500 to display auxiliary video content associated with the content series, a description 832a of the auxiliary video content, and an image 836a corresponding to the auxiliary content. The selectable option 830a, description 832a, and image 836a are overlaid on a background image related to the auxiliary video content. The background image 834a is an image that relates to the auxiliary content that plays in response to selection of option 830a. Similarly, the overlay image 836a is an icon or illustration that is different from the background image 834a that also relates to the auxiliary content that plays in response to detecting selection of option 830a. The auxiliary content user interface 828a further includes a pagination indicator 838a that indicates the relative position of the auxiliary content user interface relative to other auxiliary content user interfaces the electronic device is able to present in response to detecting a horizontal swipe.

As shown in FIG. 8D, the electronic device 500 detects slight motion of contact 803 on the touch sensitive surface 451 of remote control device 510. For example the user rolls or shifts their finger slightly while touching the touch-sensitive surface 451. In response to detecting the movement of contact 803 illustrated in FIG. 8D, the electronic device 500 displays the selectable option 830a with a visual indication 840 of the motion of the contact 803 shown in FIG. 8E. For example, device 500 slightly tilts or otherwise changes the shading of representation 830a in accordance with the touch input.

In FIG. 8E, the electronic device 500 detects a swipe (e.g., movement of contact 803) on the touch-sensitive surface 451. In response to detecting the swipe illustrated in FIG. 8E, the electronic device 500 ceases displaying the auxiliary content user interface 828a illustrated in FIG. 8E and displays the next auxiliary content user interface 828b illustrated in FIG. 8F.

The auxiliary content user interface 828b illustrated in FIG. 8F includes elements 830b, 832b, 834b, 836b and 838b that are similar to the elements 830a, 832a, 834a, 836a, and 838a of the auxiliary content user interface 828a illustrated in FIG. 8E. The elements 830b, 832b, 834b, 836b, and 838b correspond to the same item of auxiliary content, which is different from the item of auxiliary content to which elements 830a, 832a, 834a, 836a, and 838a correspond. As shown in FIG. 8F, after scrolling to the auxiliary content page, the pagination indicator 838b updates to indicate the updated position within the other pages of auxiliary user interfaces.

The electronic device 500 is able to display different styles of pagination indicators in auxiliary content user interfaces depending on the number of auxiliary content user interfaces that the user is able to present in response to a horizontal swipe input.

As shown in FIG. 8F, when the number 842 of pages of auxiliary content user interfaces is less than a first threshold 844 (e.g., 6, 8, 10 etc. pages), the electronic device 500 presents the pagination indicator 838*b* illustrated in FIG. 8F. The pagination indicator 838*b* includes a discrete indication of the current location in the plurality of auxiliary content user interfaces.

FIG. 8G illustrates another style of pagination indicator 838*c* that the electronic device 500 displays in an auxiliary content user interface 828*c*. The auxiliary content user interface 828*c* includes elements 830*c*, 832*c*, 834*c*, 836*c* and 838*c* that are similar to the elements 830*a*, 832*a*, 834*a*, 836*a*, and 838*a* of the auxiliary content user interface 828*a* illustrated in FIG. 8E. As shown in FIG. 8G, when the number of pages 842 is greater than the first threshold 844 (e.g., 6, 8, 10 etc. pages) but less than a second threshold 846 (e.g., 20, 30, etc. pages), the electronic device presents pagination indicator 838*c* shown in auxiliary content user interface 828*c*. The pagination indicator 838*c* includes a continuous indication 838*c* of the relative position of the auxiliary content user interface 828*c* relative to the other pages of auxiliary content user interfaces.

FIG. 8H illustrates another style of pagination indicator 838*d* that the electronic device 500 displays in an auxiliary content user interface 828*d*. The auxiliary content user interface 828*d* includes elements 830*d*, 832*d*, 834*d*, 836*d* and 838*d* that are similar to the elements 830*a*, 832*a*, 834*a*, 836*a*, and 838*a* of the auxiliary content user interface 828*a* illustrated in FIG. 8E. As shown in FIG. 8H, when the number of pages 842 is greater than the second threshold 846 (e.g., 20, 30, etc. pages), the electronic device presents pagination indicator 838*d* shown in auxiliary content user interface 828*d*. The pagination indicator 838*d* includes a continuous indication 838*d* of the relative position of the auxiliary content user interface 828*d* relative to the other pages of auxiliary content user interfaces. The pagination indicator 838*d* is a smaller size (e.g., smaller horizontal and/or vertical size) than pagination indicator 838*c* illustrated in FIG. 8G. As shown in FIG. 8H, the user selects (e.g., with contact 803) a button to navigate backward in the user interface back to the product page user interface (e.g., "menu" button on remote 510).

FIG. 8I illustrates presentation of the product page user interface in response to the user's selection in FIG. 8H. The product page user interface illustrated in FIG. 8I is the same as the product page user interface illustrated in FIG. 8C. The current focus is on option 822, which is the option the user selected to view the user interface described above with reference to FIGS. 8D-8H. As shown in FIG. 8I, the user scrolls down (e.g., with motion of contact 803) to scroll the product page user interface.

In response to scrolling including the scrolling illustrated in FIG. 8I, the electronic device scrolls the product page user interface to the location illustrated in FIG. 8J. As shown in FIG. 8J, the electronic device 500 presents the row 826 of representations of bonus material related to the content series and a representation 848*a* of an item of auxiliary content. The representation 848*a* of the item of auxiliary content is displayed in a row that includes part of another representation 848*b* of an item of auxiliary content. The representation 848*a* of the item of auxiliary content includes a motion background 850*a* related to the item of auxiliary content that the electronic device 500 presents in response to detecting selection of the representation 848*a* (e.g., the background animates when representation 848*a* receives the current focus, and stops animating when it loses the current focus).

As shown in FIG. 8J, while the current focus is on the representation 848*a* of an item of auxiliary content, the electronic device 500 detects a horizontal swipe (e.g., with contact 803) on the touch-sensitive surface 451 of the remote control device 510.

In response to the input illustrated in FIG. 8J, the electronic device 500 scrolls the row of representations of auxiliary content to display entire representation 848*b*, part of representation 848*a*, and part of representation 848*c*, as shown in FIG. 8K. The representation 848*b* of the auxiliary content includes a motion background 850*b* related to the auxiliary content presented by the electronic device 500 in response to detecting selection of the representation 848*b* (e.g., the background animates when representation 848*b* receives the current focus, and stops animating when it loses the current focus). As shown in FIG. 8K, the user selects (e.g., with contact 803) the representation 848*b*.

In response to the user's selection in FIG. 8K, the electronic device displays auxiliary video content corresponding to the selected representation 848*b*, as shown in FIG. 8L. As shown in FIG. 8L, while the electronic device 500 displays the video content, the electronic device 500 detects contact 803 on the touch-sensitive surface 451 of the remote control device 510 (e.g., a tap input, a resting of finger without a click, a click input).

As shown in FIG. 8M, in response to detecting the contact illustrated in FIG. 8L, the electronic device 500*a* displays a playback progress bar 854, an image 856 related to the auxiliary video content 852, and metadata 858 related to the auxiliary video content overlaid on the auxiliary video content 852. The metadata 858 includes information such as the title of the auxiliary video content, the title of the series of content to which the auxiliary content is related, the runtime of the auxiliary content, and the like. The image 856 is an illustration, icon, or other image related to the auxiliary content and/or the content series to which the auxiliary content is related. A click input detected on touch-sensitive surface 451 optionally initiates a scrubbing process in which right/left swipe inputs detected on touch-sensitive surface 451 cause scrubbing (e.g., fast forwarding, rewinding) through the auxiliary content (video content F).

When the auxiliary content 852 finishes playing, the electronic device 500 presents the product page user interface again. As shown in FIG. 8M, while the playback progress 858 of the auxiliary video content 852 is partway through the auxiliary video content 852, the electronic device 500 continues to play the auxiliary video content 852.

In FIG. 8N, the playback position 858 of the auxiliary video content 852 reaches the end of the auxiliary video content 852. In response to reaching the end of the auxiliary video content in FIG. 8N, the electronic device 500 presents the product page user interface scrolled to the same location and with the current focus on representation 848*b* in FIG. 8K again, as shown in FIG. 8O.

In FIG. 8O, the user selects (e.g., with contact 803) the representation 848*b* of the auxiliary video content. In FIG. 8P, in response to the user's selection in FIG. 8O, the electronic device 500 presents the auxiliary video content 852. While playing the auxiliary video content 852, the electronic device 500 detects selection (e.g., with contact 803) of the option to navigate backward in the user interface (e.g., "menu" button on remote 510). In response to the user's selection in FIG. 8P, the electronic device 500 presents the part of the product page that includes the representation 848b of the auxiliary content scrolled to the same location and with the current focus on representation 848b in FIG. 8K again, as shown in FIG. 8Q.

In FIG. 8Q, the electronic device 500 detects a user input to scroll the product page user interface (e.g., movement of contact 803). In response to one or more scrolling inputs including the input illustrated in FIG. 8Q, the electronic device 500 displays the section of the product page user interface illustrated in FIG. 8R.

As shown in FIG. 8R, the product page user interface includes a row 861 of representations of content items related to the content series of the product page and a representation 860 of auxiliary content. The representation 860 of auxiliary content includes a plurality of selectable options 862a-d that, when selected, cause the electronic device 500 to present a respective auxiliary content user interface. The selectable options 862a-d are overlaid on a background image 864 related to the auxiliary content represented by options 862a-d (e.g., a motion background image that optionally animates when one of the options 862a-d has the current focus and stops animating when the current focus is not on one of the options 862a-d). While a first selectable option 862a has the current focus of the electronic device 500, the representation 860 of the auxiliary content includes an overlay image 866a (e.g., icon, illustration, etc.) related to the first option 862a and text 868a related to the first selectable option 862a.

As shown in FIG. 8R, the electronic device 500 detects a swipe input (e.g., movement of contact 803 on touch-sensitive surface 451 of remote control device 510) corresponding to an input to move the current focus to the right. In response to the input illustrated in FIG. 8R, the electronic device 500 moves the current focus from the first option 862a to the second option 862b as shown in FIG. 8S. When the current focus moves from the first option 862a to the second option 862b, the electronic device 500 updates the representation 860 of the auxiliary content to include a second image 866b overlaid on the background image 864 and second text 868b that corresponds to the second option 862b. When the current focus moves from option 862a to option 862b, the background image 864 does not change. As shown in FIG. 8S, the user selects (e.g., with contact 803) the second option 862b.

In response to the user's selection in FIG. 8S, the electronic device displays the auxiliary content user interface 870 illustrated in FIG. 8T. The auxiliary content user interface 870 includes a plurality of selectable options 874a-e that, when selected, cause the electronic device 500 to display a respective item of auxiliary content or a respective other auxiliary content user interface. The selectable options 874a-e are overlaid on a motion image 872a (e.g., an animated image, video content, etc.) that corresponds to the option 874a that has the current focus of the electronic device 500. As shown in FIG. 8T, the electronic device 500 detects a swipe input (e.g., motion of contact 803 on the touch-sensitive surface 451 of remote control device 510) that corresponds to an input to move the current focus to the right.

FIG. 8U illustrates the auxiliary content user interface 870 in response to the swipe input illustrated in FIG. 8T. As shown in FIG. 8U, the electronic device 500 moves the current focus from the first option 874a to the second option 874b in accordance with the swipe input. In response to moving the focus from the first option 874a to the second option 874b, the electronic device 500 updates the auxiliary content user interface 870 to include a background image 872b that corresponds to the second option 874b.

FIG. 8V illustrates another auxiliary content user interface 876. The auxiliary content user interface includes a large selectable option 882 and a plurality of small selectable options 880a-e. Each selectable option 882 and 880a-e is selectable to display another auxiliary content user interface or an item of auxiliary content. While the large selectable option 882 has the current focus of the electronic device 500, the large selectable option 882 includes a motion background 878a. The small selectable options 880a-e each include a respective image representing the auxiliary content or auxiliary content user interface that is presented in response to detecting selection of one or more respective small selectable options 880a-e.

As shown in FIG. 8V, the electronic device 500 detects a swipe input (e.g., movement of contact 803 on touch-sensitive surface 451 of the remote control device 510) that corresponds to a user input to move the current focus down in the user interface. In response to the input illustrated in FIG. 8V, the electronic device 500 updates the auxiliary content user interface 876, as shown in FIG. 8W to move the focus from the large option 882 to a small option 880a. When the current focus moves from the large option 882 to the small option 880a, the electronic device 500 ceases to animate the image 878b included in the large option, such as by displaying a paused frame of the motion background. The small options 880a-e, including option 880a, do not animate when they have the current focus.

Although specific representations 822, 848, and 860 of auxiliary content are shown as being selectable to display specific auxiliary content user interfaces, such as the auxiliary content user interfaces described above with reference to FIGS. 8D-8H, 8L-8N, 8P, and 8T-8W, it should be understood that representations of auxiliary content are optionally selectable to display any type of auxiliary content user interface without departing from the scope of the disclosure. In other words, the representations of auxiliary content are interchangeable and the auxiliary content user interfaces are interchangeable.

FIGS. 9A-9H are flow diagrams illustrating a method 900 of presenting representations of auxiliary content related to an item of content in accordance with some embodiments of the disclosure. The method 900 is optionally performed at an electronic device such as device 100, device 300, device 500, device 501, device 510, and device 511 as described above with reference to FIGS. 1A-1B, 2-3, 4A-4B and 5A-5C. Some operations in method 900 are, optionally combined and/or order of some operations is, optionally, changed.

As described below, the method 900 provides ways to present representations of auxiliary content related to an item of content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 8C, an electronic device 500 in communication with a display device 514 and one or more input devices 510 (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device) displays (902), via the display device, a product page user interface for a respective content item (e.g., movie, series of episodic content, etc.), wherein the product page user interface includes a first representation 820 corresponding to auxiliary content created for the respective content item (e.g., the product page includes information about the content item, such as studio, genre, cast and crew, synopsis, available ways for the user to gain entitlement to watch the item of content, options to play the content, and one or more representations of auxiliary content created for the respective content item). For example, the product page for a series of episodic content includes a description of the series, a selectable option that, when selected, causes the electronic device to play the next episode in the series based on which episode the user most recently watched, representations of the episodes in the series that are each selectable to play a respective episode, and one or more representations corresponding to auxiliary content created for the series of episodic content. The one or more representations of auxiliary content optionally include text and images that represent the auxiliary content.

In some embodiments, such as in FIG. 8C, while displaying the product page user interface, the electronic device 500 receives (904), via the one or more input devices 510, an input directed to the first representation 820.

In some embodiments, in response to receiving the input directed to the first representation (906), the electronic device 500 ceases (908) display of the product page user interface for the respective content item, such as in FIG. 8D.

In some embodiments, in response to receiving the input directed to the first representation (906), the electronic device 500 displays (910), via the display device, an auxiliary content user interface 828*a* that includes the auxiliary content 832*a*, 834*a*, 836*a* created for the respective content item. For example, displaying a separate user interface dedicated to the auxiliary content, separate from the product page user interface. In some embodiments, the auxiliary content is content to which the user of the electronic device has access by virtue of the fact that the user has access to the respective content item (e.g., because the user purchased the respective content item, the user subscribed to the channel on which the respective content item is available, etc). In some embodiments, the auxiliary content is not content that can be purchased separately or independently from the respective content item, and is only available to the user once the user has access to the respective content item. The auxiliary content optionally includes text, images, audio content and/or video content related to the respective content item. In some embodiments, the auxiliary content includes video content related to the respective content item that is not the content item itself. The auxiliary content user interface optionally includes additional menus and selectable options that are selectable to present items of auxiliary content. In some embodiments, the auxiliary content user interface is the auxiliary content itself. In other words, in some embodiments, in response to detecting selection of the first representation of the auxiliary content, the electronic device presents the auxiliary content.

The above-described manner of presenting the representation of the auxiliary content created for the respective content item in the product page user interface of the respective content item allows the electronic device to present the representation of the auxiliary content item along with other content and information related to the respective content item in the product page user interface, which simplifies the interaction between the user and the electronic device and enhances the operability of the electronic device and makes the user-device interface more efficient (e.g., by reducing the number of inputs needed to browse all information and content related to the respective content item, including the auxiliary content), which additionally reduces power usage and improves battery life of the electronic device by enabling the user to use the electronic device more quickly and efficiently.

In some embodiments, such as in FIG. 8C, the first representation 820 corresponding to the auxiliary content occupies a full width of the product page user interface and includes a first selectable option 822 overlaid on the first representation, and the input directed to the first representation includes selection of the first selectable option 822 (912). In some embodiments, the first representation includes a background image that is a still image or an animated motion image. Optionally, information about the auxiliary content (e.g., title, summary, etc.) and the first selectable option are overlaid on the image. The electronic device is optionally able to direct its input focus to the first selectable option and, while the input focus is on the first selectable option, selection of the selectable option causes the electronic device to present the corresponding auxiliary content.

The above-described manner of presenting the first option overlaid on the first representation allows the electronic device to concurrently present the option and the first representation, which simplifies the interaction between the user and the electronic device and enhances the operability of the electronic device and makes the user-device interface more efficient (e.g., by reducing the number of inputs needed to select the first option while viewing the first representation), which additionally reduces power usage and improves battery life of the electronic device by enabling the user to use the electronic device more quickly and efficiently.

In some embodiments, the first representation 820 comprises a moving image background 824 (914). In some embodiments, the moving image background is video content or another animated or moving image.

The above-described manner of presenting the first representation with the moving image background allows the electronic device to present a plurality of images without a user input for navigating through the plurality of images, which simplifies the interaction between the user and the electronic device and enhances the operability of the electronic device and makes the user-device interface more efficient (e.g., by reducing the number of inputs needed to view the plurality of images), which additionally reduces power usage and improves battery life of the electronic device by enabling the user to use the electronic device more quickly and efficiently.

In some embodiments, such as in FIG. 8J, the first representation 848*a* is one of a plurality of representations 848*a* and 848*b* corresponding to auxiliary content (e.g., each representation selectable to view different auxiliary content for the respective content item) that are horizontally scrollable in the product page user interface, and the input directed to the first representation 848*a* includes selection of the first representation 848*a* that corresponds to first auxiliary content for the respective content item (916). In some embodiments, the electronic device presents part of a second representation horizontally adjacent to the first representation. Optionally, in response to detecting an input to horizontally scroll the row of representations, the electronic device updates the user interface to present the second representation and part of the first representation. In some embodiments, the first and second representations comprise motion images with information about the auxiliary content overlaid on the motion image.

The above-described manner of presenting the plurality of horizontally scrollable representations allows the electronic device to present the user with multiple representations of auxiliary content within the product page user interface, which simplifies the interaction between the user and the electronic device and enhances the operability of the electronic device and makes the user-device interface more efficient (e.g., by enabling the user to browse the representations without navigating away from the product page user interface), which additionally reduces power usage and improves battery life of the electronic device by enabling the user to use the electronic device more quickly and efficiently.

In some embodiments, such as in FIG. 8S, the first representation 860 is an image 864 on the product page user interface that includes a plurality of respective representations 862a-d corresponding to auxiliary content overlaid on the background image 864 (e.g., each representation selectable to view different auxiliary content for the respective content item) (918), and the input directed to the first representation 860 includes selection (e.g., with contact 803) of a first respective representation 862b of the plurality of respective representations that corresponds to first auxiliary content for the respective content item. In some embodiments, the electronic device presents an image that is as wide as the width of the product page user interface with a plurality of selectable representations overlaid on the image. Optionally, each representation includes text and/or an image corresponding to auxiliary content that is presented in response to detecting selection of a respective representation. In some embodiments, the electronic device also displays information about the group of items of auxiliary content overlaid on the image. As the user horizontally scrolls to move the input focus of the electronic device from one representation to another, the electronic device displays another image (e.g., an icon, illustration, etc.) that corresponds to the representation that has the current focus overlaid on the background image. In some embodiments, the background image does not change when the current focus moves from representation to representation.

The above-described manner of presenting a plurality of respective representations overlaid on an image in the product page user interface allows the electronic device to concurrently present multiple representations of auxiliary content, which simplifies the interaction between the user and the electronic device and enhances the operability of the electronic device and makes the user-device interface more efficient (e.g., by reducing the number of inputs needed to browse the representations of auxiliary content), which additionally reduces power usage and improves battery life of the electronic device by enabling the user to use the electronic device more quickly and efficiently.

In some embodiments, such as in FIG. 8R, in accordance with a determination that the first respective representation 862a of the plurality of respective representations 862a-d has a current focus, the image 864 is displayed with first information 866a and 868a, corresponding to the first respective representation 862a, overlaid on the image 864 (920) (e.g., the electronic device presents information about the auxiliary content that is presented in response to detecting selection of the first respective representation). For example, the electronic device displays a title or description of the auxiliary content below the first respective representation when the first respective representation has the current focus. In some embodiments, in addition to displaying the first information that corresponds to the first respective representation, the electronic device also presents a first image (e.g., an icon or illustration) that corresponds to the first respective representation overlaid on the background image.

In some embodiments, such as in FIG. 8S, in accordance with a determination that a second respective representation 862b of the plurality of respective representations 862a-d has the current focus, the image 864 is displayed with second information 866b and 868b, corresponding to the second respective representation 862b, overlaid on the image. In some embodiments, the electronic device presents information about the auxiliary content that is presented in response to detecting selection of the second respective representation. For example, the electronic device displays a title or description of the auxiliary content below the second respective representation when the second respective representation has the current focus. In some embodiments, in addition to displaying the second information that corresponds to the second respective representation, the electronic device also presents a second image (e.g., an icon or illustration) that corresponds to the second respective representation overlaid on the background image.

The above-described manner of displaying information overlaid on the image that corresponds to the respective representation that has the current focus allows the electronic device to provide additional information about the representation with the current focus prior to detecting selection of one of the representations, which simplifies the interaction between the user and the electronic device and enhances the operability of the electronic device and makes the user-device interface more efficient (e.g., by reducing the number of inputs needed to view the information about the respective representation that has the current focus), which additionally reduces power usage and improves battery life of the electronic device by enabling the user to use the electronic device more quickly and efficiently.

In some embodiments, such as in FIG. 8S, the first representation 860 is an auxiliary content representation of a first type (e.g., the representation includes images and information presented in a first arrangement), is located at a first location in the product page user interface, and corresponds to first auxiliary content (924) (e.g., In response to detecting selection of the first representation, the electronic device optionally presents the first auxiliary content).

In some embodiments, such as in FIG. 8Q, the product page user interface further includes a second representation 848b that is located at a second location in the product page user interface (e.g., the representation includes images and information presented in a second arrangement that is different from the first arrangement), wherein the second representation 858b is an auxiliary content representation of a second type, different than the first type, and corresponds to second auxiliary content (926). In response to detecting selection of the second representation, the electronic device optionally presents the second auxiliary content. For example, the product page includes a first representation of first auxiliary content that includes a background image occupying the width of the product page with one selectable option that, when selected, causes the electronic device to display the first auxiliary content at a location in the product page that is in between a section including information about the episodes of the content and bonus material of the content and includes a second representation of auxiliary content that is within a horizontally scrollable row of representations of auxiliary content that is selectable to present the second auxiliary content and is located between the bonus content section of the product page and a section of the product page that includes representations of content that are related to the content represented by the product page.

The above-described manner of including multiple representations of auxiliary content in the product page user interface allows the electronic device to enable the user to browse the representations of auxiliary content from the product page user interface which simplifies the interaction between the user and the electronic device and enhances the operability of the electronic device and makes the user-device interface more efficient (e.g., by reducing the inputs needed to browse the representations of auxiliary content), which additionally reduces power usage and improves battery life of the electronic device by enabling the user to use the electronic device more quickly and efficiently.

In some embodiments, such as in FIG. 8L, the auxiliary content created for the respective content item is video content 852 that is playing when the auxiliary content user interface is displayed (928). In some embodiments, in response to detecting selection of the first representation, the electronic device begins playing a video. Optionally, the electronic device ceases displaying the product page user interface when it plays the video.

The above-described manner of presenting auxiliary video content in response to detecting selection of a representation of auxiliary content displayed in the product page user interface allows the electronic device to enable browsing of the auxiliary video content from the product page user interface, which simplifies the interaction between the user and the electronic device and enhances the operability of the electronic device and makes the user-device interface more efficient (e.g., by reducing the number of inputs needed to play the video content from the product page user interface), which additionally reduces power usage and improves battery life of the electronic device by enabling the user to use the electronic device more quickly and efficiently.

In some embodiments, such as in FIG. 8L, while displaying, via the display device 514, the video content 852 in the auxiliary content user interface, the electronic device 500 receives (930), via the one or more input devices, an input including a contact 803 (e.g., a tap or click) detected on a touch-sensitive surface 451 of a remote control device 510.

In some embodiments, such as in FIG. 8M, in response to receiving the input including the contact detected on the touch-sensitive surface of the remote control device, the electronic device 500 displays (932), via the display device 514, contextual information 856 and 858 about the video auxiliary content 852 and a progress bar 854 indicating playback progress through the video auxiliary content overlaid on the video auxiliary content. In some embodiments, the contextual information is metadata about the video content, such as a title, description, runtime of the video, an indication of the content series to which the video is related, and the like. Optionally, in response to the contact, the electronic device also displays an image related to the video content overlaid on the video content. In some embodiments, the progress bar is a scrubber bar that the user is able to select to change the current playback position within the auxiliary video content.

The above-described manner of displaying the contextual information and the progress bar in response to detecting the tap while playing the auxiliary video content allows the electronic device to continue playing the video while displaying the progress bar and contextual information, which simplifies the interaction between the user and the electronic device and enhances the operability of the electronic device and makes the user-device interface more efficient (e.g., by reducing the amount of time it takes to finish the auxiliary video content and view the progress bar and contextual information), which additionally reduces power usage and improves battery life of the electronic device by enabling the user to use the electronic device more quickly and efficiently.

In some embodiments, such as in FIG. 8P, while displaying, via the display device 514, the video content 852 in the auxiliary content user interface, the electronic device 500 receives (934), via the one or more input devices 510, an input corresponding to a request to navigate back to the product page user interface for the respective content item (e.g., selection of a "menu" button on a remote control device).

In some embodiments, such as in FIG. 8Q, in response to receiving the input corresponding to the request to navigate back to the product page user interface for the respective content item (936), the electronic device 500 ceases (938) display of the auxiliary content user interface (e.g., the electronic device stops playing the auxiliary video content).

In some embodiments, such as in FIG. 8Q, in response to receiving the input corresponding to the request to navigate back to the product page user interface for the respective content item (936), the electronic device 500 displays (940), via the display device, the product page user interface for the respective content item, wherein the product page user interface is scrolled to a portion of the product page user interface that includes the first representation 848*b* (e.g., the first representation has the current focus). In some embodiments, while displaying the first representation in the product page user interface, in response to detecting selection of the first representation, the electronic device ceases to display the product page user interface and plays the auxiliary video content. Optionally, while playing the auxiliary video content, in response to detecting the input to navigate backwards, the electronic device ceases playing the auxiliary video content and displays the first representation in the product page user interface having the current focus.

The above-described manner of displaying the portion of the product page including the first representation in response to detecting the input to navigate back while presenting the auxiliary content user interface allows the electronic device to present the portion of the product page user interface the user was viewing before viewing the auxiliary content user interface in response to detecting the input to navigate backwards, which simplifies the interaction between the user and the electronic device and enhances the operability of the electronic device and makes the user-device interface more efficient (e.g., by reducing the number of inputs (e.g., scrolling inputs) needed to continue viewing the portion of the product page including the first representation after selecting the option to navigate backwards), which additionally reduces power usage and improves battery life of the electronic device by enabling the user to use the electronic device more quickly and efficiently.

In some embodiments, such as in FIG. 8N, while displaying, via the display device 514, the video content 852 in the auxiliary content user interface, the electronic device 500 detects (942) that an end of the video auxiliary content has been reached (e.g., in response to detecting selection of the first representation, the electronic device displays first auxiliary video content). Optionally, the electronic device continues playing the first auxiliary video content until the end of the first auxiliary video content.

In some embodiments, such as in FIG. 8O, in response to detecting that the end of the video auxiliary content has been reached (944), the electronic device 500 ceases (946) display of the auxiliary content user interface.

In some embodiments, such as in FIG. 8O, in response to detecting that the end of the video auxiliary content has been reached (944), the electronic device 500 displays (948), via the display device, the product page user interface for the respective content item, wherein the product page user interface is scrolled to a portion of the product page user interface that includes the first representation 848b (e.g., the first representation has the current focus). In some embodiments, after finishing the first auxiliary video content, the electronic device presents the first representation in the product page user interface.

The above-described manner of displaying the portion of the product page including the first representation in response to detecting the end of the video auxiliary content allows the electronic device to present the portion of the product page user interface the user was viewing before viewing the auxiliary content user interface in response to detecting the end of the auxiliary video content, which simplifies the interaction between the user and the electronic device and enhances the operability of the electronic device and makes the user-device interface more efficient (e.g., by reducing the number of inputs (e.g., scrolling inputs) needed to continue viewing the portion of the product page including the first representation after finishing the video auxiliary content), which additionally reduces power usage and improves battery life of the electronic device by enabling the user to use the electronic device more quickly and efficiently.

In some embodiments, such as in FIG. 8D, the auxiliary content user interface 828a includes a first full screen image 834a (e.g., a still image or a motion image, such as an animation or video content) related to first auxiliary content for the respective content item, and a first auxiliary content user interface element 832a that includes information related to the first auxiliary content that is overlaid on the first full screen image and has a current focus (950). In some embodiments, the electronic device presents text related to the first auxiliary content and a selectable option that, when selected, causes the electronic device to present the first auxiliary content (e.g., video content or another auxiliary content user interface) overlaid on the full screen image. The text and selectable option are optionally displayed in one of the corners of the background image.

The above-described manner of displaying the information overlaid on the first full screen image allows the electronic device to present the information and the full screen image at the same time, which simplifies the interaction between the user and the electronic device and enhances the operability of the electronic device and makes the user-device interface more efficient (e.g., by reducing the number of inputs needed to view the full screen image and the information), which additionally reduces power usage and improves battery life of the electronic device by enabling the user to use the electronic device more quickly and efficiently.

In some embodiments, such as in FIG. 8D, the first auxiliary content user interface element 832a includes a selectable option 830a that is selectable to display, via the display device 514, the first auxiliary content for the respective content item (952). In some embodiments, the first auxiliary content item is video content or another auxiliary content user interface. Optionally, the background image is related to the first auxiliary content.

The above-described manner of concurrently displaying the selectable option to display first auxiliary content while displaying the information about the first auxiliary content allows the electronic device to simplify the process to play the first auxiliary content after reading the information about the first auxiliary content, which simplifies the interaction between the user and the electronic device and enhances the operability of the electronic device and makes the user-device interface more efficient (e.g., by reducing the number of inputs needed to watch the first auxiliary content during or after the user reads the information about the first auxiliary content), which additionally reduces power usage and improves battery life of the electronic device by enabling the user to use the electronic device more quickly and efficiently.

In some embodiments, such as in FIG. 8E, while displaying the first full screen image 834a related to the first auxiliary content, and the first auxiliary content user interface element 832a having the current focus, the electronic device receives (954), via the one or more input devices 510, an input 803 corresponding to a request to navigate horizontally in the auxiliary content user interface (e.g., a swipe input detected on a touch sensitive surface of a remote control device or another directional input).

In some embodiments, such as in FIG. 8F, in response to receiving the input corresponding to the request to navigate horizontally in the auxiliary content user interface (956), the electronic device 500 ceases (958) display of the first full screen image 834a such as in FIG. 8E.

In some embodiments, such as in FIG. 8F, in response to receiving the input corresponding to the request to navigate horizontally in the auxiliary content user interface (956), the electronic device 500 displays (960) a second full screen image 834b related to second auxiliary content for the respective content item, such as in FIG. 8F, wherein a second auxiliary content user interface element that includes information 836b and 832b related to the second auxiliary content is overlaid on the second full screen image 834b and has the current focus. In some embodiments, the electronic device navigates between full-screen auxiliary content user interfaces that each include information about a respective item of auxiliary content and a selectable option to display the respective auxiliary content overlaid on a respective full-screen image related to the respective auxiliary content in response to detecting the horizontal directional input.

The above-described manner of displaying the second full screen image related to second auxiliary content in response to the request to navigate horizontally allows the electronic device to navigate between auxiliary content user interfaces in response to horizontal directional inputs, which simplifies the interaction between the user and the electronic device and enhances the operability of the electronic device and makes the user-device interface more efficient (e.g., by reducing the number of inputs needed to navigate between the auxiliary content user interfaces compared to, for example, requiring the user to navigate backward to select a different representation of auxiliary content on the product page user interface), which additionally reduces power usage and improves battery life of the electronic device by enabling the user to use the electronic device more quickly and efficiently.

In some embodiments, such as in FIG. 8E, while displaying the first full screen image 834a related to the first auxiliary content, and the first auxiliary content user interface element 832a having the current focus, the electronic device 500 receives (962), via the one or more input devices, an input 803 corresponding to a request to navigate horizontally in the auxiliary content user interface that is associated with a movement metric (e.g., the electronic device is able to detect a plurality of characteristics of a horizontal directional input, such as duration, length, speed, etc. of a horizontal swipe detected on a touch-sensitive surface of a remote control device). Based on the detected characteristics of the horizontal directional input, the electronic device either processes the input as a request to navigate horizontally or as a non-navigational input.

In some embodiments, such as in FIG. 8E, in response to receiving the input 803 corresponding to the request to navigate horizontally in the auxiliary content user interface (964) (e.g., the length, duration, speed, etc. of the swipe input correspond to a request to navigate horizontally in the user interface), in accordance with a determination that the movement metric is greater than a threshold movement metric, the electronic device 500 ceases (966) display of the first full screen image 834*a*, such as in FIG. 8E, and displays a second full screen image 834*b*, such as in FIG. 8F, related to second auxiliary content for the respective content item. In some embodiments, in accordance with a determination that the one or more characteristics correspond to a request to navigate horizontally (e.g., greater than a threshold length, greater than a threshold duration, greater than a threshold speed, etc.), the electronic device processes the input as a request to navigate horizontally and, in response to the input, navigates horizontally in the user interface, such as by presenting the next full-screen auxiliary content user interface.

In some embodiments, such as in FIG. 8D, in accordance with a determination that the movement metric is less than a threshold movement metric (968) (e.g., the length, duration, speed, etc. of the swipe input correspond to a non-navigational user input, such as being less than one or more of the thresholds described above), the electronic device 500 displays (970), on the first auxiliary content user interface element 830*a*, a visual indication 840 of the movement metric without ceasing display of the first full screen image 834*a* and displaying the second full screen image, such as in FIG. 8E. In some embodiments, in accordance with a determination that the one or more characteristics correspond to a non-navigational user input (e.g., based on a size, duration, speed, etc. of the input), the electronic device presents a visual indication of the input overlaid on the selectable option that, when selected, causes the electronic device to present the first auxiliary content that corresponds to the first auxiliary content user interface. For example, the electronic device presents a visual highlight (e.g., the appearance of a light shining on the user interface) overlaid on the selectable option that moves in accordance with the user input, or a tilting of the selectable option in accordance with the input.

The above-described manner of navigating horizontally in response to a request to navigate horizontally and presenting a visual indication of the movement without ceasing display of the first full screen image in response to an input that is not a navigation request allows the electronic device to indicate to the user the location of the current focus in response to the non-navigational user input, which simplifies the interaction between the user and the electronic device and enhances the operability of the electronic device and makes the user-device interface more efficient (e.g., by reducing the amount of time it takes to convey the result of making a selection in the user interface), which additionally reduces power usage and improves battery life of the electronic device by enabling the user to use the electronic device more quickly and efficiently.

In some embodiments, such as in FIG. 8E, the first full screen image 834*a* related to the first auxiliary content is one of a plurality of full screen images related to a plurality of items of auxiliary content for the respective content item that can be navigated to from within the auxiliary content user interface (972) (e.g., the auxiliary content user interface includes a plurality of full-screen pages that each include a respective background image and a respective selectable option that, when selected, causes the electronic device to present respective auxiliary content).

In some embodiments, such as in FIG. 8E, the auxiliary content user interface includes, overlaid on the first full screen image 834*a*, a visual indicator 838*a* of a scroll position within the plurality of full screen images (974) (e.g., a pagination indicator that indicates the relative position of the currently-displayed full-screen image relative to the plurality of full screen images).

In some embodiments, such as in FIG. 8F, in accordance with a determination that a number 842 of the plurality of full screen images is less than a first threshold number 844 (e.g., 3, 5, 7), the visual indicator 838*b* of the scroll position includes discrete scroll position indicators that indicate the plurality of full screen images and a current scroll position within the plurality of full screen images (976) (e.g., the electronic device displays a plurality of visual indicators next to one another (e.g., a row of dots) that each represent one of the full screen images). In some embodiments, the visual indicator representing the full-screen image that is currently displayed is presented with a visual characteristic (e.g., color, size, transparency) that is different form the visual characteristic of the other visual indicators.

In some embodiments, such as in FIG. 8G, in accordance with a determination that the number 842 of the plurality of full screen images is greater than the first threshold number 844, the visual indicator 838*c* of the scroll position includes a continuous scroll position indicator that indicates the current scroll position within the plurality of full screen images (e.g., a scroll bar). In some embodiments, the position of an indicator on the scroll bar corresponds to the relative position of the currently-displayed full-screen image relative to the other full-screen images in the plurality of full-screen images.

The above-described manner of presenting the visual indicator with the discrete scroll position in response to determining that the number of full screen images is less than the threshold number and displaying the continuous scroll position indication in response to determining that the number of full screen images is greater than the threshold number allows the electronic device to present the user with specific information about the number of full screen images when the number of full screen images is less than the threshold and present the user with an efficient indication of the relative position within the plurality of full screen images when the number of full screen images is greater than the threshold, which simplifies the interaction between the user and the electronic device and enhances the operability of the electronic device and makes the user-device interface more efficient (e.g., by presenting specific information when the number of images is below the threshold and presenting efficient information when the number of pages is above the threshold), which additionally reduces power usage and improves battery life of the electronic device by enabling the user to use the electronic device more quickly and efficiently.

In some embodiments, such as in FIG. 8H, in accordance with the determination that the number 842 of the plurality of full screen images is greater than the first threshold number 844, in accordance with a determination that the number 842 of the plurality of full screen images is greater than a second threshold 846 (e.g., 20, 30, etc.), higher than the first threshold 844, the continuous scroll position indicator 838*d* has a first size (e.g., height, width, etc.).

In some embodiments, such as in FIG. 8G, in accordance with the determination that the number 842 of the plurality of full screen images is greater than the first threshold number 844, in accordance with a determination that the number 842 of the plurality of full screen images is less than the second threshold 846, the continuous scroll position indicator 838*c* has a second size, greater than the first size. In some embodiments, in accordance with a determination that the number of the plurality of full screen images is greater than the second threshold, the scroll position indication is displayed at a smaller size and in accordance with a determination that the number of plurality of full screen images is less than the second threshold, the scroll position indicator is displayed at a larger size.

The above-described manner of displaying the scroll position indicator at the first size in response to determining that the number of full screen images is greater than the second threshold and displaying the scroll position indicator at the second size in response to determining that the number of full screen images is less than the second threshold allows the electronic device to present the indicator at a larger size that is easier to see when the number of full screen images is below the threshold and present the indicator at a smaller size that makes the relative position easier to differentiate from page to page when the number of images is above the second threshold, which simplifies the interaction between the user and the electronic device and enhances the operability of the electronic device and makes the user-device interface more efficient (e.g., by increasing the legibility of the position indicator which reduces the amount of time it takes for the user to read the scroll position indicator), which additionally reduces power usage and improves battery life of the electronic device by enabling the user to use the electronic device more quickly and efficiently.

In some embodiments, such as in FIG. 8T, the auxiliary content user interface 870 includes a full screen image 872*a* (e.g., still image, motion background, video background, etc.) related to the auxiliary content for the respective content item, and a plurality of respective representations 874*a-e* that are selectable to display respective auxiliary content for the respective content item are overlaid over the full screen image, one of the plurality of respective representations having a current focus (986). In some embodiments, in response to detecting selection of one of the respective representations, the electronic device presents respective auxiliary content (e.g., a video, another auxiliary content user interface, etc.) corresponding to the representation. Each representation optionally includes one or more of text and an image.

In some embodiments, such as in FIG. 8T, in accordance with a determination that a first respective representation 874*a* of the plurality of respective representations has the current focus, the full screen image 872*a* is a first full screen image corresponding to first respective auxiliary content for the respective content item, wherein the first respective representation 874*a* is selectable to display the first respective auxiliary content (988) (e.g., the full screen image over which the representations are overlaid corresponds to the representation that has the current focus of the electronic device).

In some embodiments, such as in FIG. 8U, in accordance with a determination that a second respective representation 874*b* of the plurality of respective representations has the current focus, the full screen image is a second full screen image 872*b* corresponding to second respective auxiliary content for the respective content item, wherein the second respective representation 874*b* is selectable to display the second respective auxiliary content (990). In some embodiments, while the current focus is on the first representation, the electronic device presents a full-screen image corresponding to the first representation. In response to detecting an input to change the current focus to the second representation, the electronic device optionally changes the current focus from the first representation to the second representation, ceases displaying the full screen image corresponding to the first representation, and displays a full screen image corresponding to the second representation.

The above-described manner of displaying a full screen image that corresponds to the representation that has the current focus while displaying the plurality of representations overlaid on the full screen image allows the electronic device to display the full screen image within the user interface that includes the plurality of representations, which simplifies the interaction between the user and the electronic device and enhances the operability of the electronic device and makes the user-device interface more efficient (e.g., by reducing the number of inputs needed to view the full screen image associated with the representation), which additionally reduces power usage and improves battery life of the electronic device by enabling the user to use the electronic device more quickly and efficiently.

In some embodiments, such as in FIG. 8V, the auxiliary content user interface includes (991) a first respective representation 882, of a plurality of respective representations 882 and 880*a-e* that are selectable to display respective auxiliary content for the respective content item, that is selectable to display first respective auxiliary content for the respective content item, wherein the first respective representation 880 has a first size (e.g., a relatively large size) and has a current focus (992). In some embodiments, the first respective representation has a width that is the width of the auxiliary content user interface. Optionally, when the electronic device initially presents the auxiliary content user interface, the first respective representation has the current focus. In some embodiments, in response to detecting selection of the first respective representation, the electronic device displays first respective auxiliary content (e.g., video content or another auxiliary content user interface).

In some embodiments, such as in FIG. 8V, the auxiliary content user interface includes (991) a remainder of the plurality of respective representations 880*a-e* that are selectable to display respective auxiliary content for the respective content item, wherein the remainder of the plurality of respective representations 880*a-e* have a second size, smaller than the first size (994). In some embodiments, the remainder of the plurality of respective representations are displayed in a row vertically adjacent to the first respective representation. In response to detecting selection of one of the remainder of the plurality of respective representations, the electronic device presents respective auxiliary content (e.g., video content or another auxiliary content user interface).

The above-described manner of concurrently displaying the first respective representation and the second respective representations allows the electronic device to enable the user to view the first and second representations without entering a user input to navigate between user interfaces that include the various representations, which simplifies the interaction between the user and the electronic device and enhances the operability of the electronic device and makes the user-device interface more efficient (e.g., by reducing the inputs needed to browse the representations of auxiliary content items), which additionally reduces power usage and improves battery life of the electronic device by enabling the user to use the electronic device more quickly and efficiently.

In some embodiments, such as in FIG. 8V, in accordance with a determination that the first respective representation 878*a* has the current focus, animating the first respective representation 879*a* (996) (e.g., displaying an animated or video version of an image included in the first respective representation when the first respective representation has the current focus).

In some embodiments, such as in FIG. 8W, in accordance with a determination that the first respective representation 882 does not have the current focus, ceasing animating the first respective representation 882 (998). In some embodiments, the electronic device displays the first respective representation with a still version of the image included in the first respective representation when a respective representation other than the first respective representation has the current focus.

The above-described manner of animating the first representation when the first representation has the current focus and ceasing to animate the first representation when the first representation no longer has the current focus allows the electronic device to play and pause the animation of the first representation within the auxiliary content user interface in response to a change in the current focus, which simplifies the interaction between the user and the electronic device and enhances the operability of the electronic device and makes the user-device interface more efficient (e.g., by reducing the number of inputs needed to play and pause the animation of the first respective representation), which additionally reduces power usage and improves battery life of the electronic device by enabling the user to use the electronic device more quickly and efficiently.

In some embodiments, such as in FIG. 8W, in accordance with a determination that a second respective representation 880*a* of the plurality of respective representations has the current focus, forgoing animating the second respective representation 880*a*. In some embodiments, the first representation animates when it has the current focus but the remaining second respective representations do not animate in response to the input focus moving to one of the second respective representations The above-described manner of forgoing animating the second respective representation in response to determining that the second respective representation has the current focus allows the electronic device to forgo loading an animation corresponding to the second representation, which reduces power usage and improves battery life of the electronic device by reducing the number of operations that need to be performed when the user moves the input focus from the first respective representation to the second respective representation.

It should be understood that the particular order in which the operations in FIGS. 9A-9H have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 1100, and 1300) are also applicable in an analogous manner to method 900 described above with respect to FIGS. 9A-9H. For example, the ways of presenting representations of auxiliary content described above with reference to method 900 optionally have one or more of the characteristics of the ways of presenting representations of items of content, presenting representations of content based on the content consumption history of the user account, presenting representations of bonus content items, etc., described herein with reference to other methods described herein (e.g., methods 700, 1100, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C or application specific chips. Further, the operations described above with reference to FIGS. 9A-9H are, optionally, implemented by components depicted in FIGS. 1A-1B. For example, displaying operations 902, 910, and 932 and receiving operations 904, 930, and 934 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Representations of Collections of Episodic Content

Users interact with electronic devices in many different manners, including using an electronic device to browse collections of episodic content. In some embodiments, an electronic device is able to present representations of collections of episodic content. The embodiments described below provide ways in which an electronic device customizes the representations of episodic content based on the content consumption history of the user. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 10A:
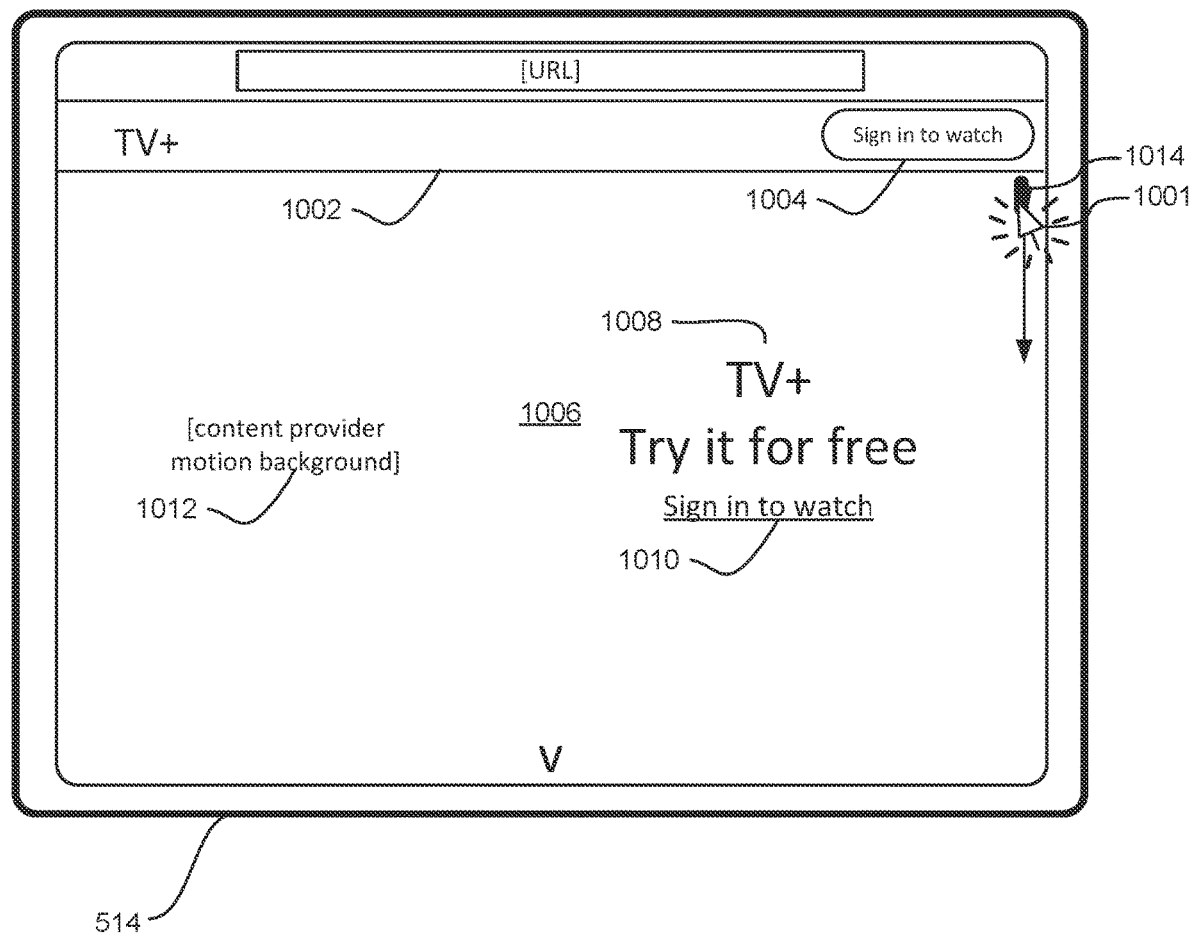
FIGS. 10A-10S illustrate exemplary ways in which an electronic device presents a content browsing user interface that is customized based on the user's content consumption history in accordance with some embodiments of the disclosure.
Figure 10B:
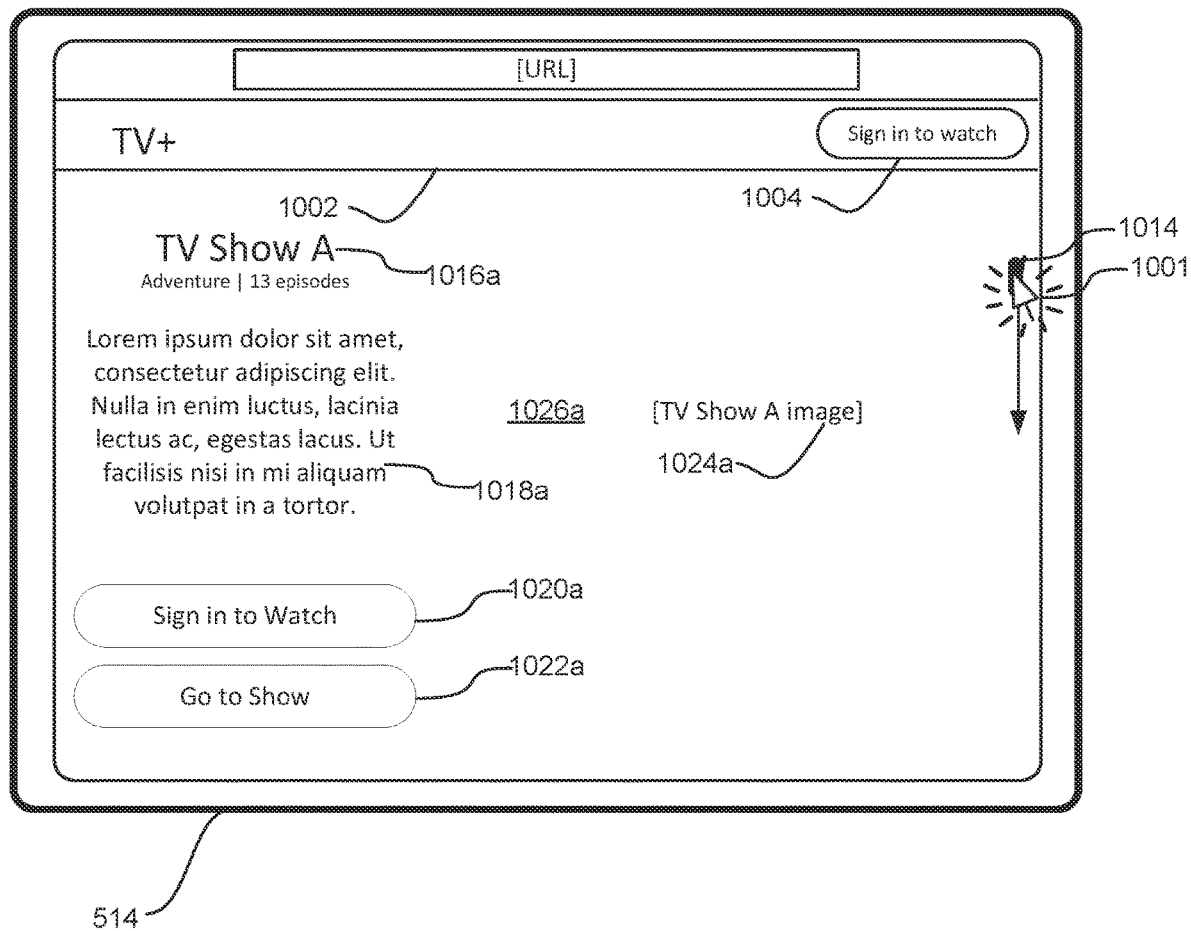
Figure 10C:
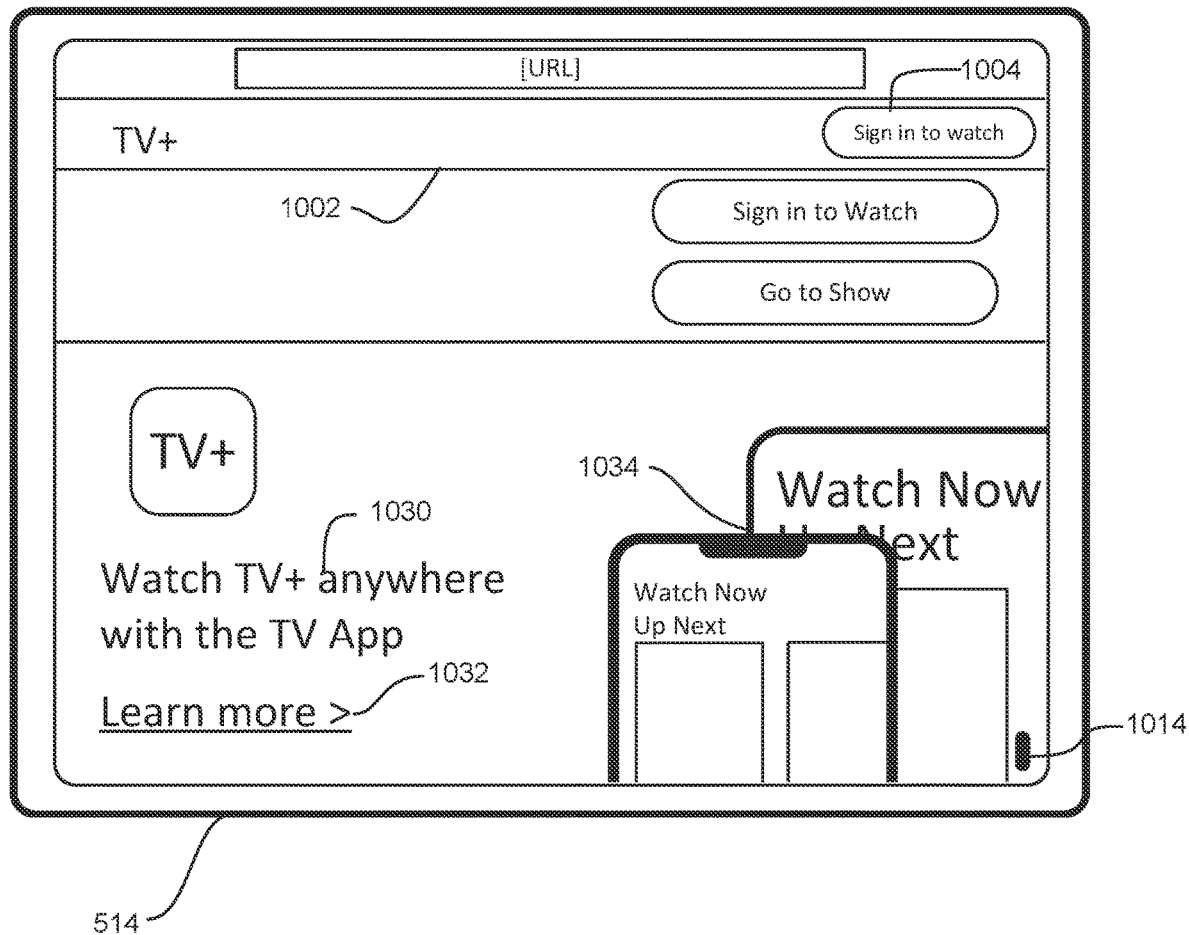
Figure 10D:
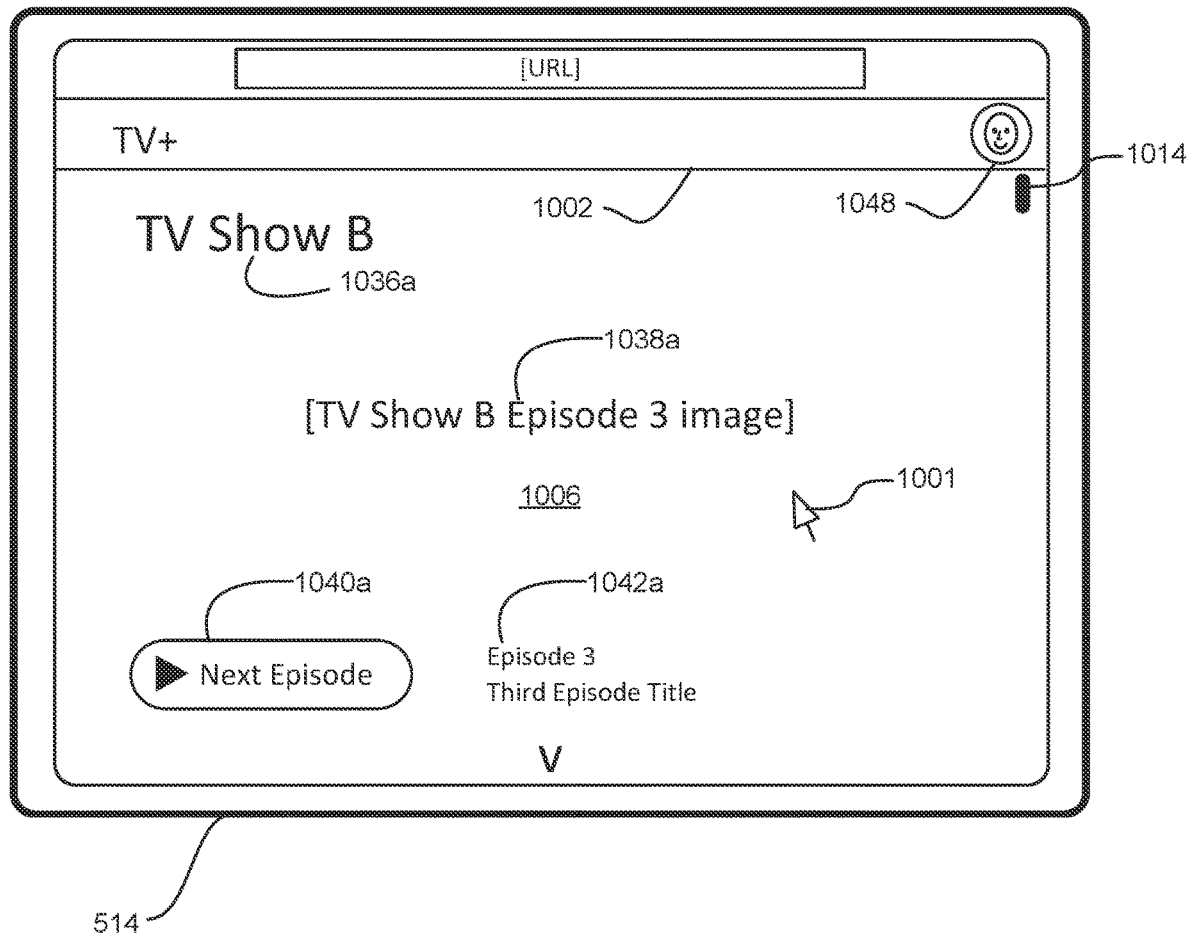
Figure 10E:
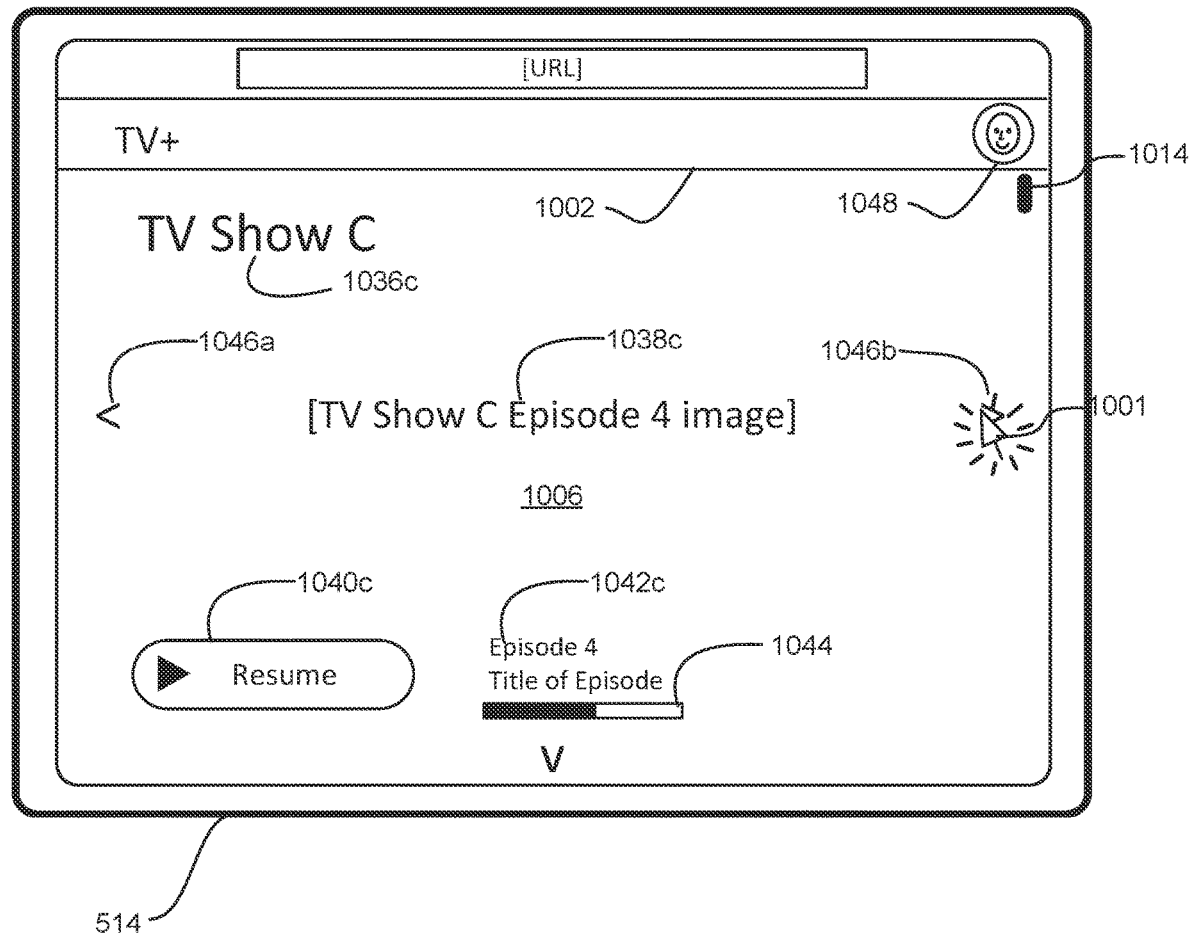
Figure 10F:
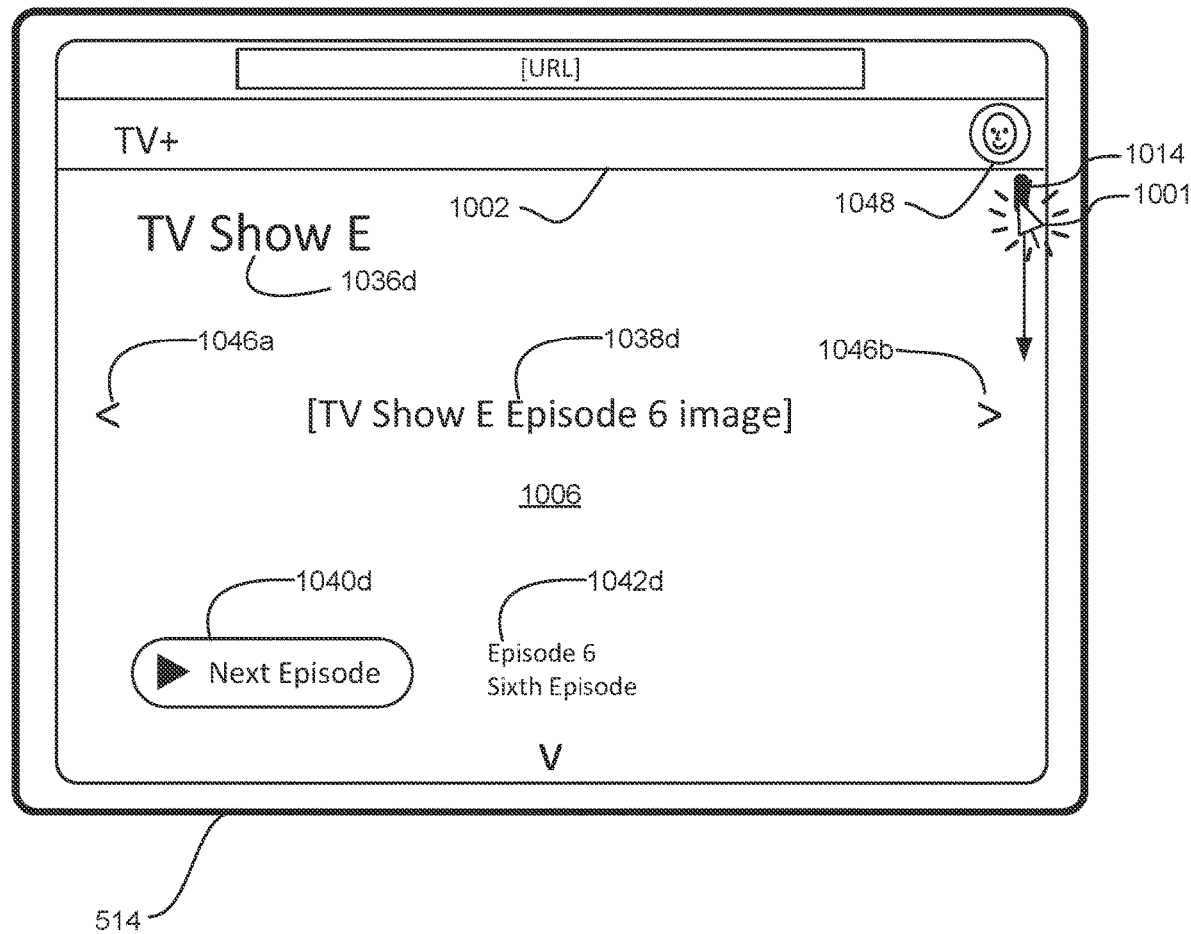
Figure 10G:
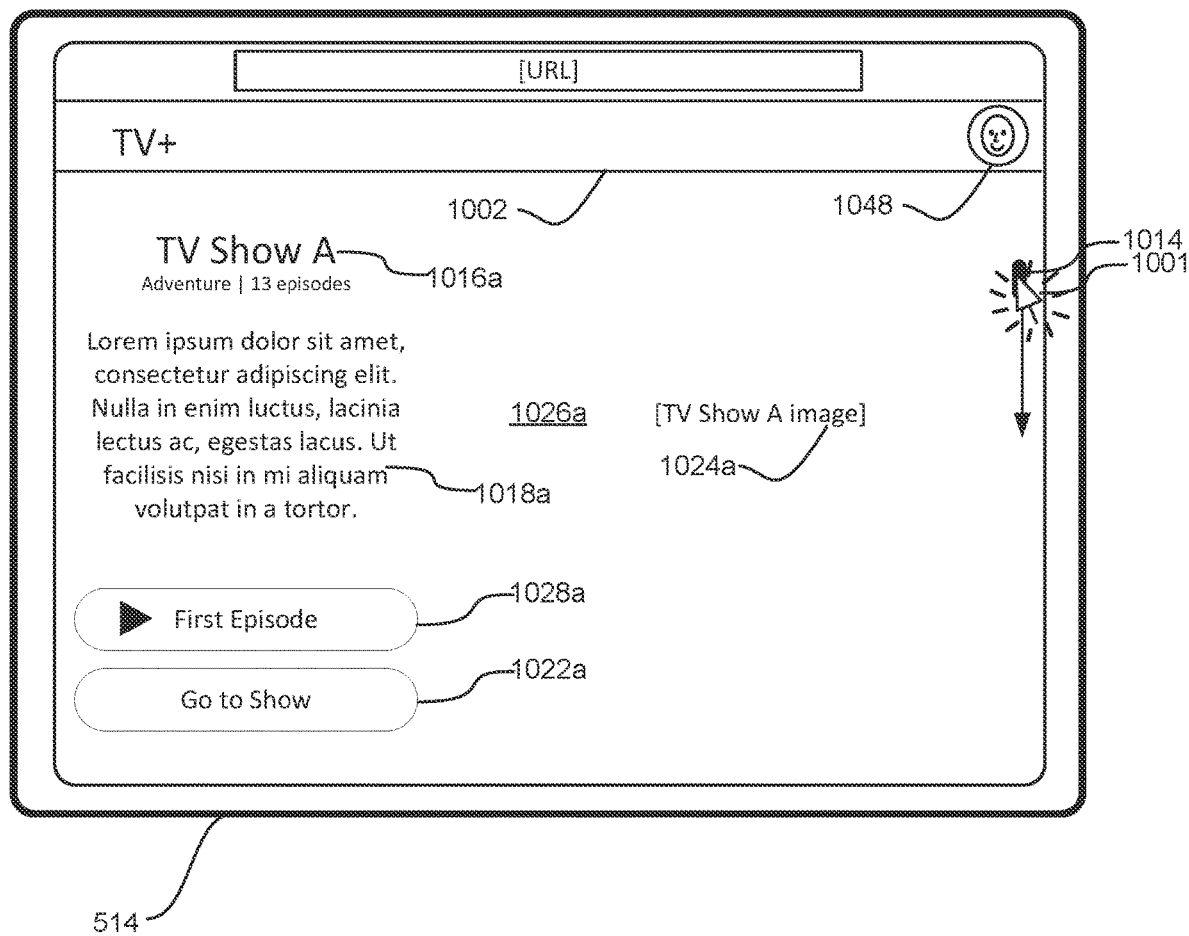
Figure 10H:
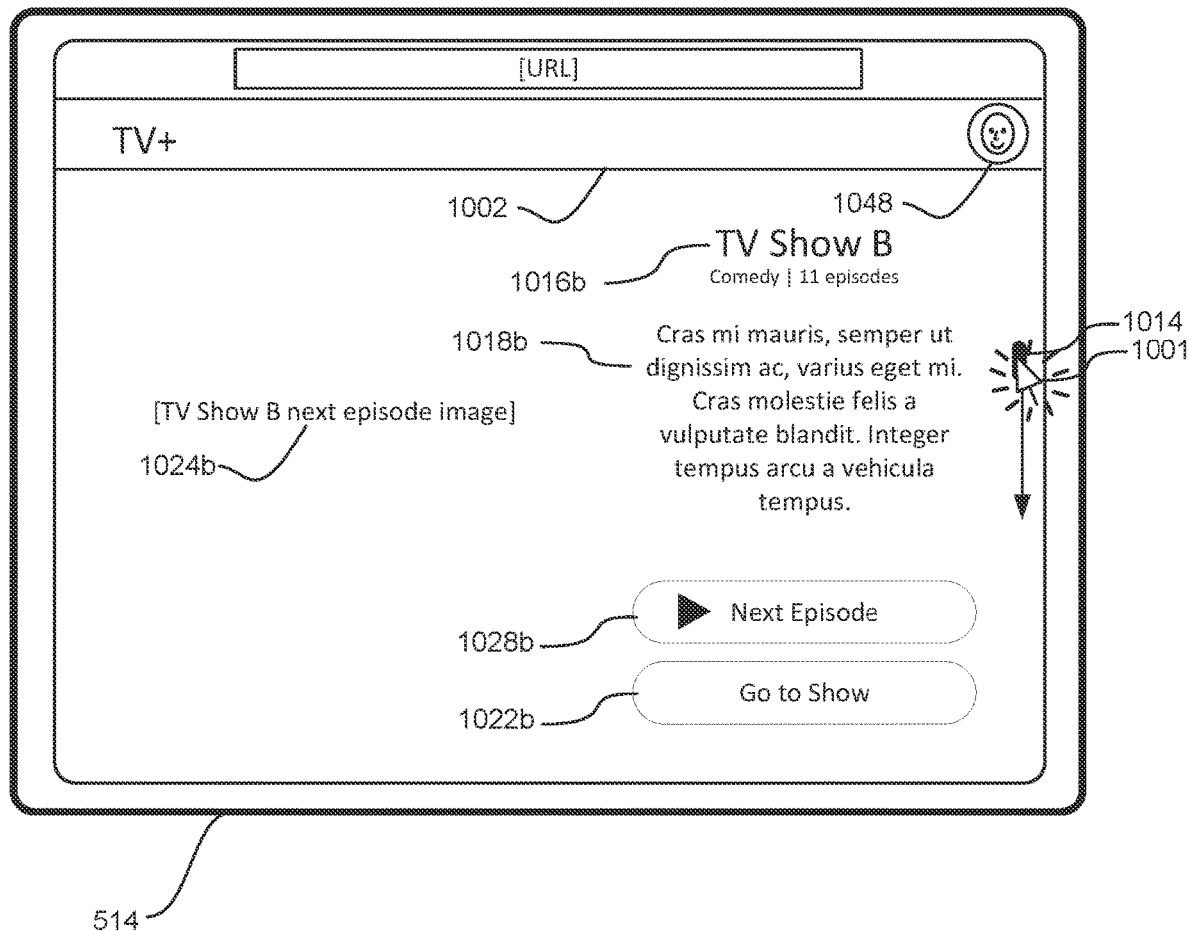
Figure 10I:
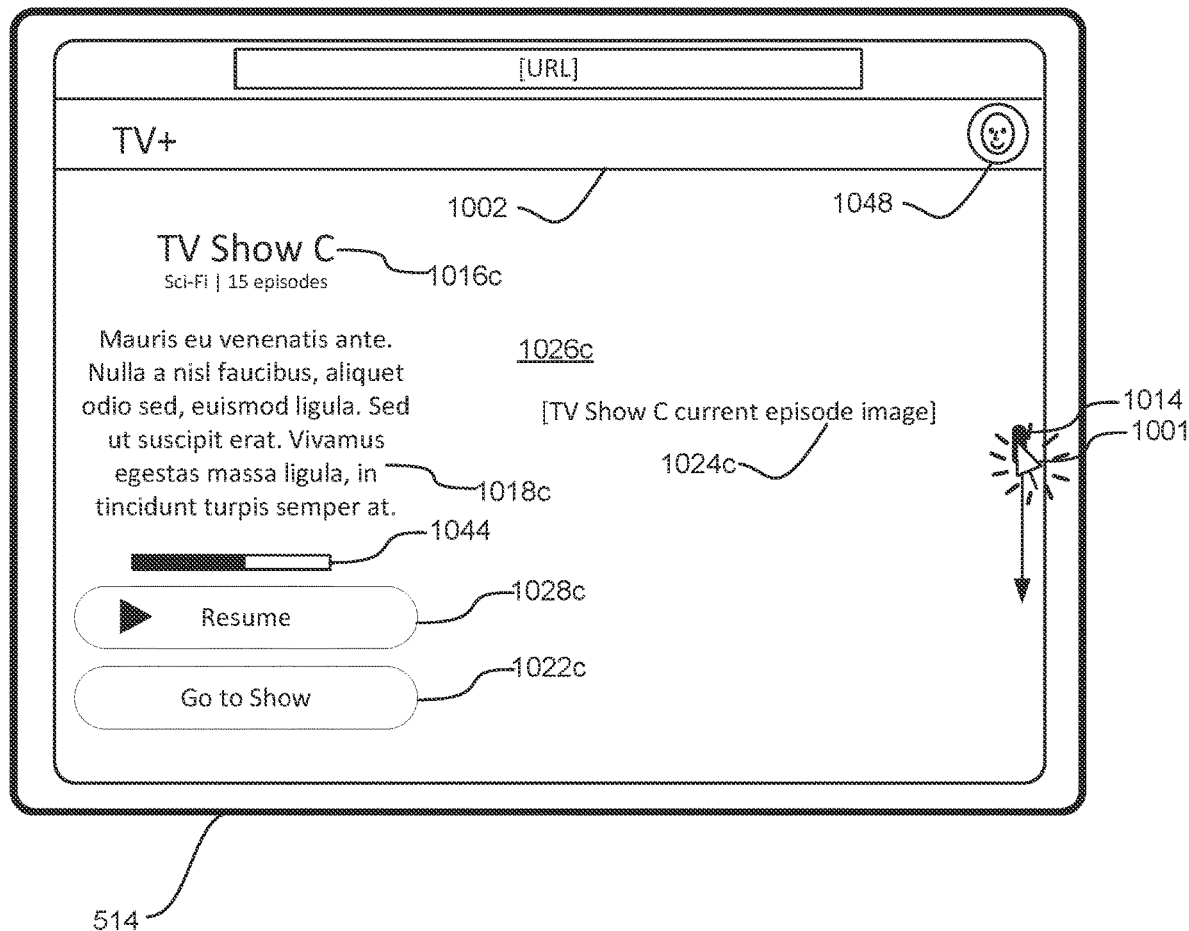
Figure 10J:
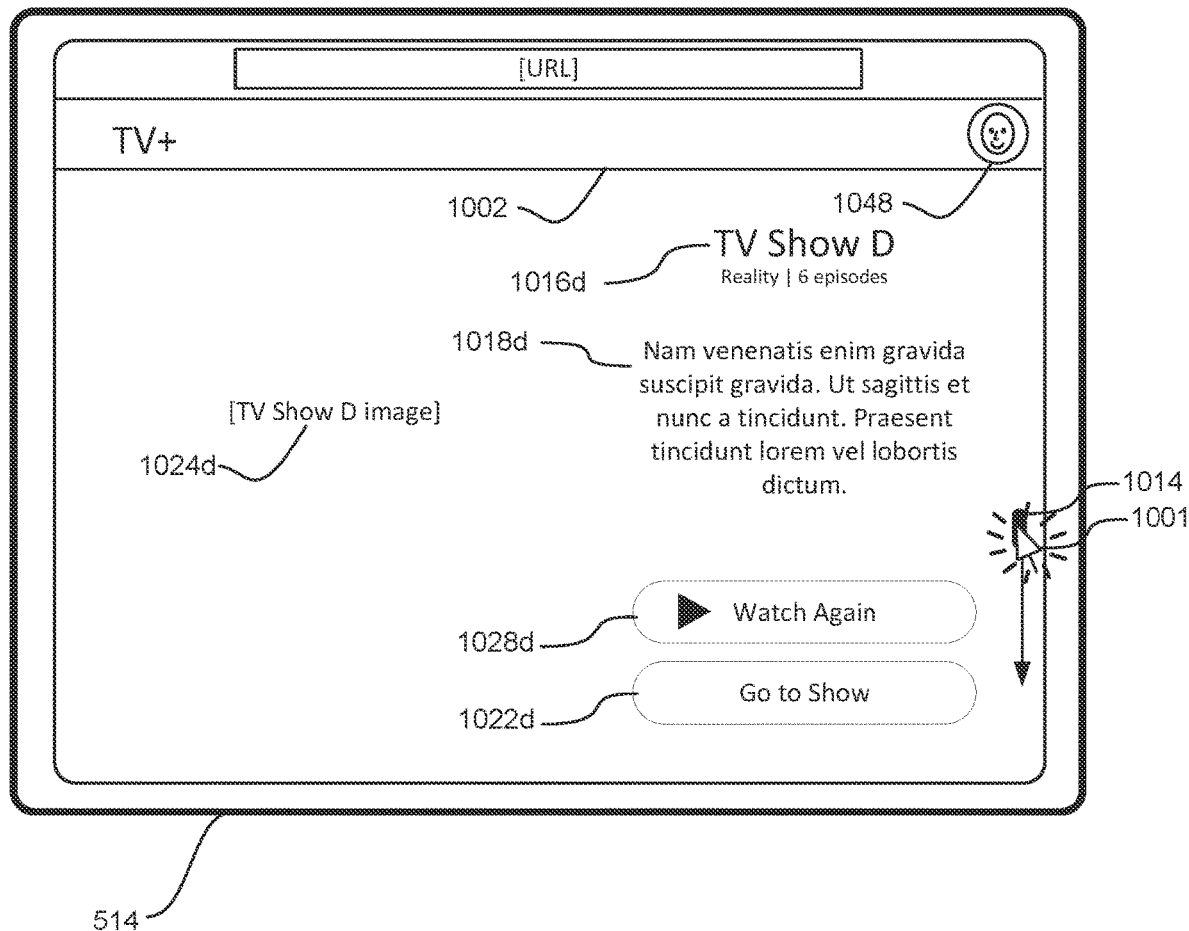
Figure 10K:
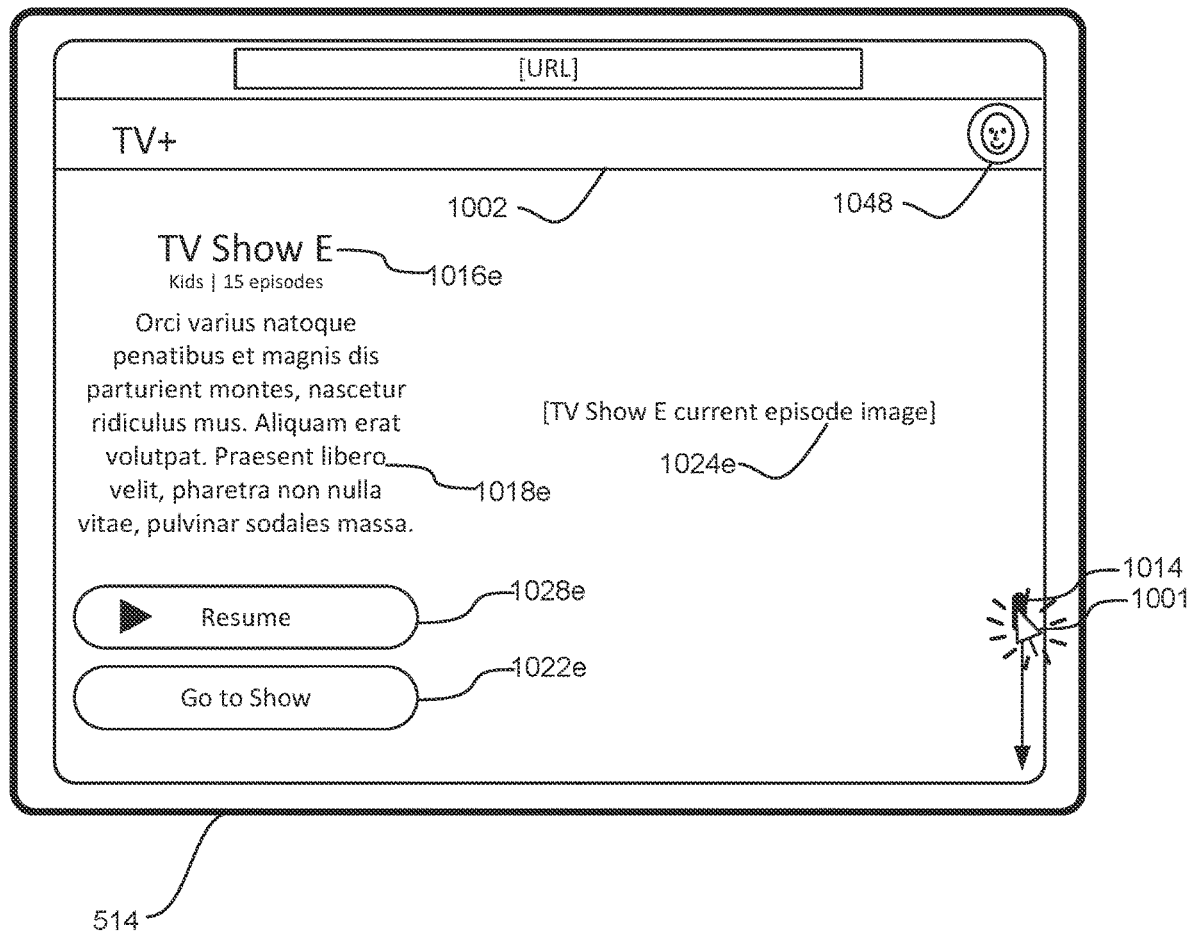
Figure 10L:
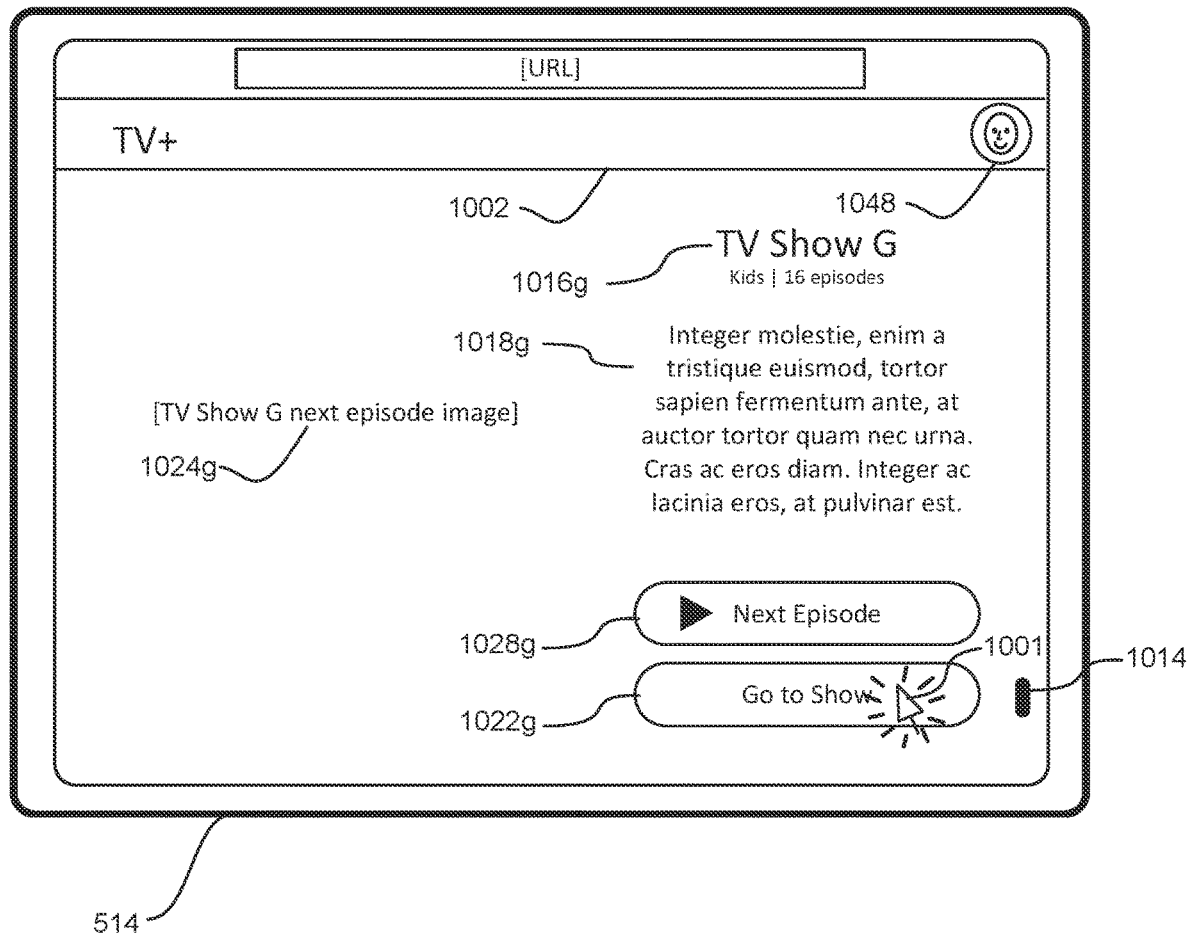
Figure 10M:
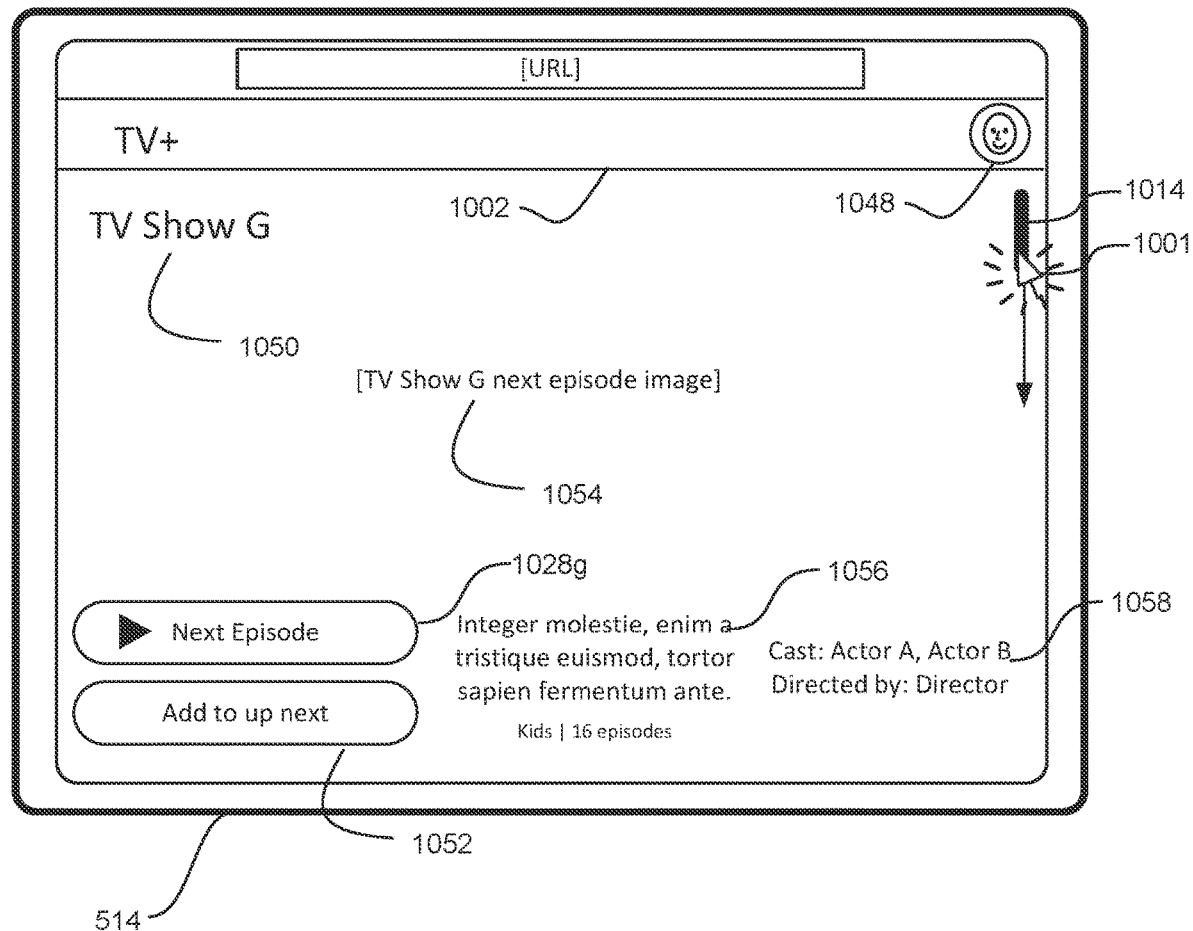
Figure 10N:
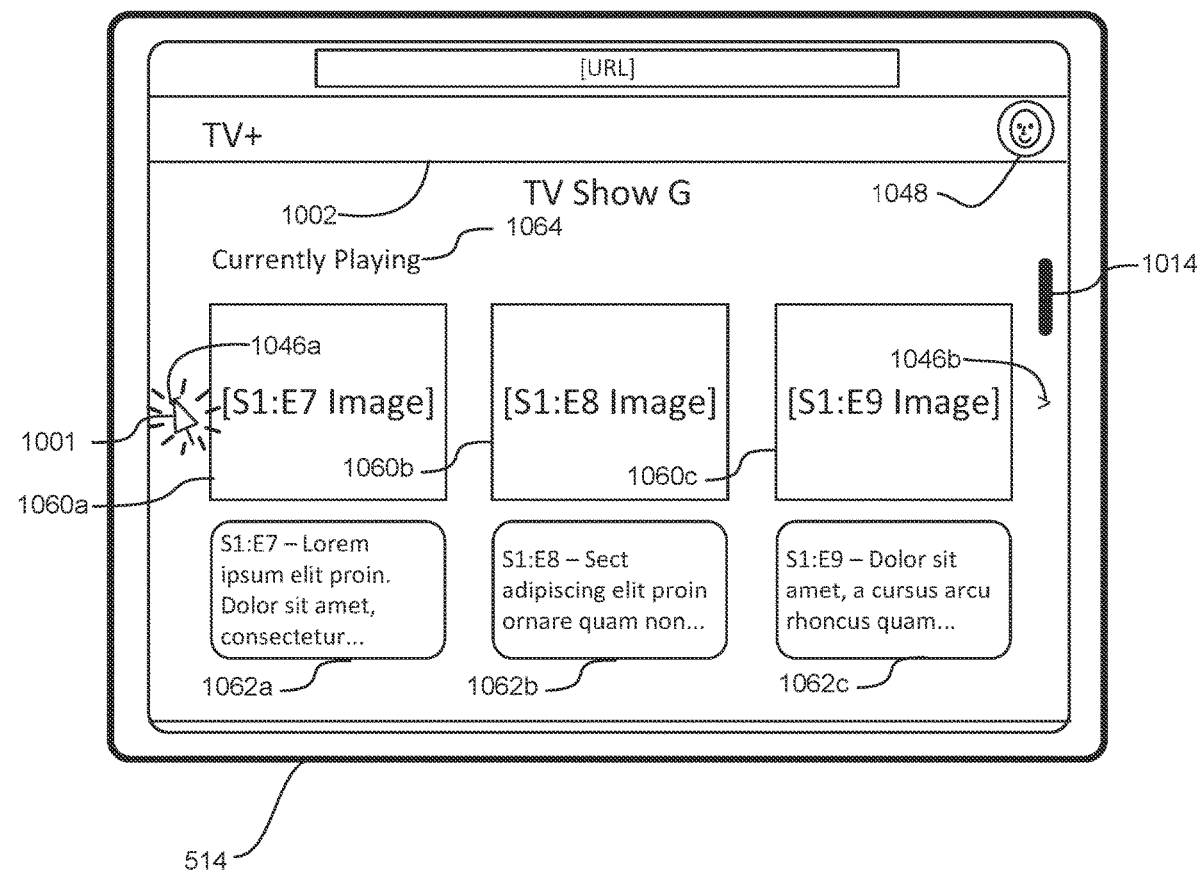
Figure 10O:
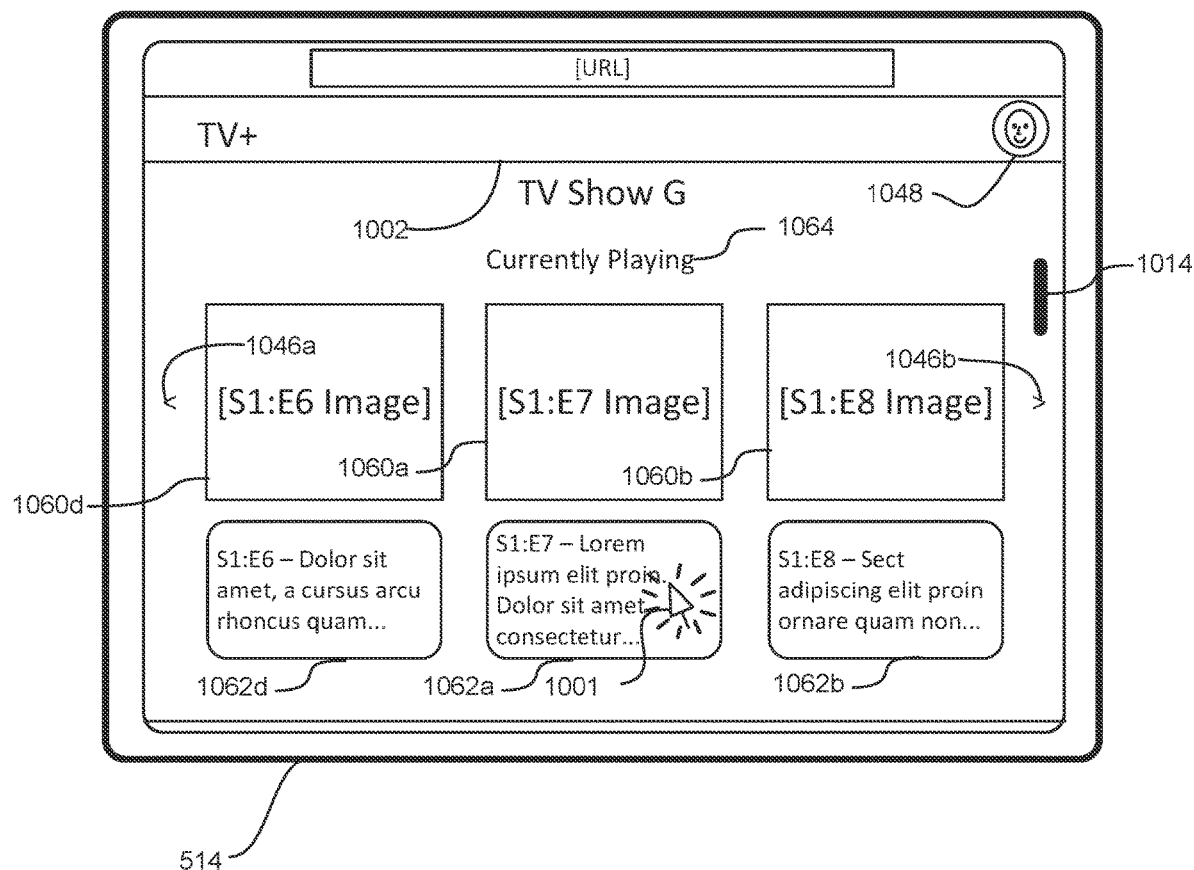
Figure 10P:
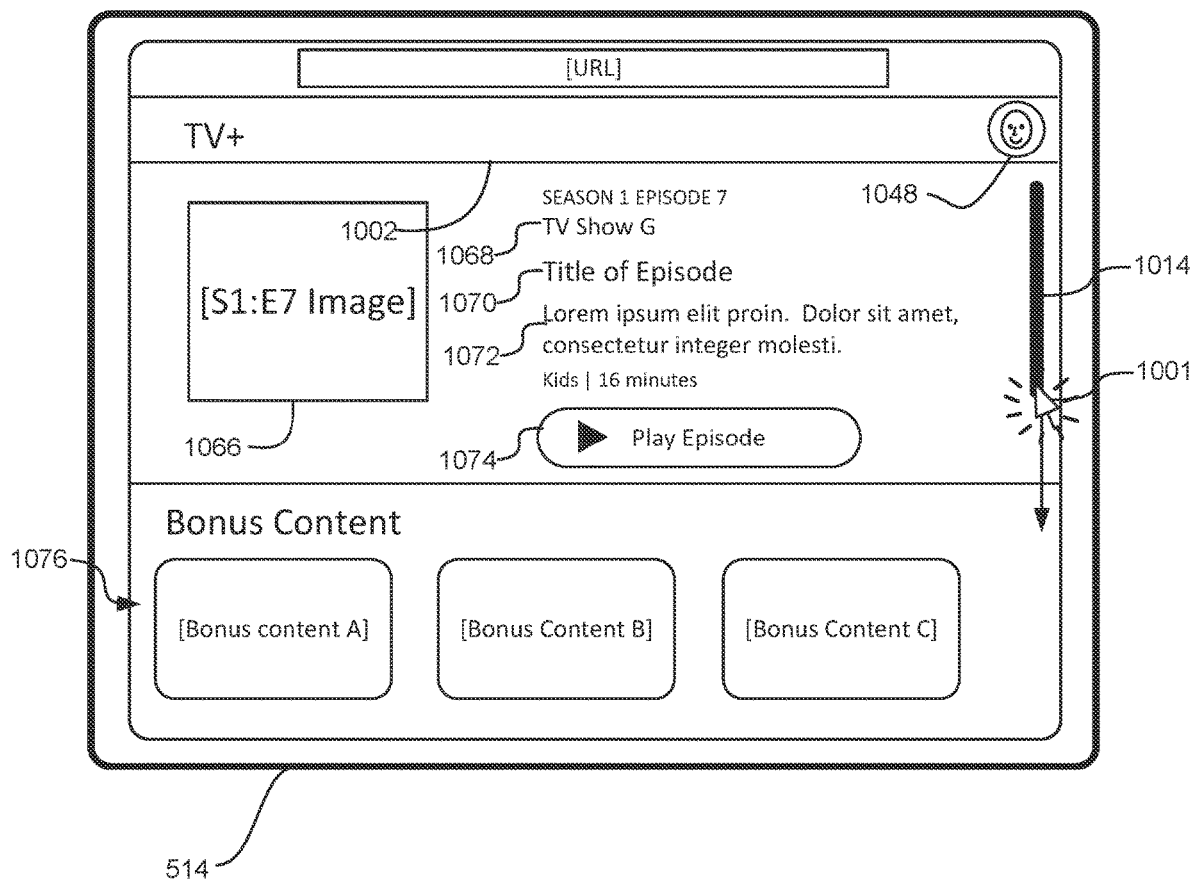
Figure 10Q:
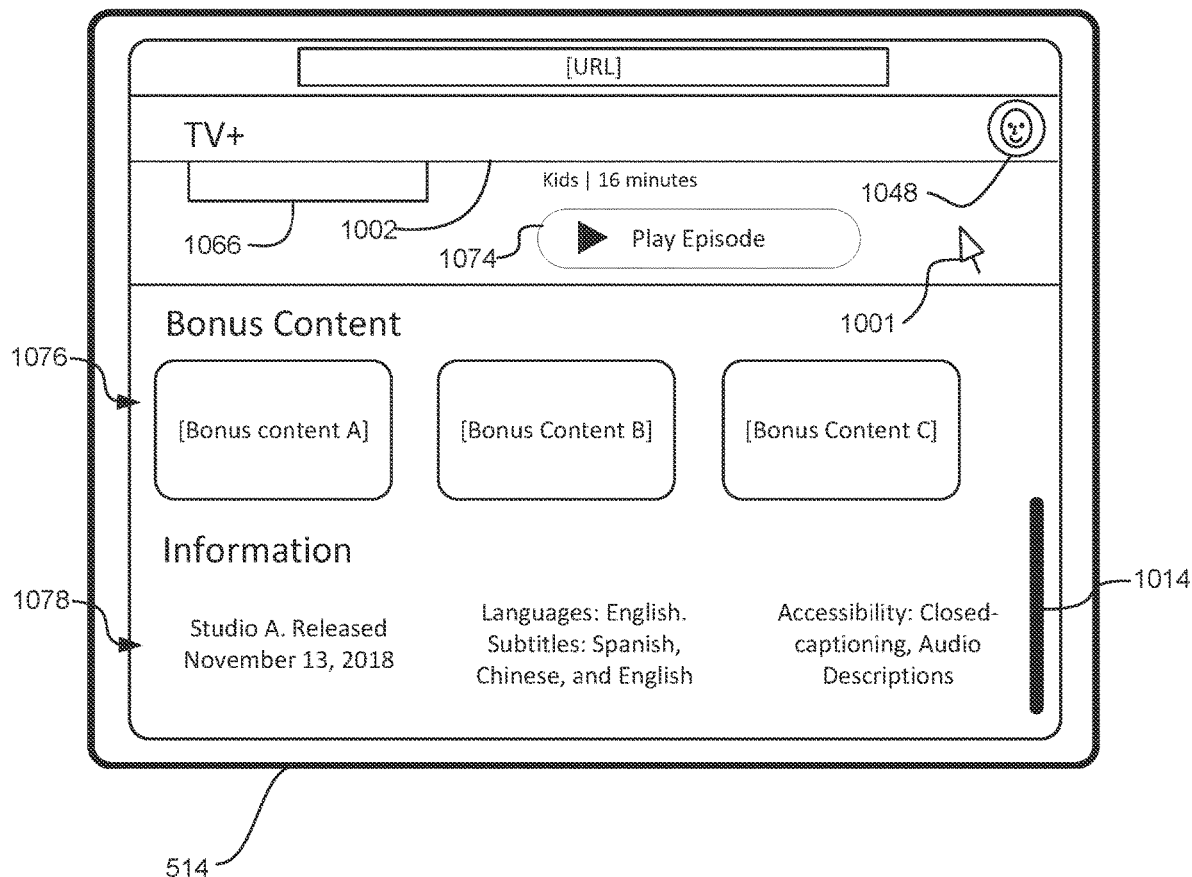
Figure 10R:
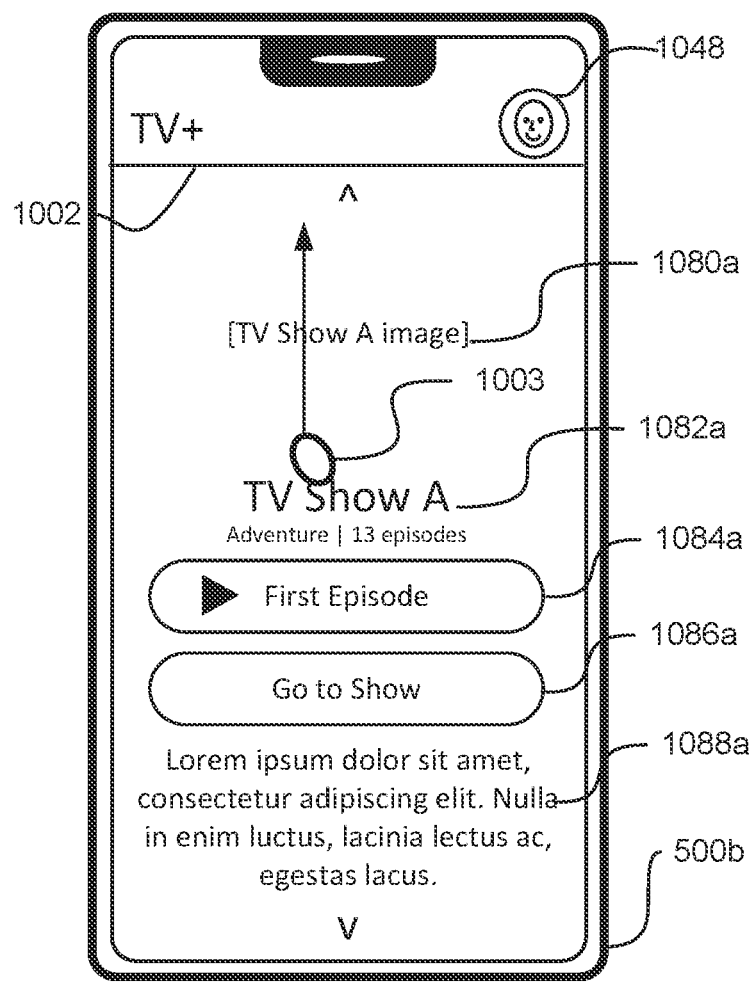
Figure 10S:
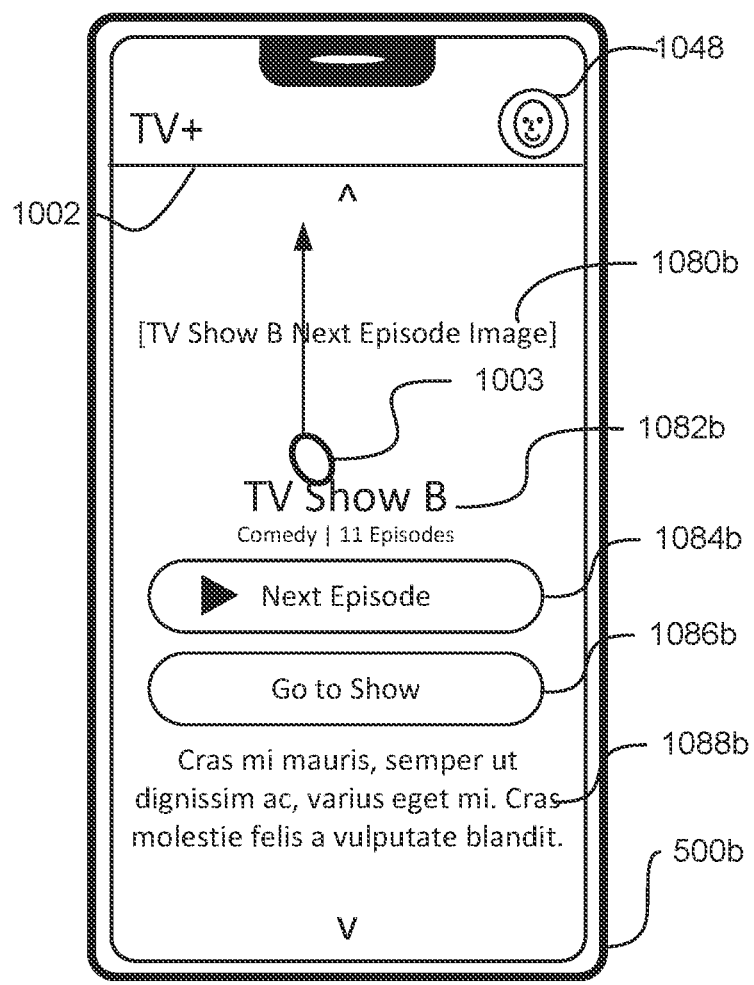
Figure 11A:
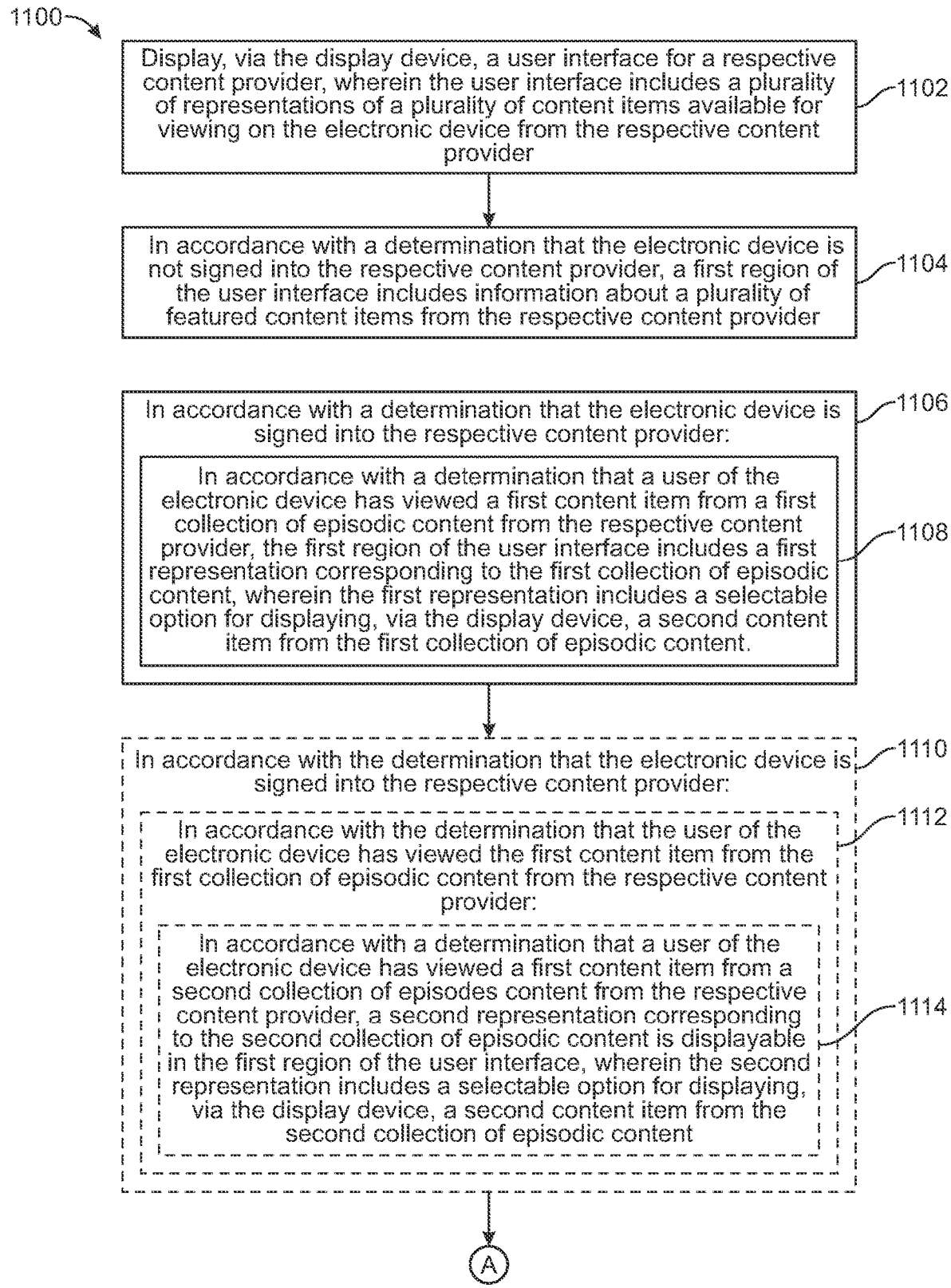
FIGS. 11A-11G are flow diagrams illustrating a method of presenting a content browsing user interface that is customized based on the user's content consumption history in accordance with some embodiments of the disclosure.
Figure 11B:
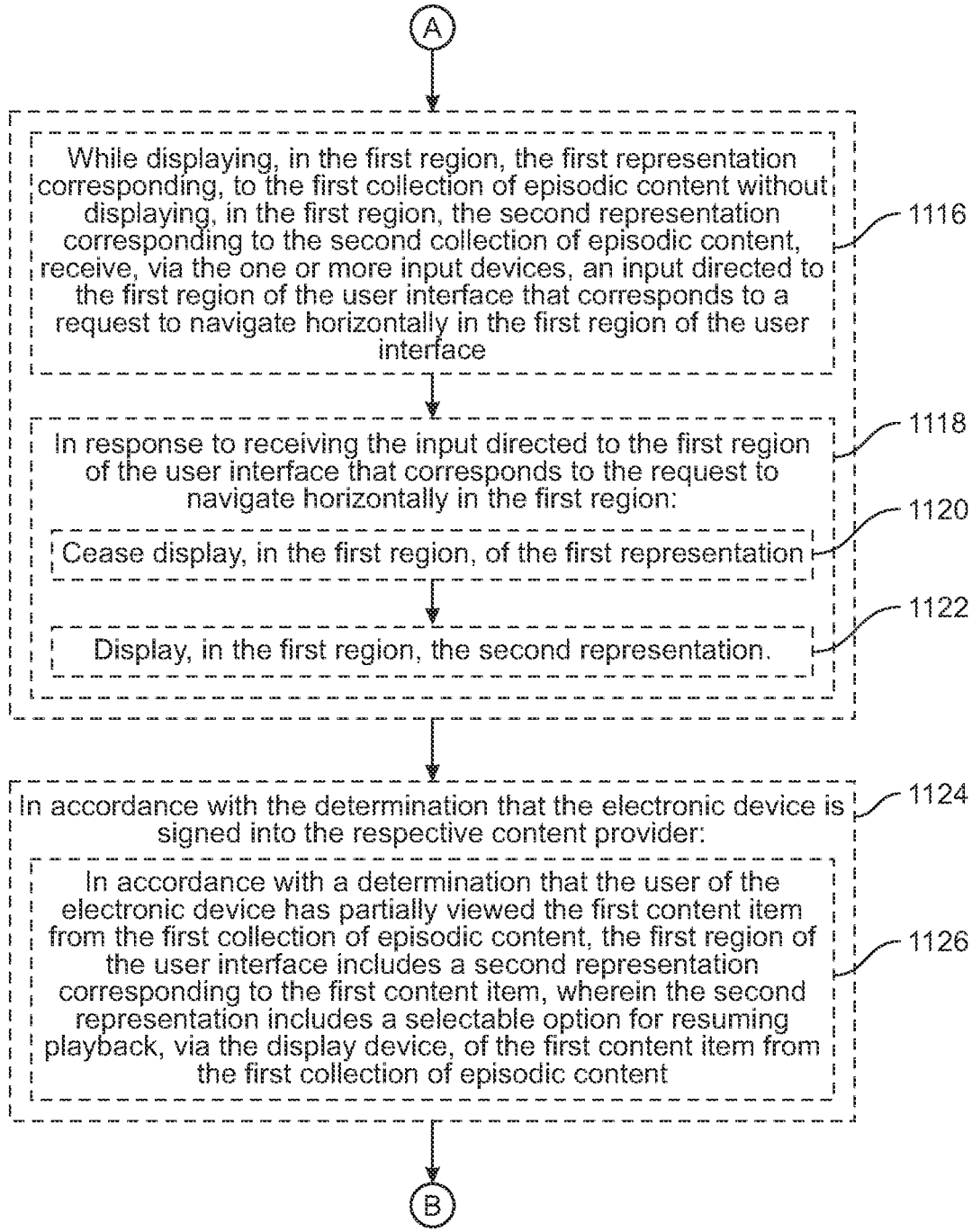
Figure 11C:
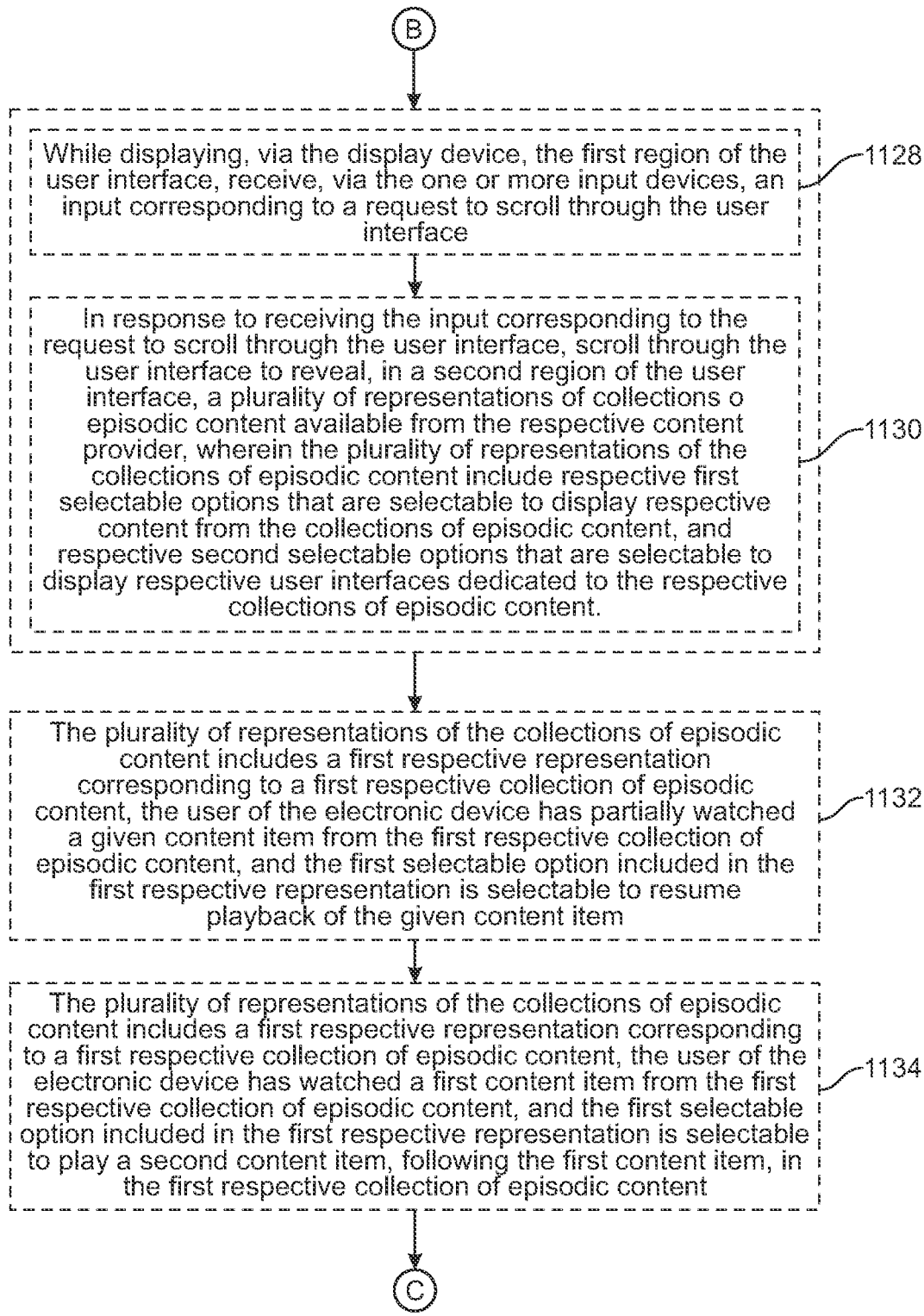
Figure 11D:
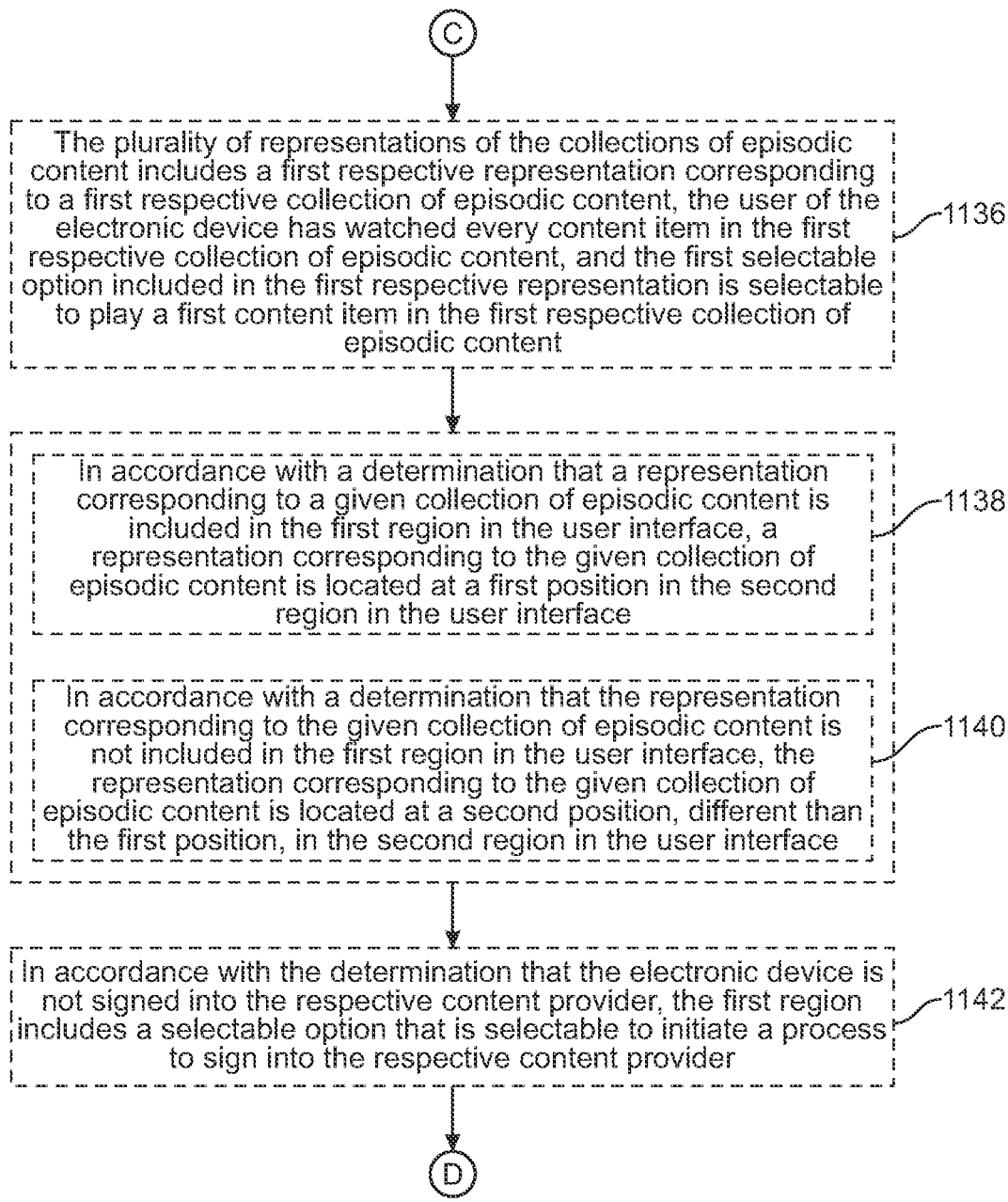
Figure 11E:
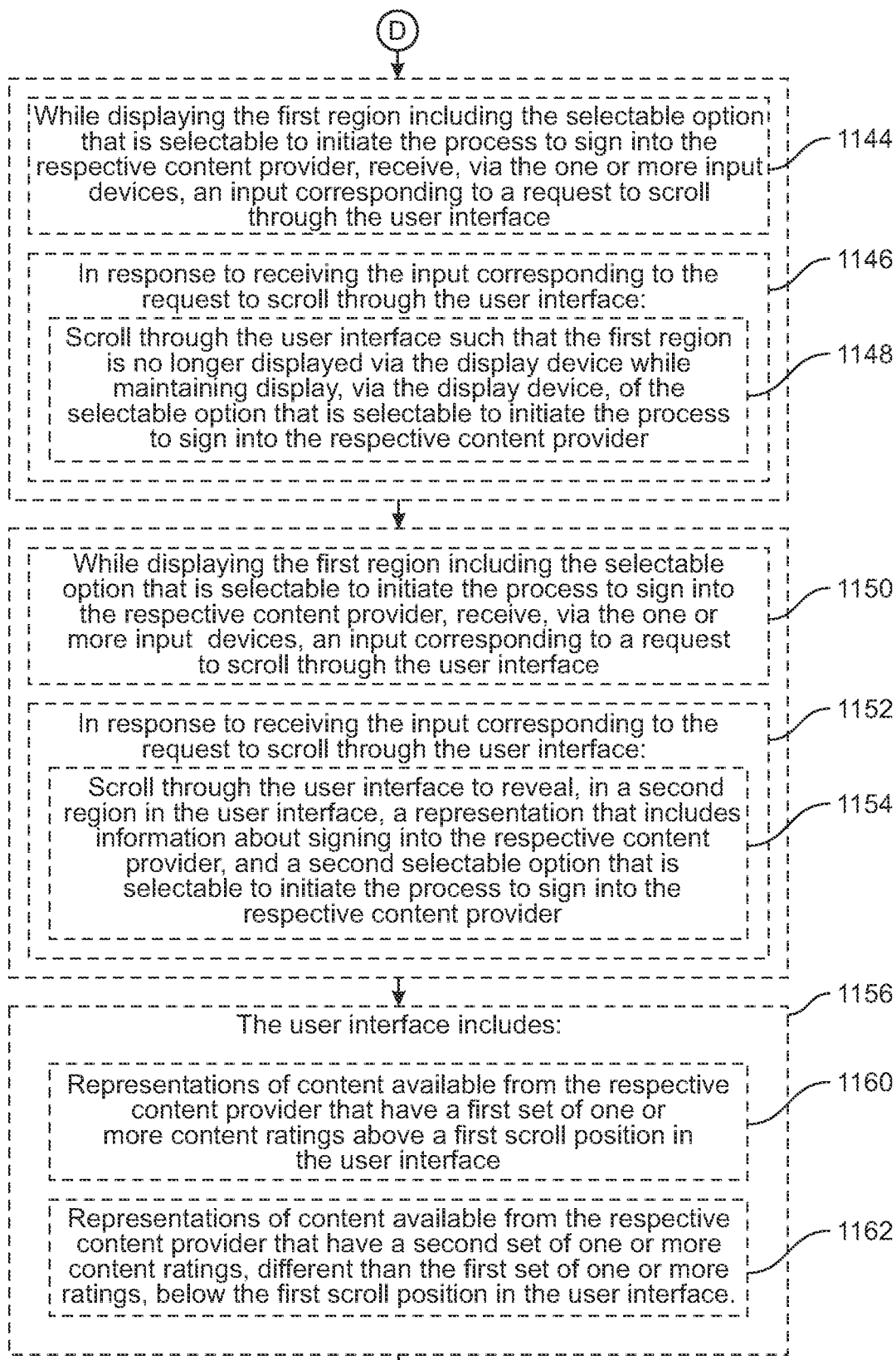
Figure 11F:
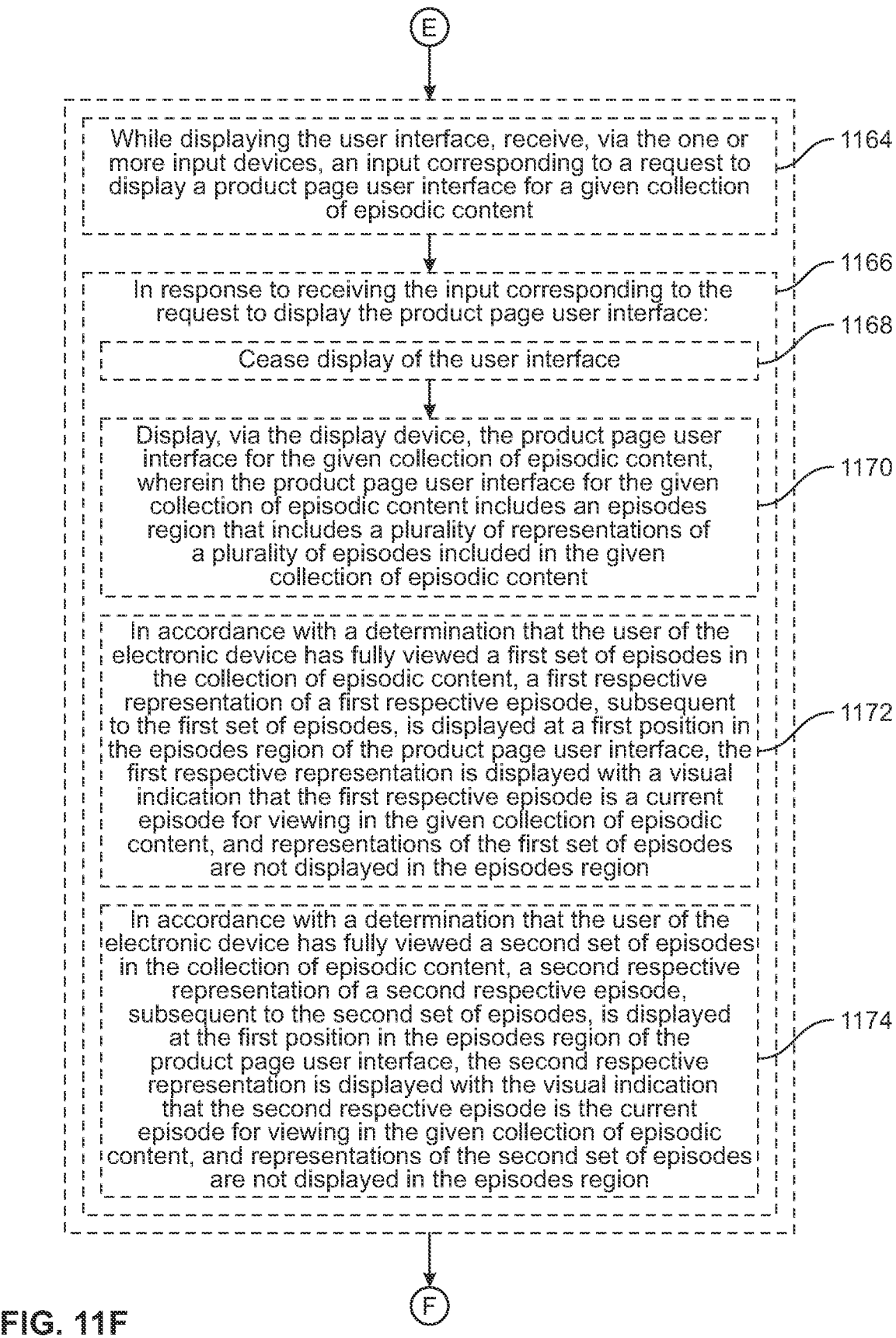
Figure 11G:
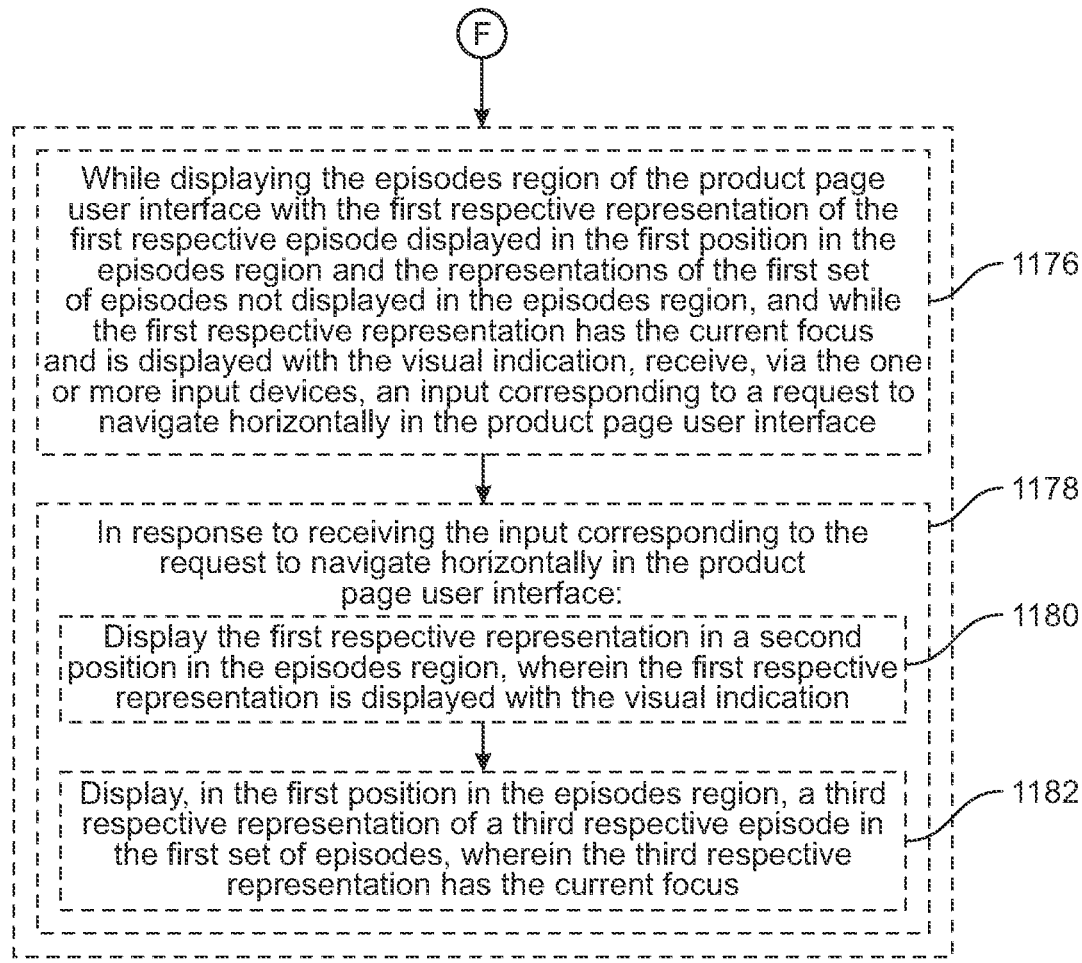

FIGS. 10A-10S illustrate exemplary ways in which an electronic device 500 presents a content browsing user interface that is customized based on the user's content consumption history in accordance with some embodiments of the disclosure. The embodiments in these figures are used to illustrate the processes described below, including the processes described with reference to FIGS. 11A-11G.

One or more of the user interfaces shown in FIGS. 10A-10S are illustrated as being presented within a web browser application. In some embodiments, one or more user interfaces are displayed in a content application or another application other than a web browser. It is understood that the examples described below can be implemented within or outside of a web browser application.

FIGS. 10A-10C illustrate a content browsing user interface when the user is not signed into a user account associated with a content provider of the content featured (included) in the content browsing user interface.

FIG. 10A illustrates the top of a scrollable user interface for browsing collections of episodic content. The user interface includes a header region 1002 that includes a selectable option 1004 that, when selected, causes the electronic device 500 to initiate a process to sign into a user account associated with the content provider of the items of content presented in the content browsing user interface. The user interface further includes a top region 1006 that has an indication 1008 of the content provider and a selectable option 1010 to sign into a user account associated with the content provider overlaid on a background image 1012. The background image 1012 is an animated or otherwise moving image that includes content related to a plurality of the collections of episodic content available via the content provider. For example, the background image 1012 is a marketing image with images and/or clips from content available via the content provider meant to entice the user to subscribe to the content provider. The user interface further includes a scroll bar 1014.

As shown in FIG. 10A, the user selects (e.g., with cursor 1001) the scroll bar 1014 to drag the scroll bar 1014 down to scroll the user interface down. In response to the user's scrolling, the electronic device 500 displays a portion of the user interface that includes a representation 1026a of one of the collections of episodic content available from the content provider, as shown in FIG. 10B. In some embodiments, the user is able to scroll to any point in the user interface, including a location between representations of content. In some embodiments, in response to a scrolling input, the electronic device 500 "snaps" the user interface to a location that includes one representation of content.

In FIG. 10B, the electronic device presents the representation 1026a of the collection of episodic content. The representation 1026a includes an indication 1016a of the name of the collection of content, a summary 1018a of the collection of content, a selectable option 1020a to sign into an account of the content provider to watch the content, and a selectable option 1022a to navigate to a product page user interface of the collection of episodic content that includes additional information about the collection of episodic content overlaid on an image 1024a that represents the collection of episodic content. The header 1002 region including the option 1004 to sign into a user account associated with the content provider remains displayed at the top of the user interface when the user scrolls the user interface. As shown in FIG. 10B, the user scrolls down in the user interface by selecting (e.g., with cursor 1001) the scroll bar 1014 and moving it down.

In response to the user's scrolling including the scrolling illustrated in FIG. 10B, the electronic device 500 displays a section of the user interface with additional information about logging into the content provider, as shown in FIG. 10C. The information includes an indication 1030 of the content provider, a selectable option 1032 that, when selected, causes the electronic device 500 to present additional information about the content provider, and an image 1034 of electronic devices using the content provider. Again, the header region 1002 including the option 1004 to sign into a user account associated with the content provider continues to be displayed at the top of the user interface.

Thus, as shown in FIGS. 10A-10C, the electronic device 500 displays a content browsing user interface when the user is not signed into a user account associated with a content provider of the content featured in the content browsing user interface.

FIGS. 10D-10F illustrate the electronic device presenting the top 1006 of the content user interface when the user is logged into the content provider (e.g., after the user logs in from the user interfaces shown in FIGS. 10A-10C).

As shown in FIG. 10D, the top region 1006 of the user interface includes information about a collection of content the user account has previously watched using the content provider. Once the user account is signed into the content provider, the header region 1002 includes a selectable representation 1048 of the user account that is selectable to view information about the user account. The header region 1002 continues to be displayed in the top of the user interface as the user scrolls the user interface.

In FIG. 10D, the user has previously watched content included in one collection of content available from the content provider (and has not watched content from other collections of episodic content available from the content provider). The electronic device 500 presents an indication 1036a of the name of the collection of content the user has previously watched, a selectable option 1040a that, when selected, causes the electronic device 500 to present the next item in the collection of content, and information 1042a about the next episode in the collection of content overlaid on an image 1038a that corresponds to the next episode in the collection of content. As shown in FIG. 10D, the next episode is the third episode in the collection of content, meaning the user has previously watched the first and second episodes. The image 1038a is optionally a still or motion image that represents the next episode in the collection of content.

FIG. 10E illustrates the top region 1006 of the user interface when the user has watched multiple collections of content from the content provider. The top region 1006 of the user interface includes information about a series of content including an episode the user has partially watched. The information includes an indication 1036c of the collection of content, a selectable option 1040c to resume playback of the episode from the previous playback position, information 1042c of the episode the user has partially watched, and an indication 1044 of the playback progress of the episode overlaid on an image 1038c that represents the episode the user partially watched. The electronic device 500 also displays navigation arrows 1046a and 1046b that, when selected, causes the electronic device 500 to display information about another collection of content the user has previously watched from the content provider. As shown in FIG. 10E, the user selects (e.g., with cursor 1001) one of the options 1046b to display a representation of another collection of content.

In response to the user's selection in FIG. 10F, the electronic device 500 presents information about another collection of content the user has watched from the content provider. The information includes elements 1036d, 1038d, 10340d, and 1042d that correspond to elements 1036a, 1038a, 10340a, and 1042a described above with reference to FIG. 10D. As shown in FIG. 10F, the user selects (e.g., with cursor 1001) the scroll bar 1014 and drags the scroll bar down to scroll the user interface.

Thus, as shown in FIGS. 10D-10F, the electronic device 500 presents information about content the user has watched in the top region 1006 of the user interface when the user is logged into a user account of the content provider.

FIGS. 10G-10L illustrate ways the electronic device 500 presents information about collections of content available from the content provider while the user is logged into the user account of the content provider.

FIG. 10G illustrates a representation 1026a of a series of content that the electronic device 500 presents in response to the user's scrolling in FIG. 10F. In some embodiments, the user is able to scroll to any location in the user interface, including a location between the top region 1006 and representation 1026a and in some embodiments, in response to the scrolling input, the electronic device "snaps" the user interface to a location that includes the entire representation 1026a. As shown in FIG. 10G, the representations 1026a consumes the width of the user interface and the height of the user interface excluding the header region 1002. Thus, in some embodiments in which the electronic device 500 "snaps" the scrolling position to discrete scrolling positions, the discrete scrolling positions are positions at which a representation of an item of content fills the space of the user interface that is not the header region 1002. Returning to FIG. 10G, the user has not yet watched the collection of content, so the electronic device 500 presents the representation 1026a toward the top of the user interface.

The representation 1026a includes an indication 1016a of the collection of content, a synopsis 1018a of the collection of content, a selectable option 1028a that, when selected, causes the electronic device 500 to play the first episode in the collection of content, and a selectable option 1022a that, when selected, causes the electronic device 500 to display a user interface with information about the collection of content overlaid on an image 1024a that represents the collection of content. Because the user has not watched the content series before, the image 1024a is an image related to the whole collection of content. As shown in FIG. 10G, the user selects (e.g., with cursor 1001) the scroll bar 1014 to drag the scroll bar to scroll the user interface.

After scrolling through one or more representations of collections of content the user has not previously watched, the user reaches a part of the user interface that includes representations of collections of content the user has watched previously. In other words, after the top region of the user interface that includes horizontally scrollable representations of content the user has previously viewed, the electronic device presents representations of content the user has not yet viewed before presenting representations of the content the user has previously viewed in the vertically scrollable section of the user interface.

In response to one or more scrolling inputs including the scrolling illustrated in FIG. 10G, the electronic device 500 presents the next representation 1024b of a collection of content, as shown in FIG. 10H. The representation 1024b includes similar elements to the representation illustrated in FIG. 10G. The representation includes a selectable option 1028b that, when selected, causes the electronic device to present the next episode in the collection of content based on the user's content consumption history. As shown in FIG. 10H, the electronic device 500 presents an image 1024b that is related to the next episode in the collection of content because the user has partially watched the collection of content. For example, if the user has watched episodes 1-3, the selection of option 1028b causes the device to display episode 4, and the image 1024b is an image of episode 4.

As shown in FIG. 10H, the user selects (e.g., with cursor 1001) the scroll bar 1014 to scroll the user interface down. In response to the user's scrolling, the electronic device 500 presents the representation 1026c of the next collection of content, as shown in FIG. 10I.

As shown in FIG. 10I, the representation 1026c includes similar elements as the representation 1026a described above with reference to FIG. 10G. The user has watched the collection of content and previously partially watched an episode in the collection of content. The representation 1026c includes an option 1028c that is selectable to resume playback of the episode from the last playback position and an indication 1044 of the playback progress within the episode (and an option 1022c that is selectable to display a product page user interface for the collection of content). The representation 1024c includes an image 1024c that represents the episode the user has partially watched. The user uses the cursor 1001 to select the scroll bar 1014 to scroll down in the user interface again.

In response to scrolling including the user's scrolling illustrated in FIG. 10I, the electronic device 500 presents the next representation of a collection of content, as shown in FIG. 10J.

The representation illustrated in FIG. 10J is of a collection of content of which the user has previously watched all of the available episodes. Thus, the representation of the collection of content includes a selectable option 1028d that, when selected, causes the electronic device 500 to present the first episode of the collection of content to enable the user to watch the collection of content again (e.g., from a first episode of the collection of content). The representation includes an image 1024d that represents the collection of content. The user uses the cursor 1001 to select the scroll bar 1014 to scroll down in the user interface again.

After the user scrolls through all of the collections of content that are not marketed towards kids, the user reaches a portion of the user interface that includes representations of collections of content that are marketed towards kids. In other words, all of the content items not marketed towards kids are presented first, then all of the content items marketed towards kids are presented. In some embodiments, the content marketed towards kids has a parental control rating below a predetermined age threshold (e.g., 6, 8, 10, 13 years old) and the content not marketed towards kids has a parental control rating above the predetermined age threshold.

As shown in FIG. 10K, in response to scrolling including the scrolling illustrated in FIG. 10J, the electronic device 500 presents a representation of a collection of content marketed towards kids. The representation includes elements that are similar to the representation described above with reference to FIG. 10G. Because the user has watched part of the collection of content, the representation includes an option 1028e that, when selected, causes the electronic device 500 to play the next episode in the collection based on the user's content consumption history. The user uses the cursor 1001 to select the scroll bar 1014 to scroll down in the user interface again.

In FIG. 10L, the electronic device 500 presents a representation of another collection of content marketed towards kids. The representation includes elements that are similar to the representation described above with reference to FIG. 10G. Because the user has watched part of the collection of content, the representation includes an option 1028g that, when selected, causes the electronic device 500 to play the next episode in the collection based on the user's content consumption history. Generally speaking, representations of kid's content optionally include similar elements to representation of content not marketed towards kids, such as including a contextual option to play the content based on the content consumption history of the user. For example, when viewing a representation of an item of content marketed towards kids that the user has not watched before, the representation includes a selectable option to play the first episode in the collection of content, similar to option 1028a illustrated in FIG. 10G. As another example, when viewing a representation of an item of content marketed towards kids that the user has previously watched and left off part way through an episode, the representation includes a selectable option to resume playback of the episode in the collection of content, similar to option 1028c illustrated in FIG. 10I.

Thus, as shown in FIGS. 10G-10L, the electronic device 500 presents information about collections of content available from the content provider while the user is logged into the user account of the content provider.

As shown in FIG. 10L, the user selects (e.g., with cursor 1001) the option 1022g to view the product page user interface corresponding to the collection of content shown in FIG. 10L (e.g., TV Show G). In response to the user's selection, the electronic device 500 displays the product page user interface related to the collection of content.

FIGS. 10M-10O illustrate the product page user interface with information about a collection of content available from the content provider. Although the product page is illustrated as being presented in response to detecting selection of option 1022g, it should be understood that the electronic device 500 is able to present similar product pages corresponding to a respective content item in response to detecting selection of any option 1022 within any representation of a respective content item.

As shown in FIG. 10M, in response to the user's selection in FIG. 10L, the electronic device 500 displays the product page user interface. The product page user interface includes an indication 1050 of the collection of content, a summary 1056 of the collection of content, information 1058 about the cast and crew of the collection of content, a selectable option 1028g that, when selected, causes the electronic device 500 to play the next episode in the collection of content, and a selectable option 1052 that, when selected, causes the electronic device 500 to add the collection of content to a playback queue of the electronic device 500 overlaid on an image 1054 that represents the next episode in the collection of content. The image 1054 is a still or motion image representing the next episode of the collection of content based on the content consumption history of the user account that is selected in a manner similar to the manner of selecting the background image of a product page described above with reference to FIGS. 6S-6X and 6AA-6EE. As shown in FIG. 10M, the user selects and drags the scroll bar with cursor 1001 to scroll the user interface down.

As shown in FIG. 10N, in response to the user's scrolling including the scrolling illustrated in FIG. 10M, the electronic device 500 presents part of the product page user interface that includes representations (e.g., images) 1060a-c of episodes of the collection of content that are selectable to play the respective episode. The user interface also includes representations (e.g., text) 1062a-c of descriptions of the episodes that are selectable to display an episode page including more information about the respective episode, as will be described in more detail below with reference to FIGS. 10O-10Q. When the user scrolls to this episodes section of the product page user interface, the representation 1060a of the current episode based on the user's content consumption history is presented beneath a current episode indication 1064. The electronic device 500 presents options 1046a-b to horizontally scroll the representations 1060a-c and 1062a-c to view representations of other episodes in the collection of content. As shown in FIG. 10N, the user selects (e.g., with cursor 1001) one of the options 1046a to scroll the representations 1060 and 1062.

In response to the user's selection in FIG. 10N, the electronic device scrolls the representations 1060 and 1062, as shown in FIG. 10O. The scrolling includes moving the indication 1064 of the current episode so that it remains above the representations 1060a of the current episode. The scrolling causes the electronic device 500 to reveal representations 1060d and 1062d that were not displayed in FIG. 10N.

Thus, as shown in FIG. 10M-10O, the electronic device 500 displays a product page including information about the collection of content available from the content provider.

As shown in FIG. 10O, the user selects (e.g., with cursor 1001) a representation 1062a of information about an episode in the collection of content. In response to the user's selection in FIG. 10O, the electronic device 500 presents an episode page related to the selected episode in the collection of content, as shown in FIGS. 10P-10Q.

FIG. 10P illustrates the episode page related to the episode that corresponds to the representation of information selected by the user in FIG. 10O. The episode page includes an image 1066 representing the episode, an indication 1068 of the series of content to which the episode belongs, the title 1070 of the episode, a summary 1072 of the episode, and a selectable option 1074 that, when selected, causes the electronic device 500 to play the episode. If the episode has been partially watched, the electronic device displays a selectable option to resume playback of the episode at the last playback position in place of the option 1074 to play the episode from the beginning. The episode page further includes a row 1076 of representations of bonus content of the episode that are each selectable to play the respective item of bonus content related to the episode. As shown in FIG. 10P, the user selects (e.g., with cursor 1001) the scroll bar 1014 to scroll the user interface down.

As shown in FIG. 10Q, in response to the user's scrolling in FIG. 10P, the electronic device 500 presents another part of the episode page that includes information 1078 about the episode, such as release date, studio, languages, subtitles, and accessibility information.

FIGS. 10R-10S illustrate the presentation of representations of collections of content on another electronic device 500b (e.g., the user interfaces described with reference to FIGS. 10A-10Q). It should be understood that both electronic devices 500 and 500b are able to present user interfaces similar to all of the user interfaces described herein. In some embodiments, in response to receiving a scrolling input, the electronic device 500b scrolls the user interface either to a discrete location that includes a full representation of an item of content or to any location in the user interface, including locations between representations of items of content. In some embodiments, electronic device 500 allows for continuous scrolling and electronic device 500b allows for discrete scrolling only. As the user scrolls the user interface, the header region 1002 including the option 1048 to view information about the user account continues to be displayed at the top of the user interface.

As shown in FIG. 10R, the electronic device 500b displays a representation of a collection of content (e.g., such as at the top of a content user interface that displays information about collections of episodic content available from a given content provider, such as described above with reference to FIG. 10D-10F or within another part of the user interface, such as in FIGS. 10G-10L). The representation includes an indication of the collection of content 1082a, a selectable option 1084a that, when selected, causes the electronic device 500 to play the first episode in the collection of content, a selectable option 1086a that, when selected, causes the electronic device 500 to present a product page user interface related to the collection of content, and a summary 1088a of the collection of content overlaid on an image 1080a that represents the collection of content. The user scrolls (e.g., with contact 1003) the user interface down to reveal the next representation of a different collection of content illustrated in FIG. 10S.

FIG. 10S illustrates the next representation of a collection of content available from the content provider. The representation includes similar elements to the representation illustrated in FIG. 10R. As shown in FIG. 10S, the representation includes a selectable option 1084b that, when selected, causes the electronic device 500 to play the next episode in the content collection based on the user's content consumption history. The representation also includes an image 1080b corresponding to the next episode in the collection of content based on the user's content consumption history.

FIGS. 11A-11G are flow diagrams illustrating a method 1100 of presenting a content browsing user interface that is customized based on the user's content consumption history in accordance with some embodiments of the disclosure. The method 1100 is optionally performed at an electronic device such as device 100, device 300, device 500, device 501, device 510, and device 511 as described above with reference to FIGS. 1A-1B, 2-3, 4A-4B and 5A-5C. Some operations in method 1100 are, optionally combined and/or order of some operations is, optionally, changed.

As described below, the method 1100 provides ways to present a content browsing user interface that is customized based on the user's content consumption history. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, such as in FIG. 10A, an electronic device 500 in communication with a display device 514 and one or more input devices (e.g., a mobile device (e.g., a tablet, a smartphone, a media player, or a wearable device) including a touch screen, a computer including one or more of a keyboard, mouse, trackpad, and touch screen and in communication with a display, or a set-top box in communication with a display and a remote control device), displays (1102), via the display device 514, a user interface for a respective content provider, wherein the user interface includes a plurality of representations of a plurality of content items available for viewing on the electronic device from the respective content provider (e.g., the user interface includes a first region, described below, and a region other than the first region that includes the plurality of representations of a plurality of content items). Optionally, each representation of a respective content item includes text and/or an image indicating the respective content item, such as the title of the respective content item and a description of the respective content item. In some embodiments, the image indicating the respective content item is optionally a still/motion background corresponding to the user's playback progress of the respective content item. For example, if the user has not watched any episodes of a series of episodic content, the motion background is related to the entire series of content, and if the user has watched one or more episodes of the episodic content, the motion background is related to the next episode of the series of content. In some embodiments, each representation of an item of content further includes an option that, when selected, causes the electronic device to play the content and another option that, when selected, causes the electronic device to present a product page user interface for the content that includes information about the content. Optionally, the option to play the content includes text that indicates which portion of the content will be played in response to selection of the option. For example, if the user has not started watching a series of episodic content, the option includes a play button and the text "first episode". As another example, if the user has watched one or more episodes of the episodic content and has not watched one or more episodes of the episodic content, the option includes a play button and the text "next episode". As another example, if the user is partway through watching a movie or partway through watching an episode of the series of episodic content, the option includes the text "resume". In some embodiments, the product page user interface of the respective content item includes information about the content item, such as a synopsis, cast and crew, parental control information, release date, and the like. The product page optionally further includes one or more selectable options to play the respective content item, including one or more selectable options to play respective episodes of a series of episodic content. In some embodiments, the product page further includes one or more selectable options that, when selected, present auxiliary content related to the respective content item according to one or more steps of method 900. In some embodiments, the representation of each respective content item occupies the entire display area of the user interface and the user is able to scroll the user interface to view the representation of a different item of content.

In some embodiments, such as in FIG. 10A, in accordance with a determination that the electronic device is not signed into the respective content provider, a first region 1006 of the user interface includes information 1012 about a plurality of featured content items from the respective content provider (1104) (e.g., a sizzle reel that includes highlights from or previews of content items available from the respective content provider, selected independent of a viewing activity of a user of the electronic device from the respective content provider). In some embodiments, the sizzle reel comprises motion image(s) and/or video content related to the content items available from the respective content provider. Optionally, the sizzle reel includes one or more still images related to the content items available from the respective content provider. In some embodiments, when the electronic device is not signed into the respective content provider, the first region of the user interface includes a selectable option that, when selected, causes the electronic device to initiate a process for logging in to the respective content provider. For example, the user is able to enter an account user name and a password associated with a user account with the content provider. In some embodiments, in response to detecting entry of a valid user name and password, the electronic device signs into the respective content provider and is granted access to the content provider. Optionally, the information about the plurality of featured content items from the respective content provider occupies the full display area of the user interface and the user is able to scroll the user interface to view other plurality of representations of content items available for viewing on the electronic device from the respective content provider.

In some embodiments, such as in FIG. 10D, in accordance with a determination that the electronic device is signed into the respective content provider (1106) (e.g., the electronic device is signed into a user account associated with the respective content provider, thus gaining access to the respective content provider), in accordance with a determination that a user of the electronic device has viewed a first content item from a first collection of episodic content from the respective content provider, such as in FIG. 10D, the first region 1006 of the user interface includes a first representation 1038*a* corresponding to the first collection of episodic content (e.g., with a still image background of the tv show, a motion image background of the tv show, etc.), wherein the first representation includes a selectable option 1040*a* for displaying, via the display device, a second content item from the first collection of episodic content (1108) (e.g., if the user has viewed the first episode but not the second episode of the tv show, the first representation includes an image from and a button to watch the second episode of the tv show). In some embodiments, the first representation corresponding to the first collection of episodic further includes text indicating the title of the series of episodic content, text indicating the episode number (e.g., including a season number and episode number), and text indicating the title of the episode. Optionally, if the user has partially watched an episode in the series of content, the first representation includes a progress bar indicating the current playback position in the episode and a selectable option for resuming playback of the episode. Optionally, the first representation occupies the full display area of the user interface and the user is able to scroll the user interface to view the plurality of representations of content items available for viewing on the electronic device from the respective content provider.

The above-described manner of presenting the information about the featured content items when the electronic device is not signed into the respective content provider and presenting the first representation corresponding to the first collection of episodic content when the electronic device is signed into the respective content provider allows the electronic device to present the first representation in a designated location in the user interface, which simplifies the interaction between the user and the electronic device and enhances the operability of the electronic device and makes the user-device interface more efficient (e.g., by reducing the number of inputs needed to locate the representation of the first collection of episodic content, such as by scrolling the user interface), which additionally reduces power usage and improves battery life of the electronic device by enabling the user to use the electronic device more quickly and efficiency.

In some embodiments, such as in FIG. 10E, in accordance with the determination that the electronic device is signed into the respective content provider (1110), in accordance with the determination that the user of the electronic device has viewed the first content item from the first collection of episodic content from the respective content provider (1112) (e.g., an episode in a first series of episodic content, such as or similar to a TV show), in accordance with a determination that a user of the electronic device has viewed a first content item from a second collection of episodes content from the respective content provider (e.g., an episode in a second series of episodic content, such as or similar to a TV show), a second representation 1038*d* corresponding to the second collection of episodic content is displayable in the first region 1006 of the user interface, such as in FIG. 10F, wherein the second representation includes a selectable option 1040*d* for displaying, via the display device, a second content item from the second collection of episodic content (1114). In some embodiments, the representation corresponding to the first collection of episodic content includes a selectable option that, when selected, causes the electronic device to display the representation corresponding to the second collection of episodic content. Optionally, each representation of a respective series of content that is displayed in the first region of the user interface includes a selectable option to view the next second representation such that the user is able to scroll through representations of each series of content from which they have watched an item of content. In some embodiments, if the user has only watched one series of content from the content provider, the electronic device only presents the representation of the series the user has watched in the region of the user interface designated for representations of content the user has watched, and the representation does not include the selectable options for scrolling the representations of content the user has watched.

The above-described manner of presenting a selectable option for displaying the second representation corresponding to the second collection of episodic content within the first representation corresponding to the first collection of episodic content allows the electronic device to enable the user to browse representations of content series from which the user has viewed items of content within the first region of the user interface, which simplifies the interaction between the user and the electronic device and enhances the operability of the electronic device and makes the user-device interface more efficient (e.g., by reducing the number of inputs needed to locate the representations of the series of content the user has watched before), which additionally reduces power usage and improves battery life of the electronic device by enabling the user to use the electronic device more quickly and efficiently.

In some embodiments, such as in FIG. 10E, while displaying, in the first region 1006, the first representation corresponding to the first collection of episodic content without displaying, in the first region 1006, the second representation corresponding to the second collection of episodic content (e.g., the electronic device displays one representation at a time), the electronic device receives (1116), via the one or more input devices, an input directed to the first region 1006 of the user interface that corresponds to a request to navigate horizontally in the first region of the user interface (e.g., an input to display the representation of the second collection of episodic content).

In some embodiments, such as in FIG. 10F, in response to receiving the input directed to the first region 1006 of the user interface that corresponds to the request to navigate horizontally in the first region (1118), the electronic device 500 ceases (1120) display, in the first region 1006, the first representation.

In some embodiments, such as in FIG. 10F, in response to receiving the input directed to the first region of the user interface that corresponds to the request to navigate horizontally in the first region (1118), the electronic device 500 displays (1122), in the first region 1006, the second representation. In some embodiments, the electronic device displays one representation at a time. In some embodiments, each representation occupies the entirety of a portion of the user interface for browsing representations of content. Optionally, the portion of the user interface for browsing the representations of content excludes a header region in which a representation of the user account is displayed.

The above-described manner of displaying one representation of a respective collection of episodic content at a time allows the electronic device to display more information within each representation, which simplifies the interaction between the user and the electronic device and enhances the operability of the electronic device and makes the user-device interface more efficient (e.g., by increasing the amount of information about the respective collection of episodic content that is visible to the user within the first region of the user interface), which additionally reduces power usage and improves battery life of the electronic device by enabling the user to use the electronic device more quickly and efficiently.

In some embodiments, such as in FIG. 10E, in accordance with the determination that the electronic device is signed into the respective content provider (1124), in accordance with a determination that the user of the electronic device 500 has partially viewed the first content item from the first collection of episodic content (e.g., the user started playing the episode from the collection of episodic content and played the content to a playback position that is not the end of the content), the first region 1006 of the user interface includes a second representation corresponding to the first content item, wherein the second representation includes a selectable option 1040c for resuming playback, via the display device, of the first content item from the first collection of episodic content (1126). In response to detecting selection of the selectable option for resuming playback, the electronic device presents the content from the playback position at which the user last left off. Optionally, the representation includes an indication of the playback progress of the item of content.

The above-described manner of displaying the option to resume playback within the second representation of the collection of episodic content allows the electronic device to display the option to resume playback of content the user was watching within the first region of the user interface, which simplifies the interaction between the user and the electronic device and enhances the operability of the electronic device and makes the user-device interface more efficient (e.g., by reducing the number of inputs needed to resume playback of content the user began watching), which additionally reduces power usage and improves battery life of the electronic device by enabling the user to use the electronic device more quickly and efficiently.

In some embodiments, such as in FIG. 10F, while displaying, via the display device, the first region 1006 of the user interface, the electronic device 500 receives (1128), via the one or more input devices, an input corresponding to a request to scroll through the user interface (e.g., an input to vertically scroll the user interface). In some embodiments, an input to horizontally scroll the user interface while displaying the first region of the user interface causes the electronic device to display a different representation in the first region of the user interface and an input to vertically scroll the user interface causes the electronic device to cease displaying the first region and to instead display a second region of the user interface.

In some embodiments, such as in FIG. 10G, in response to receiving the input corresponding to the request to scroll through the user interface, the electronic device 500 scrolls (1130) through the user interface to reveal, in a second region of the user interface, a plurality of representations of collections of episodic content available from the respective content provider (e.g., the electronic device displays one representation at a time that occupies the entire visible portion of the second region of the user interface, where the user is able to scroll vertically from one representation to another), wherein the plurality of representations of the collections of episodic content include respective first selectable options 1028 that are selectable to display respective content from the collections of episodic content (e.g., in response to detection of a respective first selectable option, the electronic device plays the respective content), and respective second selectable options 1022 that are selectable to display respective user interfaces dedicated to the respective collections of episodic content. In some embodiments, in response to detecting selection of a respective second selectable option, the electronic device presents a product page user interface of the respective collection of episodic content. The product page user interface optionally includes information about the respective collection of episodic content, representations of the episodes of the collection of episodic content, and one or more selectable options to play the content.

The above-described manner of presenting an option to play the content and an option to view a product page user interface of the content within the representation of the content allows the electronic device to concurrently present options to view more information about a respective collection of episodic content or play the respective collection of episodic content, which simplifies the interaction between the user and the electronic device and enhances the operability of the electronic device and makes the user-device interface more efficient (e.g., by reducing the number of inputs to either view the content or view information about the content), which additionally reduces power usage and improves battery life of the electronic device by enabling the user to use the electronic device more quickly and efficiently.

In some embodiments, such as in FIG. 10I, the plurality of representations of the collections of episodic content includes a first respective representation corresponding to a first respective collection of episodic content, the user of the electronic device has partially watched a given content item from the first respective collection of episodic content, and the first selectable option 1028c included in the first respective representation is selectable to resume playback of the given content item (1132). In response to detecting selection of the first respective representation, the electronic device resumes playback of the content item from a playback position at which the user last left off.

The above-described manner of presenting the option to resume playback of the content item within the representation allows the electronic device to automatically select the last playback position as the playback position at which playback will commence in response to detecting selection of the option, which simplifies the interaction between the user and the electronic device and enhances the operability of the electronic device and makes the user-device interface more efficient (e.g., by reducing the number of inputs needed to play the content from the last playback position), which additionally reduces power usage and improves battery life of the electronic device by enabling the user to use the electronic device more quickly and efficiently.

In some embodiments, such as in FIG. 10H, the plurality of representations of the collections of episodic content includes a first respective representation corresponding to a first respective collection of episodic content, the user of the electronic device has watched a first content item from the first respective collection of episodic content (e.g., the user has watched one of the episodes in the collection of episodic content), and the first selectable option 1028b included in the first respective representation is selectable to play a second content item, following the first content item, in the first respective collection of episodic content (1134). In some embodiments, if the user has fully watched one or more episodes from the collection of episodic content, the electronic device displays an option that, when selected, causes the electronic device to play the next episode in the collection of episodic content. For example, if the user has watched episodes 1-3 of a respective collection of episodic content, in response to detection of the first selectable option, the electronic device begins playing the fourth episode in the collection. The above-described manner of presenting the option to play the next episode in the collection of episodic content allows the electronic device to automatically select the next episode as the episode that will play in response to detecting selection of the option, which simplifies the interaction between the user and the electronic device and enhances the operability of the electronic device and makes the user-device interface more efficient (e.g., by reducing the number of inputs needed to play the next episode in the collection), which additionally reduces power usage and improves battery life of the electronic device by enabling the user to use the electronic device more quickly and efficiently.

In some embodiments, such as in FIG. 10J, the plurality of representations of the collections of episodic content includes a first respective representation corresponding to a first respective collection of episodic content, the user of the electronic device has watched every content item in the first respective collection of episodic content, and the first selectable option 1028*d* included in the first respective representation is selectable to play a first content item in the first respective collection of episodic content (1136). In some embodiments, the first selectable option includes an indication that the user has already watched all of the episodes in the collection of episodic content, such as the text "watch again," and selection of the first selectable option causes the electronic device to play the first episode of the content series from the beginning of the first episode.

The above-described manner of displaying an option to watch the collection of episodic content from the beginning of the collection if the user has already watched all episodes in the collection allows the electronic device to play the collection again from the beginning in response to detecting selection of the option, which simplifies the interaction between the user and the electronic device and enhances the operability of the electronic device and makes the user-device interface more efficient (e.g., by reducing the number of inputs needed to replay the collection from the beginning), which additionally reduces power usage and improves battery life of the electronic device by enabling the user to use the electronic device more quickly and efficiently.

In some embodiments, such as in FIG. 10E, in accordance with a determination that a representation corresponding to a given collection of episodic content is included in the first region 1006 in the user interface (e.g., the user has watched content from that collection of episodic content, and thus the user is able to horizontally scroll to a representation of the collection of content in the first region of the user interface), a representation corresponding to the given collection of episodic content is located at a first position in the second region in the user interface, such as in FIG. 10I (1138) (e.g., towards the bottom of the vertically scrollable second region of the user interface).

In some embodiments, such as in FIG. 10G, in accordance with a determination that the representation corresponding to the given collection of episodic content is not included in the first region in the user interface (e.g., the user has not yet watched the given collection of episodic content), the representation corresponding to the given collection of episodic content is located at a second position (e.g., towards the top of the vertically scrollable second region of the user interface), different than the first position, in the second region in the user interface (1140). In some embodiments, the electronic device presents representations of collections of the content the user has watched before in the first region of the user interface, which is horizontally scrollable and presents additional representations of those collections towards the bottom of the vertically scrollable second region of the user interface. Optionally, representations of collections of content the user has not yet watched are not displayed in the first region of the user interface but are displayed towards the top of the second region of the user interface (e.g., in between the first region and the lower representations of collections of episodic content that the user has already watched).

The above-described manner of displaying representations of collections of content that are included in the first region of the user interface in a first position in the second region of the user interface and displaying representations of collections of content that are not included in the first region of the user interface in a second position in the second region of the user interface allows the electronic device to reduce the number of inputs needed to locate the representations in the first region via horizontal scrolling and reduce the number of inputs needed to locate the representations in the second region via vertical scrolling, which simplifies the interaction between the user and the electronic device and enhances the operability of the electronic device and makes the user-device interface more efficient (e.g., by reducing the number of inputs needed to locate a respective representation of a respective collection of content), which additionally reduces power usage and improves battery life of the electronic device by enabling the user to use the electronic device more quickly and efficiently.

In some embodiments, such as in FIG. 10A, in accordance with the determination that the electronic device is not signed into the respective content provider, the first region 1002 includes a selectable option 1004 that is selectable to initiate a process to sign into the respective content provider (1142) (e.g., by displaying a user interface into which the user is able to enter credentials (e.g., username and/or password) for logging into the content provider, and unlocking access to the content available from that content provider). In some embodiments, the selectable option is displayed in a header region of the user interface that is included in the first region of the user interface.

The above-described manner of presenting the selectable option to log into the account in the first region of the user interface if the user is not logged in allows the electronic device to present the option to log in at a location in the user interface that is easily located by the user, which simplifies the interaction between the user and the electronic device and enhances the operability of the electronic device and makes the user-device interface more efficient (e.g., by reducing the amount of time it takes the user to log in), which additionally reduces power usage and improves battery life of the electronic device by enabling the user to use the electronic device more quickly and efficiently.

In some embodiments, such as in FIG. 10A, while displaying the first region 1006 including the selectable option 1004 that is selectable to initiate the process to sign into the respective content provider, the electronic device 500 receives (1144), via the one or more input devices, an input corresponding to a request to scroll through the user interface (e.g., a user input to vertically scroll the user interface to cease displaying the first region of the user interface and begin displaying another region of the user interface).

In some embodiments, such as in FIG. 10B, in response to receiving the input corresponding to the request to scroll through the user interface (1146), the electronic device 500 scrolls (1148) through the user interface such that the first region 1006 is no longer displayed via the display device while maintaining display, via the display device, of the selectable option 1004 that is selectable to initiate the process to sign into the respective content provider. In some embodiments, the header region that includes the selectable option that is selectable to initiate the process to sign into the respective content provider persists as the user scrolls the user interface. For example, the header region is always displayed at the top of the user interface. In response to detecting selection of the selectable option, the electronic device optionally presents a login user interface at which the user is able to provide user account information to the content provider to log into a user account that entitles the user to view content from the content provider.

The above-described manner of maintaining display of the option to sign into the user account while scrolling the user interface allows the electronic device to display the option to sign into the user account while the user browses the content provider user interface, which simplifies the interaction between the user and the electronic device and enhances the operability of the electronic device and makes the user-device interface more efficient (e.g., by reducing the number of inputs needed to sign into the account while browsing the content provider user interface), which additionally reduces power usage and improves battery life of the electronic device by enabling the user to use the electronic device more quickly and efficiently.

In some embodiments, such as in FIG. 10A, while displaying the first region 1006 including the selectable option that is selectable to initiate the process to sign into the respective content provider, the electronic device 500 receives (1150), via the one or more input devices, an input corresponding to a request to scroll through the user interface (e.g., a user input to vertically scroll the user interface to cease displaying the first region and to instead display another region of the user interface).

In some embodiments, such as in FIG. 10C, in response to receiving the input corresponding to the request to scroll through the user interface (1152), the electronic device 500 scrolls (1154) through the user interface to reveal, in a second region in the user interface, a representation that includes information 1030 about signing into the respective content provider (e.g., information about how to subscribe to the content provider, information about an application that presents content available via the content provider, etc.) and a second selectable option 1032 that is selectable to initiate the process to sign into the respective content provider. In some embodiments, the information about signing into the respective content provider is presented at the bottom of the user interface. The user interface optionally includes one or more representations of items of content accessible via the content provider. In some embodiments, after the user scrolls past the all of the representations of content items, the electronic device displays information about content provider. The above-described manner of displaying the information about signing into the respective content provider and the option to initiate the process to sign into the respective content provider allows the electronic device to simplify the process for signing into the content provider after scrolling through the user interface, which simplifies the interaction between the user and the electronic device and enhances the operability of the electronic device and makes the user-device interface more efficient (e.g., by reducing the number of inputs needed to sign into the user account after scrolling through the user interface), which additionally reduces power usage and improves battery life of the electronic device by enabling the user to use the electronic device more quickly and efficiently.

In some embodiments, such as in FIGS. 10G-10J, the user interface includes (1156) representations of content available from the respective content provider that have a first set of one or more content ratings above a first scroll position in the user interface (1160) (e.g., collections of content items that are not specifically marketed towards children are displayed towards the top of the user interface, or more generally, content that has a parental/content rating within a first range of content ratings).

In some embodiments, such as in FIGS. 10K-10L, the user interface includes (1156) representations of content available from the respective content provider that have a second set of one or more content ratings, different than the first set of one or more ratings, below the first scroll position in the user interface (1162). In some embodiments, collections of content items that are specifically marketed towards children are displayed towards the bottom of the user interface, or more generally, content that has a parental/content rating within a second range of content ratings, different than the first range. All of the content with the second set of ratings is optionally displayed below all of the content with the first set of ratings. The above-described manner of presenting the representations of content items with the first set of one or more content ratings above the first scroll position and presenting representations of content items with a second set of one or more content ratings below the first scroll position allows the electronic device to group representations of content items with similar content ratings together in the user interface, which simplifies the interaction between the user and the electronic device and enhances the operability of the electronic device and makes the user-device interface more efficient (e.g., by reducing the number of inputs to browse content items with the desired content rating), which additionally reduces power usage and improves battery life of the electronic device by enabling the user to use the electronic device more quickly and efficiently.

In some embodiments, such as in FIG. 10L, while displaying the user interface, the electronic device 500 receives (1164), via the one or more input devices, an input corresponding to a request to display a product page user interface for a given collection of episodic content (e.g., the product page user interface includes additional information about the collection of episodic content, such as episodes, related content, bonus content, how to watch the content, a summary of the content, and the like).

In some embodiments, such as in FIG. 10M, in response to receiving the input corresponding to the request to display the product page user interface (1166), the electronic device 500 ceases (1168) display of the user interface.

In some embodiments, such as in FIG. 10N, in response to receiving the input corresponding to the request to display the product page user interface (1166), the electronic device 500 displays (1170), via the display device, the product page user interface for the given collection of episodic content, wherein the product page user interface for the given collection of episodic content includes an episodes region that includes a plurality of representations 1160a-c of a plurality of episodes included in the given collection of episodic content (e.g., selectable representations to display the respective episodes). In some embodiments, the representations of the episodes included in the given collection of episodic content are displayed in a horizontally scrollable row in the product page user interface. In some embodiments, the electronic device also displays a row of representations of information about the respective episodes in the collection of content that horizontally scrolls with the row of representations of the episodes.

In some embodiments, such as in FIG. 10N, in response to receiving the input corresponding to the request to display the product page user interface (1166), in accordance with a determination that the user of the electronic device has fully viewed a first set of episodes in the collection of episodic content (e.g., the subset of the episodes that the user has viewed), a first respective representation 1060*a* of a first respective episode, subsequent to the first set of episodes (e.g., the next episode), is displayed at a first position in the episodes region of the product page user interface (e.g., the leftmost position in the section of the episodes row that is initially visible when the user scrolls to the episodes row of the product page user interface), the first respective representation 1060*b* is displayed with a visual indication 1064 that the first respective episode is a current episode for viewing in the given collection of episodic content (e.g., the text "currently watching" is displayed over the representation of the next episode), and representations of the first set of episodes are not displayed in the episodes region (1172) (e.g., the representations of the first set of episodes are displayed in response to detecting an input to scroll to the left in the episodes row). In some embodiments, representations of one or more episodes after the first respective episode are displayed to the right of the first respective representation of the first respective episode.

In some embodiments, in response to receiving the input corresponding to the request to display the product page user interface (1166), in accordance with a determination that the user of the electronic device has fully viewed a second set of episodes in the collection of episodic content (e.g., the subset of the episodes that the user has viewed), a second respective representation of a second respective episode, subsequent to the second set of episodes (e.g., the next episode), is displayed at the first position in the episodes region of the product page user interface (e.g., the leftmost position in the section of the episodes row that is initially visible when the user scrolls to the episodes row of the product page user interface), the second respective representation is displayed with the visual indication that the second respective episode is the current episode for viewing in the given collection of episodic content (e.g., the text "currently watching" is displayed over the representation of the next episode), and representations of the second set of episodes are not displayed in the episodes region (1174). For example, a representation of a different episode would be displayed in the position of representation 1060*a* in FIG. 10N with the indication 1064 above the representation. In some embodiments, the representations of the second set of episodes are displayed in response to detecting an input to scroll to the left in the episodes row. In some embodiments, representations of one or more episodes after the first respective episode are displayed to the right of the first respective representation of the first respective episode.

The above-described manner of displaying the indication of the next episode above the representation of the next episode, and of automatically initially putting the current focus on that next episode when vertically scrolling through the user interface, allows the electronic device to indicate to the user which episode is next while the user views the row of representations of the episode and provides for a quick and efficient way for the user to start playback of the next episode (e.g., simply by selecting the episode with the current focus without having to change the focus first), which simplifies the interaction between the user and the electronic device and enhances the operability of the electronic device and makes the user-device interface more efficient (e.g., by making it easier for the user to determine the next episode so the user is able to select the representation of the next episode to keep watching the collection of content), which additionally reduces power usage and improves battery life of the electronic device by enabling the user to use the electronic device more quickly and efficiently.

In some embodiments, such as in FIG. 10N, while displaying the episodes region of the product page user interface with the first respective representation 1060*a* of the first respective episode displayed in the first position in the episodes region and the representations of the first set of episodes not displayed in the episodes region (e.g., the electronic device displays a representation of the next episode at the start of the row of episodes and does not display the representations of the one or more episodes already watched by the user), and while the first respective representation 1060*a* has the current focus and is displayed with the visual indication 1064 (e.g., the text "currently playing" above the first respective representation), the electronic device 500 receives (1176), via the one or more input devices, an input (1001) corresponding to a request to navigate horizontally in the product page user interface (e.g., a request to reveal a representation of an episode that is not currently displayed by the electronic device, such as a leftward scroll to scroll to an off-screen representation to the left of the next episode representation).

In some embodiments, such as in FIG. 10O, in response to receiving the input corresponding to the request to navigate horizontally in the product page user interface (1178), the electronic device 500 displays (1180) the first respective representation 1060*a* in a second position in the episodes region, wherein the first respective representation 1060*a* is displayed with the visual indication 1064 (e.g., in response to an input scrolling to the left to reveal one or more representations of the episodes the user has previously watched, the electronic device moves the representation of the next episode to the right). Optionally, the visual indication moves to be displayed in association with the representation of the next episode.

In some embodiments, such as in FIG. 10O, in response to receiving the input corresponding to the request to navigate horizontally in the product page user interface (1178), the electronic device displays (1182), in the first position in the episodes region, a third respective representation 1060*d* of a third respective episode in the first set of episodes, wherein the third respective representation 1060*d* has the current focus. In response to the input to scroll the episodes row, the electronic device displays (reveals) a representation of an episode the user has already watched at the beginning of the episodes row (e.g., the position in the row that was previously occupied by the next episode representation).

The above-described manner of continuing the display the first respective representation with the visual indication allows the electronic device to indicate to the user which episode is next while the user views the row of representations of the episode, which simplifies the interaction between the user and the electronic device and enhances the operability of the electronic device and makes the user-device interface more efficient (e.g., by making it easier for the user to determine the next episode so the user is able to select the representation of the next episode to keep watching the collection of content), which additionally reduces power usage and improves battery life of the electronic device by enabling the user to use the electronic device more quickly and efficiently.

It should be understood that the particular order in which the operations in FIGS. 11A-11G have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1300) are also applicable in an analogous manner to method 1100 described above with respect to FIGS. 11A-11G. For example, the ways of presenting representations of content based on the content consumption history of the user account described above with reference to method 1100 optionally have one or more of the characteristics of the ways of presenting representations of items of content, presenting representations of auxiliary content, presenting representations of bonus content items, etc., described herein with reference to other methods described herein (e.g., methods 700, 900, and 1300). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C or application specific chips. Further, the operations described above with reference to FIGS. 11A-11G are, optionally, implemented by components depicted in FIGS. 1A-1B. For example, displaying operations 1102, 1122, and 1168 and receiving operations 1116, 1128, and 1144 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

Presenting Representations of Bonus Content Items

Users interact with electronic devices in many different manners, including using an electronic device to browse bonus content items associated with a respective series of episodic content. In some embodiments, an electronic device is able to present representations of bonus content items in a user interface for the respective series of episodic content. The embodiments described below provide ways in which an electronic device selects which representations of bonus content items to display and the order in which the representations are to be displayed in the user interface for the respective series of episodic content. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 12A:
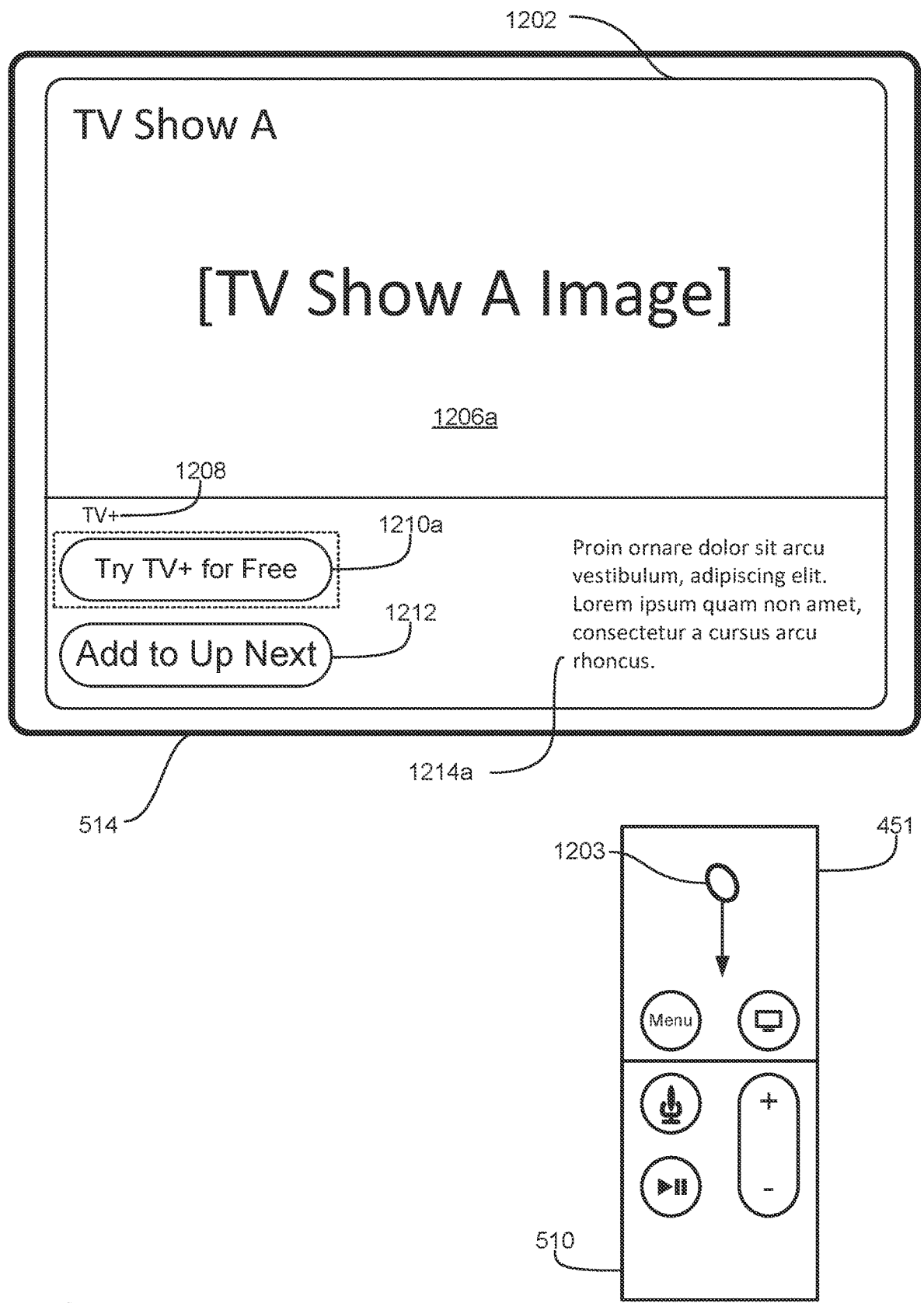
FIGS. 12A-12CC illustrate exemplary ways in which an electronic device presents representations of bonus content items in a user interface for a respective series of episodic content in accordance with some embodiments of the disclosure.
Figure 12B:
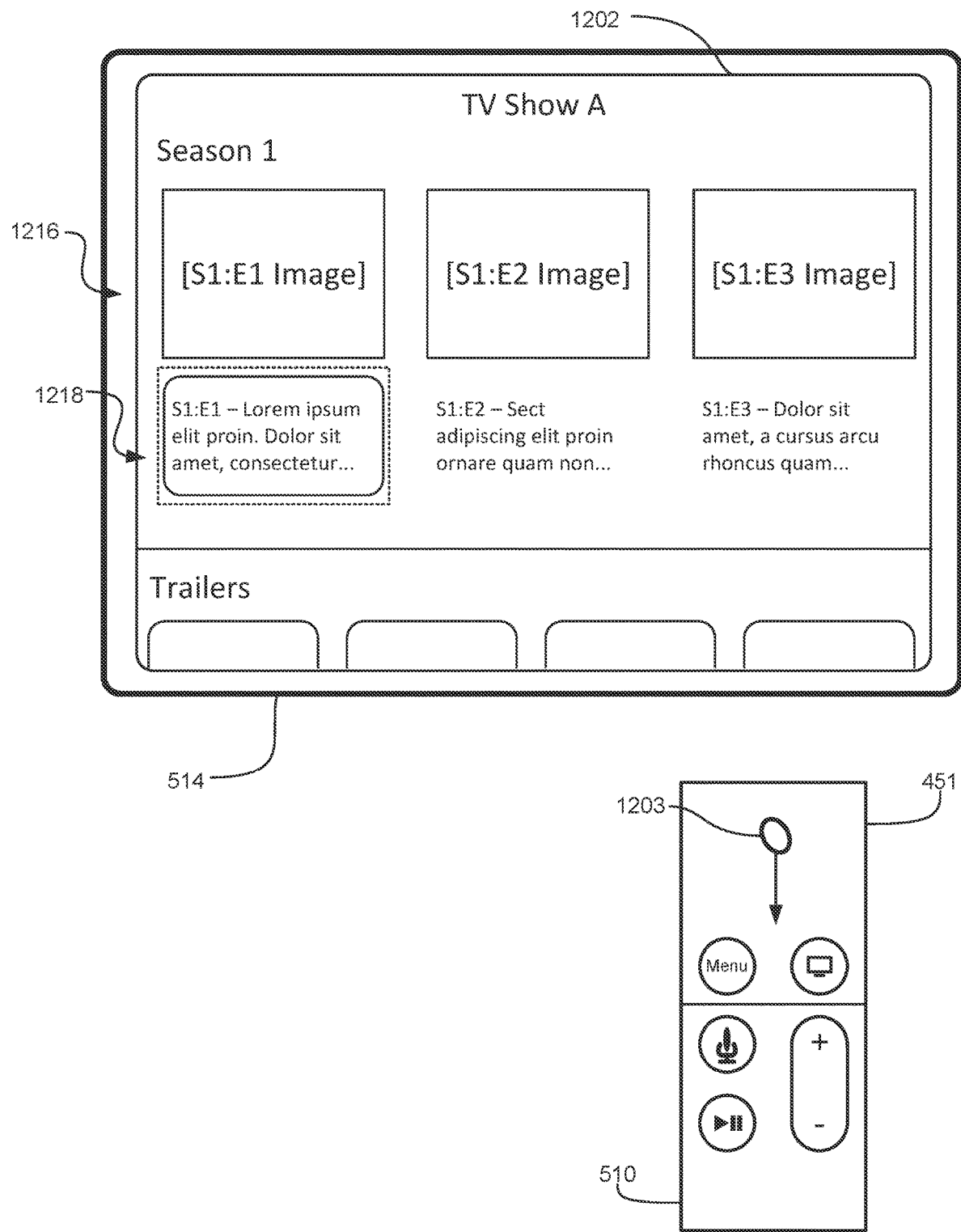
Figure 12C:
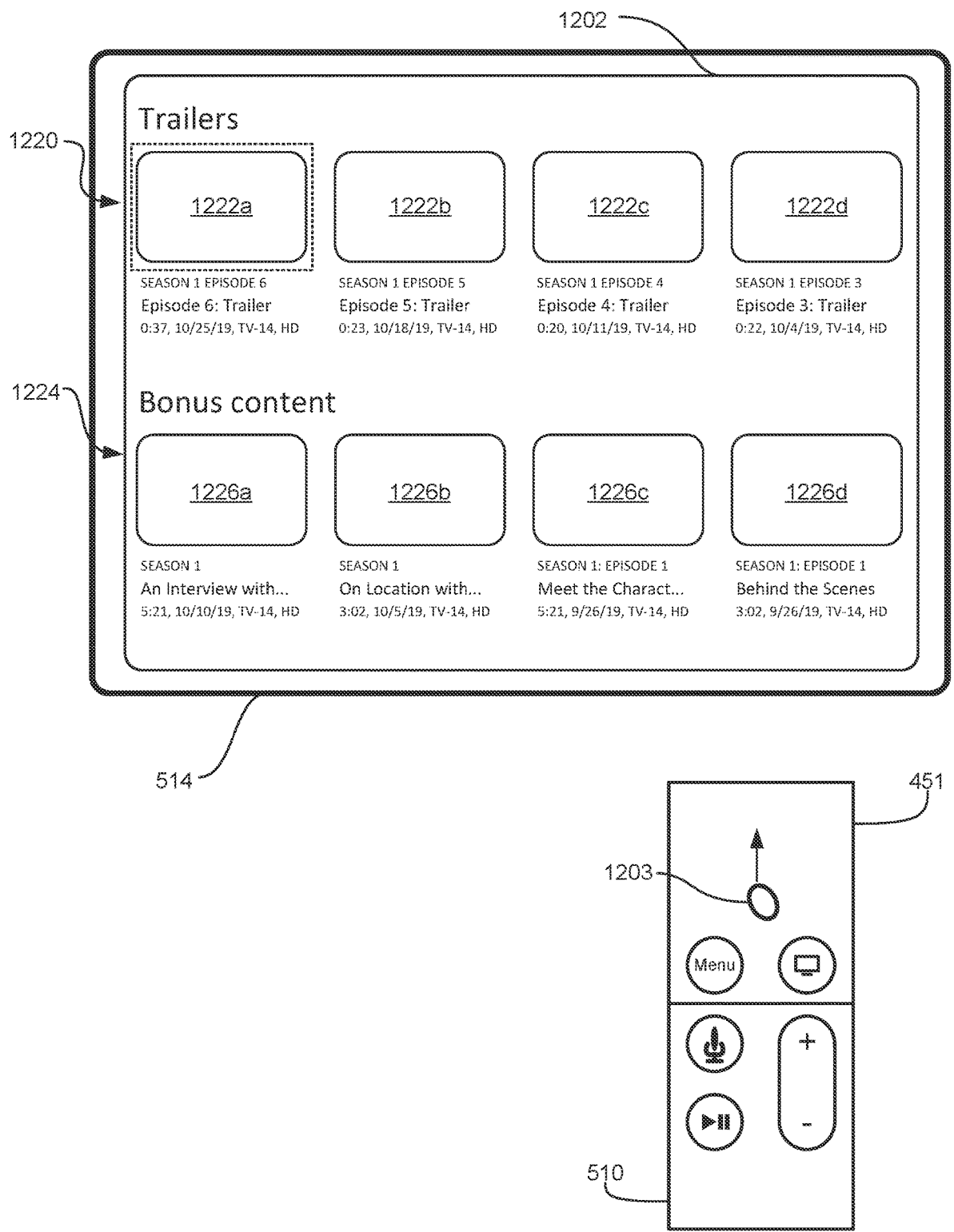

FIGS. 12A-12CC illustrate exemplary ways in which an electronic device 500 presents representations of bonus content items in a user interface for a respective series of episodic content in accordance with some embodiments of the disclosure. The embodiments in these figures are used to illustrate the processes described below, including the processes described with reference to FIG. 13.

FIGS. 12A-12D illustrate exemplary ways in which an electronic device 500 displays representations 1226 of bonus content items and representations 1222 of trailers associated with a series of episodic content when the user of the electronic device has not yet watched the series of episodic content and/or is not yet entitled to access the series of episodic content. In some embodiments, the representations 1222 and 1226 are displayed within a product page user interface 1202 associated with the series of episodic content. As will be described in more detail below, the product page user interface 1202 optionally includes information about the series of episodic content and selectable options that, when selected, cause the electronic device 500 to initiate a process to access the series of episodic content and bonus content and trailers associated with the series. In some embodiments, the product page user interface is presented in accordance with one or more steps of methods 700, 900, and/or 1100 described above.

The series of episodic content is optionally made accessible to a user via a subscription to a subscription service (e.g., a content streaming service, a television provider, etc). In some embodiments, in accordance with a determination that the user is not entitled to access the series of episodic content, the product page user interface 1202 includes one or more selectable options 1210*a* that, when selected, cause the electronic device 500 to initiate a process to entitle the user to access the series (e.g., a process to subscribe to the subscription service). Although the user is not yet entitled to access the series of episodic content, the product page user interface 1202 optionally includes information related to the series of episodic content, which may entice the user to subscribe to the subscription service to gain access to the series of episodic content. In some embodiments, one or more episodes in the series of episodic content are accessible to the user without a subscription, and a subscription is needed to access the remaining episodes in the series and/or some of the bonus content associated with the series.

FIG. 12A illustrates a product page user interface 1202 associated with a series of episodic content (e.g., "TV Show A") that the user of the electronic device 500 has not yet watched and is not currently entitled to access. The product page user interface 1202 includes an image 1206*a* related to the series, an indication 1208 of the subscription service that entitles the user to access the series, a selectable option 1210*a* that, when selected, causes the electronic device 500 to initiate a process to access the series, a selectable option 1212 that, when selected, causes the electronic device 500 to initiate a process to add one or more episodes in the series to a playback queue of the user, and metadata 1214*a* associated with the series.

The image 1206*a* is optionally a still image or video content related to the entire series, the entire first season of the series, or the first episode of the series. The selectable option 1210*a* that, when selected, causes the electronic device 500 to initiate a process to access the series is optionally selectable to initiate a process to subscribe to the service that provides access to the series. In some embodiments, initiating a subscription includes starting a free trial period of the subscription service or initiating a paid subscription to the service. Metadata 1214*a* optionally includes information about the series such as a synopsis of the series, genre, release date, parental guidance rating, audio/video format, accessibility information, runtime of the first episode, and the like.

In FIG. 12A, selectable option 1210*a* is currently selected (e.g., has the current focus) in the user interface 1202, as indicated by the dashed box shown around selectable option 1210*a* (which is optionally displayed or not displayed in the user interface). As shown in FIG. 12A, the user swipes (e.g., with contact 1203) down to scroll the product page user interface 1202 down. In response to the input illustrated in FIG. 12A, the electronic device 500 scrolls the user interface 1202 as shown in FIG. 12B.

FIG. 12B illustrates a portion of the product page user interface 1202 that includes a row of representations 1216 of episodes in the series and a row of associated descriptions 1218 of each episode. The portion of the product page user interface illustrated in FIG. 12B is similar to the portion of the product page user interface described above with reference to FIGS. 8B and 10N-10O. This portion of the product page user interface is optionally displayed in accordance with one or more steps of methods 900 and 1100.

The representations 1216 are selectable to initiate a process to access the respective episode in the series. Because the user of the electronic device 500 is not entitled to access the series of episodic content, selecting a representation 1216 optionally causes the electronic device 500 to initiate a process to subscribe to the subscription service that provides access to the series. In some embodiments, one or more of the episodes are accessible without a subscription and selecting a representation 1216 of one of these episodes causes the electronic device 500 to present the episode. The associated descriptions 1218 are selectable to present an episode page user interface associated with a respective episode, as will be described in more detail below at least with reference to FIGS. 12E-12F.

As shown in FIG. 12B, the user swipes (e.g., with contact 1203) down to scroll the product page user interface 1202 down. In response to detecting the user input illustrated in FIG. 12B, the electronic device 500 scrolls the product page user interface 1202 down, as shown in FIG. 12C.

FIG. 12C illustrates a portion of the product page user interface 1202 that includes a row 1220 of representations 1222 of trailers associated with the series of episodic content and a row 1224 of bonus content items associated with the series of episodic content. Because the user has not yet watched the series of episodic content, the trailer row 1220 is displayed above the bonus content row 1224. In some situations, the user of the electronic device 500 may be more likely to want to view trailers associated with the series of episodic content than bonus content associated with the series of episodic content when they have not yet started watching the series.

Each representation 1222 of a trailer includes an image corresponding to the trailer and metadata associated with the trailer, including one or more of a respective episode with which the trailer is associated, the title of the trailer, the runtime of the trailer, the release date of the trailer, the parental guidance rating of the trailer, or an indication of the video format of the trailer. For example, representation 1222*a* includes an image, an indication of an episode (e.g., "season 1 episode 6"), a title (e.g., "Episode 6: trailer"), a runtime (e.g., "0:37"), a release date (e.g., "Oct. 25, 2019"), a parental guidance rating (e.g., "TV-14"), and an indication of the video format (e.g., "HD") of the trailer. Each respective representation 1222 is selectable to access (e.g., play via display 514) the respective trailer associated with the respective selected representation.

Although the representations 1222 illustrated in FIG. 12C each indicate that the respective trailer is associated with a particular episode of the series of episodic content, in some embodiments, the series of episodic content is associated with one or more trailers associated with the entire series or an entire season of the series of episodic content—in such embodiments, such representations 1222 would optionally be displayed with an indication of the series (e.g., "TV Show A") or an indication of the season (e.g., "Season 1") rather than an indication of a particular episode. As shown in FIG. 12C, the representations 1222 of the trailers are displayed in reverse-chronological order based on the release date of the trailers. The representations 1222 of the trailers are optionally displayed in reverse chronological order irrespective of whether or not the user has watched the series of episodic content, whether or not the user is entitled to access the series of episodic content, the playback position of the user within the series of episodic content, and/or the association of each trailer with a particular episode, a particular season, or the entire series of episodic content. In some embodiments, the trailer row 1220 is horizontally scrollable to reveal additional representations of trailers not displayed prior to receiving the scrolling input.

Each representation 1226 of a bonus content item includes an image corresponding to the bonus content item and metadata associated with the bonus content item, including one or more of a respective episode or season with which the bonus content item is associated, the title of the bonus content item, the runtime of the bonus content item, the release date of the bonus content item, the parental guidance rating of the bonus content item, or an indication of the video format of the bonus content item. For example, representation 1226*a* includes an image, an indication that the bonus content item is associated with the first season of the series (e.g., "season 1"), a title (e.g., "An interview with . . . "), a runtime (e.g., "5:21"), a release date (e.g., "Oct. 10, 2019"), a parental guidance rating (e.g., "TV-14'), and an indication of the video format (e.g., "HD") of the bonus content item. Each respective representation 1226 is selectable to access (e.g., play via display 514) the respective bonus content item associated with the respective selected representation.

As shown in FIG. 12C, some bonus content items are associated with particular seasons of the episodic content (e.g., the bonus content items corresponding to representations 1226*a* and 1226*b*) and some bonus content items are associated with particular episodes of the series of episodic content (e.g., the bonus content items corresponding to representations 1226*c* and 1226*d*). As shown in FIG. 12C, the representations 1226*a* and 1226*b* of the bonus content items associated with the entire season of episodic content are displayed before (e.g., to the left of) the representations 1226*c* and 1226*d* of bonus content items associated with a respective episode of the series of episodic content, because the user has not yet watched the series of episodic content. In some embodiments, the bonus content row 1224 is horizontally scrollable to reveal additional representations of bonus content items not displayed prior to receiving the scrolling input.

Figure 12D:
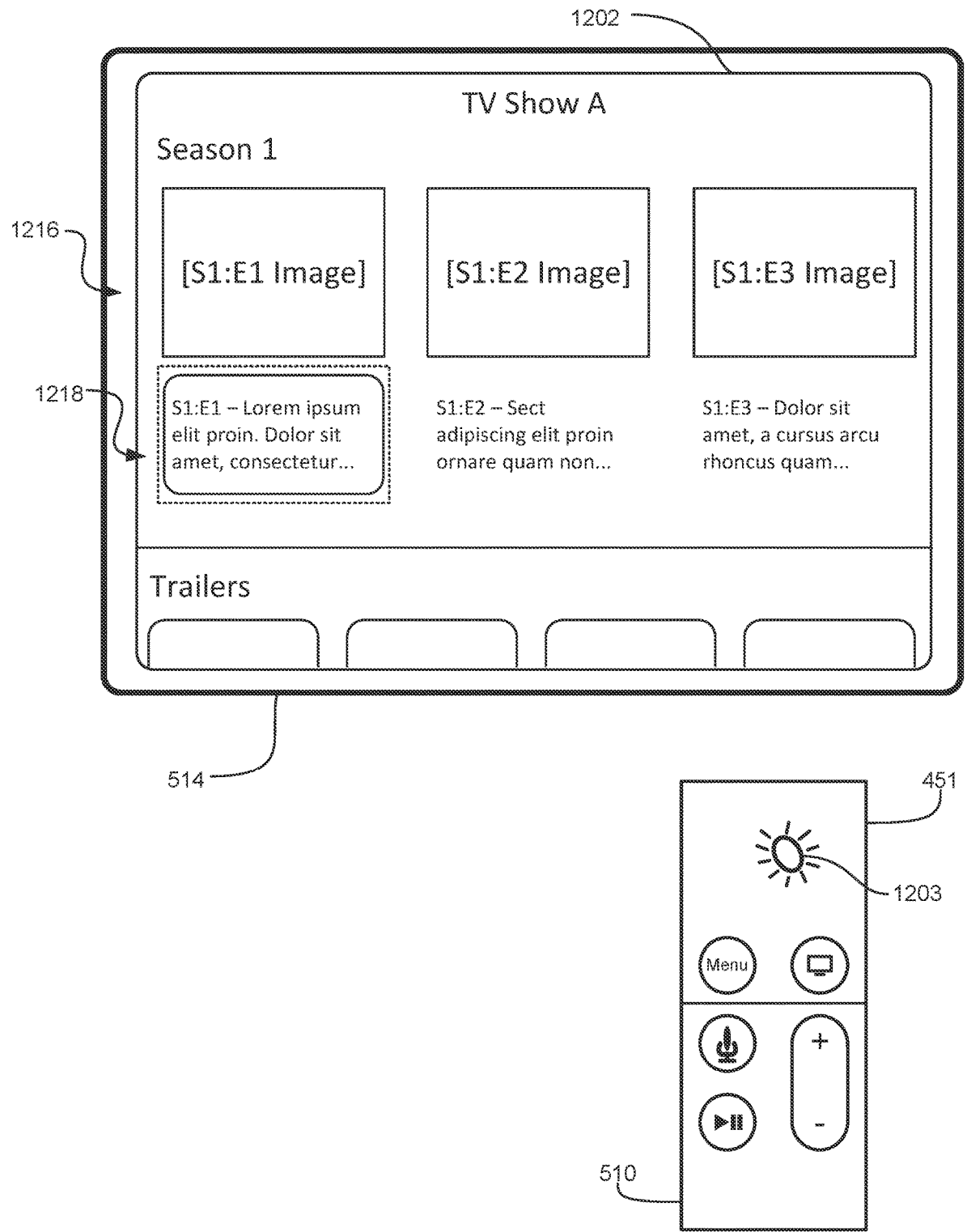

As shown in FIG. 12C, the user swipes (e.g., with contact 1203) up to scroll the product page user interface 1202 up. In response to one or more user inputs including the input illustrated in FIG. 12C, the electronic device 500 scrolls the product page user interface up, as shown in FIG. 12D. As shown in FIG. 12D, the user selects (e.g., with contact 1203) the associated description 1218 of the first episode of the series of episodic content.

Figure 12E:
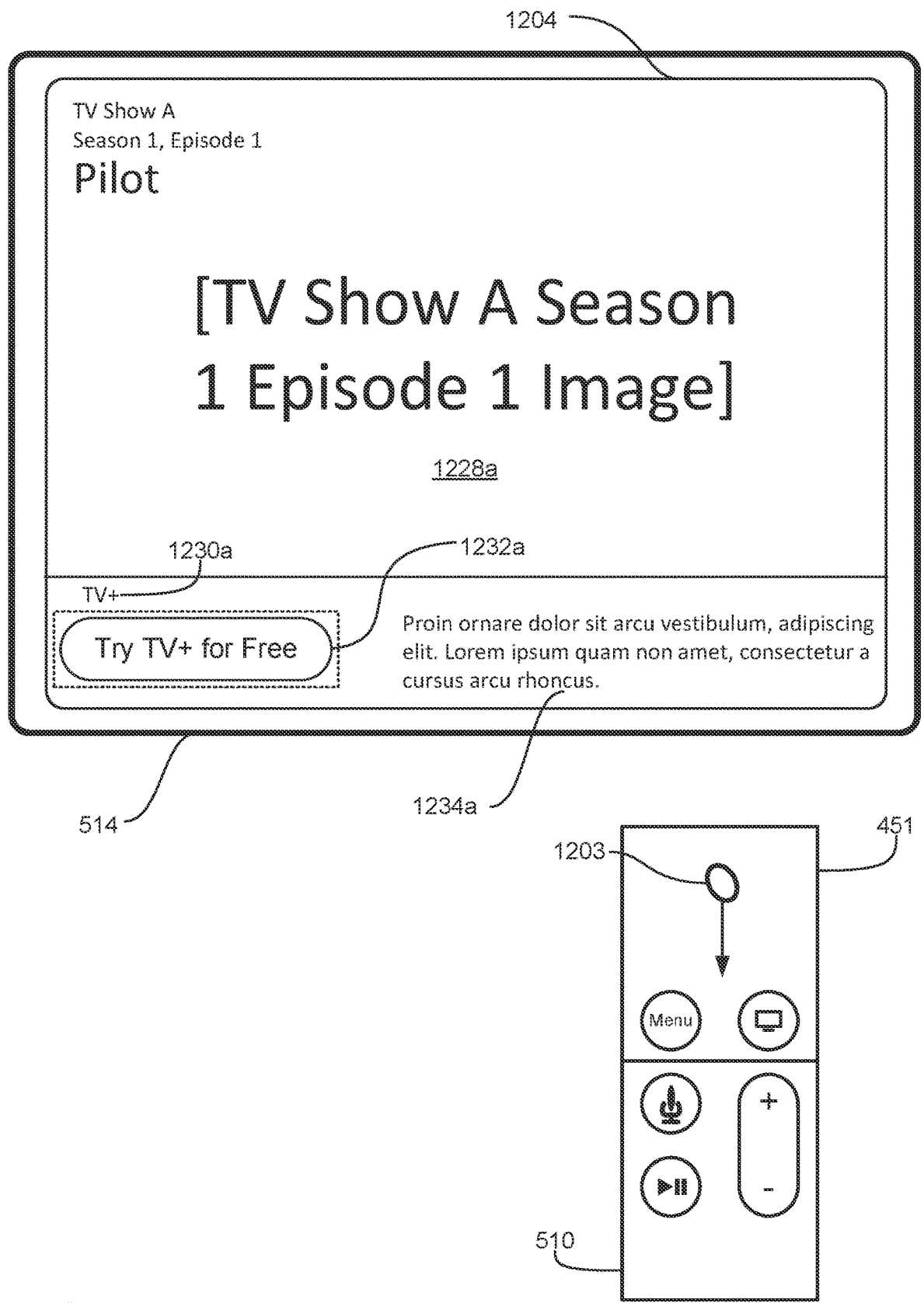
Figure 12F:
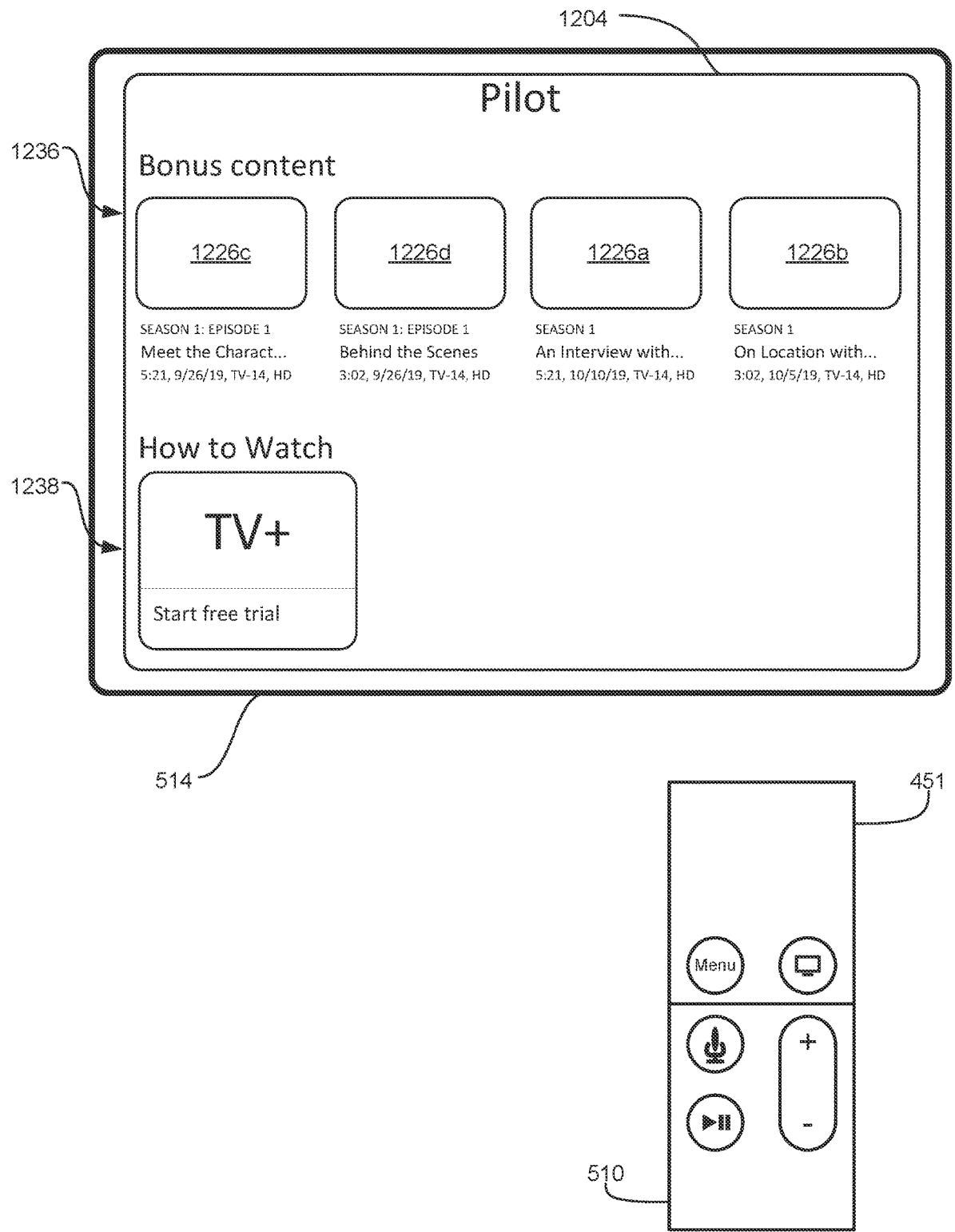

In response to the input illustrated in FIG. 12D, the electronic device 500 presents an episode page user interface 1204 illustrated in FIG. 12E. FIGS. 12E-12F illustrate ways in which the electronic device 500 displays representations of bonus content items in an episode page user interface when the user is not entitled to access the series of episodic content and has not yet watched the series of episodic content, in accordance with some embodiments.

FIG. 12E illustrates an episode page user interface 1204 for the first episode of the series of episodic content. The episode page user interface 1204 is similar to the episode page user interface described above with reference to FIGS. 10P-10Q. In some embodiments, the episode page user interface is displayed in accordance with one or more steps of method 1100. The episode page user interface 1204 includes an image 1228*a* corresponding to the first episode, an indication 1230*a* of the service that provides access to the series of episodic content, a selectable option 1232*a* that, when selected, causes the electronic device 500 to initiate a process to access the episode, and information 1234*a* about the episode.

The image 1228*a* optionally includes a still image and/or video content corresponding to the first episode. The selectable option 1232*a* optionally causes the electronic device to initiate a process to subscribe to the subscription service that provides the series of episodic content in response to detection of selection of the option 1232*a*, because the user is not yet subscribed to the subscription service. In some embodiments, the process to subscribe to the subscription service includes initiating a free trial subscription or configuring a paid subscription to the service. Information 1234*a* optionally includes a synopsis of the episode, a runtime of the episode, parental guidance rating, audio/video format, accessibility information, release date, and the like.

FIGS. 12E-12F illustrate an episode page user interface 1204 that includes representations of bonus content items in accordance with some embodiments. As shown in FIG. 12E, the user swipes (e.g., with contact 1203) down to cause the electronic device 500 to scroll the user interface 1204 down. In response to one or more inputs including the input illustrated in FIG. 12E, the electronic device 500 scrolls the episode page user interface 1204 down as shown in FIG. 12F.

FIG. 12F illustrates a portion of the episode page user interface 1204 that includes a row 1236 of representations 1226 of bonus content items associated with the first episode of the series of episodic content and an indication 1238 of how to access the episode.

The representations 1226 of bonus content items are displayed with the representations 1226*c* and 1226*d* of bonus content items related only to the first episode first in the bonus content row 1236, followed by representations 1226*a* and 1226*b* of bonus content items related to the entire season that includes the first episode. The representations 1226 are described in more detail above with reference to FIG. 12C. As shown in FIG. 12F, the episode page user interface does not include representations of bonus content items related only to episodes other than the first episode.

The episode page user interface 1204 further includes an indication 1238 of how to watch the episode. The episode is available through the "TV+" streaming service, so the product page user interface includes a representation 1238 of the streaming service that, when selected, causes the electronic device 500 to initiate a process to subscribe to the streaming service (e.g., starting a free trial or initiating a paid subscription).

Thus, FIGS. 12A-12F illustrate ways the electronic device 500 presents representations of bonus content items when the user has not started watching the series of episodic content and/or is not entitled to the service that provides access to the series in accordance with some embodiments.

FIGS. 12G-12L illustrate ways the electronic device 500 presents representations of bonus content items when the user is entitled to the service that provides access to the series of episodic content but has not watched the series of episodic content. FIGS. 12G-12J illustrate a product page user interface 1202 for the series of content when the user is entitled to the service that provides access to the series of content but has not yet watched the series of content.

Figure 12G:
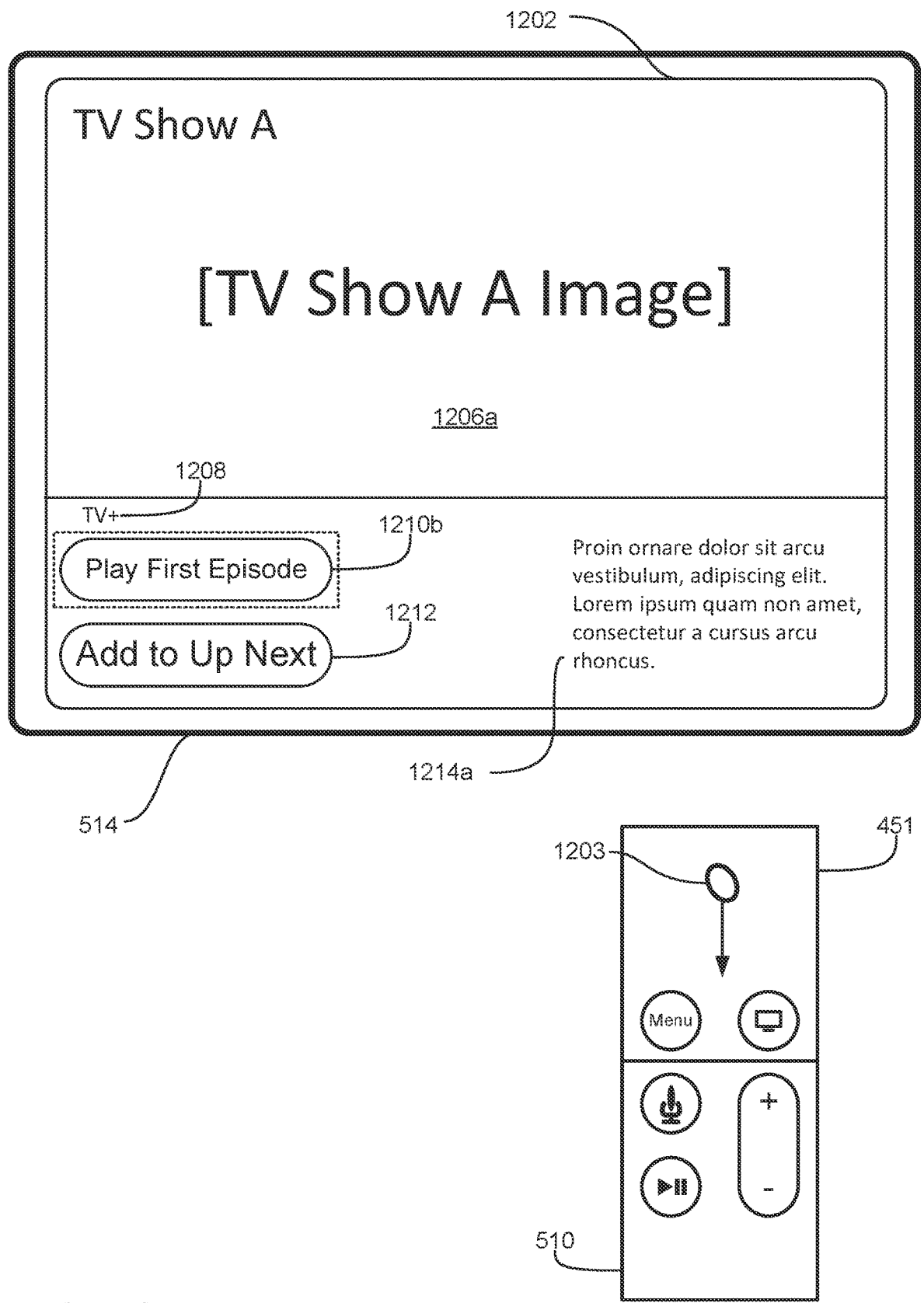

FIG. 12G illustrates a portion of the product page user interface 1202 that is the same portion of the product page user interface 1202 as the portion of the product page user interface 1202 illustrated in FIG. 12A, except for the differences that will now be described. The product page user interface 1202 includes a selectable option 1210*b* that, when selected, causes the electronic device 500 to initiate playback (e.g., via display 514) of the first episode in the series of episodic content without initiating a process to subscribe to the service that provides access to the series, because the user is entitled to access the series of episodic content and has not yet started watching the series.

As shown in FIG. 12G, the user swipes (e.g., with contact 1203) down to cause the electronic device 500 to scroll the product page user interface 1202 down. In response to one or more inputs including the input illustrated in FIG. 12G, the electronic device 500 presents the portion of the product page user interface 1202 illustrated in FIG. 12H.

Figure 12H:
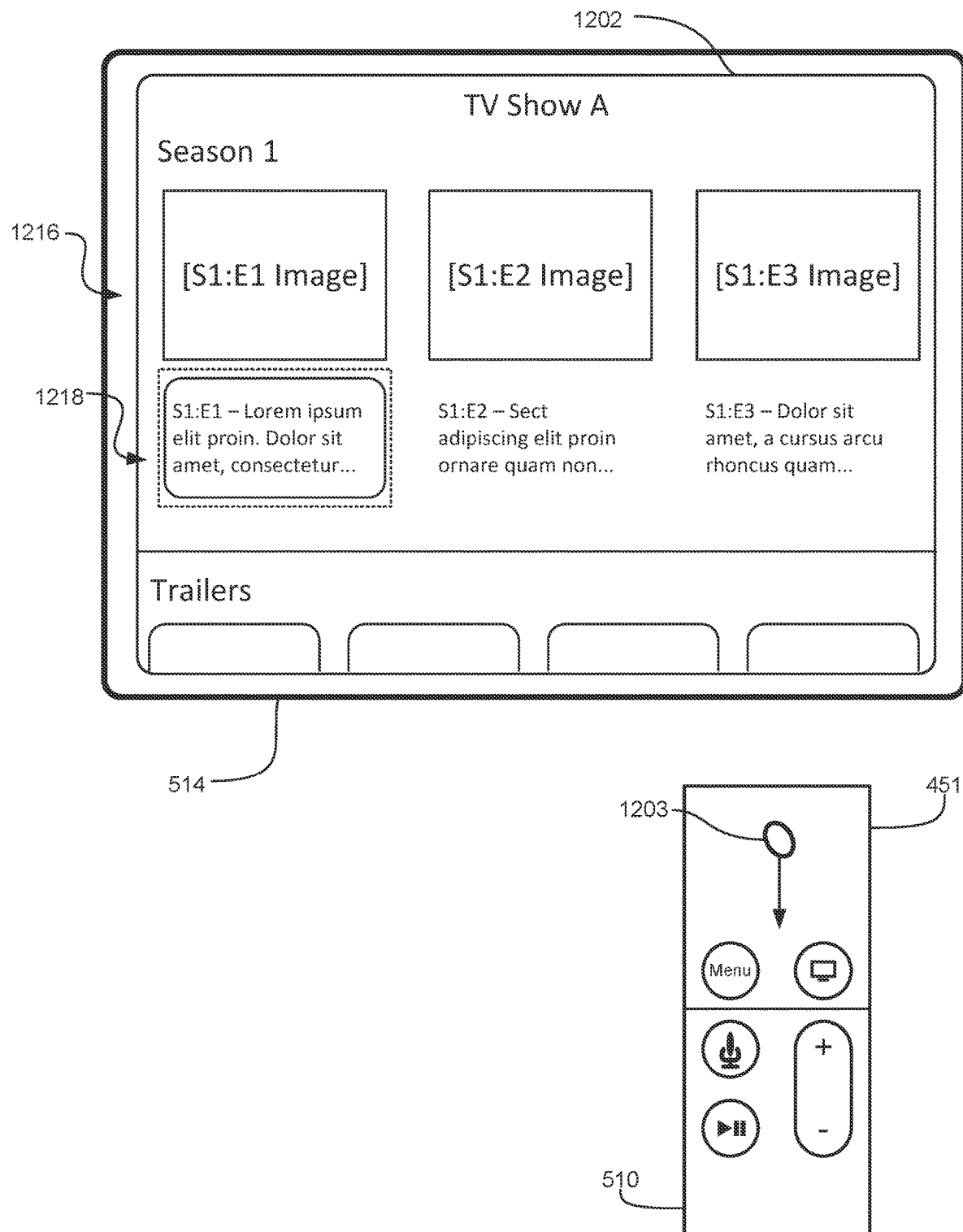

The portion of the product page user interface 1202 illustrated in FIG. 12H is the same portion of the product page user interface 1202 as the portion of the product page user interface 1202 described above with reference to FIG. 12B, except for the differences noted here. Because the user is entitled to access the series of episodic content, in response to detecting selection of one of the representations 1216 of episodes in the series of episodic content, the electronic device 500 initiates a process to play (e.g., via display 514) the respective episode without initiating a process to subscribe to the service that provides access to the series of episodic content.

As shown in FIG. 12H, the user swipes (e.g., with contact 1203) down to cause the electronic device 500 to scroll the product page user interface 1202 down. In response to one or more inputs including the input illustrated in FIG. 12H, the electronic device 500 presents the portion of the product page user interface 1202 illustrated in FIG. 12I.

Figure 12I:
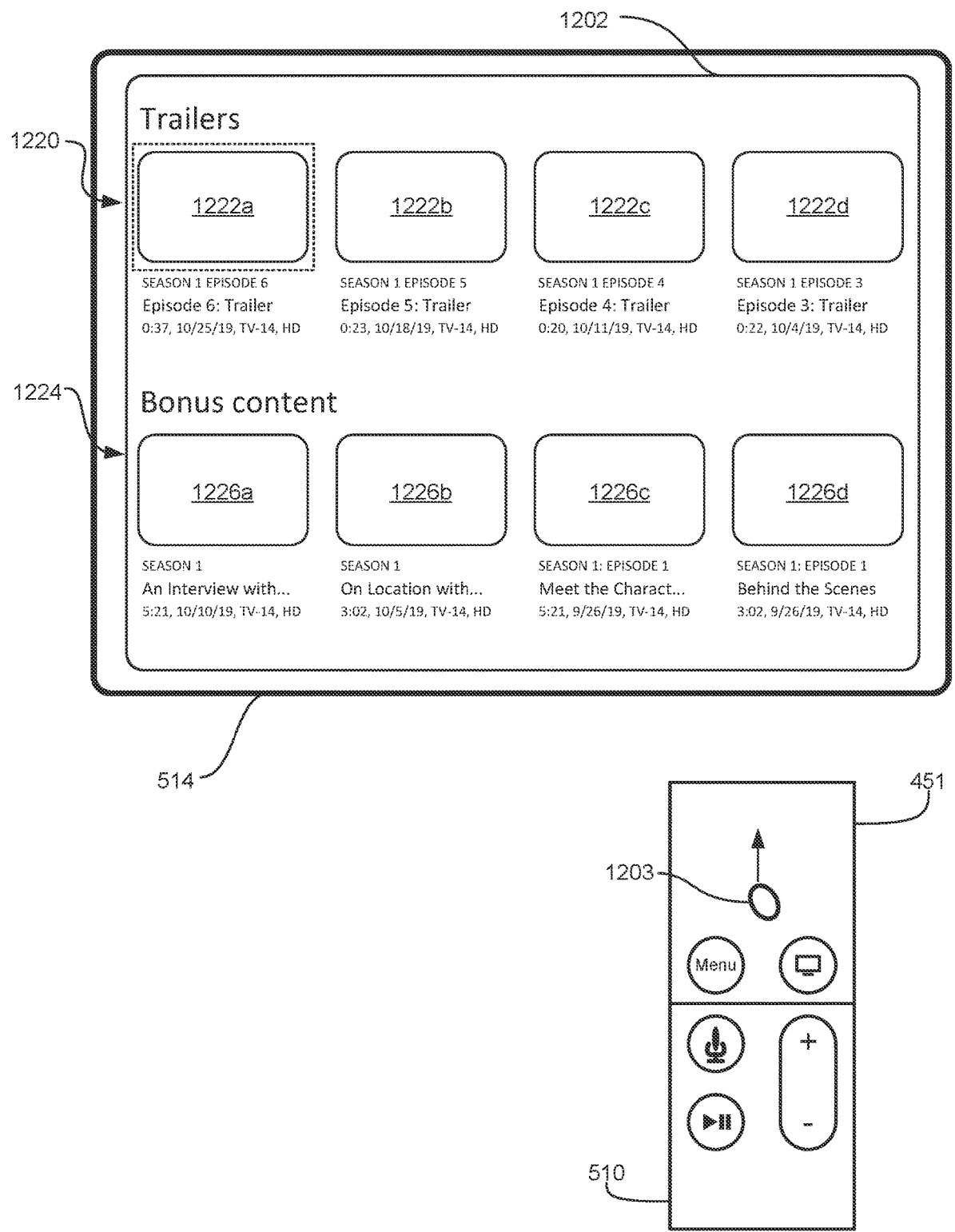

FIG. 12I illustrates a portion of the product page user interface 1202 that includes the trailer row 1220 and the bonus content row 1224. The portion of the product page user interface 1202 illustrated in FIG. 12I is the same portion of the product page user interface 1202 as the portion of the product page user interface illustrated in FIG. 12C. Because the user has not watched the series of episodic content, the representations 1222 of trailers and the representations 1226 of bonus content items are displayed in the same arrangement as the arrangement illustrated in FIG. 12C.

Figure 12J:
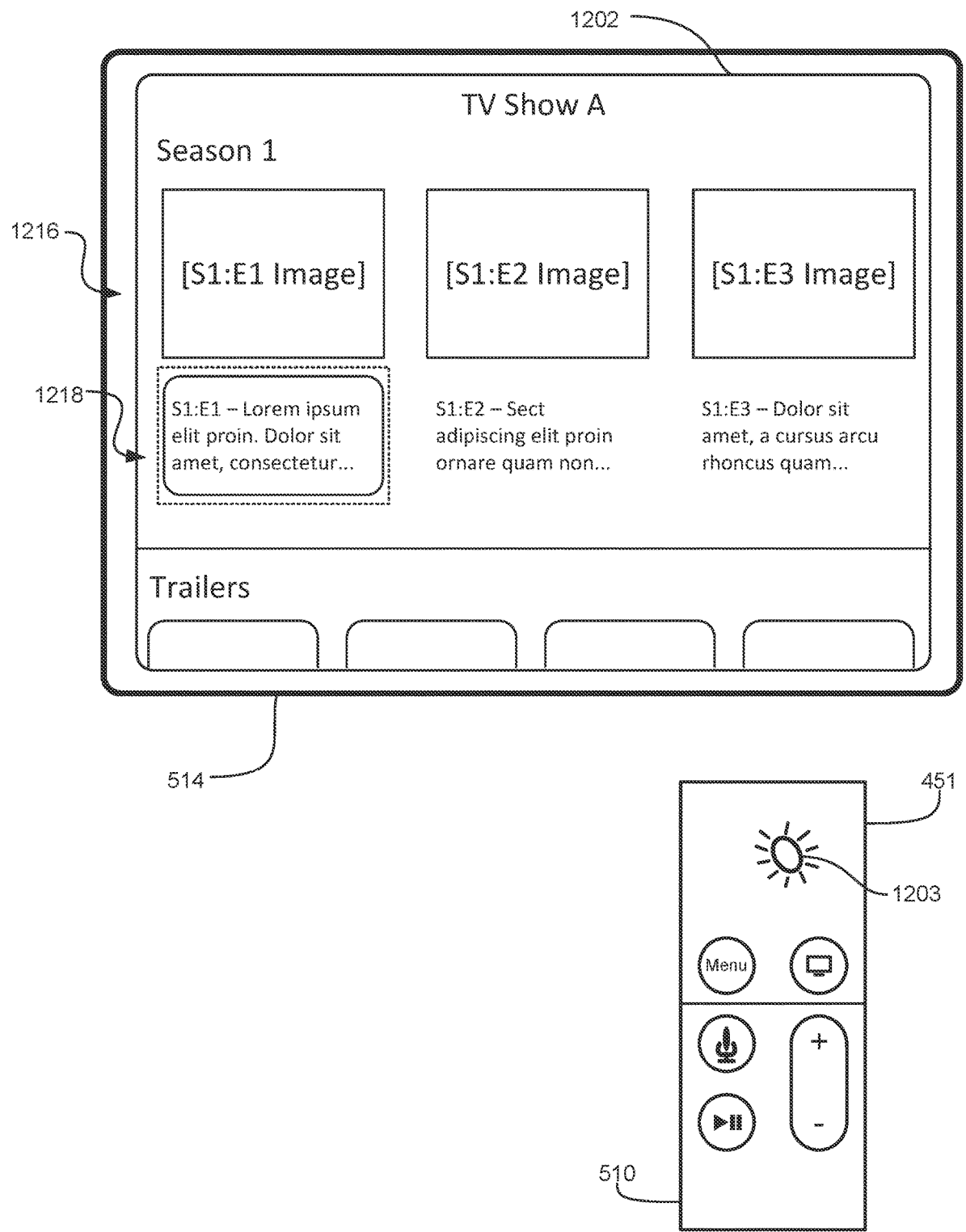

As shown in FIG. 12I, the user swipes (e.g., with contact 1203) up to cause the electronic device 500 to scroll the product page user interface 1202 up. In response to one or more inputs including the input illustrated in FIG. 12I, the electronic device 500 presents the portion of the product page user interface 1202 illustrated in FIG. 12J. FIG. 12J illustrates the same portion of the product page user interface 1202 as the portion of the product page user interface 1202 described above with reference to FIG. 12H.

Thus, FIGS. 12G-12J illustrate a product page user interface 1202 for the series of content when the user is entitled to the service that provides access to the series of content but has not yet watched the series of content. As shown in FIG. 12J, the user selects (e.g., with contact 1203) an associated description 1218 of the first episode in the series of episodic content. In response to one or more inputs including the selection illustrated in FIG. 12J, the electronic device 500 presents the episode page user interface 1204 illustrated in FIG. 12K.

Figure 12K:
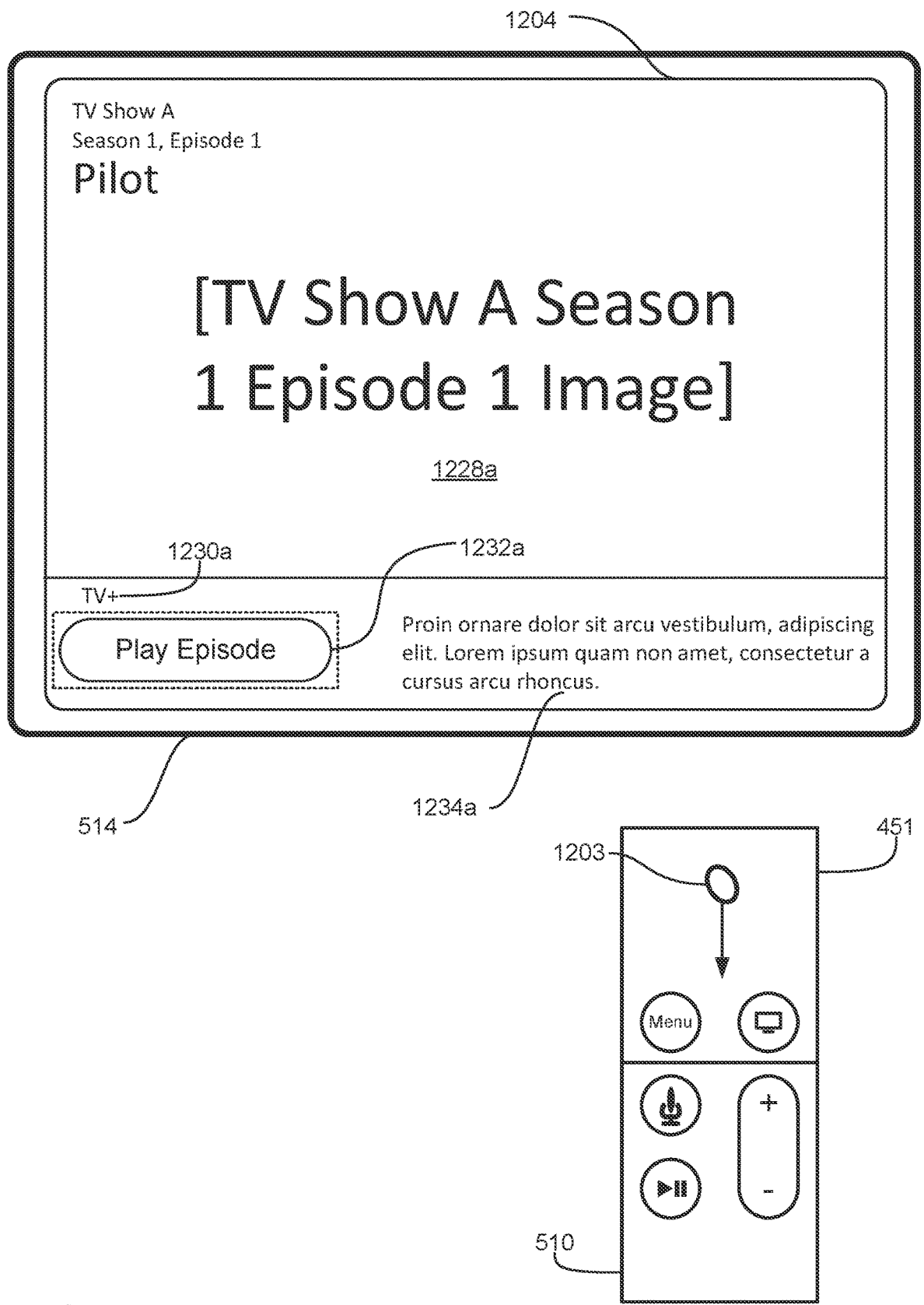
Figure 12L:
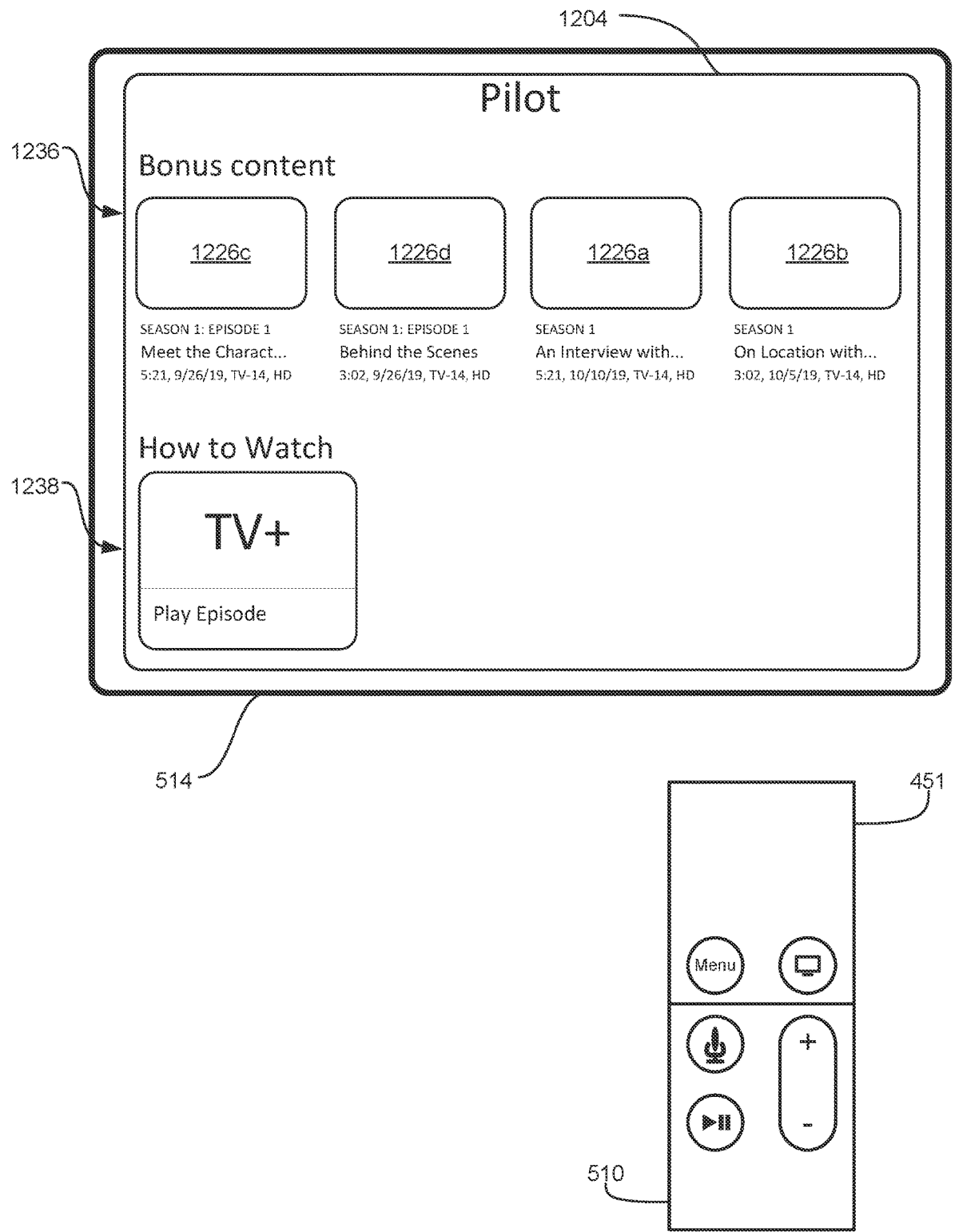

FIGS. 12K-12L illustrate an episode page user interface 1204 when the user is entitled to access the series of episodic content but hasn't started watching the series of episodic content. The episode page user interface 1204 illustrated in FIGS. 12K-12L is similar to the episode page user interface described above with reference to FIGS. 12E-12F. FIG. 12K illustrates a portion of the episode page user interface 1204 that is the same portion of the episode page user interface 1204 as the portion of the episode page 1204 described above with reference to FIG. 12E except for the differences described here. As shown in FIG. 12K, the episode page user interface 1204 includes a selectable option 1232a that, when selected, causes the electronic device 500 to initiate a process to play the first episode without initiating a process to subscribe to the subscription service that provides access to the series of episodic content, even if the first episode is not a free episode, because the user is already subscribed to the subscription service.

As shown in FIG. 12K, the user swipes (e.g., with contact 1203) down to cause the electronic device 500 to scroll the episode page user interface 1204 down. In response to one or more inputs including the input illustrated in FIG. 12K, the electronic device 500 presents the portion of the episode page user interface 1204 illustrated in FIG. 12L.

The portion of the episode page user interface 1204 illustrated in FIG. 12L is the same portion of the episode page user interface 1204 as the portion of the episode page user interface 1204 described above with reference to FIG. 12F, except for the differences noted here. The indication 1238 of how to watch the first episode is selectable to initiate a process to play the first episode without initiating a process to subscribe to the subscription service that provides access to the series of episodic content, because the user is already subscribed to the subscription service.

Thus, FIGS. 12K-12L illustrate the episode page user interface 1204 while the user is entitled to access the series of episodic content but has not yet watched the series of episodic content, and FIGS. 12G-12L illustrate ways the electronic device 500 presents representations of bonus content items when the user is entitled to the service that provides access to the series of episodic content but has not watched the series of episodic content.

FIGS. 12M-12X illustrate ways the electronic device 500 displays indications of bonus content items and trailers when the user has started watching the series of episodic content (and is, thus, also entitled to access the series of episodic content). FIGS. 12M-12P illustrate the product page user interface 1202 when the user has started watching the series of episodic content and the playback position corresponds to the second episode in the series of episodic content.

Figure 12M:
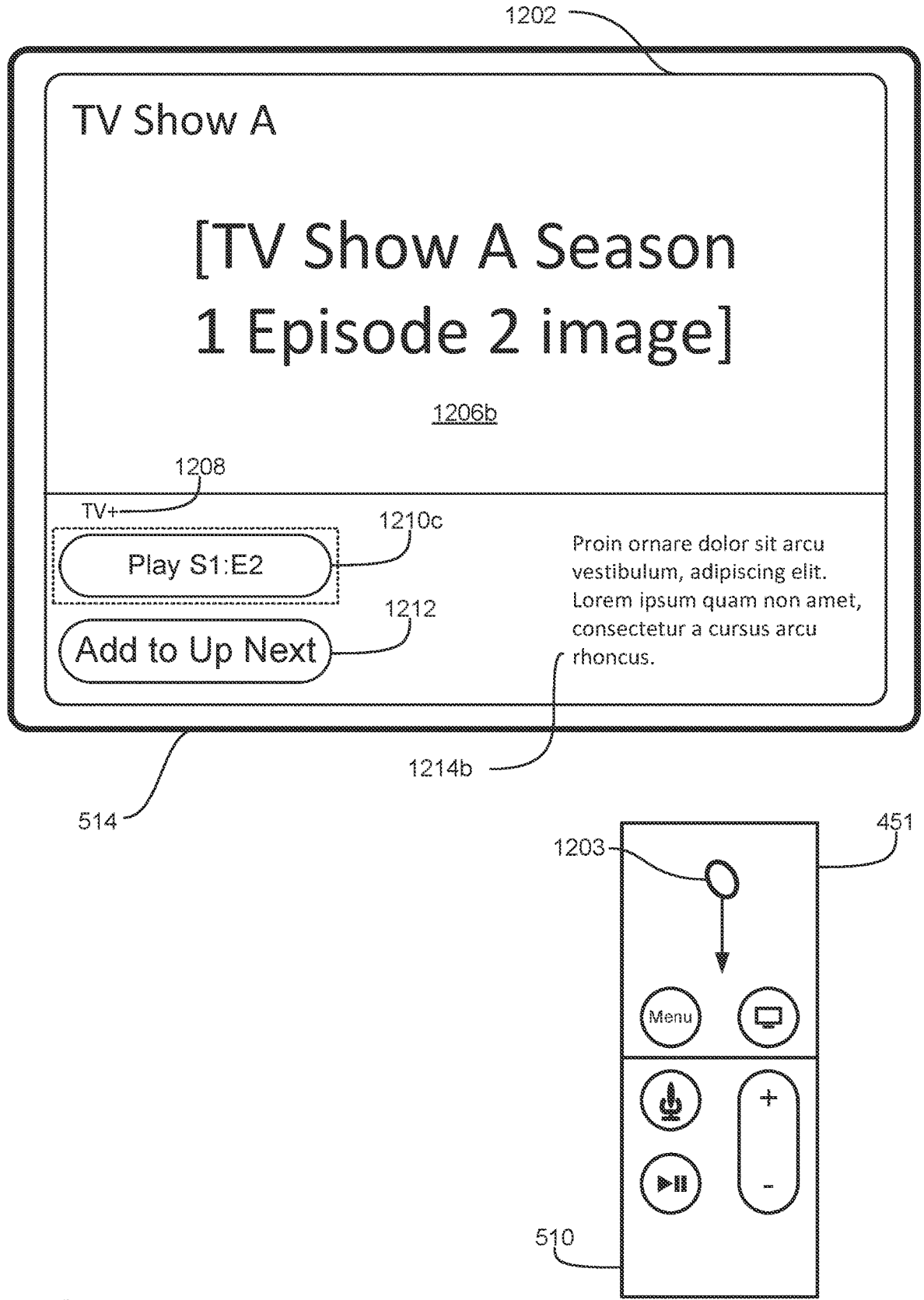

FIG. 12M illustrates a portion of the product page user interface 1202 that is the same portion of the product page user interface 1202 as the portion of the product page user interface 1202 illustrated in FIGS. 12A and 12G, except for the differences that will now be described. The product page user interface 1202 includes a selectable option 1210c that, when selected, causes the electronic device 500 to initiate playback of the second episode in the series of episodic content without initiating a process to subscribe to the service that provides access to the series, because the user is entitled to access the series of episodic content and has started watching the series. The electronic device displays the selectable option 1210c to play the second episode in the series of episodic content because the user has already watched the first episode in the series and the second episode is the next episode in the series.

As shown in FIG. 12M, the user swipes (e.g., with contact 1203) down to cause the electronic device 500 to scroll the product page user interface 1202 down. In response to one or more inputs including the input illustrated in FIG. 12M, the electronic device 500 presents the portion of the product page user interface 1202 illustrated in FIG. 12N.

Figure 12N:
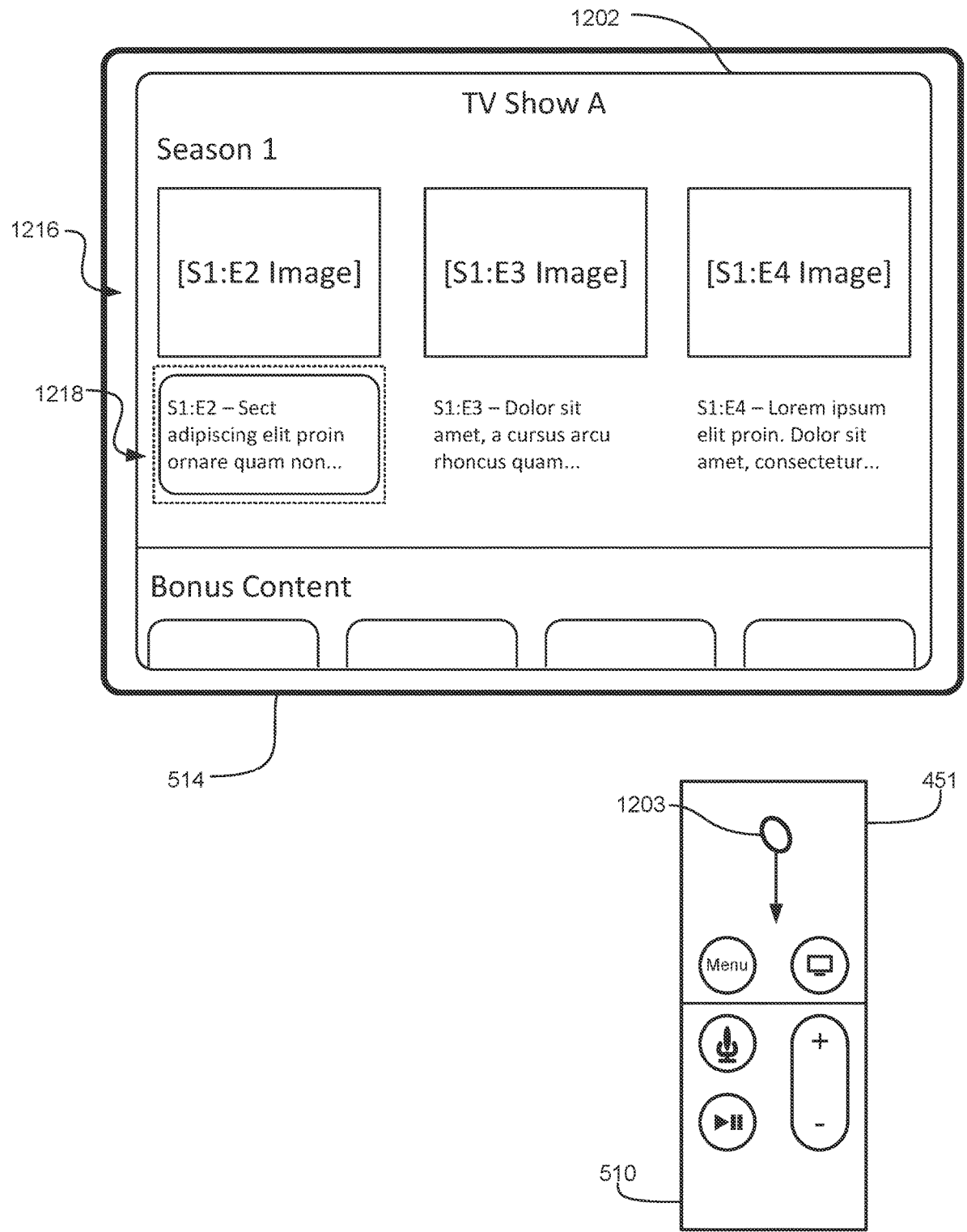

The portion of the product page user interface 1202 illustrated in FIG. 12N is the same portion of the product page user interface 1202 as the portion of the product page user interface 1202 described above with reference to FIGS. 12B and 12H, except for the differences noted here. Because the user is entitled to access the series of episodic content, in response to detecting selection of one of the representations 1216 of episodes in the series of episodic content, the electronic device 500 initiates a process to play the respective episode without initiating a process to subscribe to the service that provides access to the series of episodic content. Moreover, the row 1216 of representations of episodes and the row 1218 of associated episode descriptions starts with a representation and associated description of the second episode in the series of episodic content, because the second episode is the next episode in the series after the first episode, which was previously watched by the user.

As shown in FIG. 12N, the user swipes (e.g., with contact 1203) down to cause the electronic device 500 to scroll the product page user interface 1202 down. In response to one or more inputs including the input illustrated in FIG. 12N, the electronic device 500 presents the portion of the product page user interface 1202 illustrated in FIG. 12O.

Figure 12O:
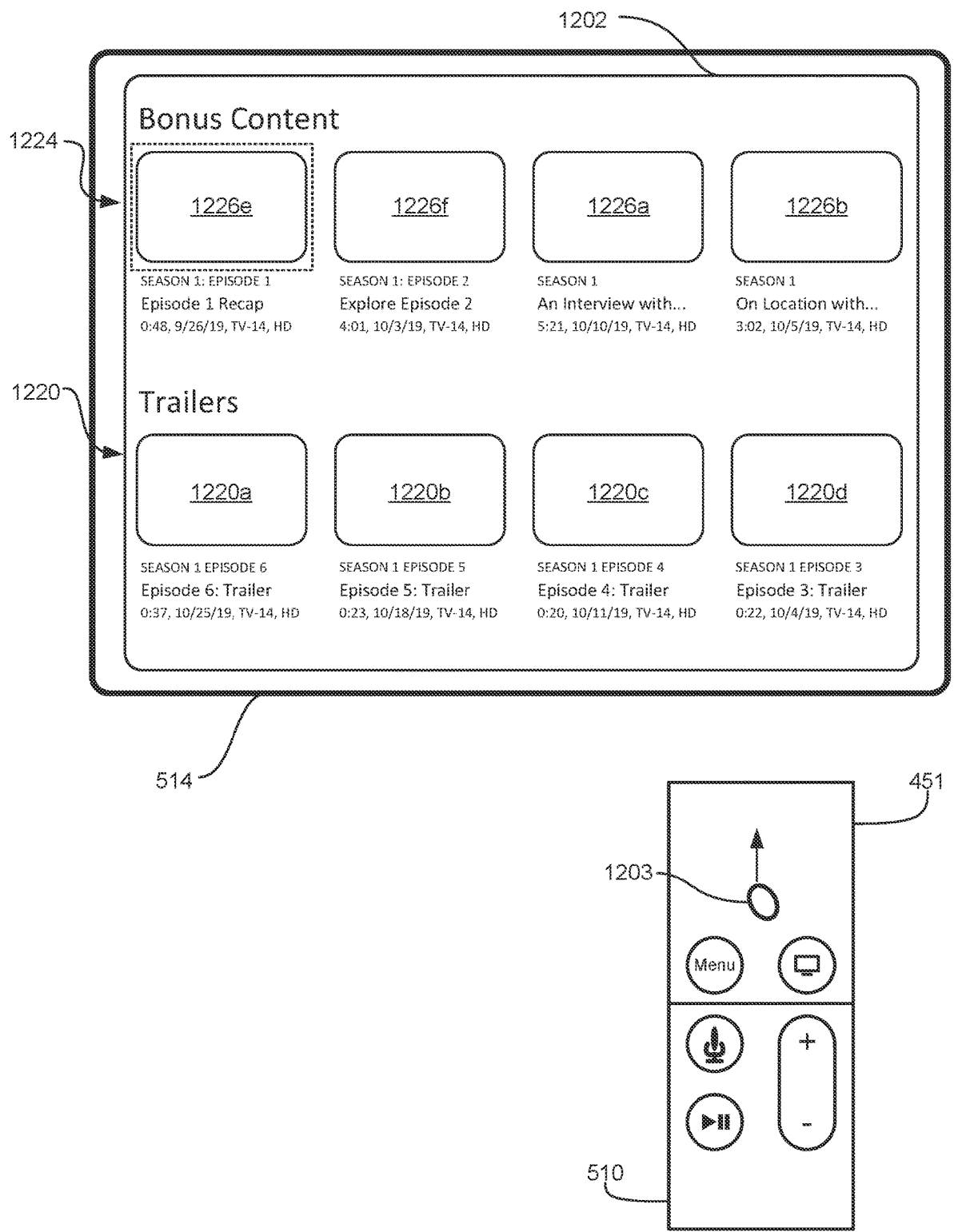

FIG. 12O illustrates a portion of the product page user interface 1202 that includes the bonus content row 1224 and the trailer row 1220. The portion of the product page user interface 1202 illustrated in FIG. 12O corresponds to the portion of the product page user interface illustrated in FIGS. 12C and 12I. Because the user has watched at least part of the series of episodic content (e.g., the user has watched the first episode), the representations 1226 of bonus content items are displayed above the representations 1220 of trailers.

As shown in FIG. 12O, the bonus content row includes representations 1226e and 1226f of bonus content related to the episode associated with the user's current playback position within the series (e.g., the second episode) and representations 1226a and 1226b of bonus content items related to the entire series of episodic content. The representations 1226e and 1226f of the episode-specific bonus content items are displayed before the representations 1226a and 1226b of bonus content items related to the entire series. Although one of the representations 1226e is for a bonus content item associated with the first episode, the representations 1226e is displayed while the user's playback position is associated with the second episode because the bonus content item associated with the representation 1226e contains spoilers for the first episode (and, thus, should optionally not be viewed until the user has finished the first episode). The bonus content row 1224 does not include representations of bonus content items related to the first episode that do not include spoilers or representations of bonus content items related to other episodes other than the second episode because the playback position corresponds to the second episode. In some embodiments, rather than forgoing displaying the representations of bonus content items related to the previously-played first episode, the electronic device displays the representations of the bonus content items related to the first episode at the end of the bonus content row 1224.

As described above with reference to FIGS. 12C and 12I and as shown in FIG. 12O, the representations 1220*a*-*d* of trailers are sorted based on release date of the trailers in reverse-chronological order. In some embodiments, rows 1224 and 1220 are horizontally scrollable to reveal additional representations 1226 or 1220, respectively, not displayed prior to receiving the scrolling input. In some embodiments, representations 1226 and 1220 are selectable to display the associated bonus content item or trailer, respectively.

Figure 12P:
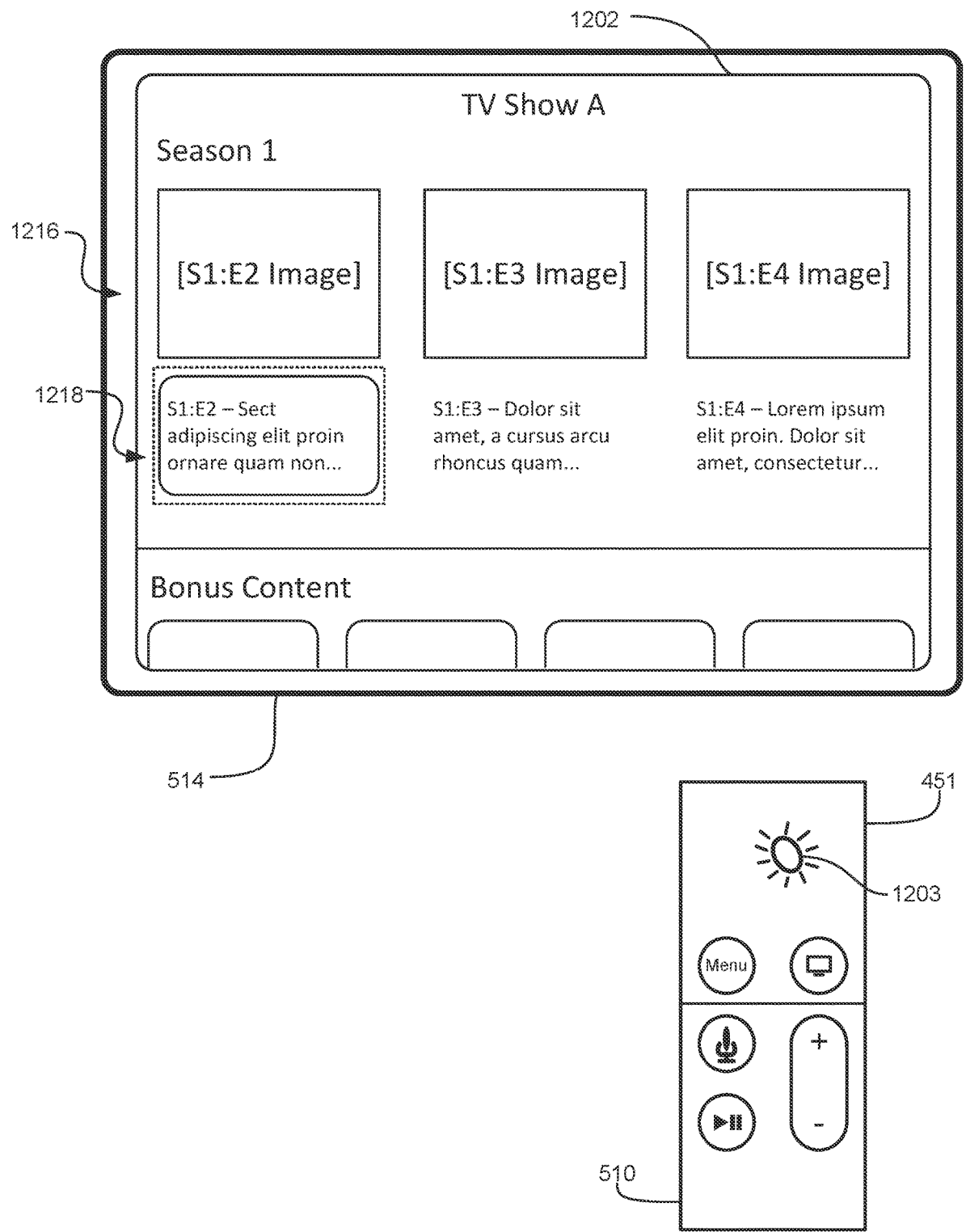

As shown in FIG. 12O, the user swipes (e.g., with contact 1203) up to cause the electronic device 500 to scroll the product page user interface 1202 up. In response to one or more inputs including the input illustrated in FIG. 12O, the electronic device 500 presents the portion of the product page user interface 1202 illustrated in FIG. 12P. FIG. 12P illustrates the same portion of the product page user interface 1202 as the portion of the product page user interface 1202 described above with reference to FIG. 12N.

Thus, FIGS. 12M-12P illustrate a product page user interface 1202 for the series of content when the user is entitled to the service that provides access to the series of content and has watched at least a portion of the series of content, and the current playback position corresponds to the second episode in the series of episodic content. As shown in FIG. 12P, the user selects (e.g., with contact 1203) an associated description 1218 of the second episode in the series of episodic content. In response to one or more inputs including the selection illustrated in FIG. 12P, the electronic device 500 presents the episode page user interface 1204 illustrated in FIG. 12Q.

Figure 12Q:
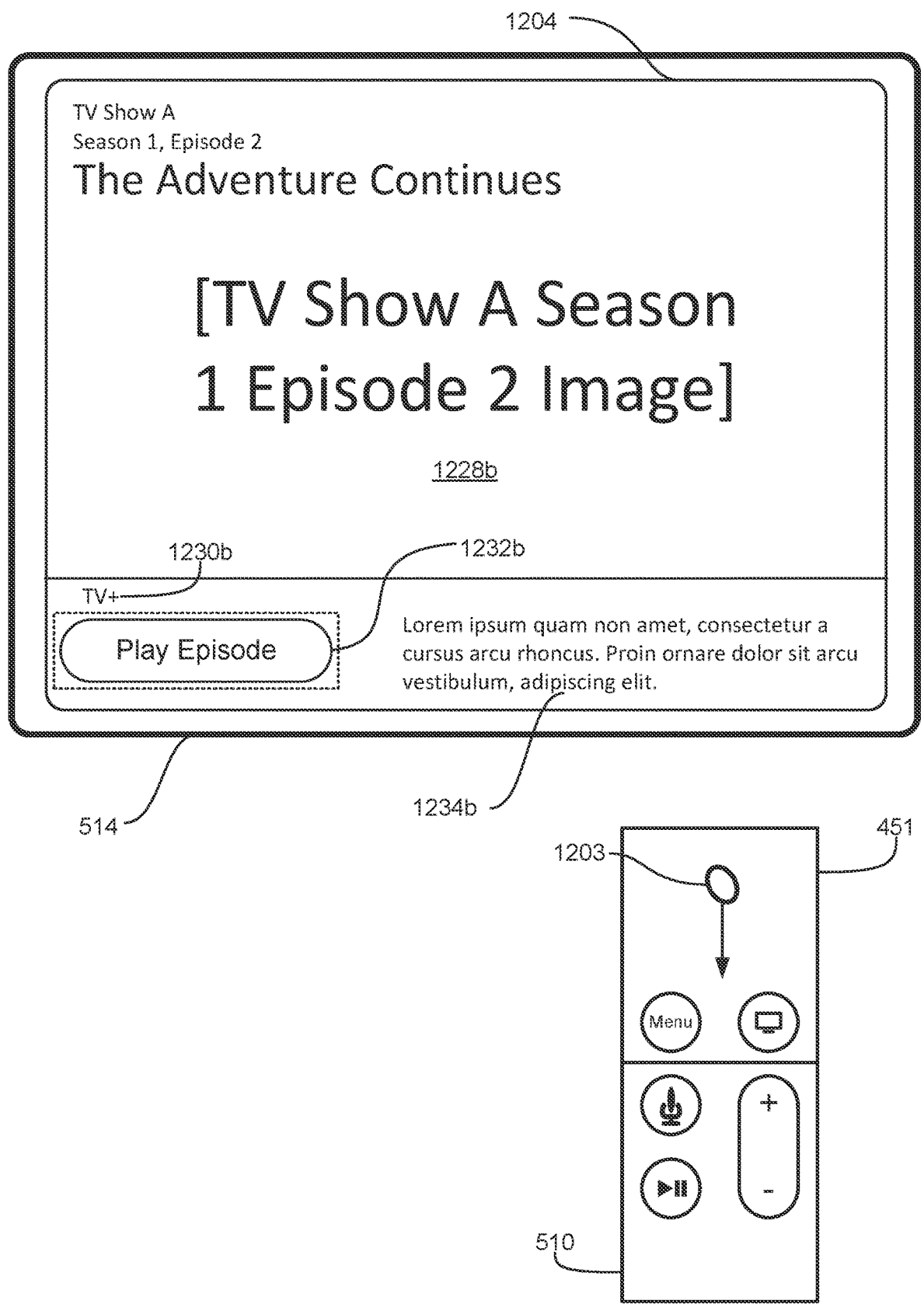
Figure 12R:
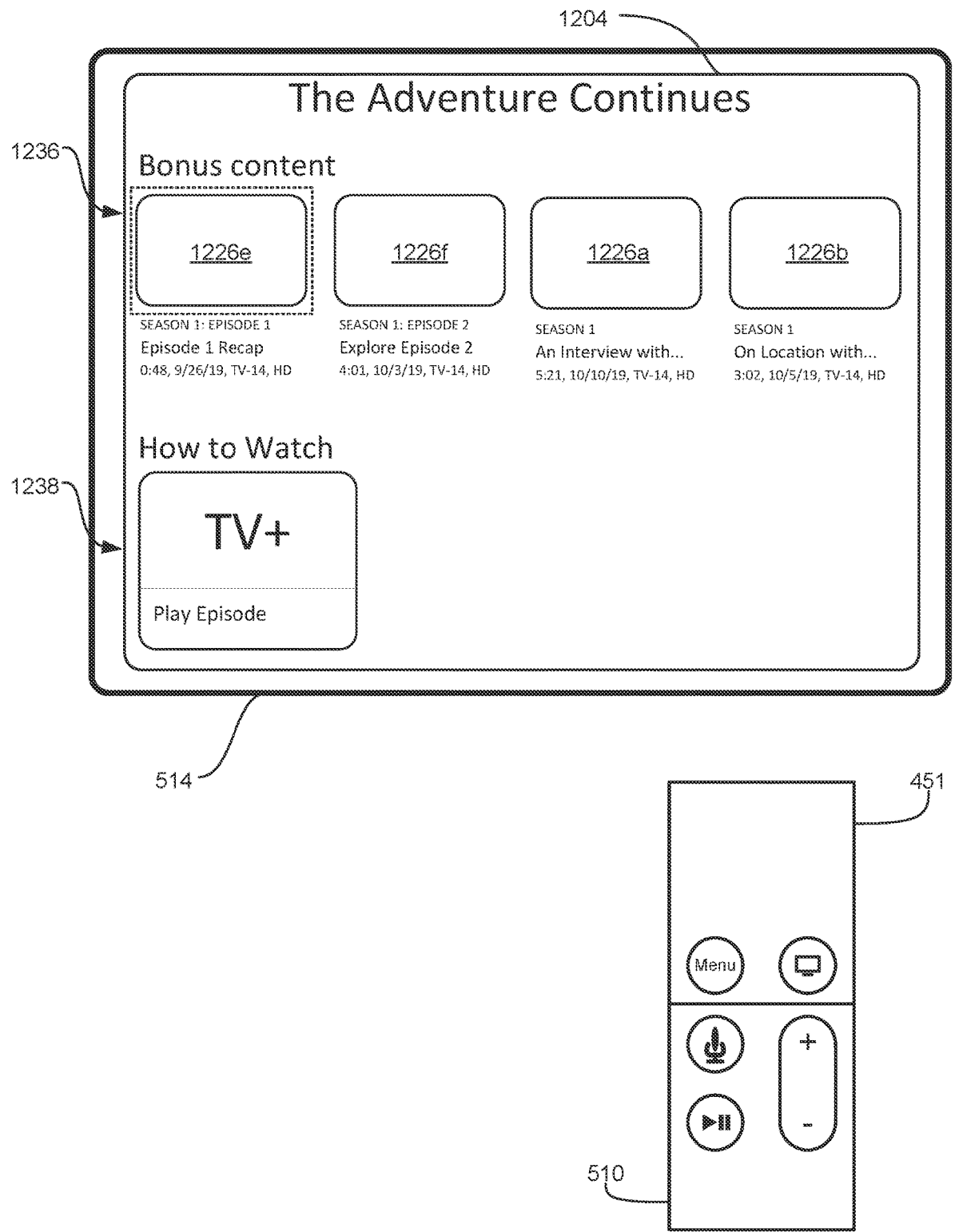

FIGS. 12Q-12R illustrate an episode page user interface 1204 when the user is entitled to access the series of episodic content and has watched at least a portion of the series of episodic content. FIG. 12Q illustrates a portion of the episode page user interface 1204 that is the same portion of the episode page user interface 1204 as the portion of the episode page 1204 described above with reference to FIGS. 12E and 12K except for the differences described here. As shown in FIG. 12Q, the episode page user interface 1204 includes a selectable option 1232*b* that, when selected, causes the electronic device 500 to initiate a process to play the second episode without initiating a process to subscribe to the subscription service that provides access to the series of episodic content, even if the second episode is not a free episode, because the user is already subscribed to the subscription service.

As shown in FIG. 12Q, the user swipes (e.g., with contact 1203) down to cause the electronic device 500 to scroll the episode page user interface 1204 down. In response to one or more inputs including the input illustrated in FIG. 12Q, the electronic device 500 presents the portion of the episode page user interface 1204 illustrated in FIG. 12R.

The portion of the episode page user interface 1204 illustrated in FIG. 12R is the same portion of the episode page user interface 1204 as the portion of the episode page user interface 1204 described above with reference to FIGS. 12F and 12L, except for the differences noted here. The indication 1238 of how to watch the second episode is selectable to initiate a process to play the first episode without initiating a process to subscribe to the subscription service that provides access to the series of episodic content because the user is already subscribed to the subscription service.

As shown in FIG. 12R, the episode page user interface 1204 includes a row 1236 of representations 1226 of bonus content items, including representations 1226*e* and 1226*f* of bonus content items related to the first and second episodes, respectively, and representations 1226*a* and 1226*b* of bonus content items related to the whole series. The bonus content row 1236 included in the episode page user interface 1204 includes the same representations 1226 in the same order as the representations 1226 in the bonus content row 1224 illustrated in FIG. 12O. As described above with reference to FIG. 12O, representation 1226*e* is associated with a bonus content item associated with the first episode that contains a spoiler of the first episode. Thus, representation 1226*e* is displayed on the episode page for the second episode.

Thus, FIGS. 12Q-12R illustrate the episode page user interface 1202 when the user has started watching the series of episodic content.

In some embodiments, as the user continues to watch the series of episodic content, the product page user interface 1202 is updated in accordance with the user's playback position within the series of episodic content. For example, the product page 1202 is updated to include representations of bonus content items associated with the episode corresponding to the user's current playback position within the series. FIGS. 12S-12V illustrate the product page user interface 1202 when the user has started watching the series of episodic content and the playback position corresponds to the third episode in the series of episodic content.

Figure 12S:
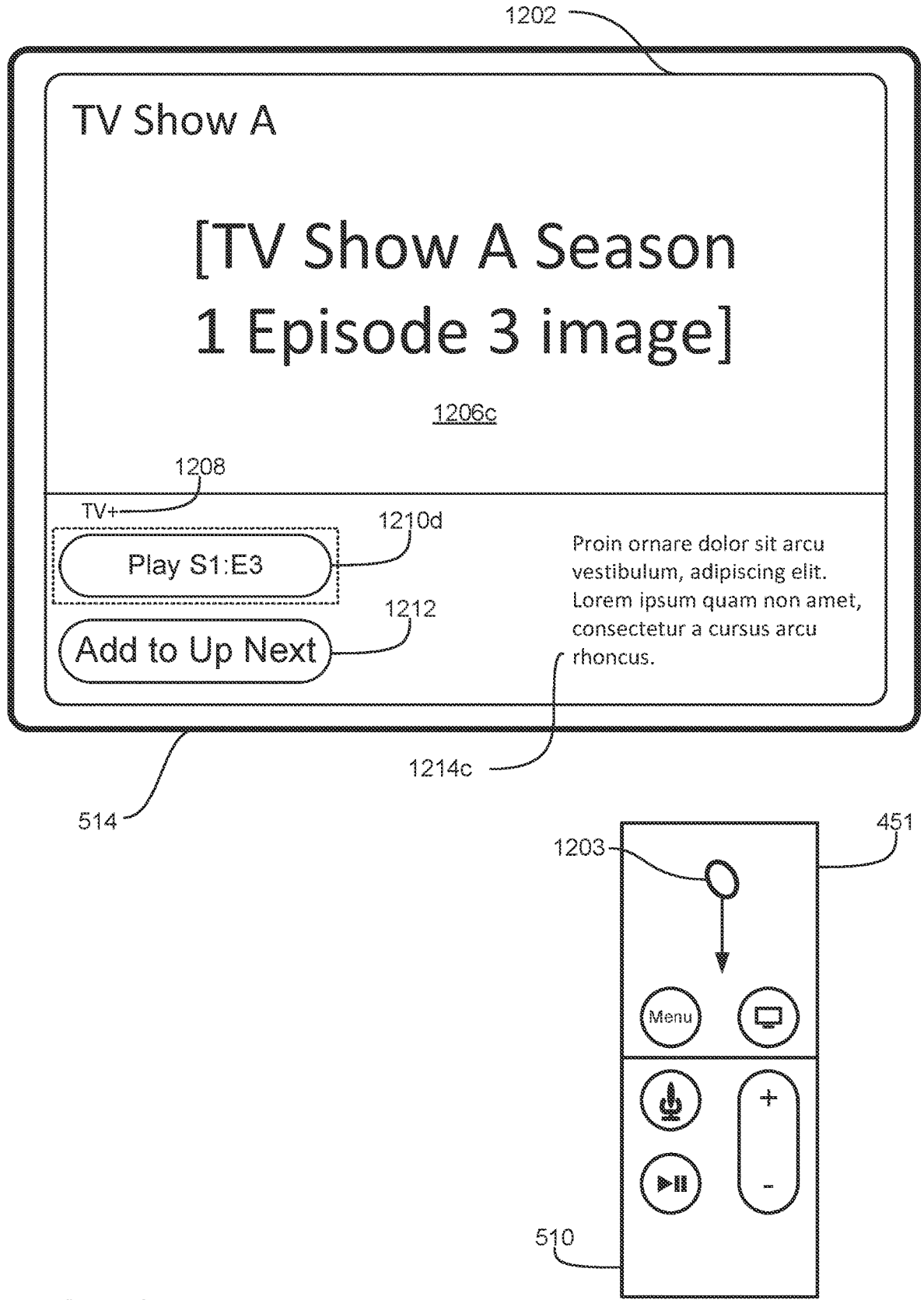

FIG. 12S illustrates a portion of the product page user interface 1202 that is the same portion of the product page user interface 1202 as the portion of the product page user interface 1202 illustrated in FIGS. 12A 12G, and 12M except for the differences that will now be described. The product page user interface 1202 includes a selectable option 1210*d* that, when selected, causes the electronic device 500 to initiate playback of the third episode in the series of episodic content without initiating a process to subscribe to the service that provides access to the series, because the user is entitled to access the series of episodic content and has started watching the series. The electronic device displays the selectable option 1210*d* to play the third episode in the series of episodic content because the user has already watched the second episode in the series and the third episode is the next episode in the series.

As shown in FIG. 12S, the user swipes (e.g., with contact 1203) down to cause the electronic device 500 to scroll the product page user interface 1202 down. In response to one or more inputs including the input illustrated in FIG. 12S, the electronic device 500 presents the portion of the product page user interface 1202 illustrated in FIG. 12T.

Figure 12T:
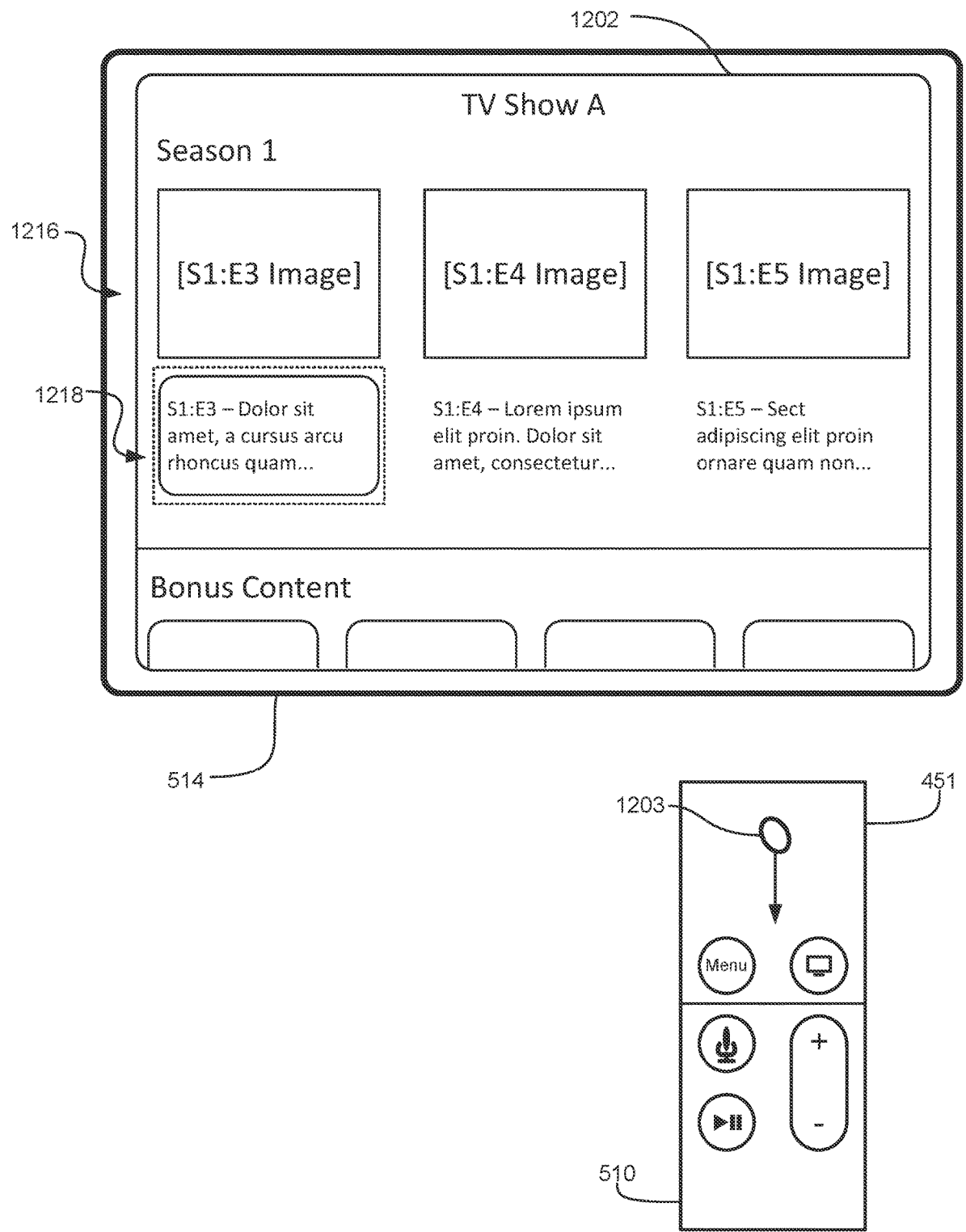

The portion of the product page user interface 1202 illustrated in FIG. 12T is the same portion of the product page user interface 1202 as the portion of the product page user interface 1202 described above with reference to FIGS. 12B, 12H, and 12N except for the differences noted here. Because the user is entitled to access the series of episodic content, in response to detecting selection of one of the representations 1216 of episodes in the series of episodic content, the electronic device 500 initiates a process to play the respective episode without initiating a process to subscribe to the service that provides access to the series of episodic content. Moreover, the row 1216 of representations of episodes and the row 1218 of associated episode descriptions starts with a representation and associated description of the third episode in the series of episodic content because the third episode is the next episode in the series after the second episode, which was previously watched by the user.

As shown in FIG. 12T, the user swipes (e.g., with contact 1203) down to cause the electronic device 500 to scroll the product page user interface 1202 down. In response to one or more inputs including the input illustrated in FIG. 12T, the electronic device 500 presents the portion of the product page user interface 1202 illustrated in FIG. 12U.

Figure 12U:
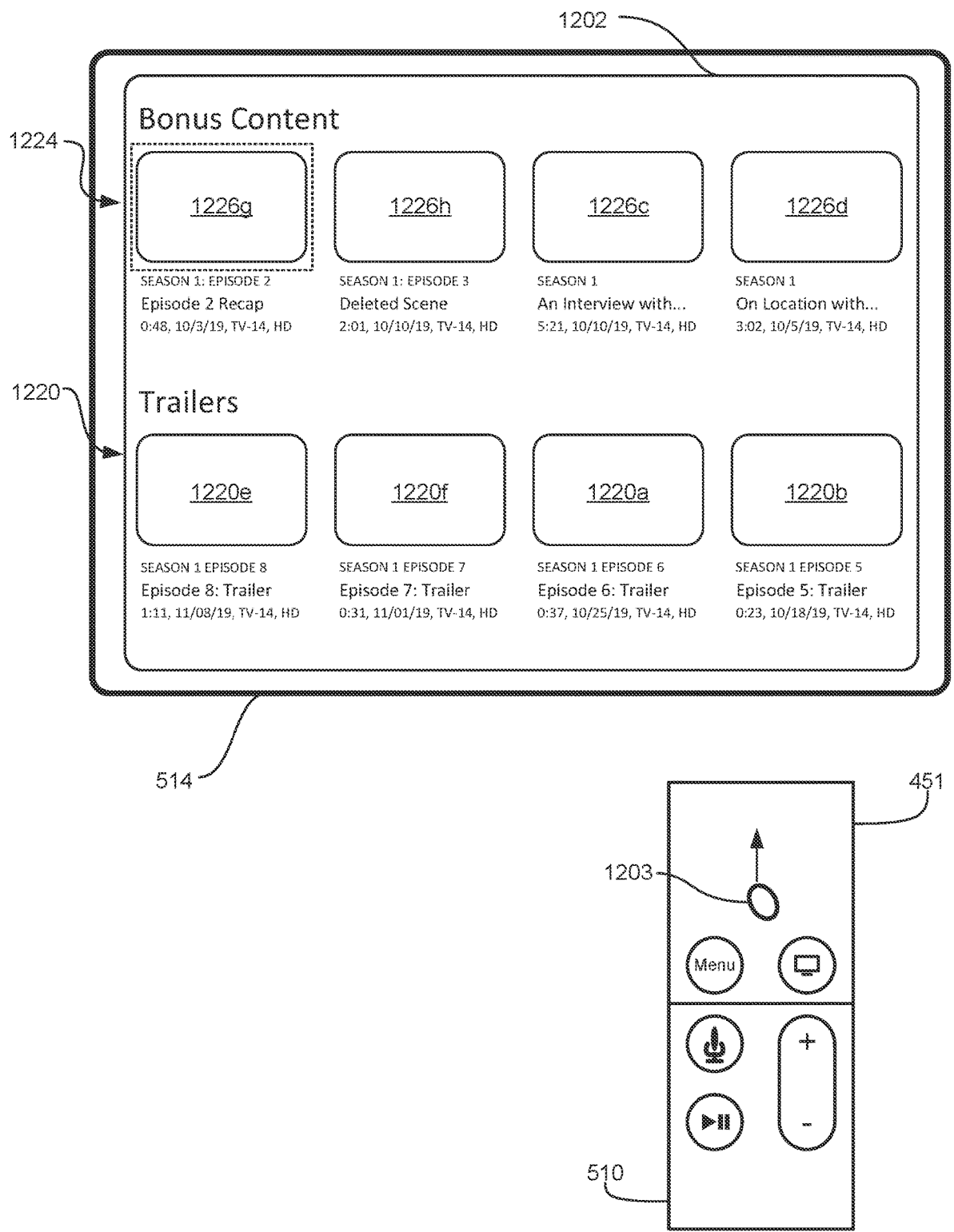

FIG. 12U illustrates a portion of the product page user interface 1202 that includes the bonus content row 1224 and the trailer row 1220. The portion of the product page user interface 1202 illustrated in FIG. 12U is the same portion of the product page user interface 1202 as the portion of the product page user interface illustrated in FIGS. 12C, 12I, and 12O. Because the user has watched at least part of the series of episodic content (e.g., the user has watched the first and second episodes), the representations 1226 of bonus content items are displayed above the representations 1220 of trailers.

As shown in FIG. 12U, the bonus content row includes representations 1226g and 1226h of bonus content items related to the episode associated with the user's current playback position within the series (e.g., the third episode) and representations 1226a and 1226b of bonus content items related to the entire series of episodic content. The representations 1226g and 1226h of the episode-specific bonus content items are displayed before the representations 1226a and 1226b of bonus content items related to the entire series. Although one of the representations 1226g is associated with a bonus content item associated with the second episode, the representation 1226g is displayed while the user's playback position is associated with the third episode because the bonus content item associated with the representation 1226g contains spoilers for the second episode. As shown in FIG. 12O, when the playback position of the user corresponded to the second episode, the representation 1226g was not displayed in the product page user interface 1202 because the bonus content item associated with the representation 1226g includes a spoiler for the second episode. The bonus content row 1224 does not include representations of bonus content items related to the first episode that do not include spoilers or representations of bonus content items related to any other episodes in the series of episodic content. In some embodiments, rather than forgoing displaying the representations of bonus content items related to the previously-played first and second episodes, the electronic device displays the representations of the bonus content items related to the first and second episodes at the end of the bonus content row 1224.

As described above with reference to FIGS. 12C, 12I, and 12O and as shown in FIG. 12U, the representations 1220a, 1220b, 1220e, and 1220f of trailers are sorted based on release date of the trailers in reverse-chronological order. In some embodiments, rows 1224 and 1220 are horizontally scrollable to reveal additional representations 1226 or 1220, respectively, not displayed prior to receiving the scrolling input. In some embodiments, representations 1226 and 1220 are selectable to display the associated bonus content item or trailer, respectively.

Figure 12V:
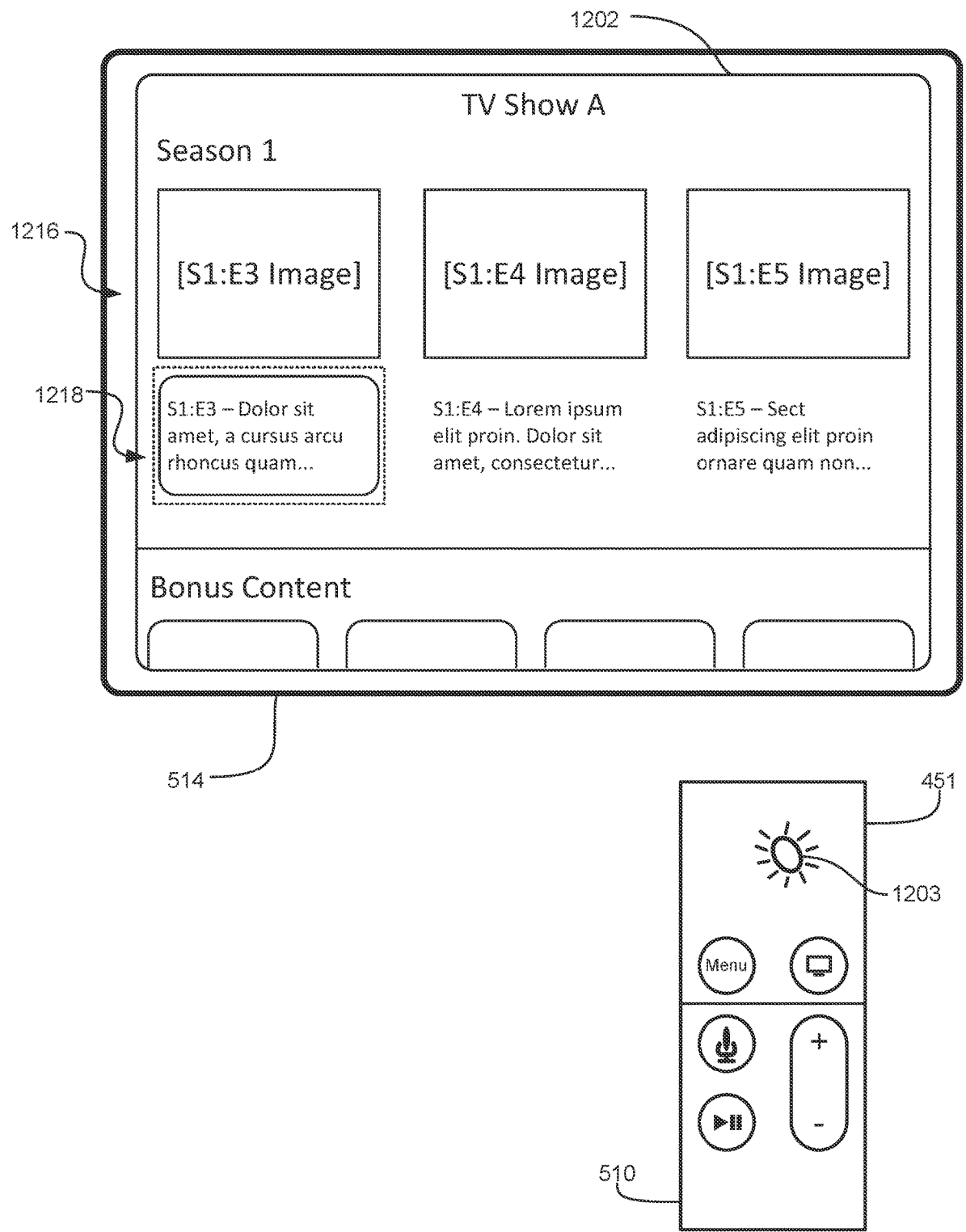

As shown in FIG. 12U, the user swipes (e.g., with contact 1203) up to cause the electronic device 500 to scroll the product page user interface 1202 up. In response to one or more inputs including the input illustrated in FIG. 12U, the electronic device 500 presents the portion of the product page user interface 1202 illustrated in FIG. 12V. FIG. 12V illustrates the same portion of the product page user interface 1202 as the portion of the product page user interface 1202 described above with reference to FIG. 12T.

Thus, FIGS. 12S-12V illustrate a product page user interface 1202 for the series of content when the user is entitled to the service that provides access to the series of content and has watched at least a portion of the series of content, and the current playback position corresponds to the third episode in the series of episodic content. As shown in FIG. 12V, the user selects (e.g., with contact 1203) an associated description 1218 of the third episode in the series of episodic content. In response to one or more inputs including the selection illustrated in FIG. 12V, the electronic device 500 presents the episode page user interface 1204 illustrated in FIG. 12W.

Figure 12W:
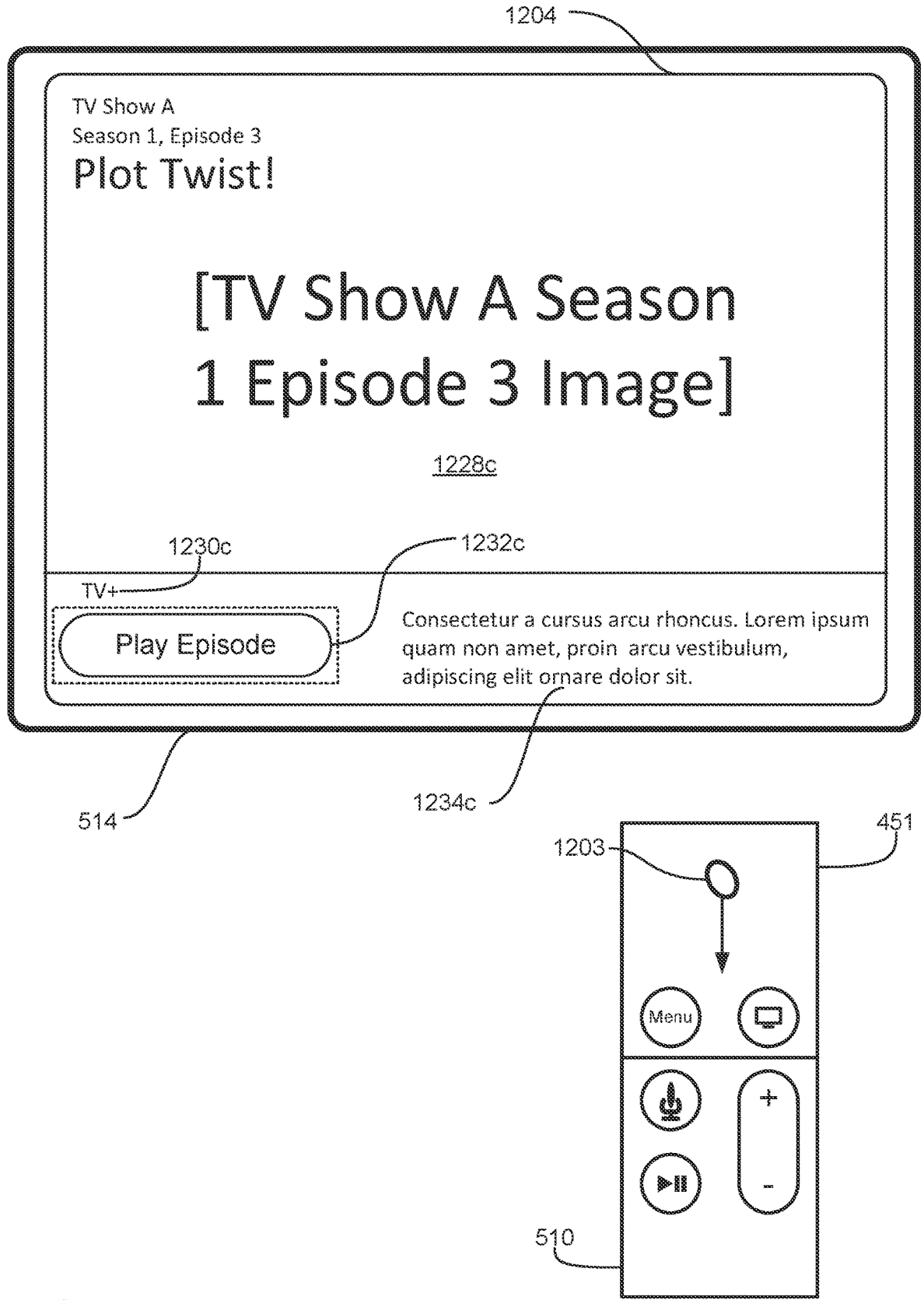
Figure 12X:
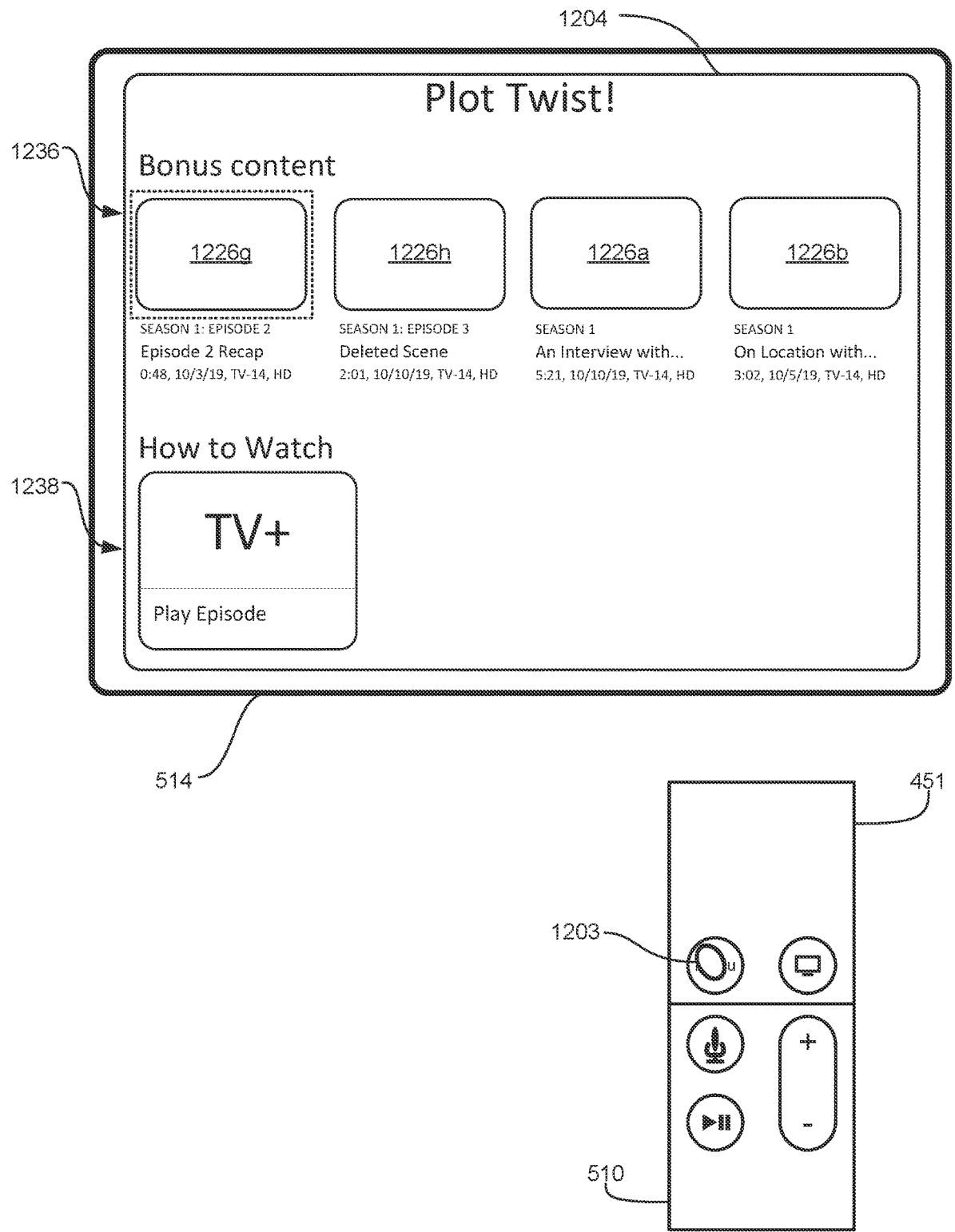

FIGS. 12W-12X illustrate an episode page user interface 1204 when the user is entitled to access the series of episodic content and has watched at least a portion of the series of episodic content. FIG. 12W illustrates a portion of the episode page user interface 1204 that is the same portion of the episode page user interface 1204 as the portion of the episode page 1204 described above with reference to FIGS. 12E, 12K, and 12Q except for the differences described here. As shown in FIG. 12Q, the episode page user interface 1204 includes a selectable option 1232c that, when selected, causes the electronic device 500 to initiate a process to play the third episode without initiating a process to subscribe to the subscription service that provides access to the series of episodic content, even if the third episode is not a free episode, because the user is already subscribed to the subscription service.

As shown in FIG. 12W, the user swipes (e.g., with contact 1203) down to cause the electronic device 500 to scroll the episode page user interface 1204 down. In response to one or more inputs including the input illustrated in FIG. 12W, the electronic device 500 presents the portion of the episode page user interface 1204 illustrated in FIG. 12X.

The portion of the episode page user interface 1204 illustrated in FIG. 12X is the same portion of the episode page user interface 1204 as the portion of the episode page user interface 1204 described above with reference to FIGS. 12F, 12L, and 12R except for the differences noted here. The indication 1238 of how to watch the third episode is selectable to initiate a process to play the third episode without initiating a process to subscribe to the subscription service that provides access to the series of episodic content, because the user is already subscribed to the subscription service.

As shown in FIG. 12X, the episode page user interface 1204 includes a row 1236 of representations 1226 of bonus content items, including representations 1226g and 1226h of bonus content items related to the second and third episodes, respectively, and representations 1226a and 1226b of bonus content items related to the whole series. As described above with reference to FIG. 12U, representation 1226g is associated with a bonus content item associated with the second episode that contains a spoiler of the second episode. Thus, representation 1226g is displayed on the episode page for the third episode. Moreover, the episode page user interface 1204 of the second episode illustrated in FIGS. 12Q-12R does not include representation 1226g because the bonus content item associated with representation 1226g contains a spoiler for the second episode. In some embodiments in which representation 1226g does not include a spoiler for the second episode, it would not be displayed in user interface 1204 in FIG. 12X, but instead would be displayed in user interface 1204 shown in FIGS. 12Q-12R. Returning to FIG. 12X, the bonus content row 1224 does not include representations of bonus content items related to the second episode that do not include spoilers or representations of bonus content items related to any other episodes in the series of episodic content.

Thus, FIGS. 12W-12X illustrate the episode page user interface 1204 when the user has started watching the series of episodic content and FIGS. 12M-12X illustrate ways the electronic device 500 displays indications of bonus content items and trailers when the user has started watching the series of episodic content.

Figure 12Y:
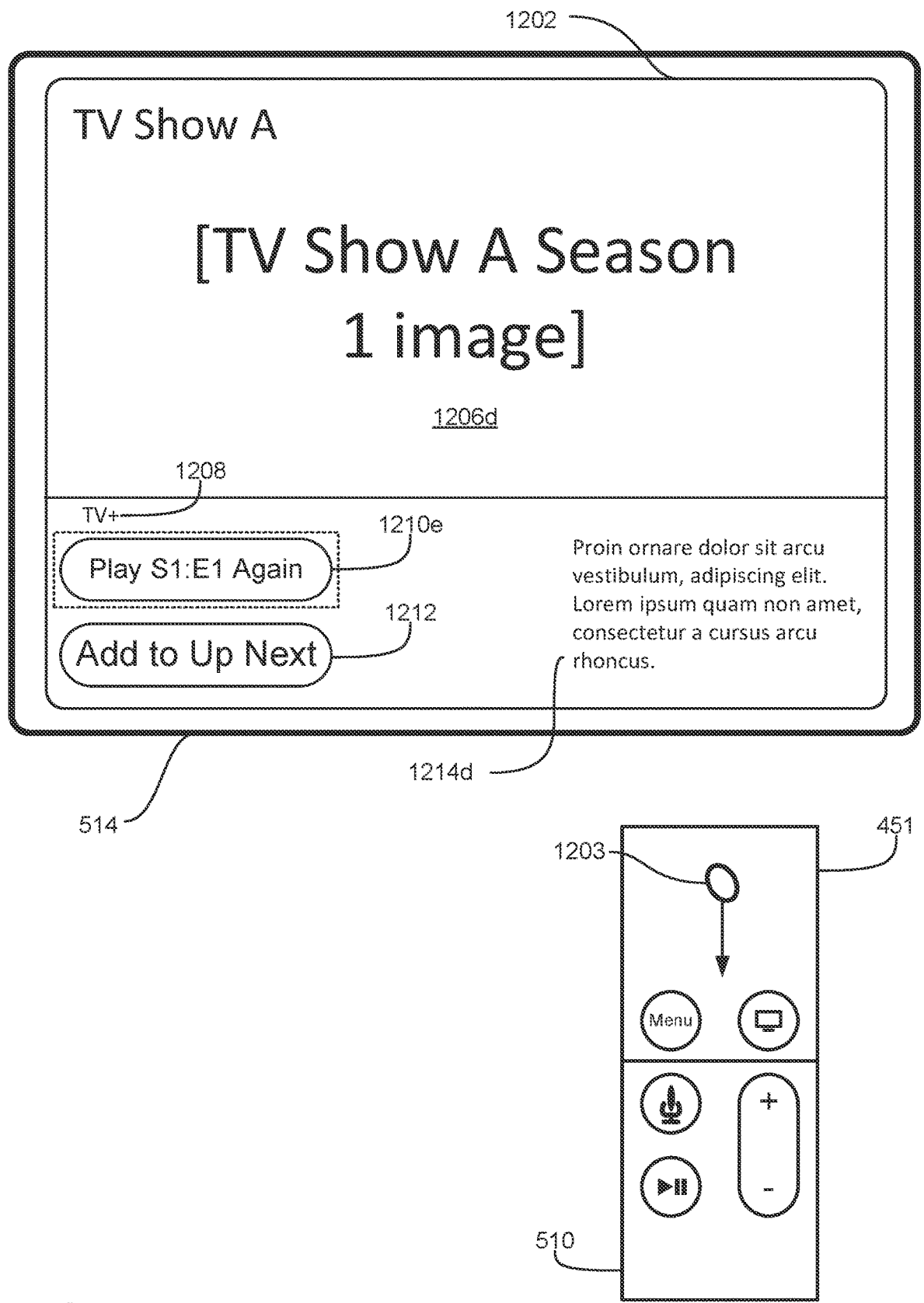

FIGS. 12Y-12CC illustrate ways in which the electronic device 500 displays the product page user interface 1202 after the user has finished watching the series of episodic content.

FIG. 12Y illustrates a portion of the product page user interface 1202 that is the same portion of the product page user interface 1202 as the portion of the product page user interface 1202 illustrated in FIGS. 12A 12G, 12M, and 12S except for the differences that will now be described. The product page user interface 1202 includes a selectable option 1210e that, when selected, causes the electronic device 500 to initiate playback of the first episode in the series of episodic content without initiating a process to subscribe to the service that provides access to the series, because the user is entitled to access the series of episodic content and has already watched the entire series. Thus, the user is able to start watching the series again from the beginning by selecting the option 1210e.

As shown in FIG. 12Y, the user swipes (e.g., with contact 1203) down to cause the electronic device 500 to scroll the product page user interface 1202 down. In response to one or more inputs including the input illustrated in FIG. 12Y, the electronic device 500 presents the portion of the product page user interface 1202 illustrated in FIG. 12Z.

Figure 12Z:
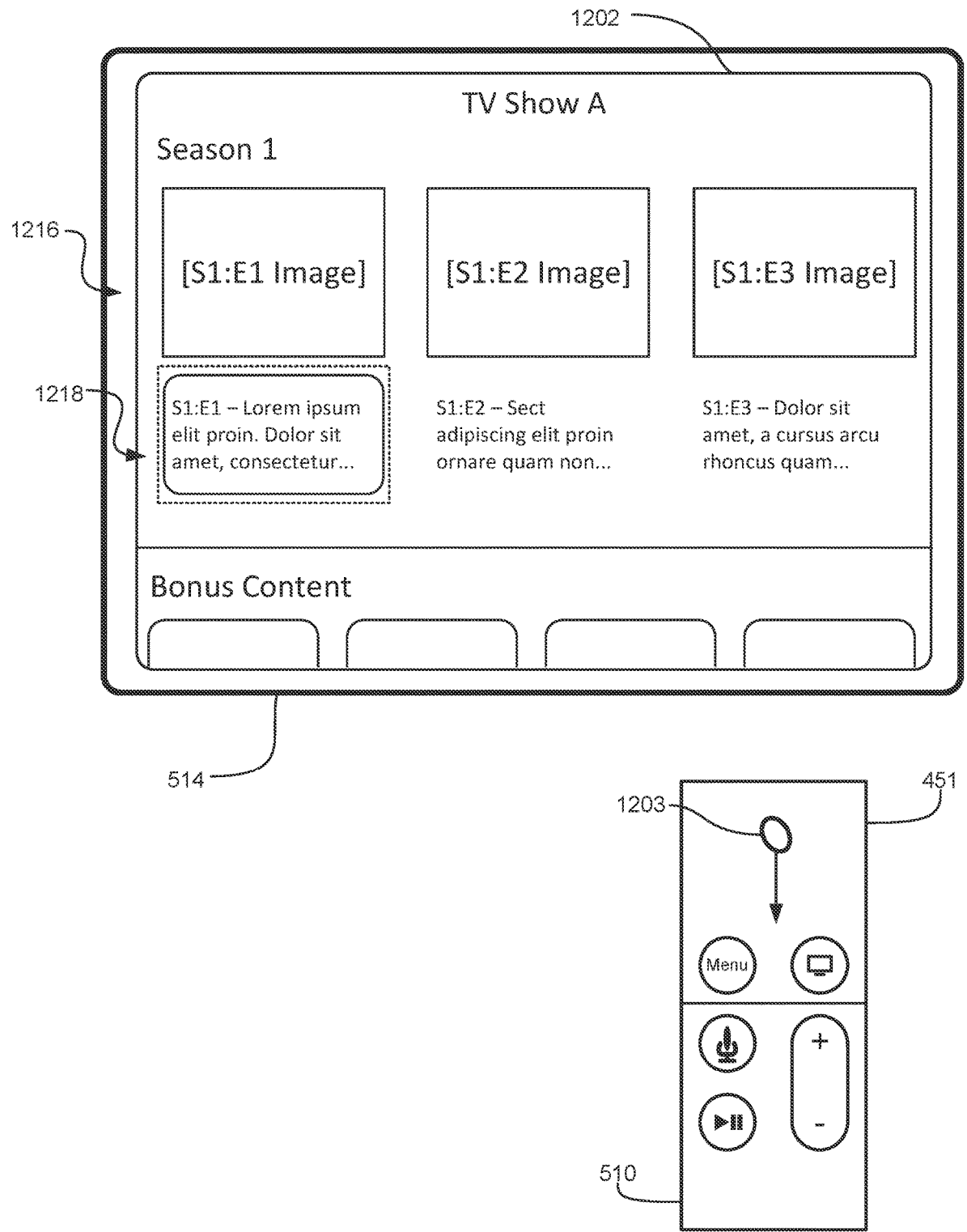
Figure 12A:
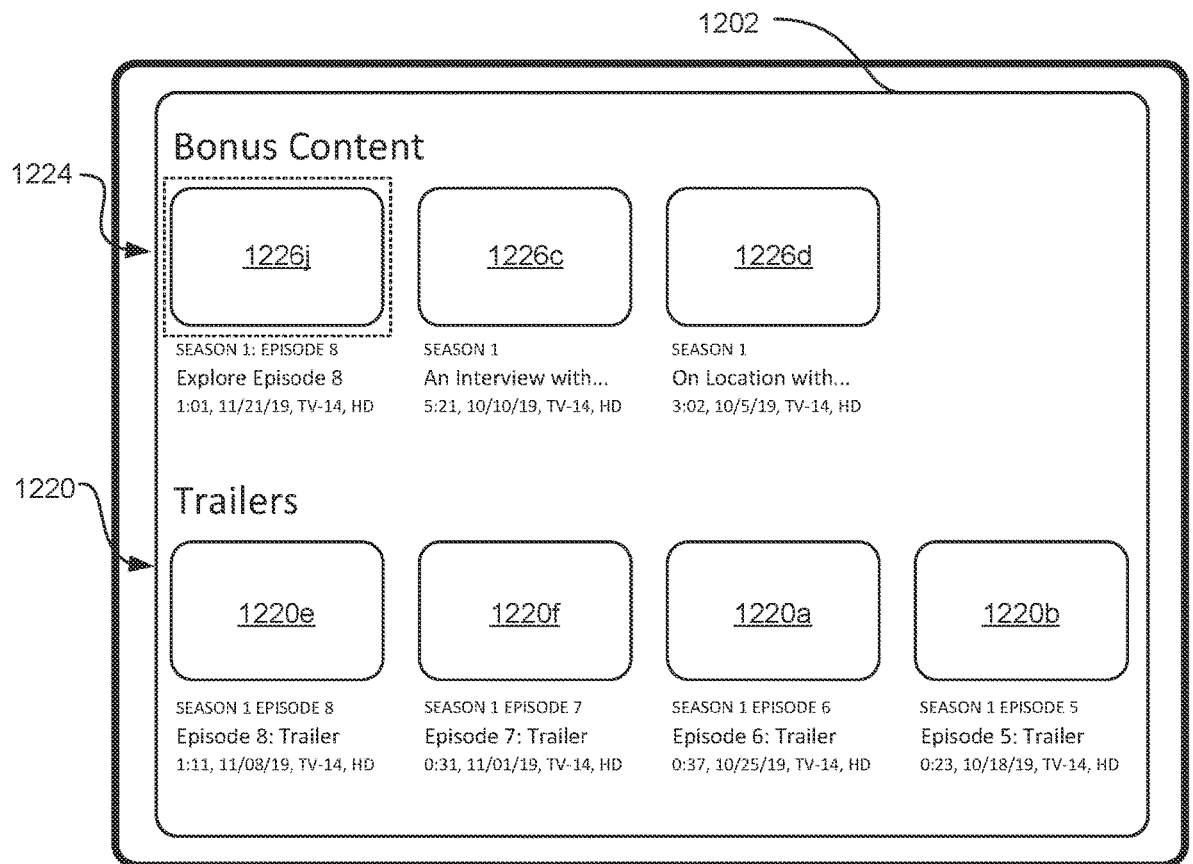
Figure 12A:
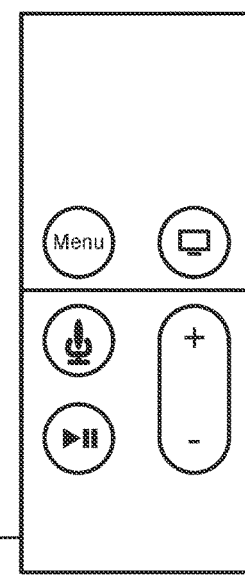
Figure 12B:
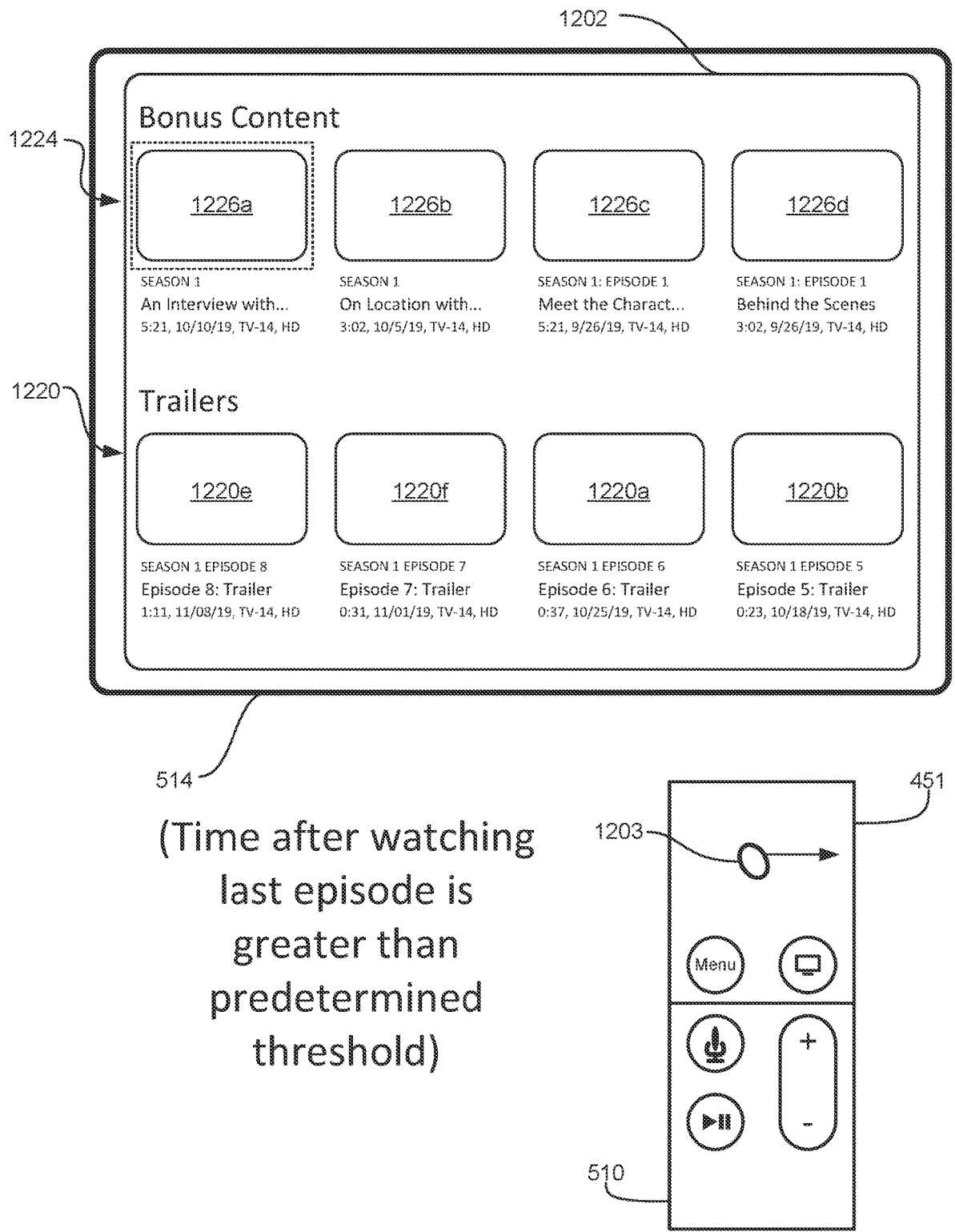
Figure 12C:
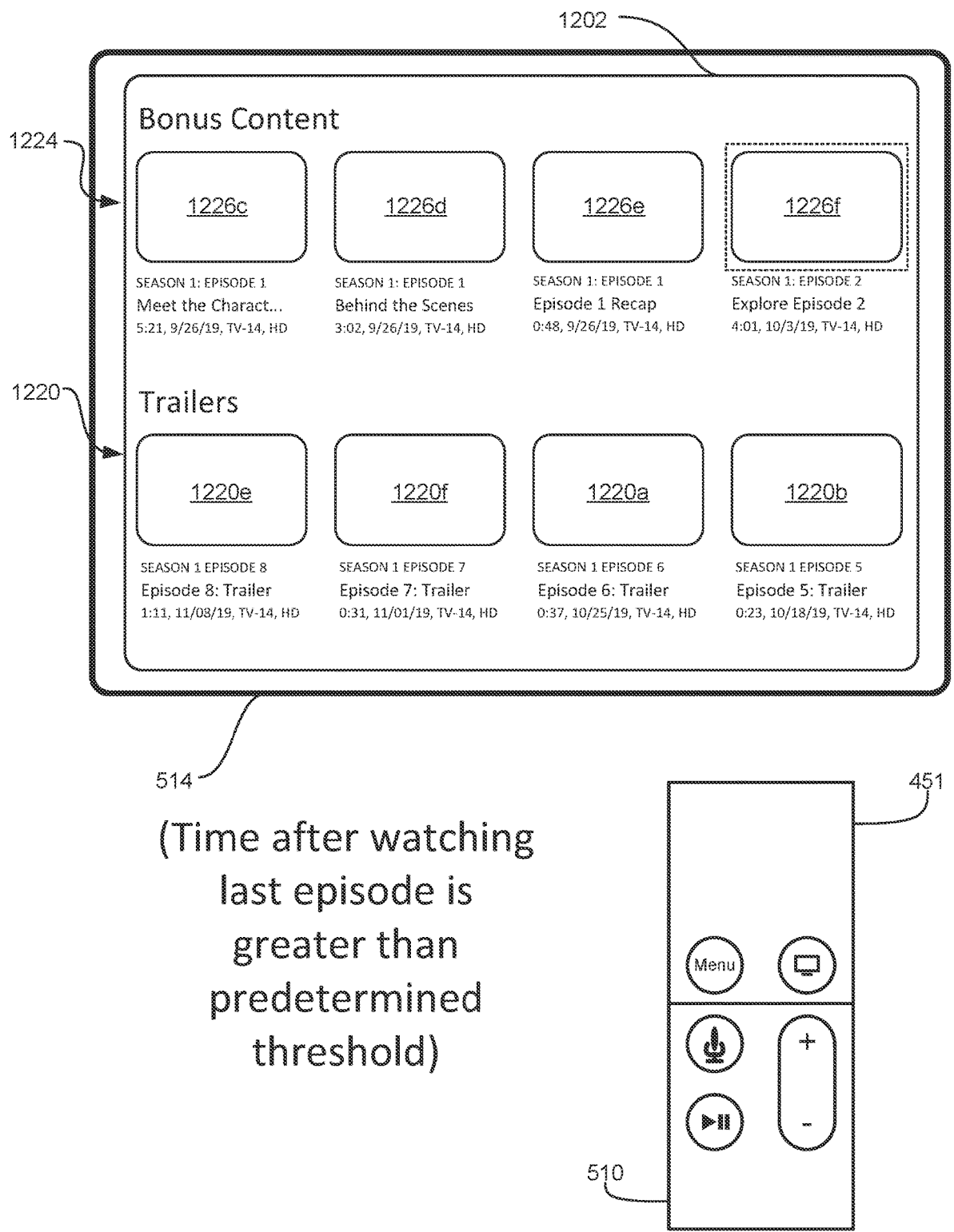

The portion of the product page user interface 1202 illustrated in FIG. 12Z is the same portion of the product page user interface 1202 as the portion of the product page user interface 1202 described above with reference to FIGS. 12B, 12H, 12N, and 12T except for the differences noted here. Because the user is entitled to access the series of episodic content, in response to detecting selection of one of the representations 1216 of episodes in the series of episodic content, the electronic device 500 initiates a process to play the respective episode without initiating a process to subscribe to the service that provides access to the series of episodic content. Moreover, the row 1216 of representations of episodes and the row 1218 of associated episode descriptions starts with a representation and associated description of the first episode in the series of episodic content because the user has finished watching the series of episodic content. Thus, the user is able to start watching the series again from the beginning by selecting the representation 1216 of the first episode.

As shown in FIG. 12Z, the user swipes (e.g., with contact 1203) down to cause the electronic device 500 to scroll the product page user interface 1202 down. In response to one or more inputs including the input illustrated in FIG. 12Z, the electronic device 500 presents the portion of the product page user interface 1202 illustrated in FIG. 12AA.

FIG. 12AA illustrates a portion of the product page user interface 1202 that includes the bonus content row 1224 and the trailer row 1220 when the time since the user finished watching the series of episodic content is less than a predetermined threshold (e.g., 2, 3, 4, 5, or 6 months). The portion of the product page user interface 1202 illustrated in FIG. 12AA is the same portion of the product page user interface 1202 as the portion of the product page user interface illustrated in FIGS. 12C, 12I, 12O, and 12U. Because the user has watched at least part of the series of episodic content (e.g., the user has watched the entire series), the representations 1226 of bonus content items are displayed above the representations 1220 of trailers.

As shown in FIG. 12AA, the bonus content row includes a representation 1226j of a bonus content item related to the episode associated with the user's current playback position within the series (e.g., the eighth episode) and representations 1226a and 1226b of bonus content items related to the entire series of episodic content. The representation 1226j of the episode-specific bonus content item is displayed before the representations 1226a and 1226b of bonus content items related to the entire series. The representations 1226 of bonus content items are displayed in the order shown in FIG. 12AA (e.g., the representation 1226j of the bonus content item related to the eighth episode is displayed before the representations 1226c-1226d of bonus content items related to the entire series) because the time since the user finished watching the series of episodic content is less than a predetermined threshold (e.g., 3, 4, 5, or 6 months). The bonus content row 1224 does not include representations of bonus content items associated only with individual episodes other than the eighth episode because the playback position corresponds to the eighth episode. In some embodiments, rather than forgoing displaying the representations of bonus content items related to the previously-played episodes, the electronic device displays the representations of the bonus content items related to the other episodes at the end of the bonus content row 1224.

As described above with reference to FIGS. 12C, 12I, 12O, and 12U and as shown in FIG. 12AA, the representations 1220a, 1220b, 1220e, and 1220f of trailers are sorted based on release date of the trailers in reverse-chronological order. In some embodiments, rows 1224 and 1220 are horizontally scrollable to reveal additional representations 1226 or 1220, respectively, not displayed prior to receiving the scrolling input. In some embodiments, representations 1226 and 1220 are selectable to display the associated bonus content item or trailer, respectively.

FIG. 12BB illustrates a portion of the product page user interface 1202 that includes the bonus content row 1224 and the trailer row 1220 when the time since the user finished watching the series of episodic content is greater than a predetermined threshold (e.g., 2, 3, 4, 5, or 6 months). The portion of the product page user interface 1202 illustrated in FIG. 12BB is the same portion as the portion of the product page user interface illustrated in FIGS. 12C, 12I, 12O, 12U, and 12AA. Because the user has watched at least part of the series of episodic content (e.g., the user has watched the entire series), the representations 1226 of bonus content items are displayed above the representations 1220 of trailers. In some embodiments, however, once the user has watched the entire series of episodic content, this portion of the product page user interface 1202 resets to the arrangement presented while the user has not yet watched the series, such as the arrangement illustrated in FIG. 12C. In other words, in some embodiments, after the threshold time (e.g., 2, 3, 4, 5, or 6 months) has passed since the user has finished watching the series of episodic content, the electronic device 500 displays the trailer row 1220 above the bonus content row 1224.

As shown in FIG. 12BB, the bonus content row includes representations 1226c and 1226d of bonus content items related to individual episodes of the series and representations 1226a and 1226b of bonus content items related to the entire series of episodic content. The representations 1226a and 1226b of bonus content items related to the entire series are displayed before the representations 1226c and 1226d of the episode-specific bonus content items. The representations 1226c and 1226d of episode-specific bonus content items are displayed based on release date of the bonus content items in chronological order. The representations 1226 of bonus content items are displayed in the order shown in FIG. 12BB because more than the threshold period of time has passed since the user finished the series of episodic content.

As described above with reference to FIGS. 12C, 12I, 12O, 12U, 12AA and as shown in FIG. 12BB, the representations 1220a, 1220b, 1220e, and 1220f of trailers are sorted based on release date of the trailers in reverse-chronological order. In some embodiments, rows 1224 and 1220 are horizontally scrollable to reveal additional representations 1226 or 1220, respectively, not displayed prior to receiving the scrolling input. In some embodiments, representations 1226 and 1220 are selectable to display the associated bonus content item or trailer, respectively.

As shown in FIG. 12BB, the user swipes (e.g., with contact 1203) to the right to cause the electronic device 500 to scroll the row 1224 of representations 1226 of bonus content items. As shown in FIG. 12CC, in response to one or more inputs including the input illustrated in FIG. 12BB, the electronic device 500 ceases displaying representations 1226a and 1226b on the left side of row 1224, shifts representations 1226c and 1226d to the left, and displays representations 1226e and 1226f on the right side of row 1224. Thus, after the threshold period of time (e.g., 2, 3, 4, 5, or 6 months) has passed since the user has finished watching the series of episodic content, representations of all bonus content items for the series of episodic content are displayed in the product page user interface 1202.

Thus, FIGS. 12Y-12CC illustrate ways in which the electronic device 500 displays the product page user interface 1202 after the user has finished watching the series of episodic content.

Figure 13:
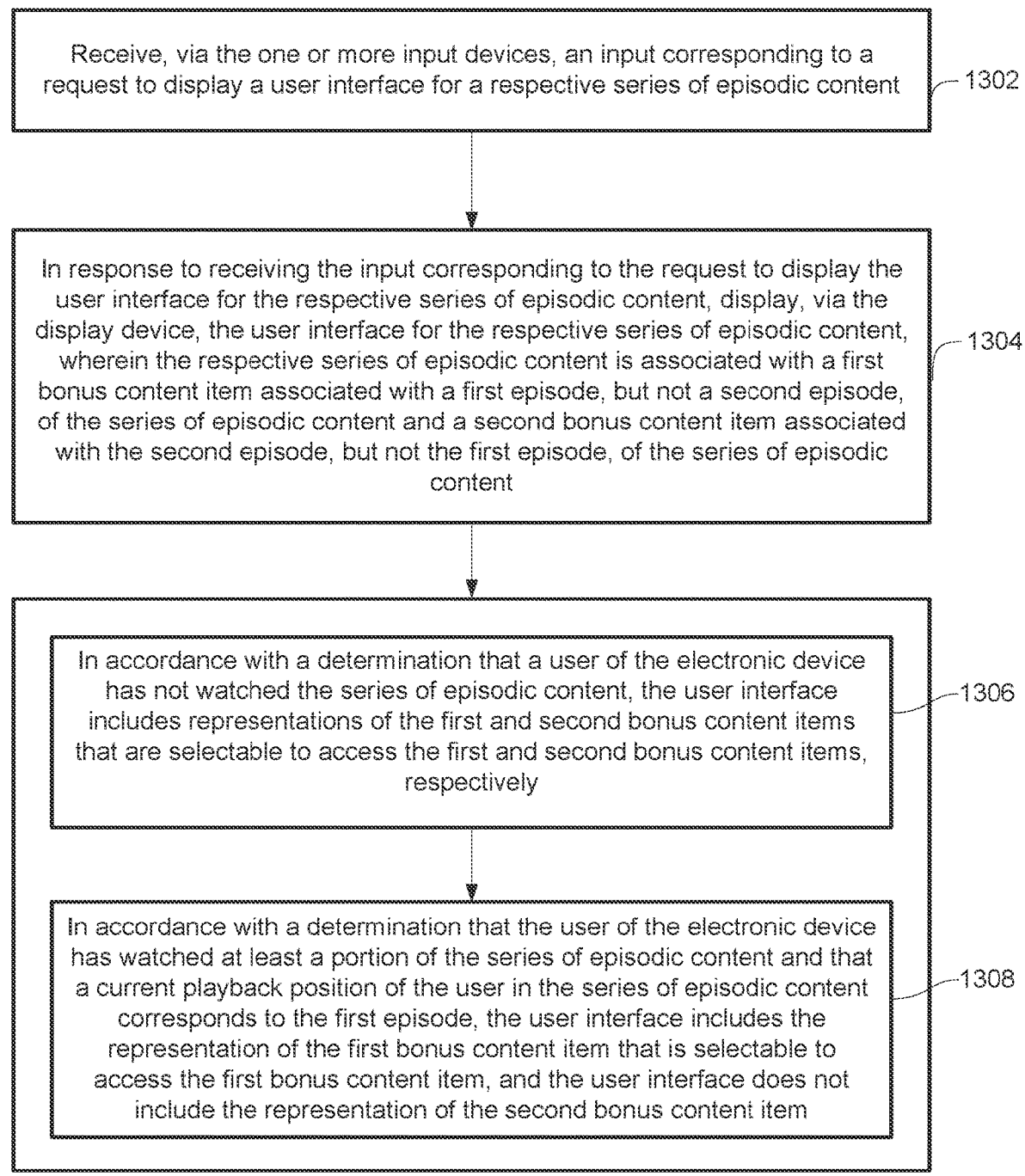
FIG. 13 is a flow diagram illustrating a method of presenting representations of bonus content items in a user interface for a respective series of episodic content in accordance with some embodiments of the disclosure.

FIG. 13 is a flow diagram illustrating a method 1300 of presenting representations of bonus content items in a user interface for a respective series of episodic content in accordance with some embodiments of the disclosure. The method 1300 is optionally performed at an electronic device such as device 100, device 300, device 500, device 501, device 510, and device 511 as described above with reference to FIGS. 1A-1B, 2-3, 4A-4B and 5A-5C. Some operations in method 1300 are, optionally combined and/or order of some operations is, optionally, changed.

As described below, the method 1300 provides ways to present representations of bonus content items for a respective series of episodic content. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, method 1300 is performed at an electronic device 500 in communication with a display device and one or more input devices (e.g., a mobile device (e.g., a tablet, a smartphone, a media player, or a wearable device) including a touch screen, a computer including one or more of a keyboard, mouse, trackpad, and display/touch screen, or a set-top box in communication with a display device and a remote control device).

In some embodiments, such as in FIG. 12A, the electronic device receives (1302), via the one or more input devices, an input (e.g., contact 1203) corresponding to a request to display a user interface 1202 for a respective series of episodic content. For example, in response to detecting selection of a representation of the respective series of episodic content, the electronic device displays the user interface for the respective series of episodic content. In some embodiments, the user interface includes various information about the series of episodic content and one or more selectable options that, when selected, cause the electronic device to initiate playback of the series of episodic content. Optionally, in accordance with a determination that the user is entitled to the series of episodic content (e.g., the user is subscribed to a channel, streaming service, or other provider that provides the series of episodic content, or the user has purchased the series of episodic content), the user interface includes one or more selectable options that, when selected, cause the electronic device to play the series of episodic content. In some embodiments, in accordance with a determination that the user is not entitled to the series of episodic content (e.g., the user is not subscribed to the channel, streaming service, or other content provider that provides access to the series of episodic content), the user interface includes one or more selectable options that, when selected, cause the electronic device to initiate a process to subscribe to one of the providers of the episodic content and/or purchase the series of episodic content. In some embodiments, the user interface includes representations of the episodes in the respective series of episodic content, a synopsis of each episode and/or of the series as a whole, information about the cast and crew of the series of episodic content, representations of trailers and/or bonus content associated with the series of episodic content, and the like. The user interface can be displayed in accordance with one or more steps of processes 700, 900, and/or 1100, described above with reference to FIGS. 6A-11G.

In some embodiments, in response to receiving the input (e.g., contact 1203 illustrated in FIG. 12A) corresponding to the request to display the user interface 1202 for the respective series of episodic content, the electronic device 500 displays (1304), via the display device 514, the user interface 1202 for the respective series of episodic content, wherein the respective series of episodic content is associated with a first bonus content item associated with a first episode, but not a second episode, of the series of episodic content and a second bonus content item associated with the second episode, but not the first episode, of the series of episodic content. In some embodiments, bonus content includes one or more of behind-the-scenes footage related to the series of episodic content, deleted scenes of the series of episodic content, interviews with cast and crew of the episodic content, and other content related to the series of episodic content. The bonus content optionally includes video content, images, text, audio recordings, or other media. In some embodiments, bonus content is associated with a particular episode of the series of episodic content. For example, a video interview with a director about the making of the first episode of the series of episodic content is associated with the first episode. As another example, a recap of all of the episodes prior to the season finale episode of the series of episodic content is associated with the season finale episode of the series of episodic content. In some embodiments, some of the bonus content is associated with the series of episodic content as a whole or an entire season of the episodic content. For example, behind-the-scenes footage of the location at which a respective season of the series of episodic content that does not include spoilers for any episodes within the respective season is associated with the respective season of the series of episodic content. More generally, in some embodiments, bonus content that relates to the entire series of episodic content without including spoilers for any episodes of the series of episodic content is associated with the entire series of episodic content.

In some embodiments, in accordance with a determination that a user of the electronic device has not watched the series of episodic content, the user interface includes representations 1226c and 1226f of the first and second bonus content items that are selectable to access the first and second bonus content items, respectively, such as in FIG. 12CC (1306). Optionally, the user interface includes selectable representations of all of the bonus content items associated with the series of episodic content, including representations of bonus content associated with the entire series or season and bonus content associated with individual episodes in the series of episodic content. In some embodiments, the selectable representations of all of the bonus content are displayed on the product page regardless of whether or not the user is entitled to access the series of episodic content. For example, if the user is not subscribed to the channel, streaming service, or other provider that provides the series of episodic content (or has not otherwise purchased the series of episodic content), the user interface for the series of episodic content includes selectable representations of all of the items of bonus content associated with the series of episodic content and selecting a representation first initiates a process to subscribe to the content provider before playing the bonus content. As another example, if the user is subscribed to the provider of the series of episodic content (or has otherwise purchased access to the series of episodic content), the user interface for the series of episodic content includes selectable representations of all of the bonus content associated with the series of episodic content and selecting a representation of a respective item of bonus content causes the electronic device to play the respective item of bonus content. In some embodiments, each selectable representation of an item of bonus content includes text (e.g., a title of the bonus content and other information such as date of publication, parental guidance rating, image quality, and duration) and/or an image (e.g., a frame of the bonus content or another image representing the bonus content) representing the bonus content.

In some embodiments, such as in FIG. 8AA, in accordance with a determination that the user of the electronic device 500 has watched at least a portion of the series of episodic content and that a current playback position of the user in the series of episodic content corresponds to the first episode, the user interface includes the representation 1226j of the first bonus content item that is selectable to access the first bonus content item, and the user interface does not include the representation of the second bonus content item (1308). If the user has watched one or more episodes of the series of episodic content, the user interface includes selectable representations of the bonus content related to the episode the user is currently watching and optionally selectable representations of bonus content related to the entire series or an entire season of the series of episodic content, without including representations of bonus content related only to other episodes in the series. If, for example, the user has finished watching a respective episode in the series, the playback position is associated either with the episode the user just finished or the next episode in the series. For example, if the user's current playback position is the second episode in the series of episodic content, the user interface for the series includes bonus content associated with the second episode (if any) and optionally bonus content associated with the series (or season) as a whole (if any), but does not include bonus content associated only with the first, third, fourth, etc. episodes. Once the user's current playback position switches from the second episode to the third episode, the user interface for the series optionally would include bonus content associated with the third episode (if any) and optionally bonus content associated with the series (or season) as a whole (if any), but optionally would not include bonus content associated only with the first, second, fourth, etc. episodes.

The above-described manner of displaying representations of the first and second bonus content items in accordance with a determination that the user has not watched the series of episodic content enables the electronic device to inform the user of the quantity of bonus content associated with the respective series of episodic content which could entice the user to watch the series of episodic content and displaying the representation of the first bonus content item without displaying the representation of the second bonus content item in accordance with a determination that the current playback position corresponds to the first episode reduces the number of representations of bonus content that are not currently relevant to the user that are included in the product page which simplifies the interaction between the user and the electronic device and enhances the operability of the electronic device and makes the user-device interface more efficient (e.g., by reducing the number of inputs needed to view representations of bonus content that are currently relevant to the user based on the current playback position within the series of episodic content), which additionally reduces power usage and improves battery life of the electronic device by enabling the user to use the electronic device more quickly and efficiently.

In some embodiments, such as in FIG. 12O, in accordance with a determination that the user of the electronic device has watched at least the portion of the series of episodic content and that the current playback position of the user in the series of episodic content corresponds to the second episode (e.g., the user has started watching the second episode or has finished the episode prior to the second episode but not yet started watching the second episode), the user interface 1202 includes the representation 1226f of the second bonus content item that is selectable to access the second bonus content item, and the user interface does not include the representation of the first bonus content item. The electronic device optionally displays representations of the bonus content items associated with the second episode because the playback position of the user in the series of episodic content corresponds to the second episode. In some embodiments, the electronic device also displays representations of bonus content items related to the entire series of episodic content in addition to representations of bonus content items related only to the second episode in the series of episodic content. Generally speaking, in accordance with the determination that the user has watched at least the portion of the series of episodic content, the user interface for the respective series of episodic content optionally includes representations of bonus content items associated with the respective episode that corresponds to the user's playback position in the series of episodic content.

In some embodiments, such as in FIG. 12O, in accordance with a determination that the user has watched at least the portion of the series of episodic content and that a current playback position of the user in the series of episodic content corresponds to the second episode (e.g., the user has started watching the second episode or has finished the episode prior to the second episode but not yet started watching the second episode), in accordance with a determination that the second bonus content item contains a spoiler for the second episode (e.g., the second bonus content item includes content that reveals information not known to the viewer until watching the second episode), the user interface does not include the representation 1226g, shown in FIG. 12U, of the second bonus content item. In some embodiments, the user interface optionally includes representations of one or more other bonus content items associated with the second episode that do not contain spoilers for the second episode because the one or more other bonus content items do not include spoilers. Optionally, once the playback position of the user in the series of episodic content changes from being associated with the second episode to being associated with the episode immediately after the second episode, the representation of the second bonus content item is displayed in the user interface and the representations of the one or more other bonus content items associated with the second episode that do not contain spoilers are no longer displayed in the user interface for the series of episodic content. In some embodiments, the representation of the second bonus content item is displayed concurrently with representations of bonus content items associated with the episode immediately after the second episode. Once the playback position advances to the next episode immediately after the episode that is immediately after the second episode, the representation of the second bonus content item optionally ceases to be displayed. In some embodiments, in accordance with a determination that the user has watched at least the portion of the series of episodic content and that a current playback position of the user in the series of episodic content corresponds to the second episode, in accordance with the determination that the second bonus content item does not contain a spoiler for the second episode (e.g., the second bonus content item does not include content that reveals information not known to the viewer until watching the second episode), the user interface includes the representation of the second bonus content item. In some embodiments, the representation of the second bonus content item is displayed in the user interface for the series of episodic content while the playback position corresponds to the second episode because the second bonus content item does not contain a spoiler for the second episode.

In some embodiments, such as in FIG. 12U, the user interface 1202 for the respective series of episodic content includes a representation 1226c of a third bonus content item that is a type of bonus content different from a type of bonus content of the first bonus content item and the second bonus content item. In some embodiments, the type of bonus content of the third bonus content item is a type that is associated with an entire season of the series or the entire series of episodic content and the type of bonus content of the first and second bonus content items is a type of bonus content that is associated with individual episodes of the series of episodic content. In some embodiments, the representation of the third bonus content item is displayed in the user interface for the respective series of episodic content regardless of whether or not the user has watched the portion of the series of episodic content. Optionally, the series of episodic content is associated with the third bonus content item, which is associated with both the first episode and the second episode. In some embodiments, the third bonus content item is associated with the entire series of episodic content. For example, the third bonus content item relates generally to the series of episodic content or to the entire season of the series of episodic content. Optionally, in accordance with the determination that the user of the electronic device has not watched the series of episodic content, the user interface for the respective series of episodic content includes a representation of the third bonus content item that is selectable to access the third bonus content item. In accordance with a determination that the user of the electronic device has not watched the series of episodic content, the electronic device optionally displays representations of all of the bonus content items associated with the series of episodic content, including bonus content items related to specific episodes of the series of episodic content (e.g., the first and second bonus content items) and bonus content items related to the entire series of episodic content (e.g., the third bonus content item). For example, if a user has not ever watched a respective television show using the electronic device, the user interface corresponding to the respective television show includes representations of all bonus content items related to the show, including representations of bonus content items related to specific episodes and representations of bonus content items related to the entire series. Optionally, in accordance with the determination that the user of the electronic device has watched at least the portion of the series of episodic content and that the current playback position of the user in the series of episodic content corresponds to the first episode, the user interface for the respective series of episodic content includes the representation of the third bonus content item that is selectable to access the third bonus content item. In some embodiments, in accordance with a determination that the user of the electronic device has watched the series of episodic content, the electronic device displays representations of bonus content items related to the episode corresponding to the current playback position within the series of episodic content and representations of bonus content items related to the entire series of episodic content. Optionally, the electronic device does not display representations of bonus content items related only to other episodes in the series of episodic content. For example, if the user is watching a respective series of episodic content and the current playback position within the series of episodic content corresponds to the third episode of the series, the user interface associated with the series includes representations of items of bonus content associated with the third episode in the series and representations of items of bonus content associated with the entire series, but does not include representations of items of bonus content related to other episodes in the series.

The above-described manner of displaying the representation of the third bonus content item associated with the first and second episodes regardless of whether the user has watched at least the portion of the series of episodic content enables the electronic device to provide quick access to bonus content items related to the entire series of episodic content from the user interface associated with the series of episodic content, which simplifies the interaction between the user and the electronic device and enhances the operability of the electronic device and makes the user-device interface more efficient (e.g., by providing a predictable and efficient way of accessing the bonus content related to the entire series of episodic content, thus reducing the number of inputs needed to access the bonus content related to the entire series), which additionally reduces power usage and improves battery life of the electronic device by enabling the user to use the electronic device more quickly and efficiently.

In some embodiments, in accordance with the determination that the user of the electronic device has not watched the series of episodic content, the representation 1226a of the third bonus content item is displayed with higher priority than (e.g., before, such as at the first position(s) in a list of bonus content) the representations 1226c-1226d of the first and second bonus content items in a respective region of the user interface for the respective series of episodic content, such as in FIG. 12C. In some embodiments, the representations of the bonus content items are displayed in a row in the user interface and, in accordance with a determination that the user of the electronic device has not watched the series of episodic content, the representations of bonus content items related to the entire series (e.g., the third bonus content item) are displayed first (e.g., leftmost) within the row, followed by representations of bonus content items specific to respective episodes of the series of episodic content (e.g., the first and second bonus content items). The electronic device optionally displays the representations of episode-specific bonus content items in chronological order based on the release date of the episode-specific bonus content items. For example, in accordance with a determination that the user has not watched the series of episodic content, the user interface includes a bonus content row with representations of bonus content items from left to right starting with bonus content items related to the entire series of episodic content, then representations of episode-specific bonus content items in chronological order of release date (e.g., most recent release to least recent release). In some embodiments, the bonus content row is horizontally scrollable to reveal additional representations of bonus content items not displayed prior to the scrolling input being received at the electronic device.

In some embodiments, in accordance with the determination that the user of the electronic device 500 has watched at least the portion of the series of episodic content and that the current playback position of the user in the series of episodic content corresponds to the first episode, the representation 1226e of the first bonus content item is displayed with higher priority than (e.g., before, such as at the first position(s) in a list of bonus content) the representation 1226a of the third bonus content item in the respective region of the user interface for the respective series of episodic content, such as in FIG. 12O. In some embodiments, in accordance with the determination that the user has watched the series of episodic content, the electronic device displays the bonus content items in the bonus content row of the user interface with the representations of bonus content items associated with the episode corresponding to the current playback position first (e.g., leftmost) within the row followed by the representations of bonus content items associated with the entire series of episodic content. For example, if the user is watching a series of episodic content and the current playback position corresponds to the first episode in the series, the electronic device displays the user interface including the representations of the bonus content items associated with the first episode first within the bonus content row followed by the representations of bonus content items associated with the entire series. As another example, if the user is watching the series and the current playback position corresponds to the second episode in the series, the electronic device displays the user interface including the representations of the bonus content items associated with the second episode first within the bonus content row followed by the representations of bonus content items associated with the entire series.

The above-described manner of displaying the representations of bonus content items in different orders enables the electronic device to provide quick access to the bonus content item that is likely more relevant to the user (e.g., when the user has not watched the series, it is more likely that they will be interested in bonus content related to the whole series, rather than bonus content related to a specific episode, and if the user has watched part of the series, it is more likely that they are more interested in bonus content related to the episode corresponding to the current playback position) which simplifies the interaction between the user and the electronic device and enhances the operability of the electronic device and makes the user-device interface more efficient (e.g., by reducing the number of inputs needed to access relevant bonus content), which additionally reduces power usage and improves battery life of the electronic device by enabling the user to use the electronic device more quickly and efficiently.

In some embodiments, the series of episodic content is associated with a first trailer 1222a (e.g., an item of content related to the series of episodic content meant to entice the user to watch the series of episodic content), such as in FIG. 12C. In some embodiments, trailers are associated with the entire series of episodic content and/or trailers are associated with individual episodes from the series of episodic content. For example, a trailer that is associated with the entire series of episodic content relates to the entire series of episodic content (e.g., and includes snippets of content from multiple episodes of the content series) and is meant to entice the user to watch the series of episodic content. As another example, a trailer that is associated with a respective episode of the series of episodic content relates to the respective episode (e.g., and includes snippets of content from only one episode—for example, the respective episode—of the content series) and is meant to entice the user to watch the respective episode in the series of episodic content.

In some embodiments, such as in FIG. 12C, the user interface for the respective series of episodic content further includes a representation 1226a of the first trailer that is selectable to access the first trailer. Optionally, the representation of the first trailer is displayed in the user interface for the respective series of episodic content regardless of whether or not the user of the electronic device has watched the series of episodic content. In some embodiments, in accordance with the determination that the user of the electronic device has not watched the series of episodic content, the user interface for the respective series of episodic content further includes a representation of the first trailer that is selectable to access the first trailer. In some embodiments, the electronic device displays representations of all of the trailers—including the first trailer—associated with the series of episodic content in accordance with a determination that the user has not watched the series of episodic content. For example, the first trailer is associated with the entire series of episodic content or with a respective episode in the series of episodic content. In some embodiments, in accordance with the determination that the user of the electronic device has watched at least the portion of the series of episodic content, the user interface for the series of episodic content further includes the representation of the first trailer that is selectable to access the first trailer. In some embodiments, the electronic device displays the representation of the first trailer irrespective of whether or not the user has watched the series of episodic content.

In some embodiments, such as in FIG. 12C, the user interface 1202 includes a first region (e.g., a first row) above a second region (e.g., a second row). In some embodiments, each region is a row of representations of content (e.g., bonus content or trailers)—other than episodes included in the series of episodic content—related to the series of episodic content.

In some embodiments, such as in FIG. 12C, in accordance with the determination that the user of the electronic device 500 has not watched the series of episodic content, the representation 1222a of the first trailer is displayed in the first region (e.g., the first row) of the user interface, and the representations 1226 of the first and second bonus content items are displayed in the second region (e.g., the second row) of the user interface 1202. In some embodiments, in accordance with the determination that the user has not watched the series of episodic content, the row of representations of trailers is displayed above the row of representations of bonus content in the user interface.

In some embodiments, such as in FIG. 12O, in accordance with the determination that the user of the electronic device 500 has watched at least the portion of the series of episodic content, the representation 1226e of the first bonus content item is displayed in the first region (e.g., the first row) of the user interface 1202, and the representation of the first trailer 1220a is displayed in the second region (e.g., the second row) of the user interface. In some embodiments, in accordance with a determination that the user has watched at least a portion of the series of episodic content, the row of representations of bonus content is displayed above the row of representations of trailers in the user interface.

The above-described manner of changing the order of the trailer and bonus content rows in the user interface enables the electronic device to present the representations of the items of content that are most relevant to the user with higher priority and quicker access (e.g., displaying the representation of the first trailer with higher priority when the user has not watched the series and displaying the representations of bonus content when the user has watched the series), which simplifies the interaction between the user and the electronic device and enhances the operability of the electronic device and makes the user-device interface more efficient (e.g., by reducing the number of inputs needed to access the trailer when the user has not watched the series of episodic content and reducing the number of inputs needed to access bonus content when the user has watched the series of episodic content), which additionally reduces power usage and improves battery life of the electronic device by enabling the user to use the electronic device more quickly and efficiently.

In some embodiments, such as in FIG. 12C, the series of episodic content is associated with a second trailer 1226a that was released after the first trailer 1226b. Each of the first and second trailers are optionally related to the entire series of episodic content or related to a single respective episode of the series of episodic content. For example, the first and second trailers can be related to the same episode, to different individual episodes, or to the entire series and an individual episode respectively. Optionally, in accordance with the determination that the user of the electronic device 500 has not watched the series of episodic content, the user interface 1202 for the respective series of episodic content further includes a representation 1226a of the second trailer that is displayed with a higher priority than (e.g., before) the representation 1226b of the first trailer in a respective region (e.g., a row) of the user interface in which the representations of the first and second trailers are displayed (e.g., a trailer row of the user interface), such as in FIG. 12C. In some embodiments, the trailers are displayed in reverse-chronological order with the representation of the most recently released trailer being first (e.g., leftmost) in the trailer row and the other trailers being displayed left to right in reverse-chronological order (e.g., newest first, oldest last). In some embodiments, the order in which the representations of trailers are displayed depends only on the release date of the trailers and does not depend on which trailers are related to the entire series of episodic content versus which being related only to a respective episode in the series. The trailer row is optionally horizontally scrollable to reveal additional representations of trailers that were not displayed prior to detection of a scrolling input. For example, if the second trailer was released before the first trailer, then the electronic device would display the representation of the first trailer to the left of the representation of the second trailer. In some embodiments, the representation of the first trailer is selectable to initiate a process to access the first trailer and the representation of the second trailer is selectable to initiate a process to access the second trailer. Optionally, in accordance with the determination that the user of the electronic device 500 has watched at least the portion of the series of episodic content, the user interface 1202 for the respective series of episodic content further includes the representation 1220a of the second trailer that is displayed with a higher priority than (e.g., before) the representation 1220b of the first trailer in a respective region (e.g., row) of the user interface in which the representations of the first and second trailers are displayed (e.g., a trailer row.), such as in FIG. 12O. The electronic device optionally displays the representations of the trailers in reverse-chronological order irrespective of whether or not the user has watched the series of episodic content and irrespective of the current playback position in the series of episodic content if the user has watched the series. In some embodiments, the trailers are displayed in reverse-chronological order with the representation of the most recently released trailer being first (e.g., leftmost) in the trailer row and the other trailers being displayed left to right in reverse-chronological order (e.g., newest first, oldest last). In some embodiments, the order in which the representations of trailers are displayed depends only on the release date of the trailers and does not depend on which trailers are related to the entire series of episodic content versus which being related only to a respective episode in the series. The trailer row is optionally horizontally scrollable to reveal additional representations of trailers that were not displayed prior to detection of a scrolling input. For example, if the second trailer was released before the first trailer, then the electronic device would display the representation of the first trailer to the left of the representation of the second trailer. In some embodiments, the representation of the first trailer is selectable to initiate a process to access the first trailer and the representation of the second trailer is selectable to initiate a process to access the second trailer.

In some embodiments, such as in FIG. 12C, the representation 1226a of the first bonus content item includes (e.g., or alternatively is displayed along with) an indication of the first episode with which the first bonus content item is associated, and metadata associated with the first bonus content item (e.g., a title of the first bonus content item, the runtime of the first bonus content item, the parental guidance rating of the first bonus content item, the audio/video quality of the first bonus content item, and/or the release date of the first bonus content item). In some embodiments, the representation of the first bonus content item further includes an image associated with the first bonus content item, which is optionally a still or animated image included in the first bonus content item. For example, the first bonus content item is a video and the image is one or more frames of the video.

In some embodiments, such as in FIG. 12C, the representation 1226b of the second bonus content item includes (e.g., or alternatively is displayed along with) an indication of the second episode with which the second bonus content item is associated, and metadata associated with the second bonus content item (e.g., a title of the second bonus content item, the runtime of the second bonus content item, the parental guidance rating of the second bonus content item, the audio/video quality of the second bonus content item, and/or the release date of the second bonus content item). In some embodiments, the representation of the second bonus content item further includes an image associated with the second bonus content item, which is optionally a still or animated image included in the second bonus content item. For example, the second bonus content item is a video and the image is one or more frames of the video.

The above-described manner of including an indication of the episode and metadata associated with the respective bonus content item with the representation of the respective bonus content item enables the electronic device to quickly and efficiently provide the user with information about the respective bonus content item while displaying the user interface for the series of episodic content, which simplifies the interaction between the user and the electronic device and enhances the operability of the electronic device and makes the user-device interface more efficient (e.g., by reducing the number of inputs needed to view the episode and metadata associated with the respective bonus content item compared to not displaying the indication and metadata in the user interface for the series of episodic content), which additionally reduces power usage and improves battery life of the electronic device by enabling the user to use the electronic device more quickly and efficiently.

In some embodiments, such as in FIG. 12AA, the respective series of episodic content is further associated with a third bonus content item 1226j that is associated with a final episode of the respective series of episodic content (e.g., the last episode in the series of episodic content), wherein the third bonus content item 1226j is not associated with the first or second episodes of the series of episodic content (e.g., the third bonus content item is associated with the final episode only). The final episode is optionally the final episode in the entire series (e.g., no more episodes of the series will be released in the future) or the final episode of the current season (e.g., no more episodes will be released in the current season, and there are currently no seasons after the current season, but new seasons will be released in the future). For example, a series of episodic content currently has two seasons and the final season is the season finale of the second season and the third bonus content item is associated with the final episode without being associated with the other episodes in the series.

In some embodiments, such as in FIG. 12AA, in accordance with a determination that the user of the electronic device 500 has finished watching the final episode of the respective series of episodic content, the user interface 1202 for the respective series of episodic content includes a representation 1226j of the third bonus content item that is selectable to access the third bonus content item, and does not include the representations of the first and second bonus content items. The playback position within the series of episodic content optionally remains associated with the final episode once the user finishes watching the final episode. In some embodiments, while the playback position is associated with the final episode, the user interface associated with the series of episodic content includes representations of bonus content items associated with the final episode and does not include representations of bonus content items associated with other single respective episodes in the series of episodic content. The user interface associated with the series of episodic content optionally further includes representations of bonus content items related to the entire series of episodic content in addition to the representations of the bonus content items associated with the final episode of the series of episodic content. In some embodiments, rather than excluding representations of bonus content items related only to individual previously-played episodes, the electronic device moves these representations to the end of a list. For example, the electronic device displays representations of bonus content items associated with the current episode first, then representations of bonus content items related to the entire series of episodic content, and, last, representations of bonus content items related only to single, previously-played episodes.

The above-described manner of displaying the representation of the third bonus content item in the user interface in accordance with a determination that the user has finished watching the final episode of the series of episodic content enables the electronic device to provide quick access to the third bonus content item associated with the final episode from the user interface associated with the series of episodic content when the user is likely to want to access the third bonus content item (e.g., after watching the final episode), which simplifies the interaction between the user and the electronic device and enhances the operability of the electronic device and makes the user-device interface more efficient (e.g., by reducing the number of inputs needed to access relevant bonus content items), which additionally reduces power usage and improves battery life of the electronic device by enabling the user to use the electronic device more quickly and efficiently.

In some embodiments, such as in FIG. 12AA, the respective series of episodic content is further associated with a third bonus content item 1226j that is associated with a final episode of the respective series of episodic content (e.g., the last episode in the series of episodic content), wherein the third bonus content item 1226j is not associated with the first or second episodes of the series of episodic content (e.g., the third bonus content item is associated with the final episode only). The final episode is optionally the final episode in the entire series (e.g., no more episodes of the series will be released in the future) or the final episode of the current season (e.g., no more episodes will be released in the current season, and there are currently no seasons after the current season, but new seasons will be released in the future). For example, a series of episodic content currently has two seasons and the final season is the season finale of the second season and the third bonus content item is associated with the final episode without being associated with the other episodes in the series.

In some embodiments, such as in FIG. 12AA, in accordance with a determination that the user of the electronic device 500 has finished watching the final episode of the respective series of episodic content and in accordance with a determination that an amount of time since the user of the electronic device finished watching the final episode of the respective series of episodic content is less than a predetermined time threshold (e.g., 2, 3, 4 or 6 months), the user interface 1202 for the respective series of episodic content includes a representation 1226j of the third bonus content item that is selectable to access the third bonus content item, and does not include the representations of the first and second bonus content items. The playback position within the series of episodic content optionally remains associated with the final episode for a predetermined period of time (e.g., 2, 3, 4, 5, or 6 months) after the user finishes watching the final episode. In some embodiments, the user interface associated with the series of episodic content includes representations of bonus content items associated with the final episode and does not include representations of bonus content items associated with other single respective episodes in the series of episodic content for the predetermined time (e.g., 2, 3, 4, 5, or 6 months) after the user finishes watching the final episode. The user interface associated with the series of episodic content optionally further includes representations of bonus content items related to the entire series of episodic content in addition to the representations of the bonus content items associated with the final episode of the series of episodic content.

In some embodiments, such as in FIGS. 12BB-12CC, in accordance with a determination that the user of the electronic device has finished watching the final episode of the respective series of episodic content, in accordance with a determination that the amount of time since the user of the electronic device finished watching the final episode of the respective series of episodic content is greater than the predetermined time threshold (e.g., 2, 3, 4 or 6 months), the user interface for the respective series of episodic content includes the representations 1226 of the first, second, and third bonus content items. In some embodiments, once the predetermined period of time (e.g., 2, 4, 5, or 6 months) has passed since the user has finished the final episode of the series of episodic content, the user interface associated with the series of episodic content includes representations of all of the bonus content items associated with the series of episodic content. The user interface optionally includes representations of bonus content items associated with the entire series of episodic content and all episode-specific bonus content items (e.g., all bonus content items associated with individual episodes in the series of episodic content).

The above-described manner of temporarily maintaining the playback position at the final episode enables the electronic device to make it quicker for the user to access the third bonus content item associated with the final episode when the user recently finished watching the final episode and is more likely to want to watch the bonus content associated with the final episode and to make it quicker for the user to browse and access the first, second, and third bonus content items when the user is less likely to be particularly interested in the bonus content associated with the final episode and may be considering re-watching the series of episodic content, which simplifies the interaction between the user and the electronic device and enhances the operability of the electronic device and makes the user-device interface more efficient (e.g., by reducing the number of inputs needed to browse and access the bonus content items that are likely to be of interest to the user depending on how long it has been since the user finished watching the final episode of the series of episodic content), which additionally reduces power usage and improves battery life of the electronic device by enabling the user to use the electronic device more quickly and efficiently.

In some embodiments, such as in FIG. 12P, while displaying the user interface 1202 for the respective series of episodic content and while the current playback position of the user in the series of episodic content corresponds to the first episode (e.g., the user has started watching the first episode but has not progressed to watching the second episode), the electronic device receives, via the one or more input devices 510, an input (e.g., contact 1203) corresponding to a request to display a user interface 1204 for the second episode of the respective series of episodic content (e.g., an episode page user interface associated with the second episode), such as user interface 1204 in FIG. 12Q. In some embodiments, the episode page user interface includes information about a respective episode of the series of episodic content, including a selectable option to play the episode, information about how to watch the respective episode (e.g., subscription services and channels that provide access to the episode), metadata about the episode (e.g., runtime, release date, cast and crew, synopsis, genre, audio/video quality/format, parental guidance rating, etc.), and representations of bonus content associated with the episode. The electronic device optionally displays the episode page user interface in response to detecting selection of an option associated with the episode page user interface for a respective episode. For example, in response to detecting selection of an option associated with the episode page user interface for the second episode, the electronic device displays the episode page for the second episode. As another example, in response to detecting selection of an option associated with the episode page user interface for the first episode, the electronic device displays the episode page for the first episode. In some embodiments, each episode in the series of episodic content has an episode page user interface associated therewith. The episode page user interface is optionally displayed in accordance with one or more steps of method 1100.

In some embodiments, in response to receiving the input corresponding to the request to display the user interface for the second episode, such as in FIG. 12Q, the electronic device 500 displays, via the display device, the user interface 1204 for the second episode, such as in FIG. 12Q, wherein the user interface for the second episode includes the representation of the second bonus content item 1226f, such as in FIG. 12R. The episode page user interface for the second episode optionally does not include the representation of the first bonus content item associated with the first episode. In some embodiments, the episode page user interface for the second episode includes representations of all of the bonus content items associated with the second episode, including bonus content items associated solely with the second episode and bonus content items associated with the entire series of episodic content. The episode page user interface of the second episode optionally includes the representations of bonus content items associated with the second episode irrespective of the user's playback position within the series of episodic content (e.g., even if the bonus content items associated with the second episode are not displayed in the content series user interface). Likewise, in some embodiments, an episode page user interface for the first episode includes representations of bonus content related to the first episode, including bonus content items associated with the first episode only and bonus content items associated with the entire series of episodic content, irrespective of the user's playback position within the series of episodic content. In some embodiments, the episode page user interface for the first episode does not include the representation of the second bonus content item associated with the second episode. Thus, the representations of bonus content items related to the entire series of episodic content are optionally included in the episode page user interfaces for all of the episodes included in the series of episodic content.

The above-described manner of displaying the user interface for the second episode with the representation of the second bonus content item associated with the second episode when the current playback position of the user in the series of episodic content corresponds to the first episode enables the electronic device to provide quick access to bonus content items associated with episodes other than the episode that corresponds to the current playback position of the user in the series of episodic content, which simplifies the interaction between the user and the electronic device and enhances the operability of the electronic device and makes the user-device interface more efficient (e.g., by providing an efficient and predictable way of accessing the bonus content items associated with each episode in the series of episodic content), which additionally reduces power usage and improves battery life of the electronic device by enabling the user to use the electronic device more quickly and efficiently.

In some embodiments, such as in FIG. 12R, the respective series of episodic content is further associated with a third bonus content item 1226a associated with the first and second episodes of the series of episodic content (e.g., a bonus content item associated with the entire series of episodic content). In some embodiments, such as in FIG. 12R, the representation 1226f of the second bonus content item is displayed with higher priority than (e.g., before, such as at the first position(s) in a list of bonus content) a representation 1226a of the third bonus content item in a respective region (e.g., a row) of the user interface for the second episode. The representation of the second bonus content item is optionally displayed to the left of the representation of the third bonus content item in a row of representations of bonus content items on the episode page user interface for the second episode. Generally speaking, in some embodiments, the representations of bonus content items related only to the second episode are displayed to the left of the representations of the bonus content items related to the entire series of episodic content in the bonus content row of the episode page user interface associated with the second episode. Likewise, the episode page user interface associated with the first episode optionally includes a bonus content row that includes representations of bonus content items related only to the first episode (e.g., the representation of the first bonus content item) displayed to the left of the representations of bonus content items related to the entire series of episodic content. In some embodiments, the bonus content row is horizontally scrollable to reveal additional representations of bonus content items that were not displayed prior to receiving the scrolling input.

The above-described manner of displaying the representation of the second bonus content item that is associated with the second episode with higher priority than the representation of the third bonus content item that is associated with both the first episode and the second episode enables the electronic device to make it quicker for the user to access the bonus content item associated with the second episode while displaying the user interface for the second episode, which simplifies the interaction between the user and the electronic device and enhances the operability of the electronic device and makes the user-device interface more efficient (e.g., by reducing the number of inputs needed to access the second bonus content item, which the user is likely to be more interested in viewing than the third bonus content item because the user chose to view a user interface for the second episode), which additionally reduces power usage and improves battery life of the electronic device by enabling the user to use the electronic device more quickly and efficiently.

In some embodiments, such as in FIG. 12X, the respective series of episodic content is associated with a third bonus content item 1226h associated with the second episode, the user interface for the second episode 1204 includes a representation 1226h of the third bonus content item, such as in FIG. 12X, and in accordance with the determination that the user of the electronic device has watched at least a portion of the series of episodic content and that a current playback position of the user in the series of episodic content corresponds to the first episode, such as in FIG. 12O, the user interface 1202 for the respective series of episodic content does not include the representation of the third bonus content item. In some embodiments, even if the user interface for the respective series of episodic content does not include a representation of the third bonus content item associated with the second episode (e.g., because the playback position corresponds to the first episode), the user interface for the second episode still includes the representation of the third bonus content item—and representations of other bonus content items associated with the second episode.

The above-described manner of displaying representations of bonus content items associated with the second episode in the user interface for the second episode even when the representations of bonus content items associated with the second episode are not displayed in the user interface for the series of episodic content enables the electronic device to reduce the number of representations of bonus content items included in the user interface for the series of episodic content while still providing access to all of the bonus content by displaying the representations of bonus content items associated with a respective episode in the user interface for the respective episode which simplifies the interaction between the user and the electronic device and enhances the operability of the electronic device and makes the user-device interface more efficient (e.g., by reducing the number of inputs needed to access bonus content related to the current playback position of the user in the series of episodic content while also providing a predictable way to access all other bonus content items from the user interfaces for individual episodes), which additionally reduces power usage and improves battery life of the electronic device by enabling the user to use the electronic device more quickly and efficiently.

In some embodiments, such as in FIG. 12L, in accordance with the determination that the user of the electronic device 500 has not watched the series of episodic content, the user interface 1204 for the second episode includes the representation 1226c of the second bonus content item. In some embodiments, such as in FIG. 12R, in accordance with the determination that the user of the electronic device 500 has watched at least the portion of the series of episodic content, the user interface 1204 for the second episode includes the representation 1226f of the second bonus content item. In some embodiments, such as in FIG. 12R, in accordance with a determination that the user of the electronic device 500 is entitled to access the series of episodic content (e.g., the user is subscribed to a channel, streaming service, or other provider that provides the series of episodic content, or the user has purchased the series of episodic content), the user interface 1204 for the second episode includes the representation 1226f of the second bonus content item. In some embodiments, such as in FIG. 12F, in accordance with a determination that the user of the electronic device 500 is not entitled to access the series of episodic content (e.g., the user is not subscribed to the channel, streaming service, or other provider that provides the series of episodic content, and the user has not purchased the series of episodic content), the user interface 1204 for the second episode includes the representation 1226c of the second bonus content item. The episode page user interface optionally further includes representations of bonus content items associated with the entire series of episodic content irrespective of whether or not the user has watched the series of episodic content and irrespective of whether the user is entitled to access the respective series of episodic content. In some embodiments, the user is entitled to access the respective series of episodic content via an active subscription to a streaming service, channel, or other content provider. Optionally, the user is not entitled to access the respective series of episodic content if they do not have an active subscription to the service or content provider that provides the series. For example, if the user is subscribed to the service that provides access to the series of episodic content, the episode page user interface for the second episode includes representations of the bonus content items associated with the second episode, including bonus content associated only with the second episode and bonus content items associated with the entire series of episodic content. As another example, even if the user is not subscribed to the service that provides access to the series of episodic content, the episode page user interface for the second episode includes representations of the bonus content items associated with the second episode, including bonus content associated only with the second episode and bonus content items associated with the entire series of episodic content. Likewise, in some embodiments, an episode page user interface for the first episode includes representations of bonus content items related to the first episode, including bonus content items related only to the first episode and bonus content items related to the entire series of episodic content irrespective of whether the user has watched the series of episodic content and whether or not the user is entitled to access the series of episodic content. In some embodiments, the user is able to access the items of bonus content regardless of whether the user is entitled to access the series of episodic content. In some embodiments, the user is only able to access the bonus content items if they are entitled to access the series of episodic content.

The above-described manner of displaying the representation of the second bonus content item in the episode page user interface for the second episode in a variety of scenarios enables the electronic device to provide quick and predictable access to the second bonus content item, which simplifies the interaction between the user and the electronic device and enhances the operability of the electronic device and makes the user-device interface more efficient (e.g., by reducing the number of inputs needed to find the representation of the second bonus content item by displaying it consistently in the episode page user interface for the second episode), which additionally reduces power usage and improves battery life of the electronic device by enabling the user to use the electronic device more quickly and efficiently.

In some embodiments, such as in FIG. 12C, in accordance with the determination that the user of the electronic device 500 has not watched the series of episodic content and in accordance with a determination that the series of episodic content is currently-releasing series of episodic content (e.g., new episodes of the series of episodic content are still being released), the user interface 1202 for the series of episodic content includes the representations 1226 of the first and second bonus content items.

In some embodiments, such as in FIG. 12C, in accordance with the determination that the user of the electronic device 500 has not watched the series of episodic content and in accordance with a determination that the series of episodic content is not a currently-releasing series of episodic content (e.g., all episodes of the respective series of episodic content have been released), the user interface 1202 for the series of episodic content includes the representations 1226 of the first and second bonus content items. For example, if the series of episodic content is not a currently-releasing series of episodic content, one or more episodes that will be included in a currently-releasing series of episodic content have not yet been released. Optionally, a series of episodic content that is not a currently-releasing series of episodic content is a "closed" series episodic content. In some embodiments, when a series of episodic content is "closed," all episodes of the series of episodic content have been released and no further episodes are scheduled to be released in the future (e.g., the series has been canceled). In some embodiments, in accordance with the determination that the user of the electronic device has not watched the series of episodic content, the user interface associated with the respective series of episodic content includes representations of all of the bonus content items associated with the series of episodic content regardless of whether the series of episodic content is a "closed" series or is a currently-releasing series.

In some embodiments, such as in FIG. 12O, in accordance with the determination that the user of the electronic device 500 has watched at least the portion of the series of episodic content and that the current playback position of the user in the series of episodic content corresponds to the first episode and in accordance with the determination that the series of episodic content is currently-releasing series of episodic content (e.g., new episodes of the series of episodic content are still being released), the user interface 1202 includes the representation 1226f of the first bonus content item, and the user interface does not include the representation of the second bonus content item.

In some embodiments, such as in FIG. 12O, in accordance with the determination that the user of the electronic device 500 has watched at least the portion of the series of episodic content and that the current playback position of the user in the series of episodic content corresponds to the first episode and in accordance with a determination that the series of episodic content is not a currently-releasing series of episodic content (e.g., all episodes of the respective series of episodic content have been released), the user interface 1202 includes the representation 1226f of the first bonus content item, and the user interface does not include the representation of the second bonus content item. In some embodiments, in accordance with a determination that the user has watched at least a portion of the series of episodic content, the user interface associated with the series of episodic content includes representations of bonus content items related to the episode associated with the current playback position within the series of episodic content regardless of whether the series of episodic content is a "closed" series or is a currently-releasing series. For example, if the playback position is currently associated with the first episode, the user interface for the series of episodic content includes representations of bonus content items related only to the first episode and representations of bonus content items related to the entire series—without including representations of bonus content items related only to other episodes in the series—regardless of whether the series of episodic content is a "closed" series or is a currently-releasing series. As another example, if the playback position is currently associated with the second episode, the user interface for the series of episodic content includes representations of bonus content items related only to the second episode and representations of bonus content items related to the entire series—without including representations of bonus content items related to only to other episodes in the series regardless of whether the series of episodic content is a "closed" series or is a currently-releasing series.

The above-described manner of displaying bonus content items irrespective of the release status of the content series enables the electronic device to provide quick and predictable access to the representations of bonus content most relevant to the user based on the playback position within the series of episodic content, which simplifies the interaction between the user and the electronic device and enhances the operability of the electronic device and makes the user-device interface more efficient (e.g., by providing a predictable and efficient way of accessing the most relevant bonus content to all users, irrespective of whether the user watches the series while it is open or closed), which additionally reduces power usage and improves battery life of the electronic device by enabling the user to use the electronic device more quickly and efficiently.

It should be understood that the particular order in which the operations in FIG. 13 have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein (e.g., methods 700, 900, and 1100) are also applicable in an analogous manner to method 1300 described above with respect to FIG. 13. For example, the ways of presenting representations of bonus content items described above with reference to method 1300 optionally have one or more of the characteristics of the ways of presenting representations of items of content, presenting representations of auxiliary content, presenting representations of content based on the content consumption history of the user account, etc., described herein with reference to other methods described herein (e.g., methods 700, 900, and 1100). For brevity, these details are not repeated here.

The operations in the information processing methods described above are, optionally, implemented by running one or more functional modules in an information processing apparatus such as general purpose processors (e.g., a as described with respect to FIGS. 1A-1B, 3, 5A-5C or application specific chips. Further, the operations described above with reference to FIG. 13 are, optionally, implemented by components depicted in FIGS. 1A-1B. For example, displaying operation 1304 and receiving operation 1302 are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from various sources to improve the delivery to users of content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of content delivery services, the present technology can be configured to allow users to select to "opt in" or "opt out" of participation in the collection of personal information data during registration for services or anytime thereafter. In another example, users can select not to provide content taste data for targeted content delivery services. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display and one or more input devices:
displaying, via the display, a content item representation section that includes a primary position, a first secondary position, and a second secondary position, wherein a first representation associated with a first content item is located in the primary position, a second representation associated with a second content item is located in the first secondary position, the first representation is partially overlaid on the second representation, and the first and second representations are selectable to initiate respective actions corresponding to respective content items;
while displaying the content item representation section, receiving, via the one or more input devices, an input corresponding to a request to move the first representation to the second secondary position in the content item representation section; and
in response to receiving the input:
moving the first representation from the primary position to the second secondary position a first distance in a first direction; and
moving the second representation from the first secondary position to the primary position the first distance in the first direction,
wherein:
moving the first representation from the primary position to the second secondary position, and the second representation from the first secondary position to the primary position comprises moving a cropping boundary between first representation and the second representation by a second distance, greater than the first distance, in the first direction, revealing the second representation from underneath the first representation, and
after moving the first representation from the primary position to the second secondary position, and the second representation from the first secondary position to the primary position, the second representation is partially overlaid on the first representation.

2. The method of claim 1, wherein the content item representation section is included as a row in a user interface of a unified media browsing application, the user interface including other rows of other representations of content items that are selectable to initiate processes to display the respective content items via the display.

3. The method of claim 1, wherein:
the primary position is a center position in the content item representation section, the first secondary position is a left position in the content item representation section, and the second secondary position is a right position in the content item representation section,
a left side of a respective representation that is in the first secondary position is aligned with a left side of the first secondary position, and
a right side of a respective representation that is in the second secondary position is aligned with a right side of the second secondary position.

4. The method of claim 1, wherein the second representation comprises two or more layers of images, and while the second representation is in the primary position, the two or more layers of images move with respect to each other within the second representation in response to touch input detected on a touch-sensitive surface of the one or more input devices.

5. The method of claim 4, wherein the two or more layers includes a first video layer that includes playing video content and a first static layer that includes static image content, wherein the video content in the first video layer starts playing in response to the second representation being moved to the primary position.

6. The method of claim 1, wherein the second representation comprises two or more layers of images, the method further comprising:
while the second representation is not in the primary position, the two or more layers of the second representation are fixed to each other and do not move with respect to one another in response to touch input detected on a touch-sensitive surface of the one or more input devices; and
while the second representation is in the primary position, the two or more layers of images move with respect to each other within the second representation in response to touch input detected on the touch-sensitive surface of the one or more input devices.

7. The method of claim 6, further comprising:
while the second representation is in the primary position:

receiving, via the one or more input devices, a respective touch input detected on the touch-sensitive surface of the one or more input devices; and in response to receiving the respective touch input:

in accordance with a determination that the respective touch input has a movement magnitude larger than a threshold, moving the two or more layers of images in the second representation with respect to each other within the second representation in accordance with the respective touch input; and in accordance with a determination that the respective touch input has the movement magnitude smaller than the threshold, forgoing moving the two or more layers of images in the second representation with respect to each other.

8. The method of claim 7, wherein moving the two or more layers of images in the second representation with respect to each other within the second representation comprises moving the two or more layers of images in the second representation with respect to each other within the second representation while a border of the second representation remains fixed.

9. The method of claim 1, wherein the second representation includes a title of the second content item, and the title of the second content item animates from outside the second representation to inside the second representation in response to the second representation being moved to the primary position.

10. The method of claim 1, wherein:

while the first representation associated with the first content item is in the primary position and the second representation associated with the second content item is in the first secondary position, the first representation is displayed with a first brightness characteristic, and the second representation is displayed with a second brightness characteristic, different than the first brightness characteristic, and while the second representation associated with the second content item is in the primary position and the first representation associated with the first content item is in the second secondary position, the first representation is displayed with the second brightness characteristic, and the second representation is displayed with the first brightness characteristic.

11. The method of claim 1, wherein the second representation comprises two or more layers of images, the method further comprising:

while the second representation is in the primary position, receiving, via the one or more input devices, an input corresponding to a selection input detected at the one or more input devices; and in response to receiving the input corresponding to the selection input detected at the one or more input devices, displaying an animation of the two or more layers moving towards a foreground of the display resulting in display, via the display, of a user interface specific to the second content item.

12. The method of claim 11, further comprising:

in response to displaying the user interface specific to the second content item:

in accordance with a determination that a user of the electronic device has not interacted with the second content item:

displaying, on the user interface, a video trailer associated with the second content item; and in accordance with a determination that a user of the electronic device has interacted with the second content item:

displaying, on the user interface, ambient video content, as a background of the user interface, associated with the second content item without displaying the video trailer in the user interface.

13. The method of claim 12, wherein:

in accordance with a determination that the user of the electronic device has watched a first set of episodes of the second content item, the ambient video is a first ambient video, and in accordance with a determination that the user of the electronic device has watched a second set of episodes of the second content item, different than the first set, the ambient video is a second ambient video, different than the first ambient video.

14. The method of claim 13, wherein the content item representation section includes the first representation, the second representation and a third representation of a third content item, and:

while a respective representation of the first, second and third representations is in the primary position in the content item representation section, the respective representation includes at least one animated portion; and while respective representations of the first, second and third representations are in the first and second secondary positions in the content item representation section, the respective representations do not include respective at least one animated portions.

15. The method of claim 1, wherein the content item representation section does not include a representation of an episode of a collection of episodic content.

16. The method of claim 1, wherein:

while the first representation of the first content item is located in the primary position, the first representation includes a visual indication of a provider of the first content item, and while the second representation of the second content item is located in the primary position, the second representation include a visual indication of a provider of the second content item.

17. An electronic device, comprising:

one or more processors;

memory; and one or more programs, wherein the one or more programs are stored in the memory and configured to be executed by the one or more processors, the one or more programs including instructions for:

displaying, via a display, a content item representation section that includes a primary position, a first secondary position, and a second secondary position, wherein a first representation associated with a first content item is located in the primary position, a second representation associated with a second content item is located in the first secondary position, the first representation is partially overlaid on the second representation, and the first and second representations are selectable to initiate respective actions corresponding to respective content items;

while displaying the content item representation section, receiving, via one or more input devices, an input corresponding to a request to move the first representation to the second secondary position in the content item representation section; and in response to receiving the input:

moving the first representation from the primary position to the second secondary position a first distance in a first direction; and
moving the second representation from the first secondary position to the primary position the first distance in the first direction,
wherein:
  moving the first representation from the primary position to the second secondary position, and the second representation from the first secondary position to the primary position comprises moving a cropping boundary between first representation and the second representation by a second distance, greater than the first distance, in the first direction, revealing the second representation from underneath the first representation, and
  after moving the first representation from the primary position to the second secondary position, and the second representation from the first secondary position to the primary position, the second representation is partially overlaid on the first representation.

18. A non-transitory computer readable storage medium storing one or more programs, the one or more programs comprising instructions, which when executed by one or more processors of an electronic device, cause the electronic device to:
  display, via a display, a content item representation section that includes a primary position, a first secondary position, and a second secondary position, wherein a first representation associated with a first content item is located in the primary position, a second representation associated with a second content item is located in the first secondary position, the first representation is partially overlaid on the second representation, and the first and second representations are selectable to initiate respective actions corresponding to respective content items;
  while displaying the content item representation section, receive, via one or more input devices, an input corresponding to a request to move the first representation to the second secondary position in the content item representation section; and
  in response to receiving the input:
    move the first representation from the primary position to the second secondary position a first distance in a first direction; and
    move the second representation from the first secondary position to the primary position the first distance in the first direction,
    wherein:
      moving the first representation from the primary position to the second secondary position, and the second representation from the first secondary position to the primary position comprises moving a cropping boundary between first representation and the second representation by a second distance, greater than the first distance, in the first direction, revealing the second representation from underneath the first representation, and
      after moving the first representation from the primary position to the second secondary position, and the second representation from the first secondary position to the primary position, the second representation is partially overlaid on the first representation.

19. The electronic device of claim 17, wherein the content item representation section is included as a row in a user interface of a unified media browsing application, the user interface including other rows of other representations of content items that are selectable to initiate processes to display the respective content items via the display.

20. The electronic device of claim 17, wherein:
  the primary position is a center position in the content item representation section, the first secondary position is a left position in the content item representation section, and the second secondary position is a right position in the content item representation section,
  a left side of a respective representation that is in the first secondary position is aligned with a left side of the first secondary position, and
  a right side of a respective representation that is in the second secondary position is aligned with a right side of the second secondary position.

21. The electronic device of claim 17, wherein the second representation comprises two or more layers of images, and while the second representation is in the primary position, the two or more layers of images move with respect to each other within the second representation in response to touch input detected on a touch-sensitive surface of the one or more input devices.

22. The electronic device of claim 21, wherein the two or more layers includes a first video layer that includes playing video content and a first static layer that includes static image content, wherein the video content in the first video layer starts playing in response to the second representation being moved to the primary position.

23. The electronic device of claim 17, wherein the second representation comprises two or more layers of images, and wherein:
  while the second representation is not in the primary position, the two or more layers of the second representation are fixed to each other and do not move with respect to one another in response to touch input detected on a touch-sensitive surface of the one or more input devices; and
  while the second representation is in the primary position, the two or more layers of images move with respect to each other within the second representation in response to touch input detected on the touch-sensitive surface of the one or more input devices.

24. The electronic device of claim 23, the one or more programs including instructions further for:
  while the second representation is in the primary position:
    receiving, via the one or more input devices, a respective touch input detected on the touch-sensitive surface of the one or more input devices; and
    in response to receiving the respective touch input:
      in accordance with a determination that the respective touch input has a movement magnitude larger than a threshold, moving the two or more layers of images in the second representation with respect to each other within the second representation in accordance with the respective touch input; and
      in accordance with a determination that the respective touch input has the movement magnitude smaller than the threshold, forgoing moving the two or more layers of images in the second representation with respect to each other.

25. The electronic device of claim 24, wherein moving the two or more layers of images in the second representation with respect to each other within the second representation comprises moving the two or more layers of images in the second representation with respect to each other within the second representation while a border of the second representation remains fixed.

26. The electronic device of claim 17, wherein the second representation includes a title of the second content item, and the title of the second content item animates from outside the second representation to inside the second representation in response to the second representation being moved to the primary position.

27. The electronic device of claim 17, wherein:
while the first representation associated with the first content item is in the primary position and the second representation associated with the second content item is in the first secondary position, the first representation is displayed with a first brightness characteristic, and the second representation is displayed with a second brightness characteristic, different than the first brightness characteristic, and
while the second representation associated with the second content item is in the primary position and the first representation associated with the first content item is in the second secondary position, the first representation is displayed with the second brightness characteristic, and the second representation is displayed with the first brightness characteristic.

28. The electronic device of claim 17, wherein the second representation comprises two or more layers of images, the one or more programs including instructions further for:
while the second representation is in the primary position, receiving, via the one or more input devices, an input corresponding to a selection input detected at the one or more input devices; and
in response to receiving the input corresponding to the selection input detected at the one or more input devices, displaying an animation of the two or more layers moving towards a foreground of the display resulting in display, via the display, of a user interface specific to the second content item.

29. The electronic device of claim 28, the one or more programs including instructions further for:
in response to displaying the user interface specific to the second content item:
in accordance with a determination that a user of the electronic device has not interacted with the second content item:
displaying, on the user interface, a video trailer associated with the second content item; and
in accordance with a determination that a user of the electronic device has interacted with the second content item:
displaying, on the user interface, ambient video content, as a background of the user interface, associated with the second content item without displaying the video trailer in the user interface.

30. The electronic device of claim 29, wherein:
in accordance with a determination that the user of the electronic device has watched a first set of episodes of the second content item, the ambient video is a first ambient video, and
in accordance with a determination that the user of the electronic device has watched a second set of episodes of the second content item, different than the first set, the ambient video is a second ambient video, different than the first ambient video.

31. The electronic device of claim 30, wherein the content item representation section includes the first representation, the second representation and a third representation of a third content item, and:
while a respective representation of the first, second and third representations is in the primary position in the content item representation section, the respective representation includes at least one animated portion; and
while respective representations of the first, second and third representations are in the first and second secondary positions in the content item representation section, the respective representations do not include respective at least one animated portions.

32. The electronic device of claim 17, wherein the content item representation section does not include a representation of an episode of a collection of episodic content.

33. The electronic device of claim 17, wherein:
while the first representation of the first content item is located in the primary position, the first representation includes a visual indication of a provider of the first content item, and
while the second representation of the second content item is located in the primary position, the second representation include a visual indication of a provider of the second content item.

34. The non-transitory computer readable storage medium of claim 18, wherein the content item representation section is included as a row in a user interface of a unified media browsing application, the user interface including other rows of other representations of content items that are selectable to initiate processes to display the respective content items via the display.

35. The non-transitory computer readable storage medium of claim 18, wherein:
the primary position is a center position in the content item representation section, the first secondary position is a left position in the content item representation section, and the second secondary position is a right position in the content item representation section,
a left side of a respective representation that is in the first secondary position is aligned with a left side of the first secondary position, and
a right side of a respective representation that is in the second secondary position is aligned with a right side of the second secondary position.

36. The non-transitory computer readable storage medium of claim 18, wherein the second representation comprises two or more layers of images, and while the second representation is in the primary position, the two or more layers of images move with respect to each other within the second representation in response to touch input detected on a touch-sensitive surface of the one or more input devices.

37. The non-transitory computer readable storage medium of claim 36, wherein the two or more layers includes a first video layer that includes playing video content and a first static layer that includes static image content, wherein the video content in the first video layer starts playing in response to the second representation being moved to the primary position.

38. The non-transitory computer readable storage medium of claim 18, wherein the second representation comprises two or more layers of images, and wherein:
while the second representation is not in the primary position, the two or more layers of the second representation are fixed to each other and do not move with respect to one another in response to touch input detected on a touch-sensitive surface of the one or more input devices; and while the second representation is in the primary position, the two or more layers of images move with respect to each other within the second representation in response to touch input detected on the touch-sensitive surface of the one or more input devices.

39. The non-transitory computer readable storage medium of claim 38, wherein when executed by the one or more processors of the electronic device, the instructions further cause the respective device to:

while the second representation is in the primary position:
receive, via the one or more input devices, a respective touch input detected on the touch-sensitive surface of the one or more input devices; and
in response to receiving the respective touch input:
in accordance with a determination that the respective touch input has a movement magnitude larger than a threshold, move the two or more layers of images in the second representation with respect to each other within the second representation in accordance with the respective touch input; and
in accordance with a determination that the respective touch input has the movement magnitude smaller than the threshold, forgo moving the two or more layers of images in the second representation with respect to each other.

40. The non-transitory computer readable storage medium of claim 39, wherein moving the two or more layers of images in the second representation with respect to each other within the second representation comprises moving the two or more layers of images in the second representation with respect to each other within the second representation while a border of the second representation remains fixed.

41. The non-transitory computer readable storage medium of claim 18, wherein the second representation includes a title of the second content item, and the title of the second content item animates from outside the second representation to inside the second representation in response to the second representation being moved to the primary position.

42. The non-transitory computer readable storage medium of claim 18, wherein:

while the first representation associated with the first content item is in the primary position and the second representation associated with the second content item is in the first secondary position, the first representation is displayed with a first brightness characteristic, and the second representation is displayed with a second brightness characteristic, different than the first brightness characteristic, and while the second representation associated with the second content item is in the primary position and the first representation associated with the first content item is in the second secondary position, the first representation is displayed with the second brightness characteristic, and the second representation is displayed with the first brightness characteristic.

43. The non-transitory computer readable storage medium of claim 18, wherein the second representation comprises two or more layers of images, and wherein when executed by the one or more processors of the electronic device, the instructions further cause the electronic device to:

while the second representation is in the primary position, receive, via the one or more input devices, an input corresponding to a selection input detected at the one or more input devices; and in response to receiving the input corresponding to the selection input detected at the one or more input devices, display an animation of the two or more layers moving towards a foreground of the display resulting in display, via the display, of a user interface specific to the second content item.

44. The non-transitory computer readable storage medium of claim 43, wherein when executed by the one or more processors of the electronic device, the instructions further cause the electronic device to:

in response to displaying the user interface specific to the second content item:
in accordance with a determination that a user of the electronic device has not interacted with the second content item:
display, on the user interface, a video trailer associated with the second content item; and
in accordance with a determination that a user of the electronic device has interacted with the second content item:
display, on the user interface, ambient video content, as a background of the user interface, associated with the second content item without displaying the video trailer in the user interface.

45. The non-transitory computer readable storage medium of claim 44, wherein:

in accordance with a determination that the user of the electronic device has watched a first set of episodes of the second content item, the ambient video is a first ambient video, and in accordance with a determination that the user of the electronic device has watched a second set of episodes of the second content item, different than the first set, the ambient video is a second ambient video, different than the first ambient video.

46. The non-transitory computer readable storage medium of claim 45, wherein the content item representation section includes the first representation, the second representation and a third representation of a third content item, and:

while a respective representation of the first, second and third representations is in the primary position in the content item representation section, the respective representation includes at least one animated portion; and while respective representations of the first, second and third representations are in the first and second secondary positions in the content item representation section, the respective representations do not include respective at least one animated portions.

47. The non-transitory computer readable storage medium of claim 18, wherein the content item representation section does not include a representation of an episode of a collection of episodic content.

48. The non-transitory computer readable storage medium of claim 18, wherein:

while the first representation of the first content item is located in the primary position, the first representation includes a visual indication of a provider of the first content item, and while the second representation of the second content item is located in the primary position, the second representation include a visual indication of a provider of the second content item.

* * * * *